(12) United States Patent
Ohashi et al.

(10) Patent No.: US 8,020,774 B2
(45) Date of Patent: Sep. 20, 2011

(54) TAG LABEL PRODUCING APPARATUS

(75) Inventors: Tsuyoshi Ohashi, Hashima (JP);
Koshiro Yamaguchi, Kakamigahara (JP); Satoru Moriyama, Iwakura (JP); Takuya Nagai, Nagoya (JP); Yoshinori Maeda, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 429 days.

(21) Appl. No.: 12/086,842

(22) PCT Filed: Dec. 20, 2006

(86) PCT No.: PCT/JP2006/325436
§ 371 (c)(1),
(2), (4) Date: Jun. 20, 2008

(87) PCT Pub. No.: WO2007/072887
PCT Pub. Date: Jun. 28, 2007

(65) Prior Publication Data
US 2009/0041527 A1    Feb. 12, 2009

(30) Foreign Application Priority Data

Dec. 20, 2005  (JP) ................ 2005-366087
Jan. 13, 2006  (JP) ................ 2006-006298
Feb. 21, 2006  (JP) ................ 2006-043799
Dec. 19, 2006  (JP) ................ 2006-341795

(51) Int. Cl.
*G06K 19/06*    (2006.01)
(52) U.S. Cl. .................... 235/492; 340/572.1

(58) Field of Classification Search .......... 235/492; 340/572.1; 400/76, 248, 120.16, 615.2; 156/264, 156/256, 378, 277, 220, 248, 267
See application file for complete search history.

(56) References Cited

U.S. PATENT DOCUMENTS

| | | | |
|---|---|---|---|
| 5,875,434 A | 2/1999 | Matsuoka et al. | |
| 6,330,971 B1* | 12/2001 | Mabry et al. | 235/383 |
| 6,593,853 B1* | 7/2003 | Barrett et al. | 340/572.1 |
| 7,066,667 B2* | 6/2006 | Chapman et al. | 400/76 |
| 7,384,496 B2* | 6/2008 | Cote et al. | 156/277 |
| 7,394,358 B2* | 7/2008 | Cherry | 340/505 |
| 2005/0029350 A1* | 2/2005 | Jusas et al. | 235/451 |
| 2005/0091821 A1* | 5/2005 | Best et al. | 29/430 |
| 2006/0006234 A1* | 1/2006 | Mizutani et al. | 235/451 |
| 2006/0125640 A1* | 6/2006 | Oakes et al. | 340/572.7 |
| 2008/0038034 A1* | 2/2008 | Yamaguchi et al. | 400/76 |

FOREIGN PATENT DOCUMENTS

| | | |
|---|---|---|
| JP | 05-027098 | 2/1993 |
| JP | 08-244919 | 9/1996 |
| JP | 10-143688 | 5/1998 |
| JP | 10-273208 | 10/1998 |
| JP | 11-003406 | 1/1999 |

(Continued)

*Primary Examiner* — Michael G Lee
*Assistant Examiner* — Tabitha Chedekel
(74) *Attorney, Agent, or Firm* — Day Pitney LLP

(57) ABSTRACT

This disclosure discloses a tag label producing apparatus comprises a feeding device that feeds a tag medium including an RFID circuit element having an IC circuit part configured to store information and a tag antenna configured to transmit/receive information, a communication device that transmits and receives information via a wireless communication to and from the RFID circuit element provided in the tag medium; and a communication facilitation processing portion that executes predetermined facilitation processing related to a communication during the wireless communication based on the communication device.

11 Claims, 64 Drawing Sheets

FOREIGN PATENT DOCUMENTS

| | | |
|---|---|---|
| JP | 2000-113130 | 4/2000 |
| JP | 2000-242754 | 9/2000 |
| JP | 2001-096814 | 4/2001 |
| JP | 2001-134814 | 5/2001 |
| JP | 2002-279356 | 9/2002 |
| JP | 2002-279362 | 9/2002 |
| JP | 2003-108942 | 4/2003 |
| JP | 2003-140548 | 5/2003 |
| JP | 2003-223619 | 8/2003 |
| JP | 2003-288557 | 10/2003 |
| JP | 2004-086654 | 3/2004 |
| JP | 2005-107809 | 4/2005 |
| JP | 2005-222205 | 8/2005 |
| JP | 2005-222206 | 8/2005 |
| JP | 2005-243387 | 9/2005 |
| JP | 2005-329996 | 12/2005 |

* cited by examiner

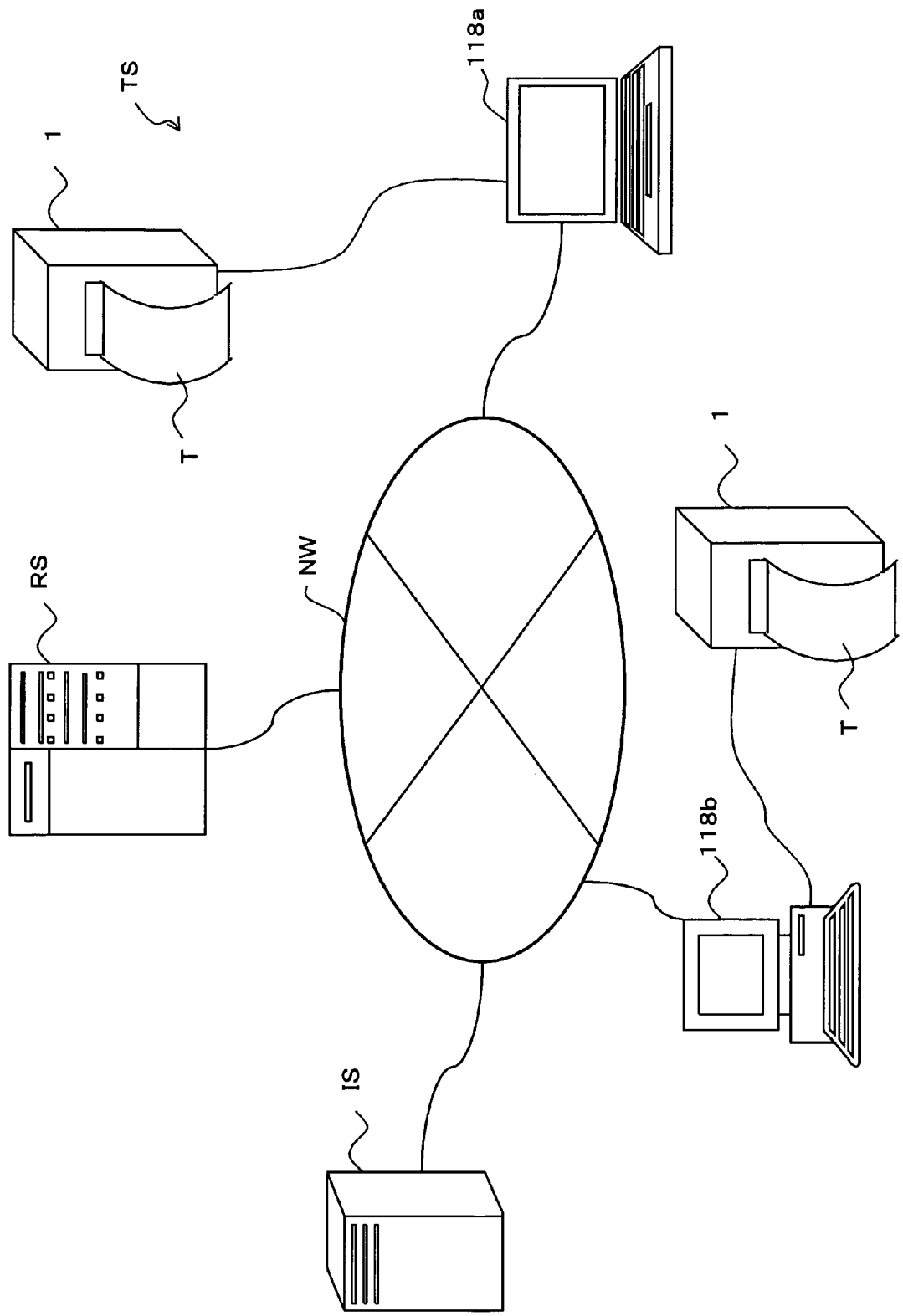
[FIG. 1]

[FIG. 2]
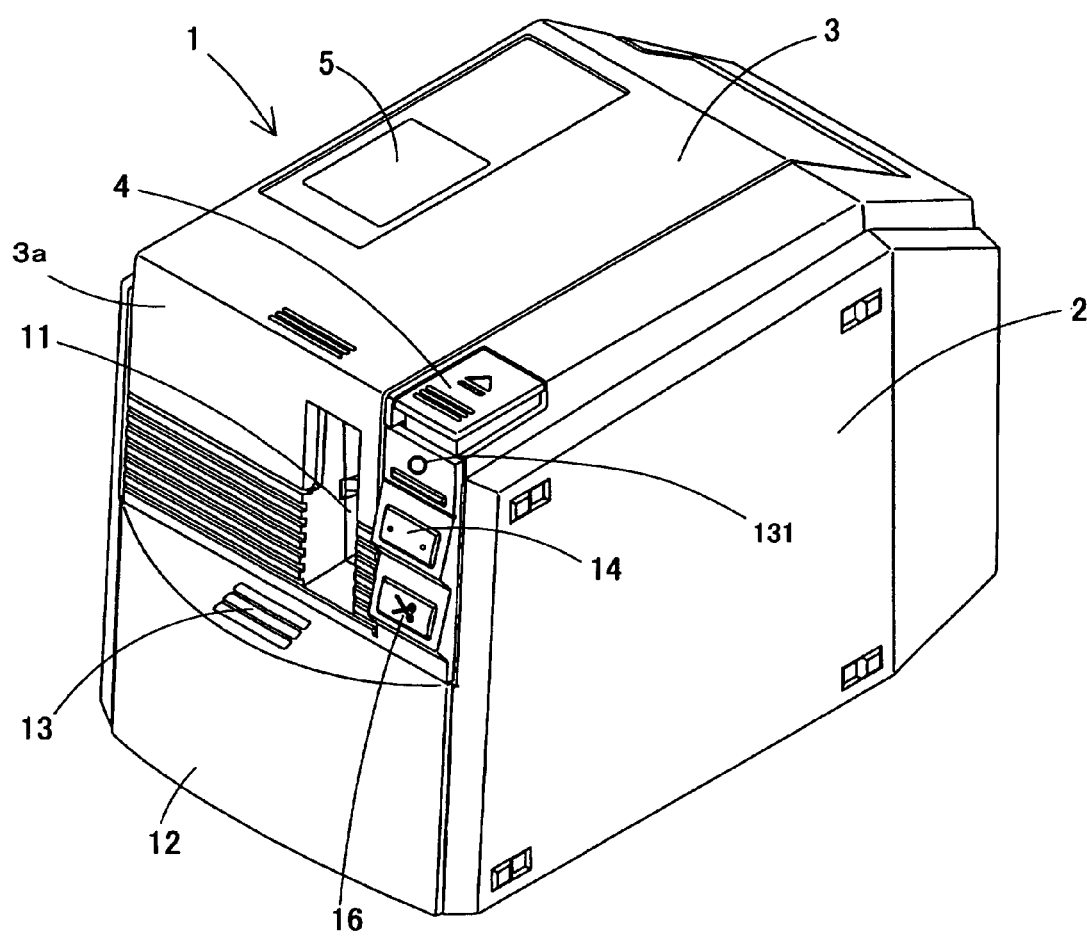

[FIG. 3]
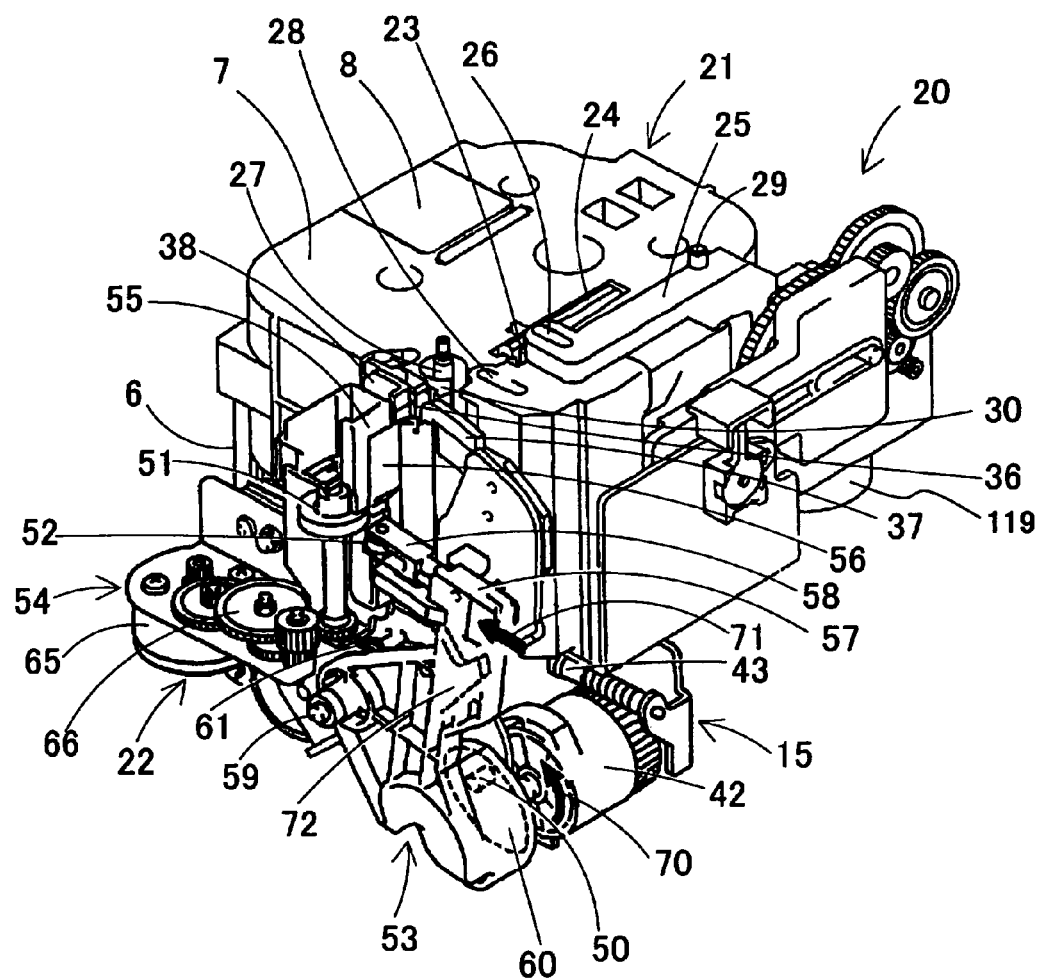

[FIG. 4]
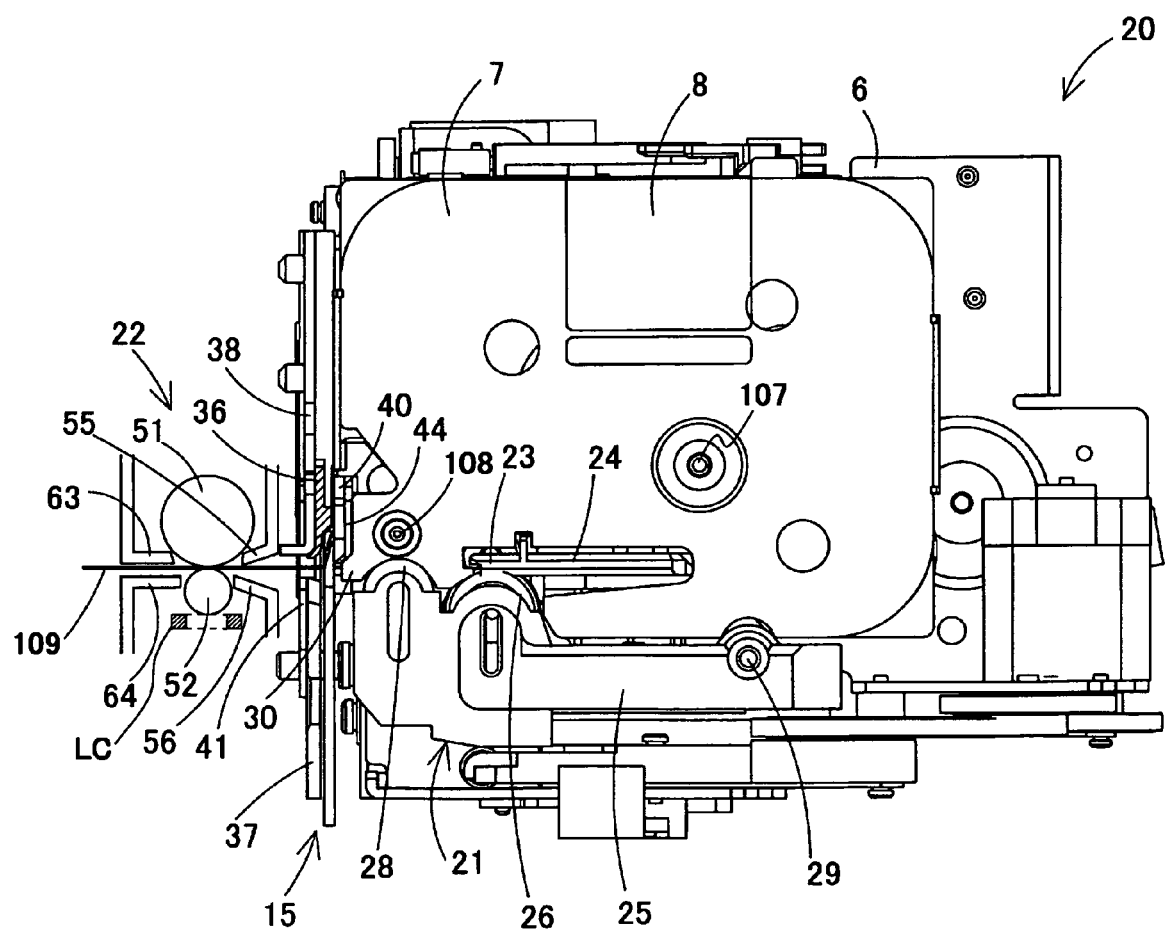

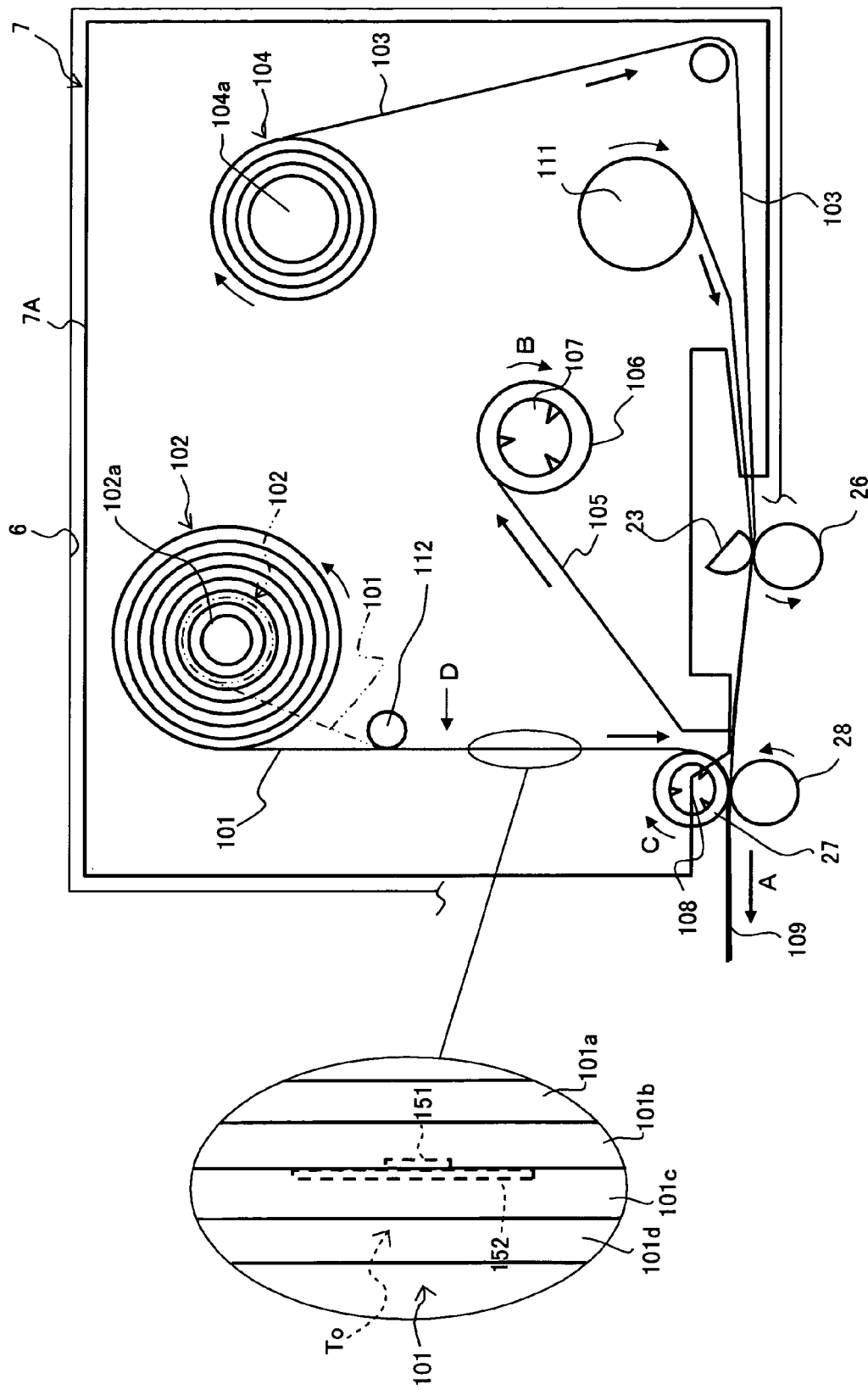

[FIG. 6]
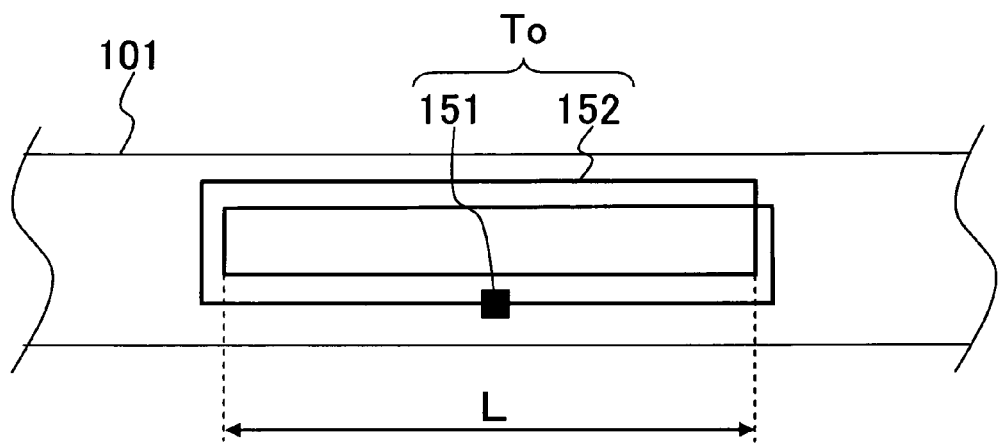

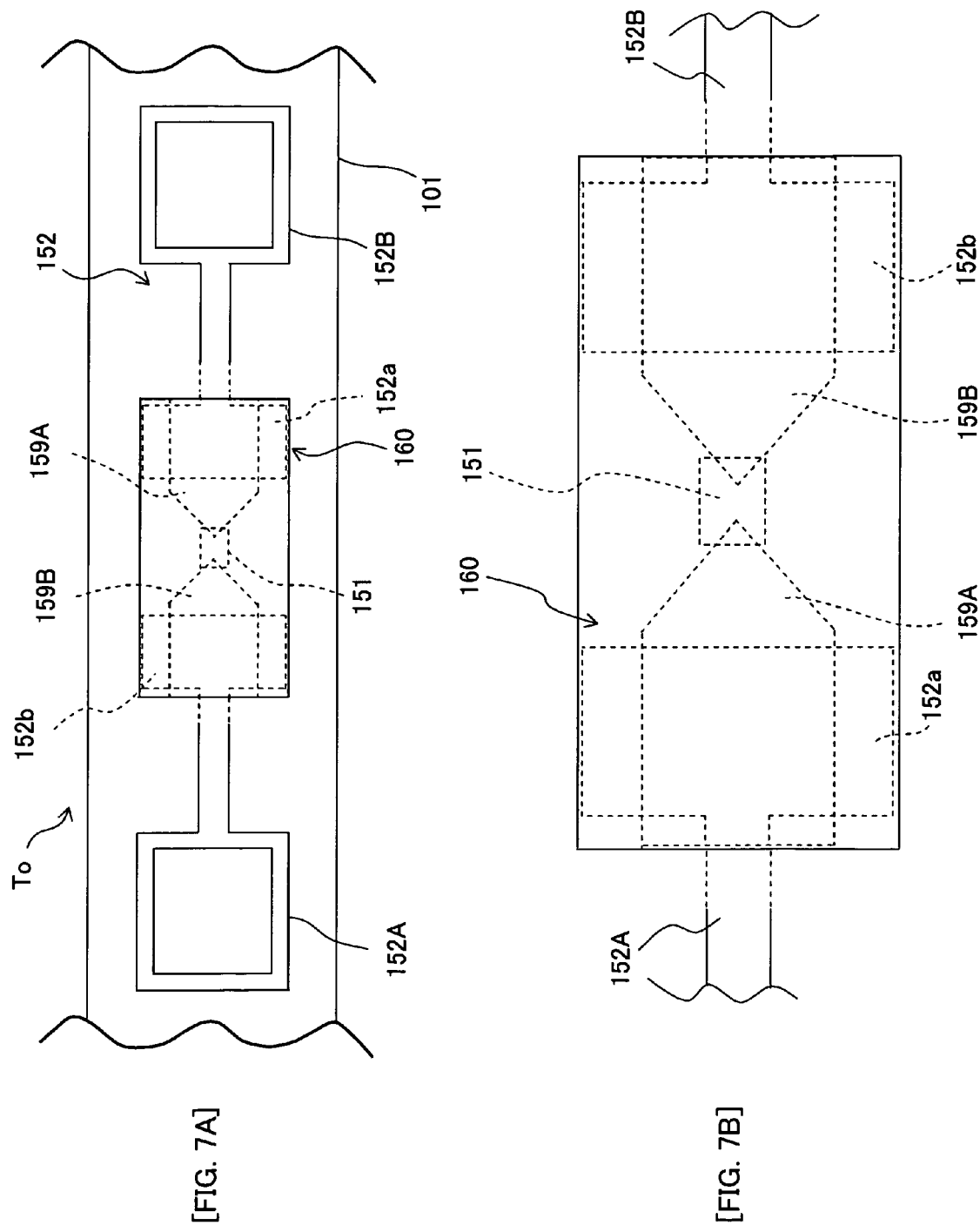

[FIG. 8]
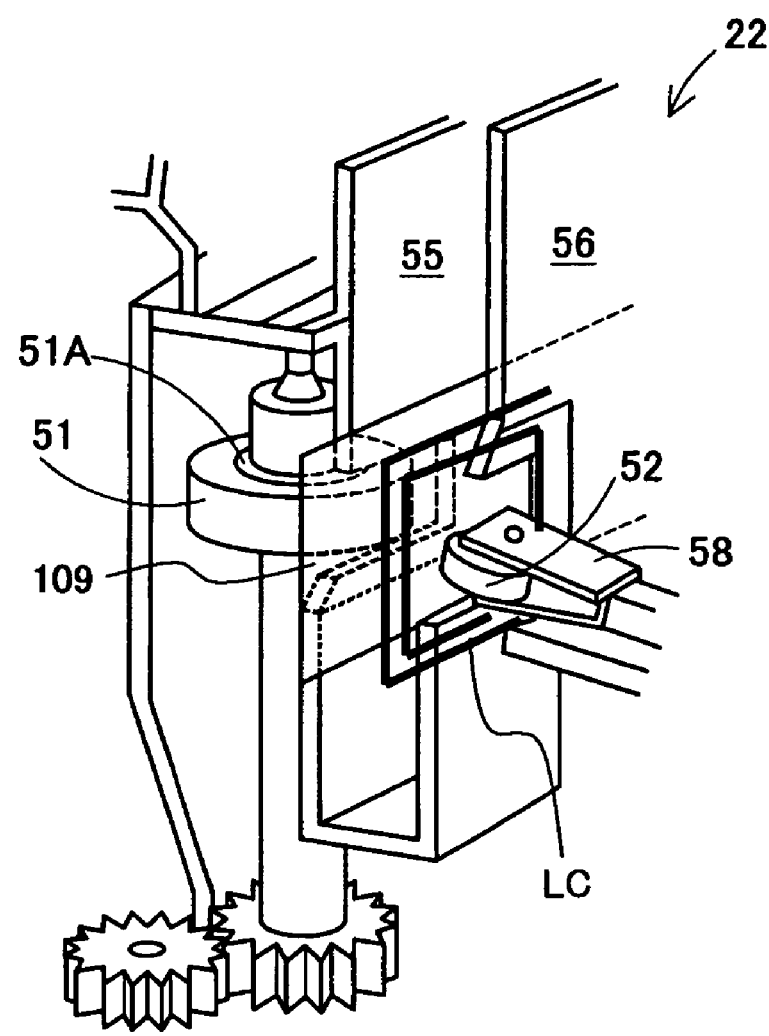

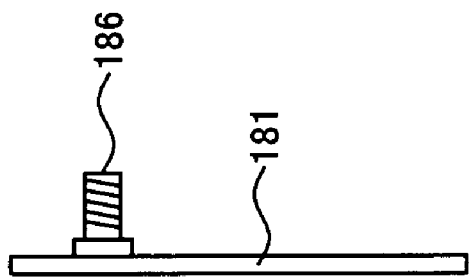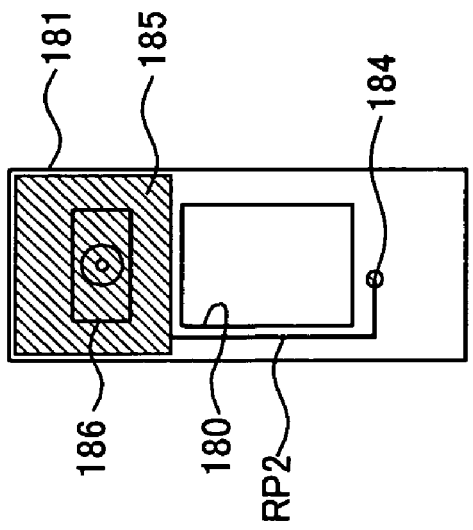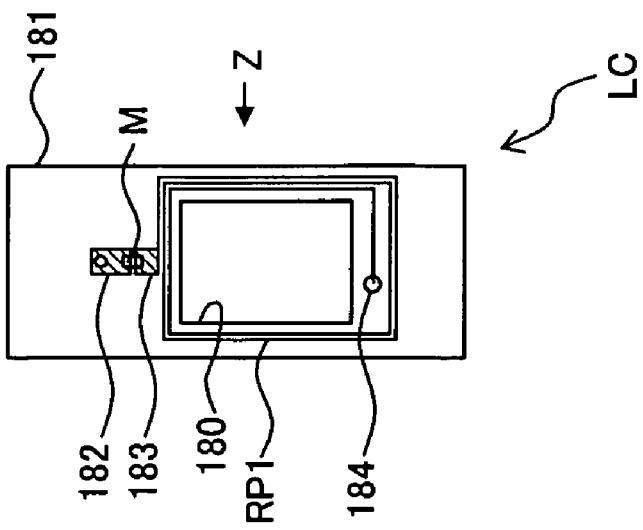

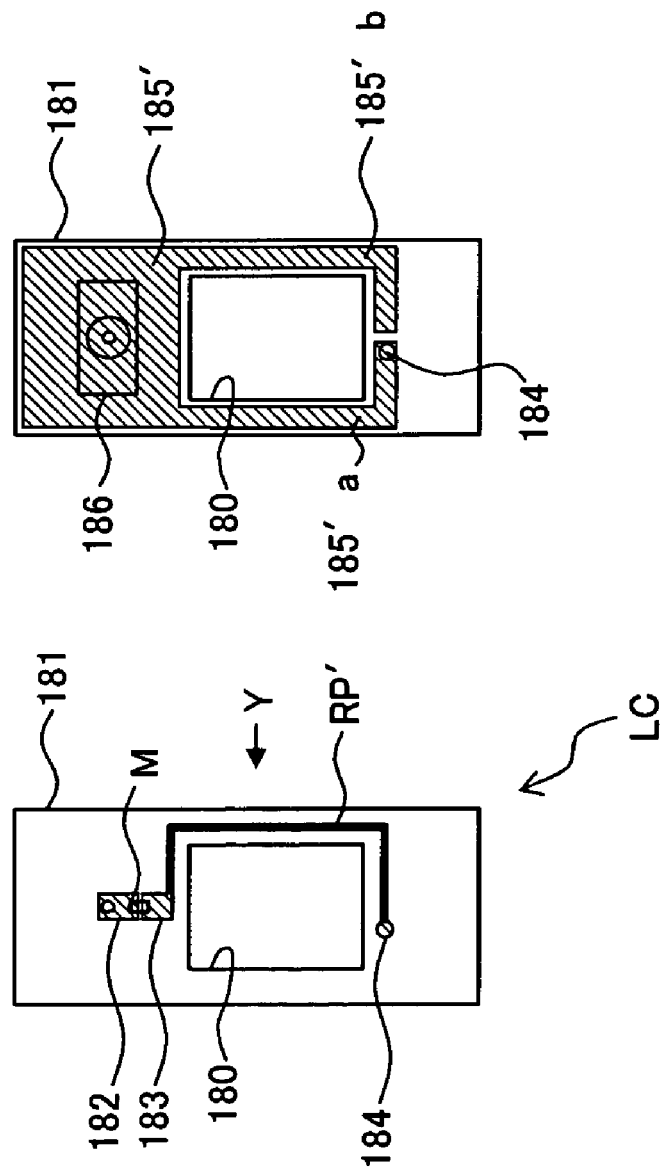

[FIG. 11]
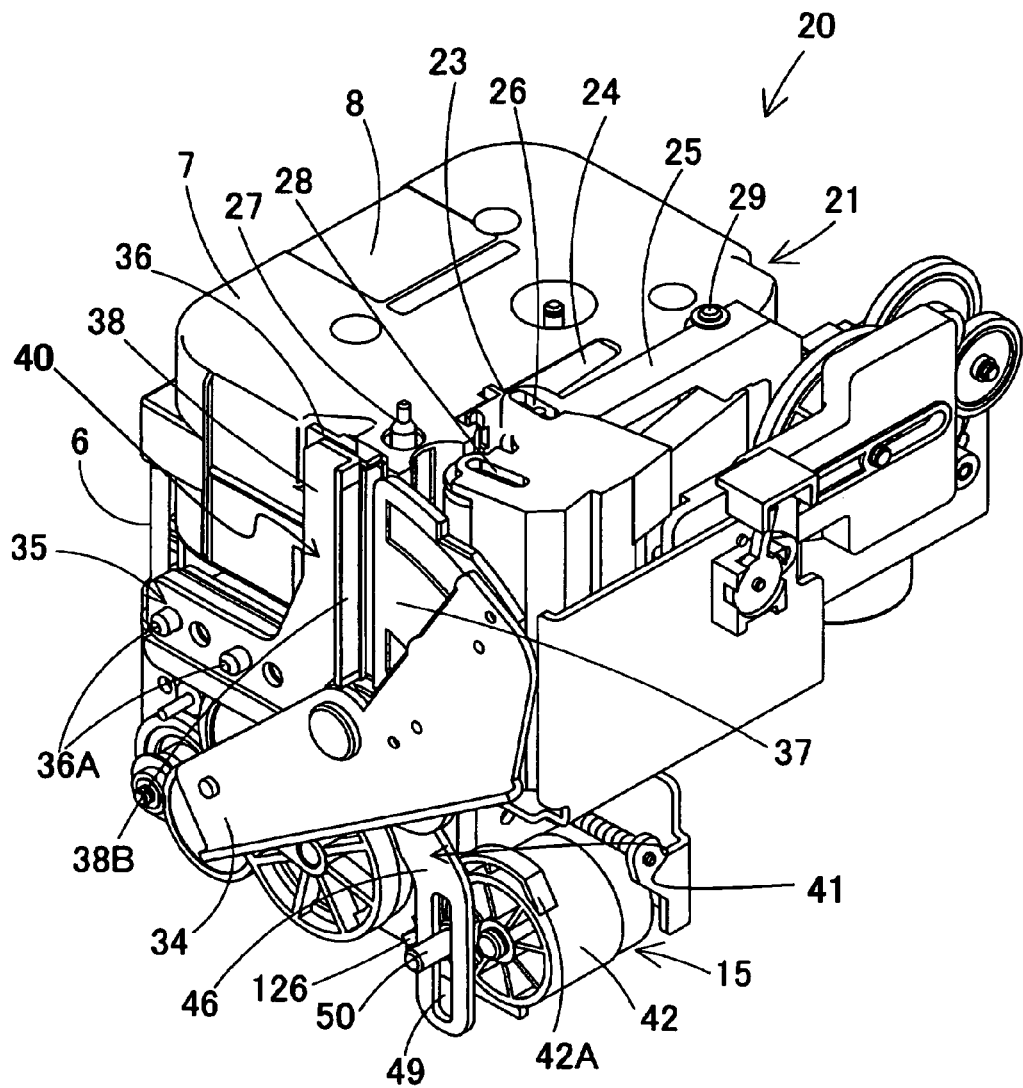

[FIG. 12]
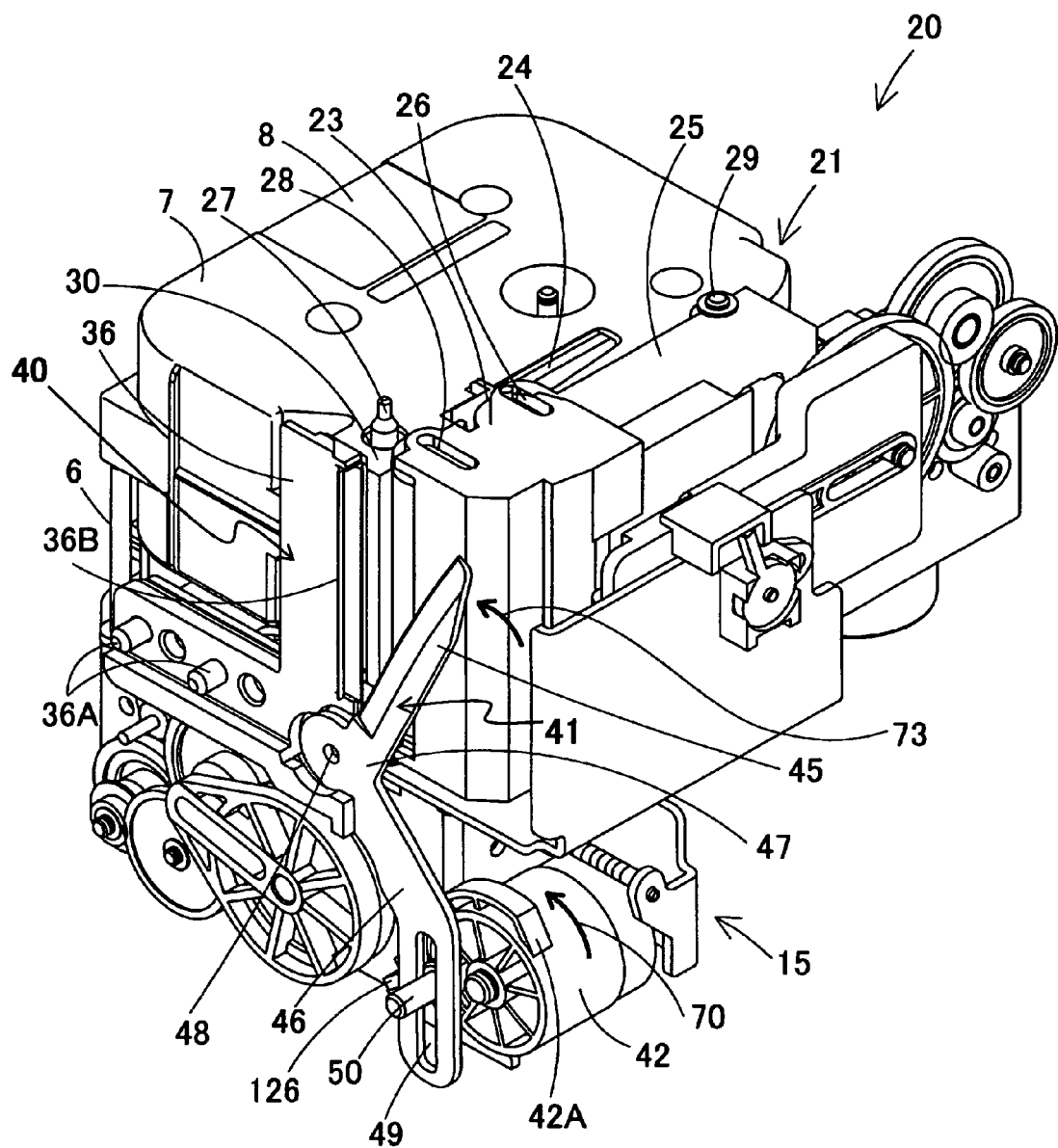

[FIG. 13]
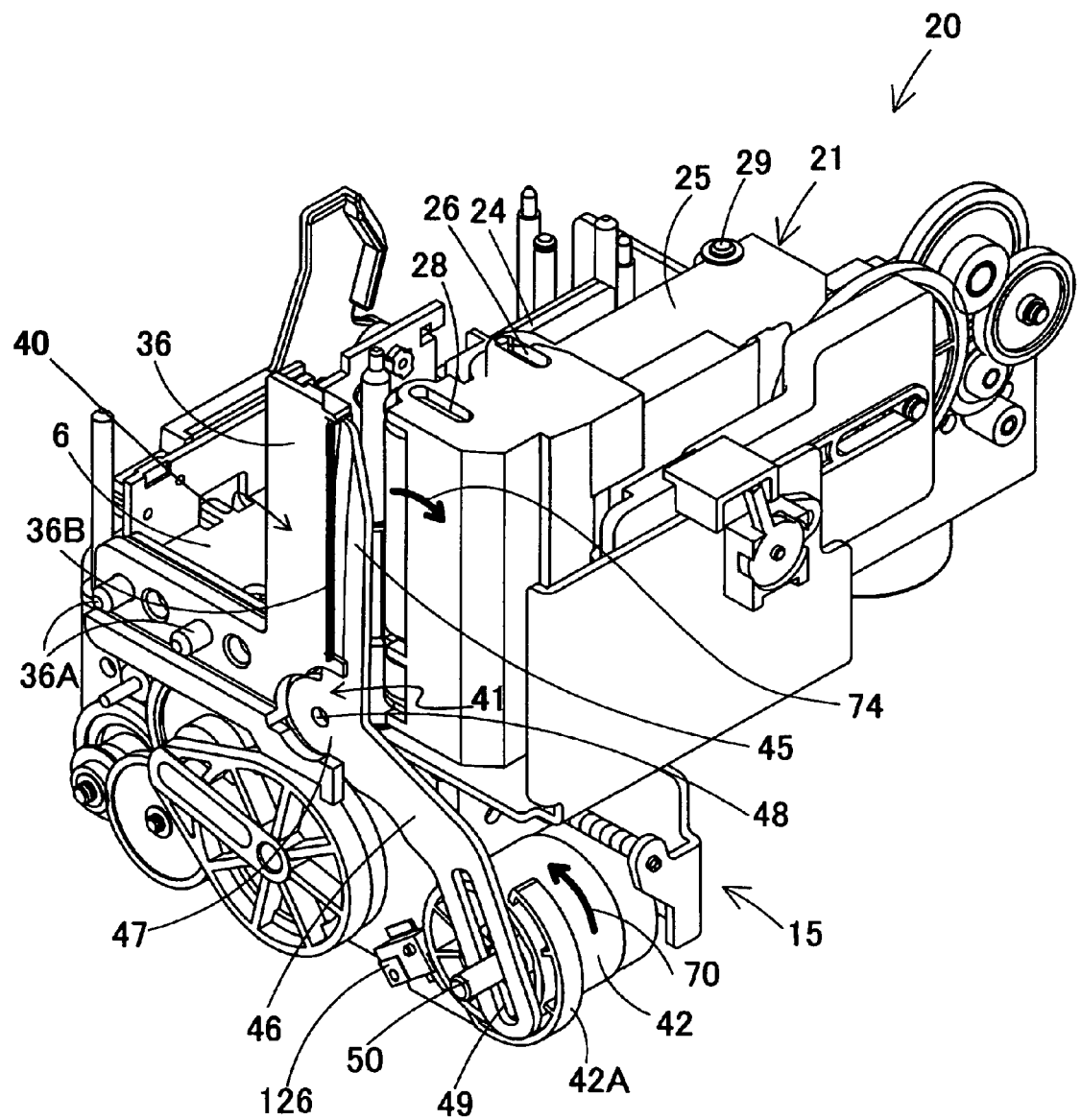

[FIG. 14]
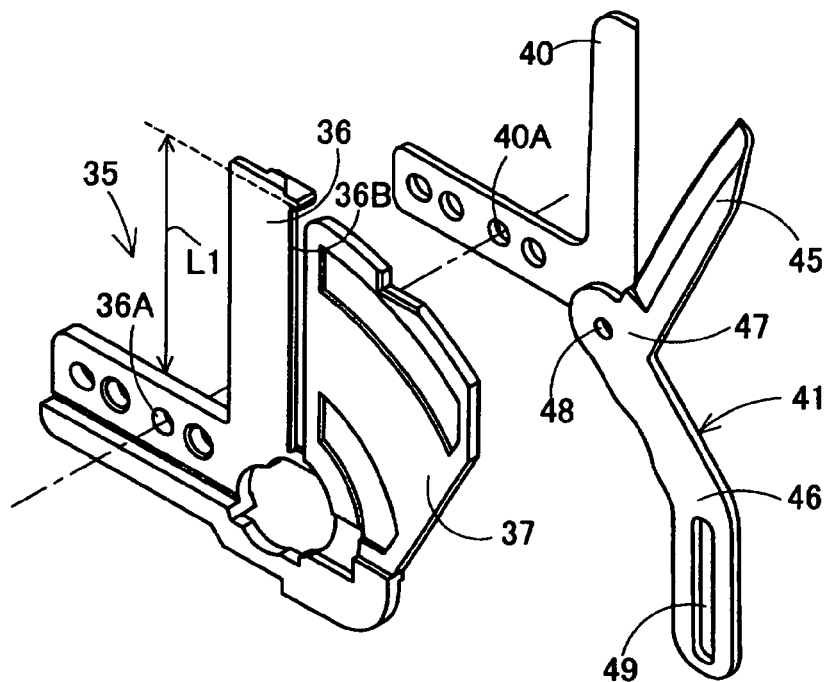
[FIG. 15]
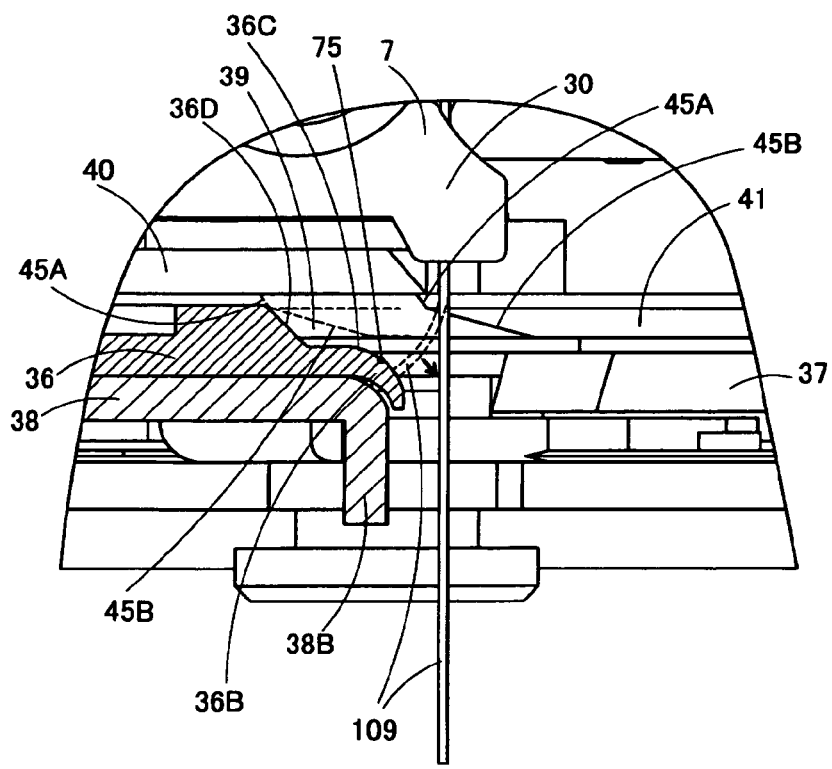

[FIG. 16]
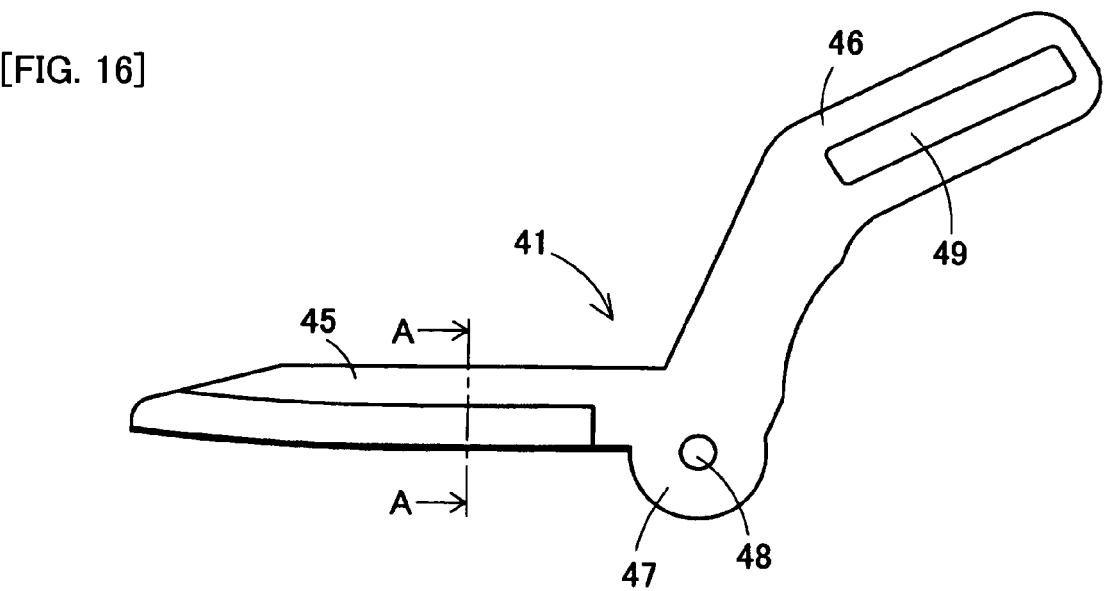
[FIG. 17]
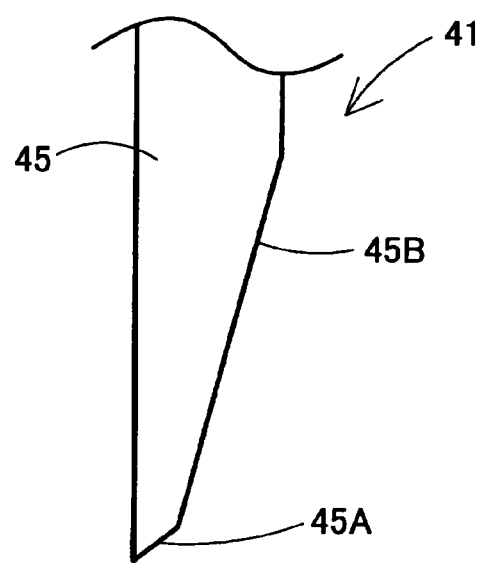

[FIG. 18]
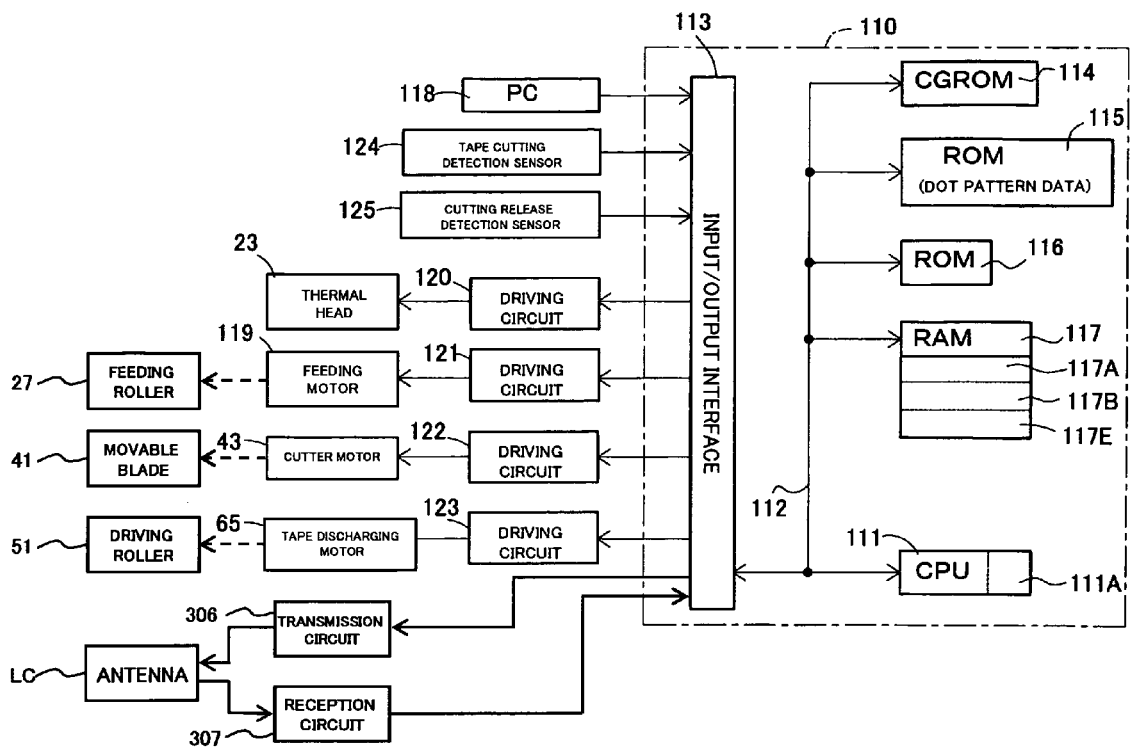

[FIG. 19]
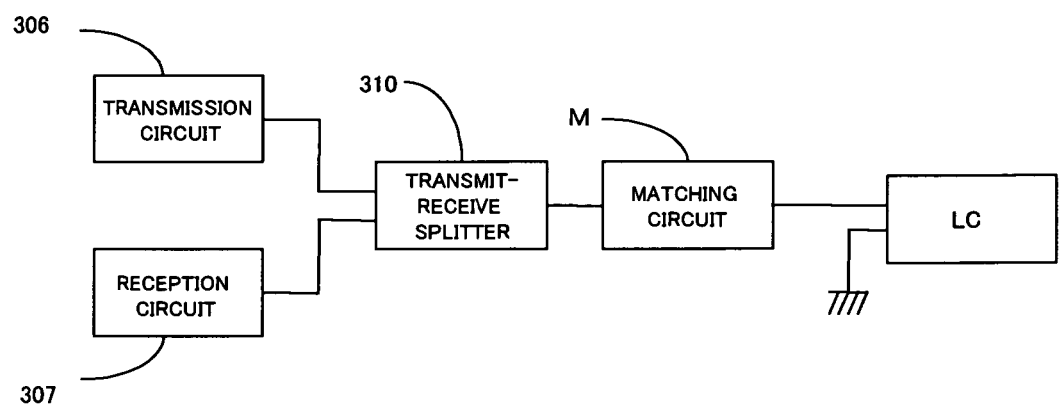

[FIG. 20]
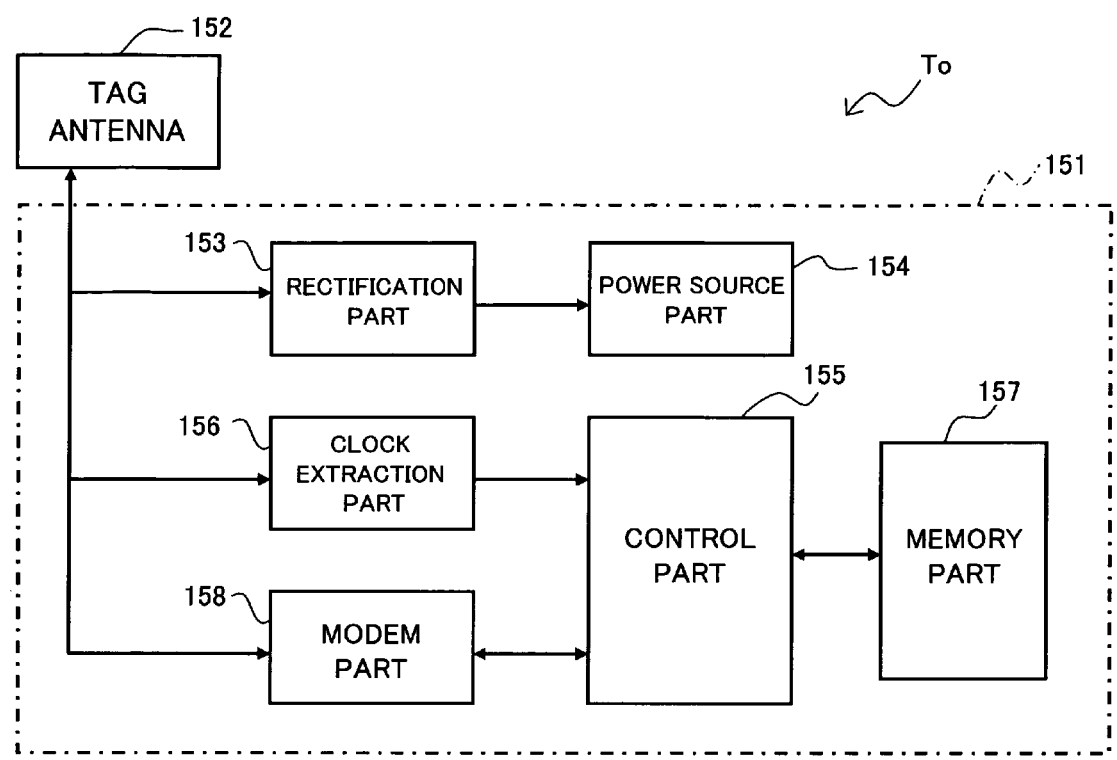

[FIG. 21A]
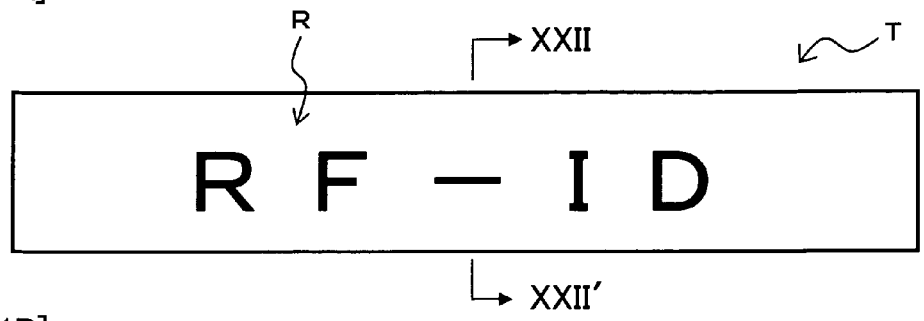
[FIG. 21B]
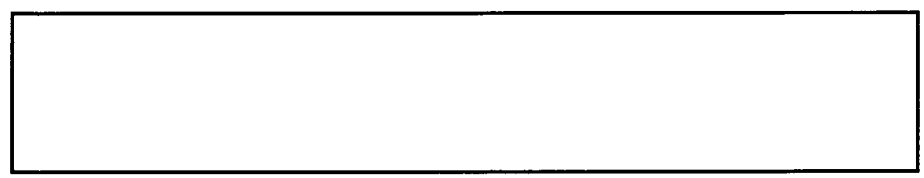
[FIG. 22]
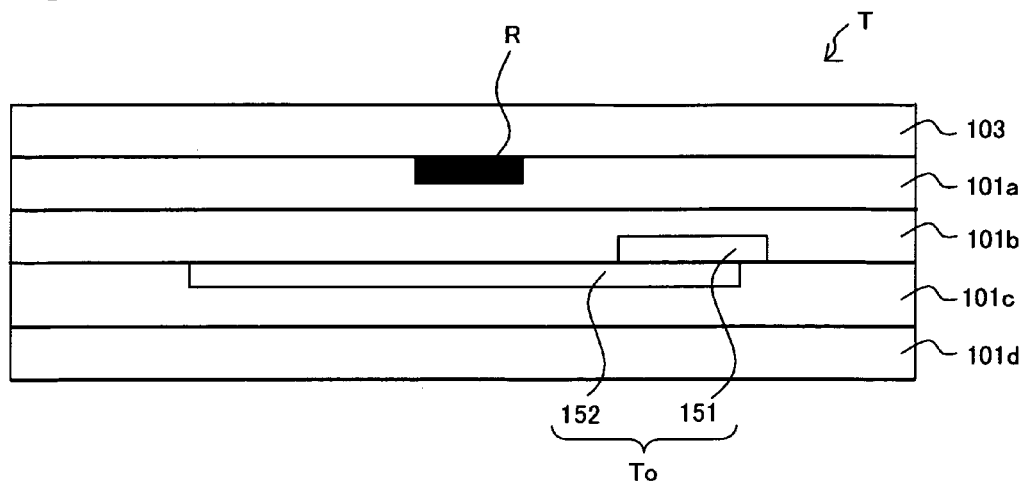

[FIG. 23]
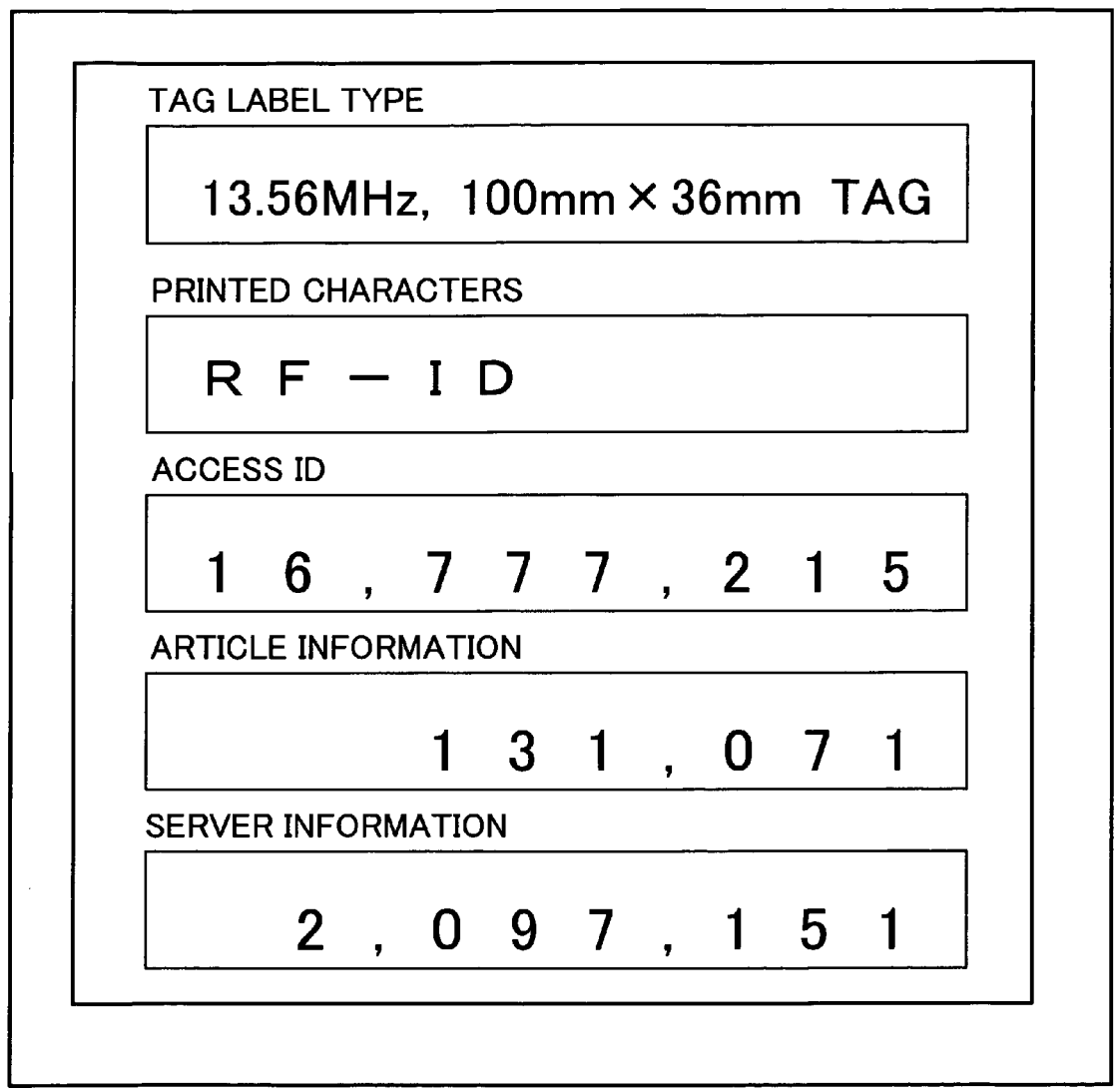

[FIG. 24]
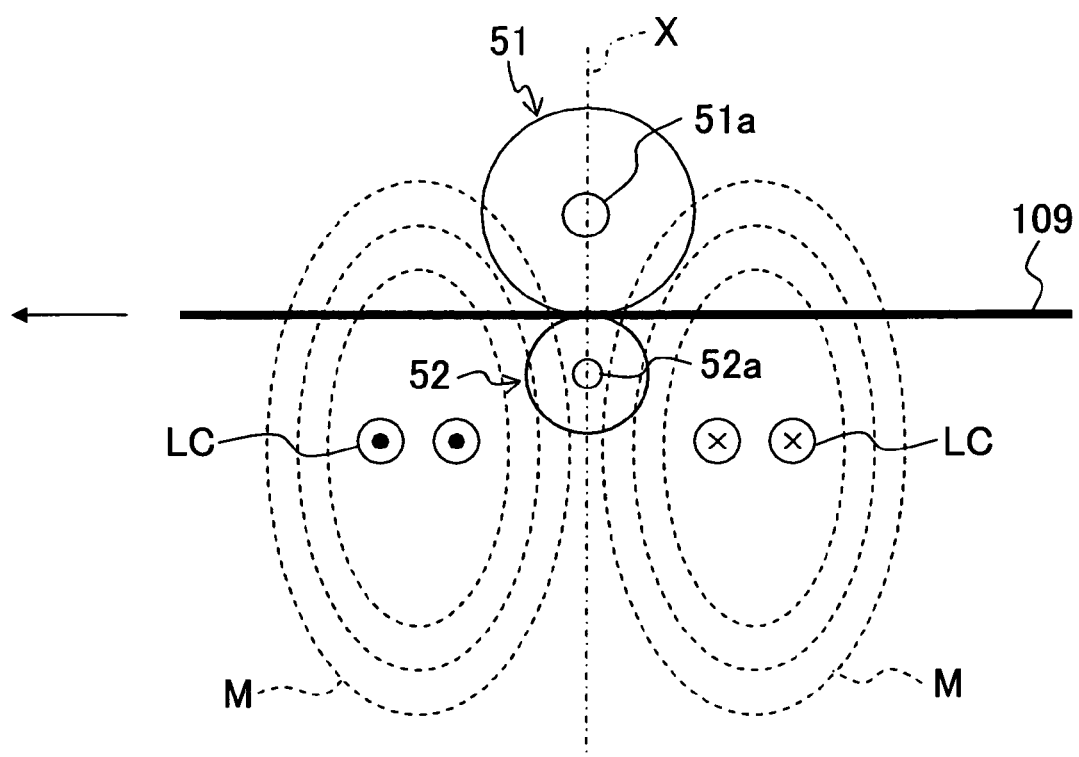

[FIG. 25]
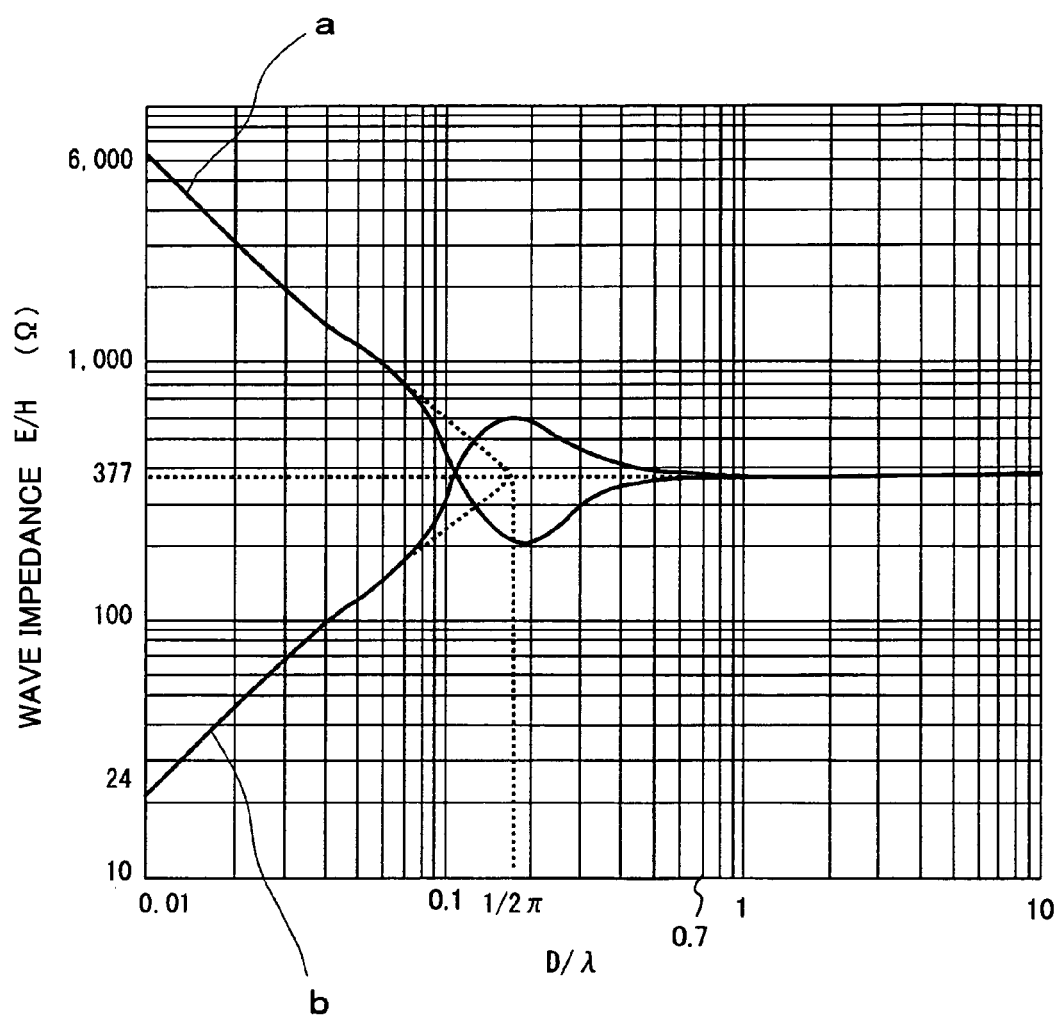

[FIG. 26]
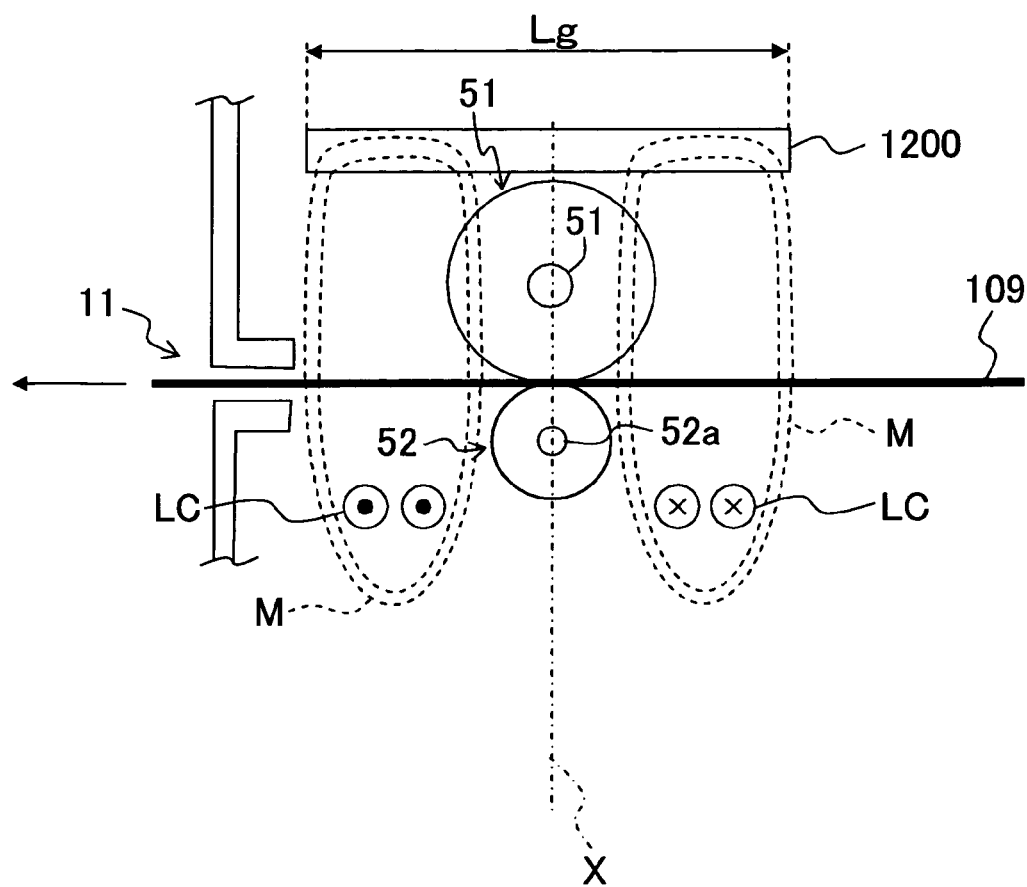

[FIG. 27]
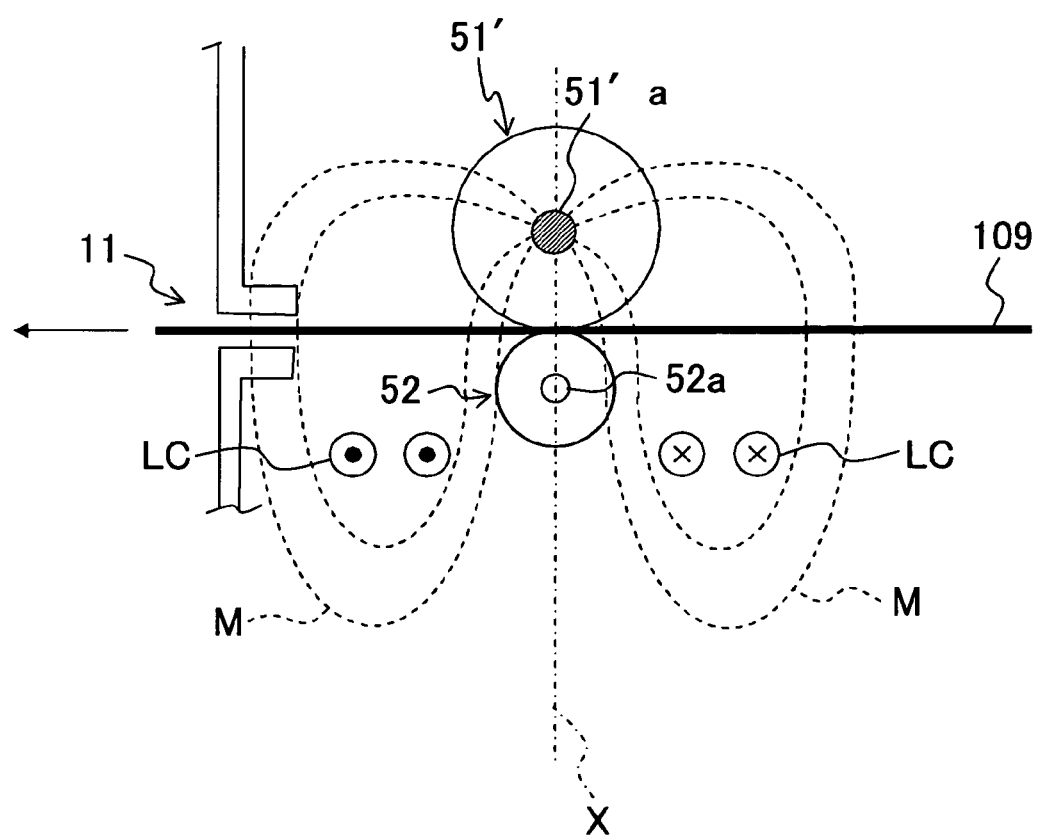

[FIG. 28]
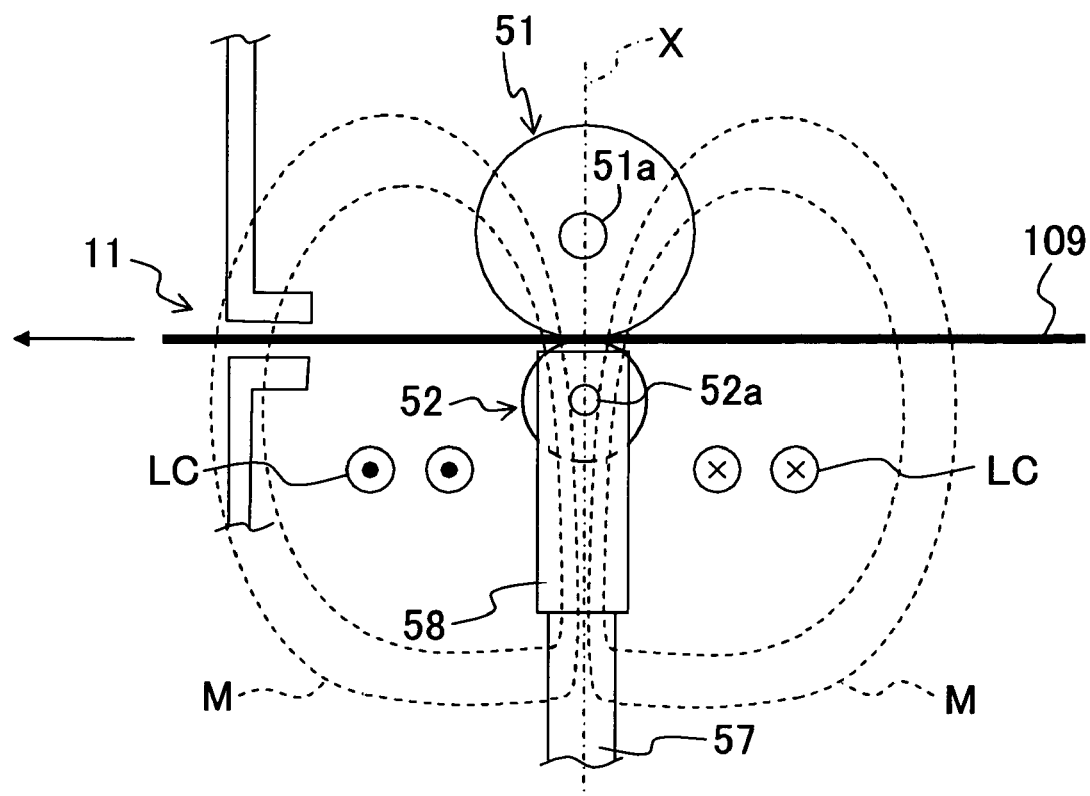

[FIG. 29]
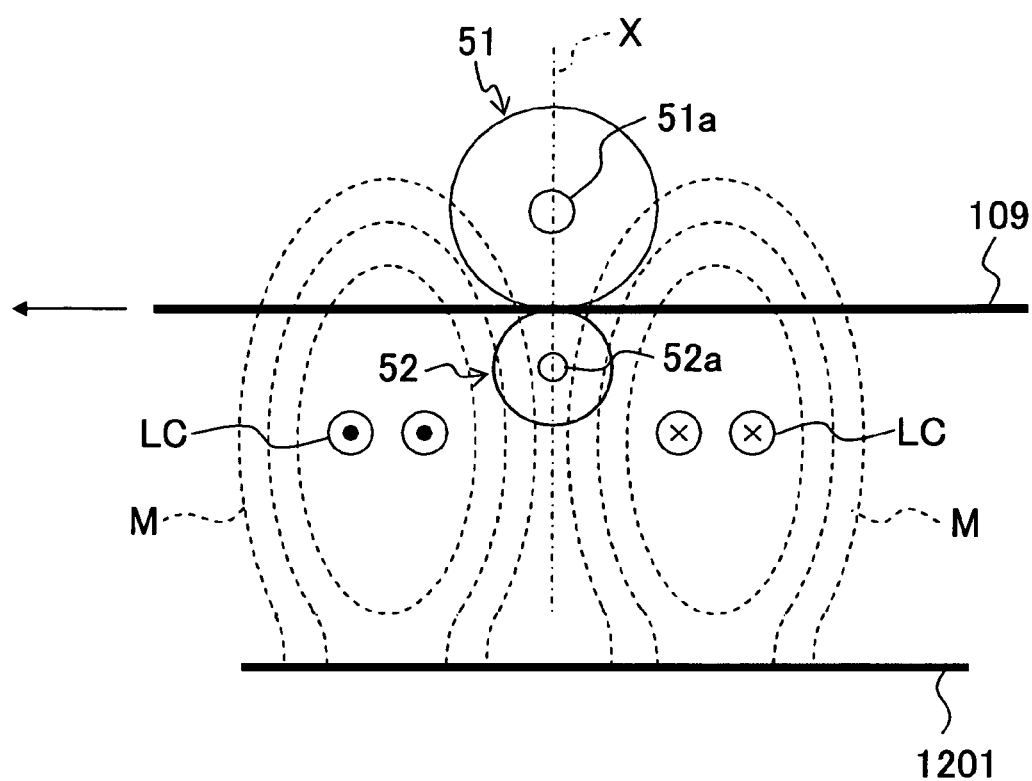

[FIG. 30]
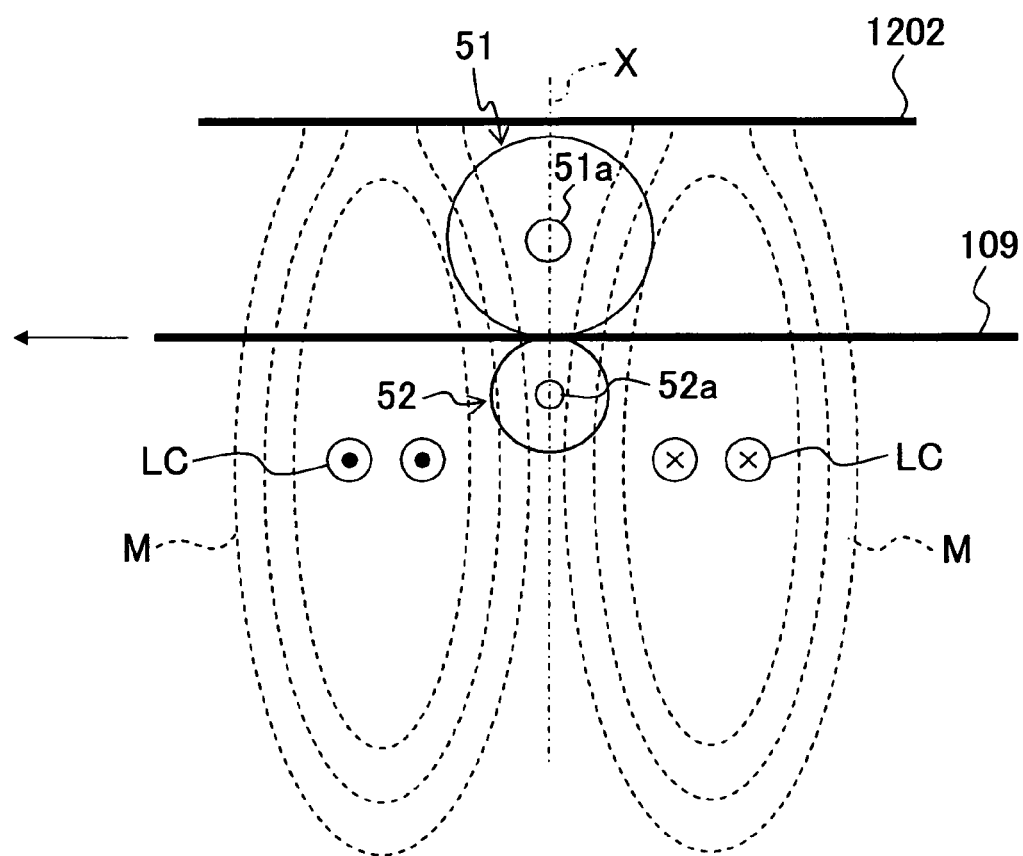

[FIG. 31]
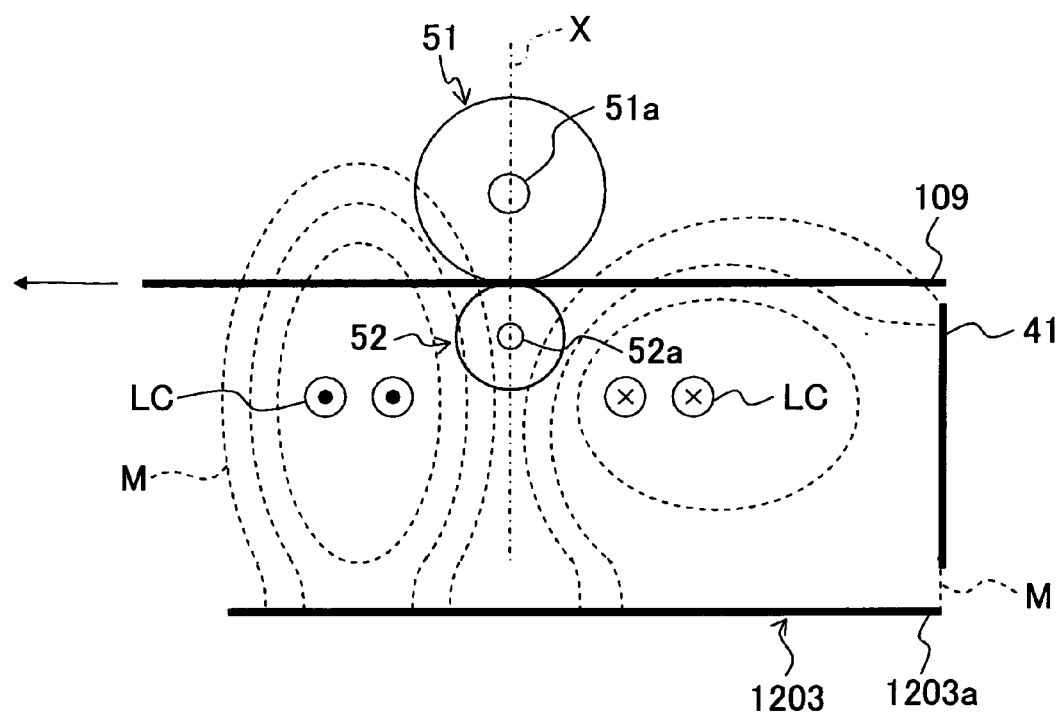

[FIG. 32]
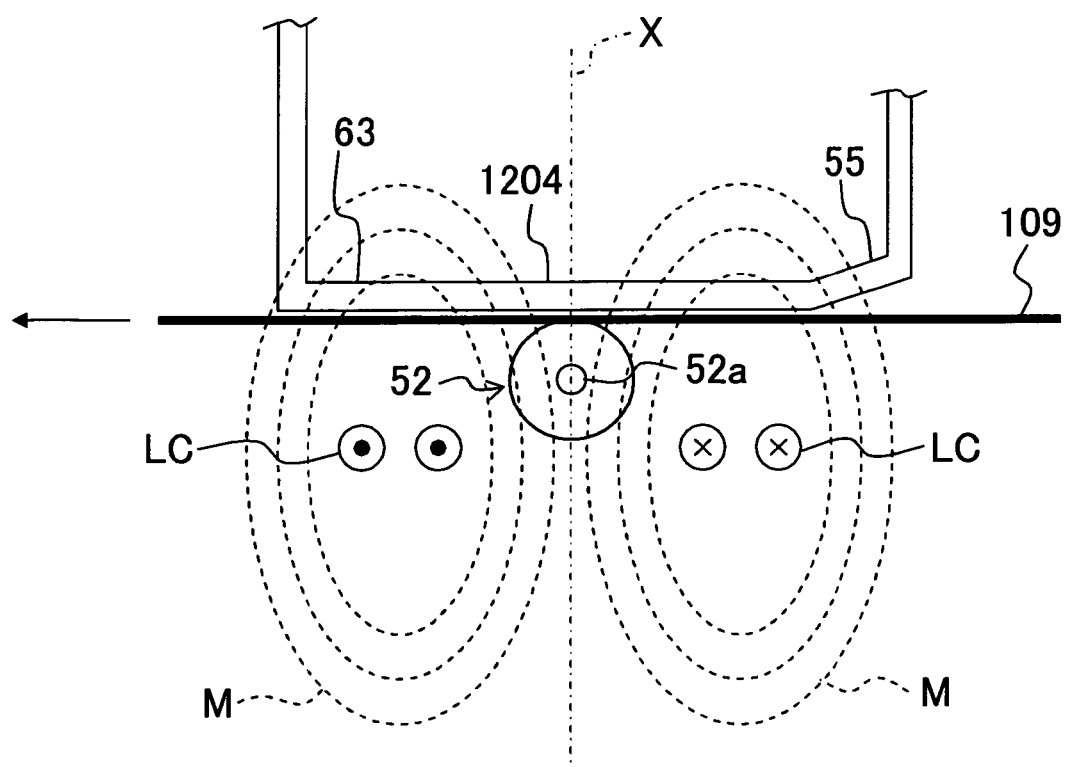

[FIG. 33]
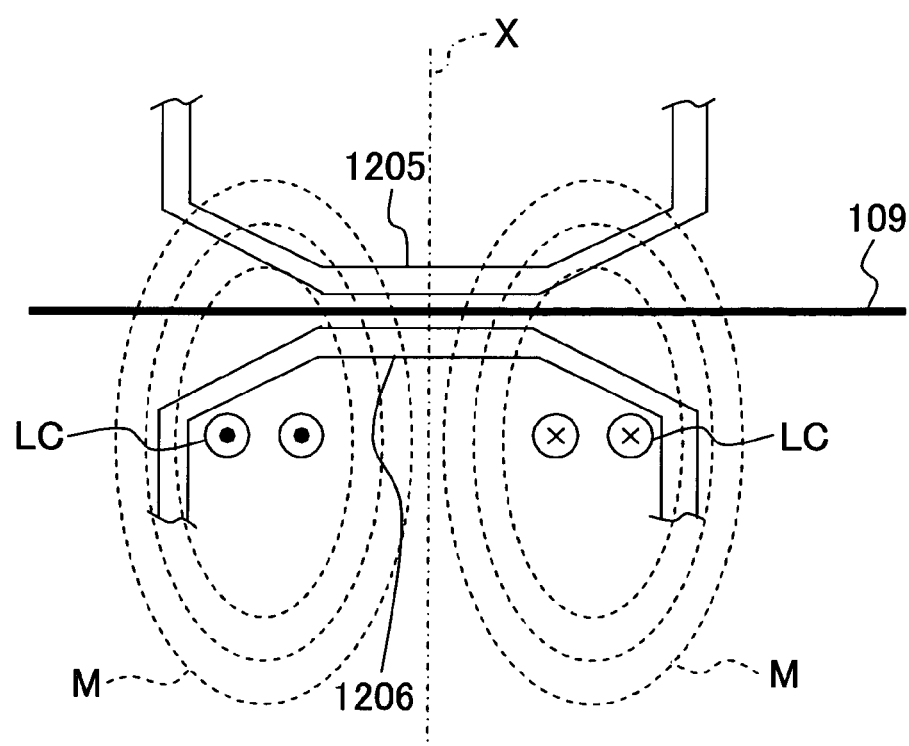

[FIG. 34]
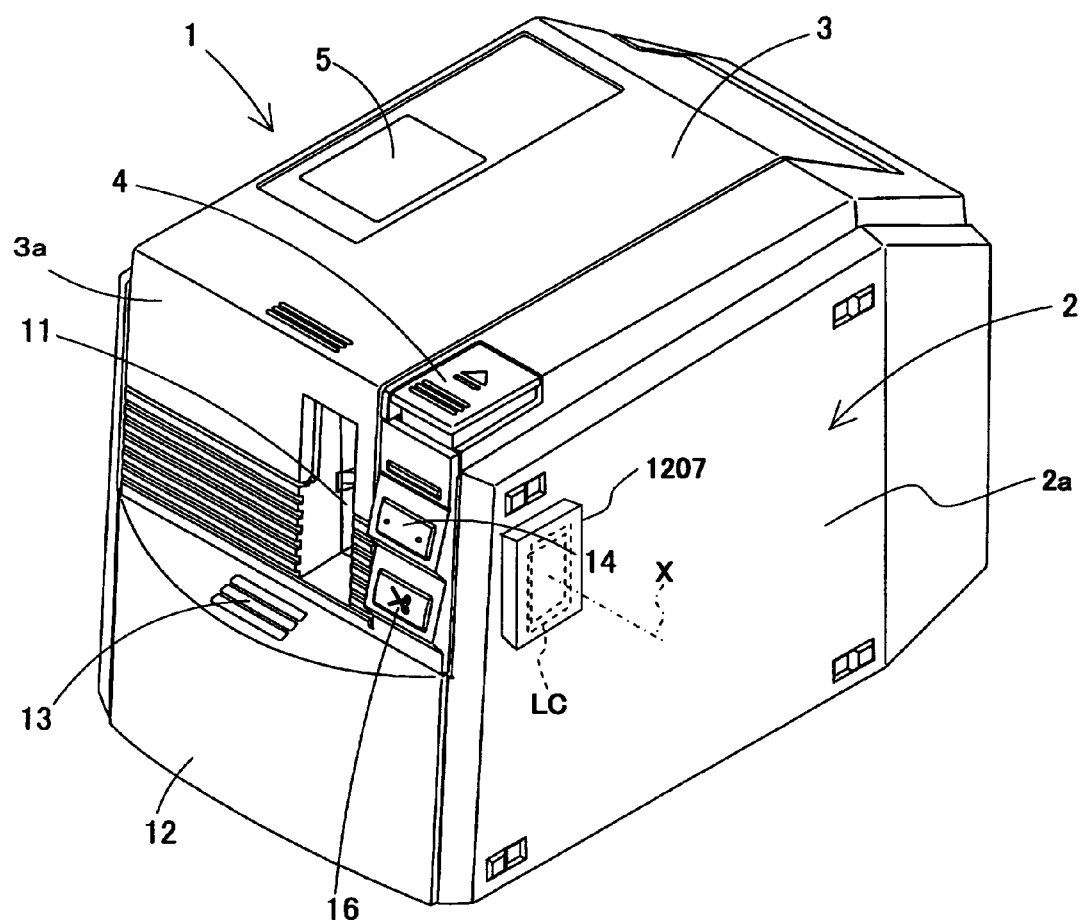

[FIG. 35]
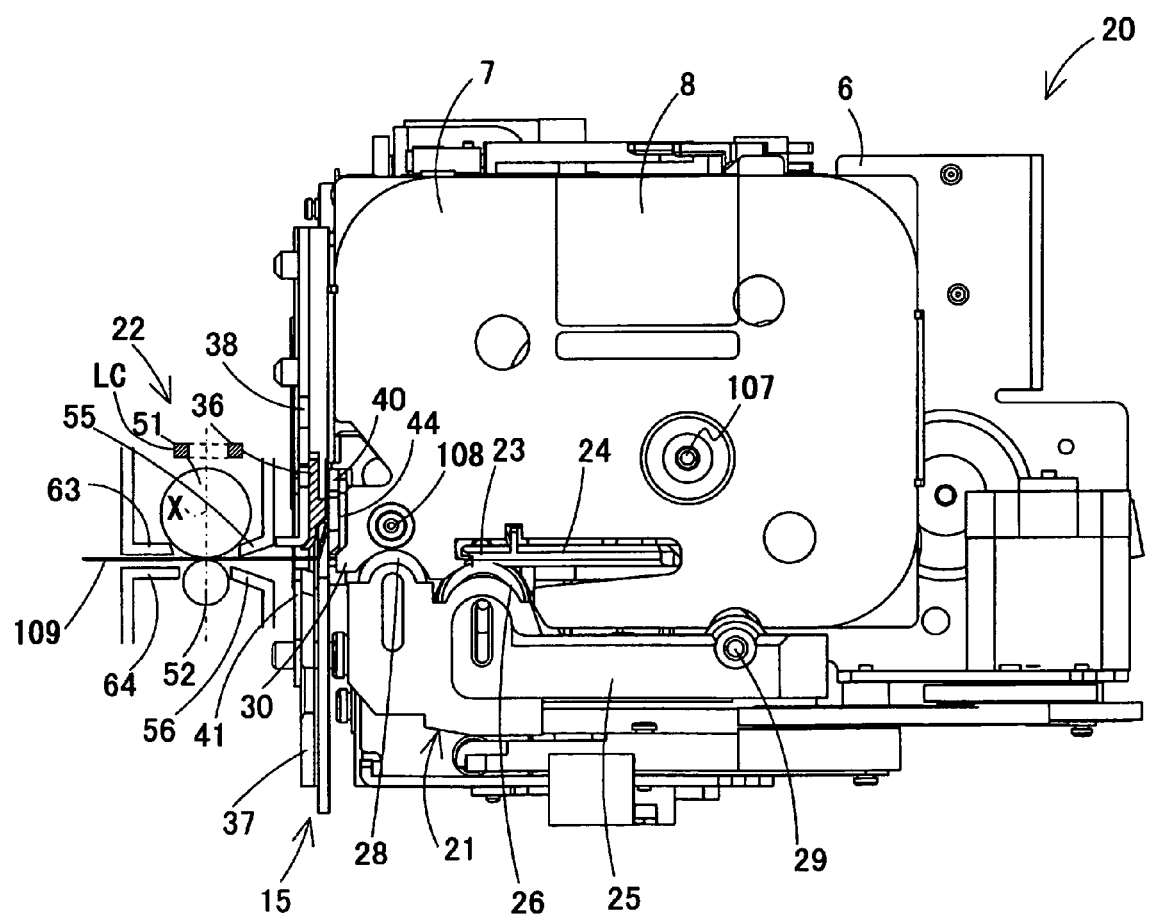

[FIG. 36]
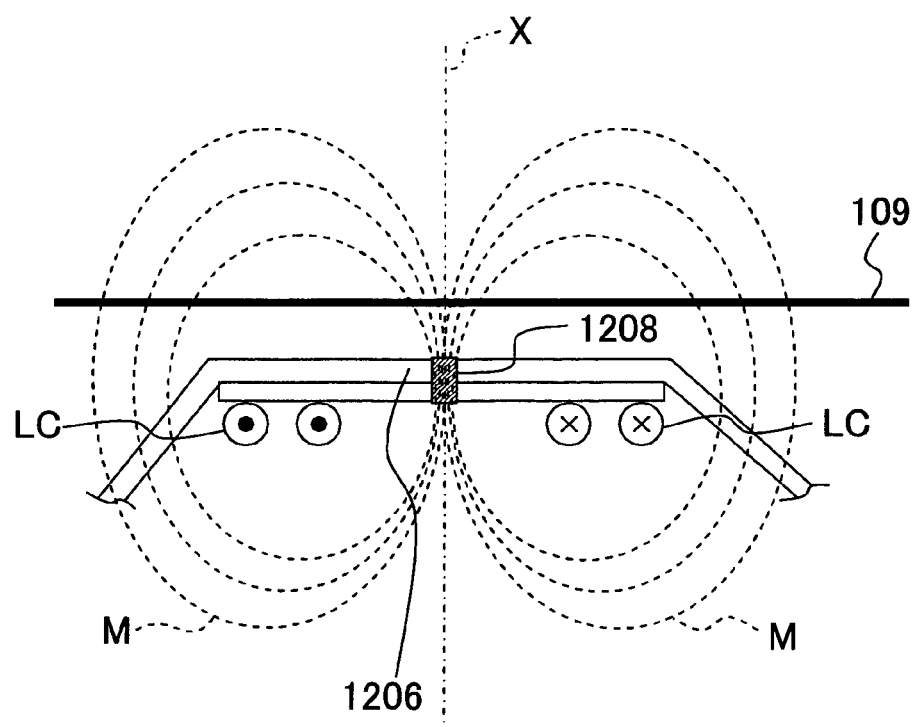

[FIG. 37]
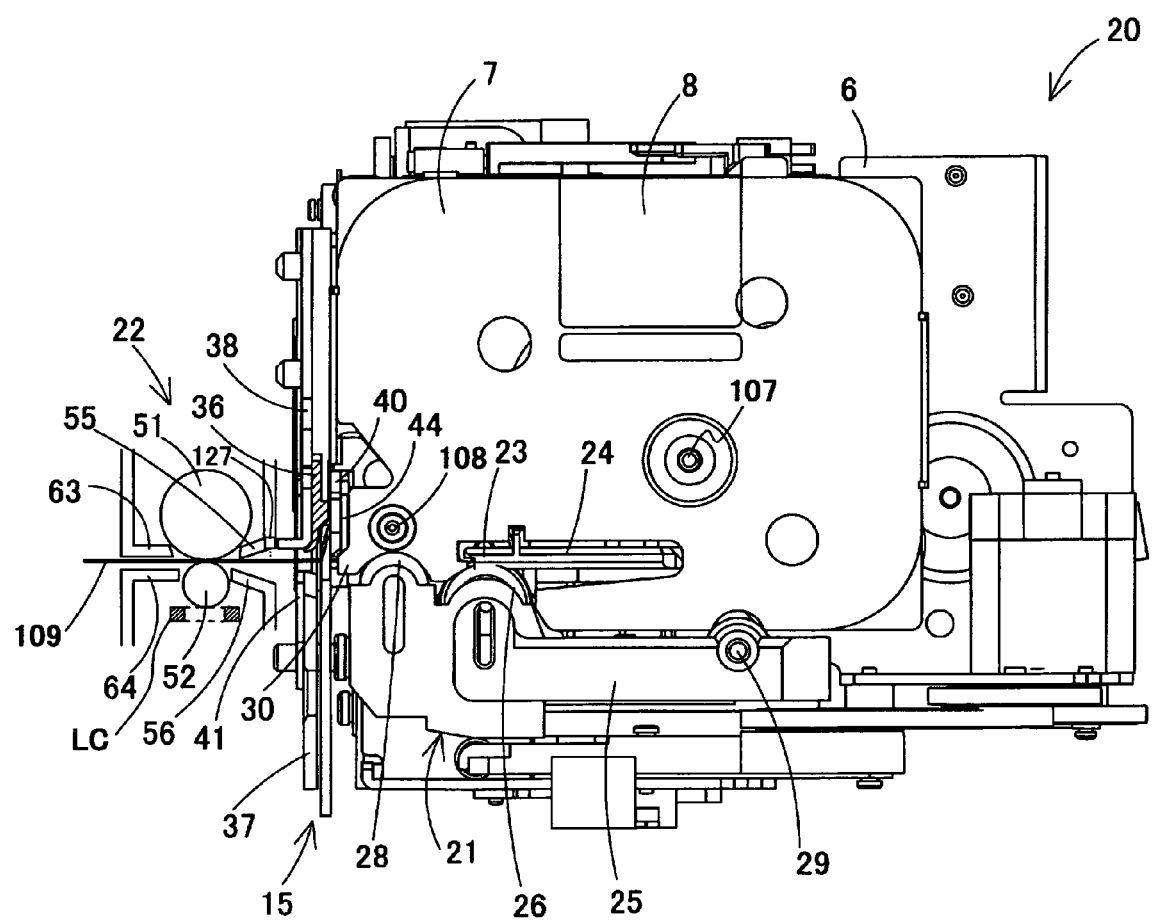

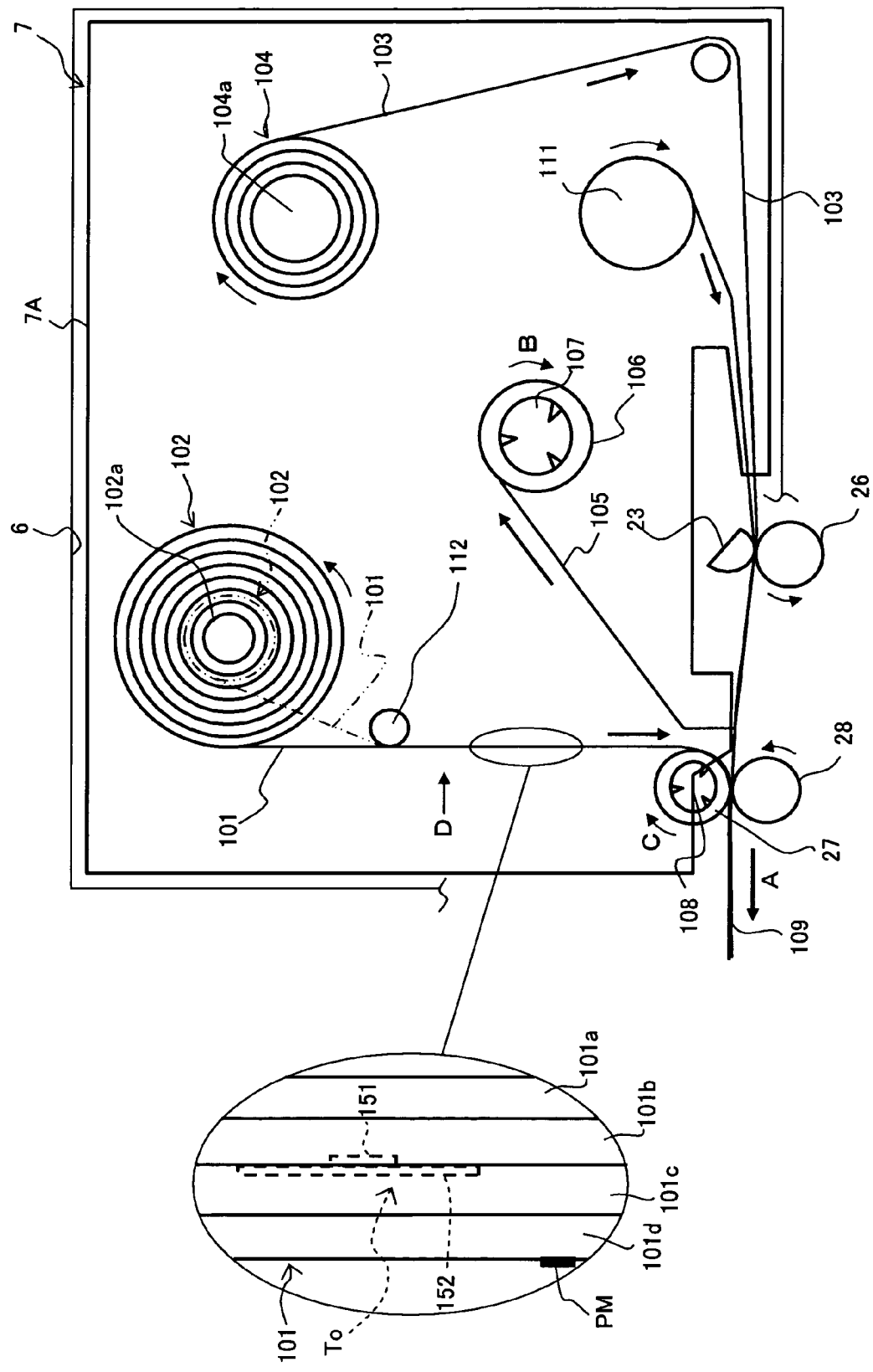
[FIG. 38]

[FIG. 39]
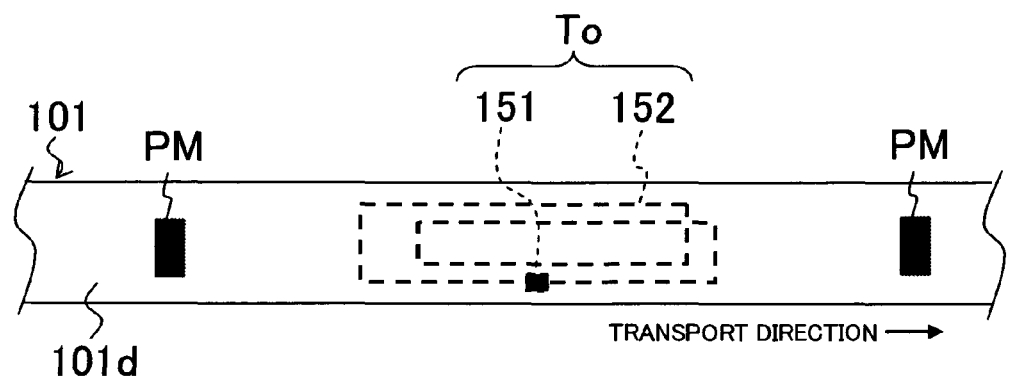

[FIG. 40A]
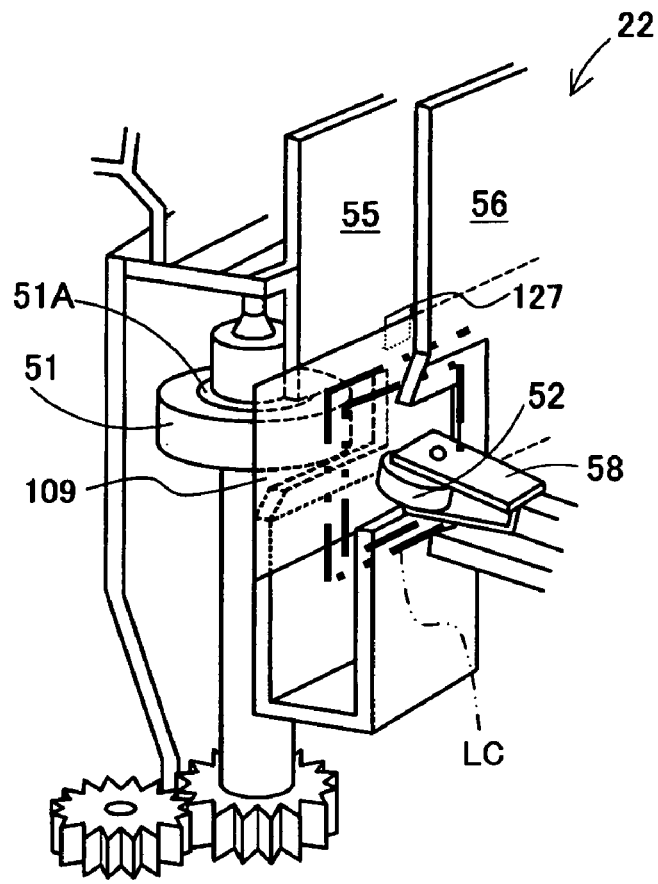
[FIG. 40B]
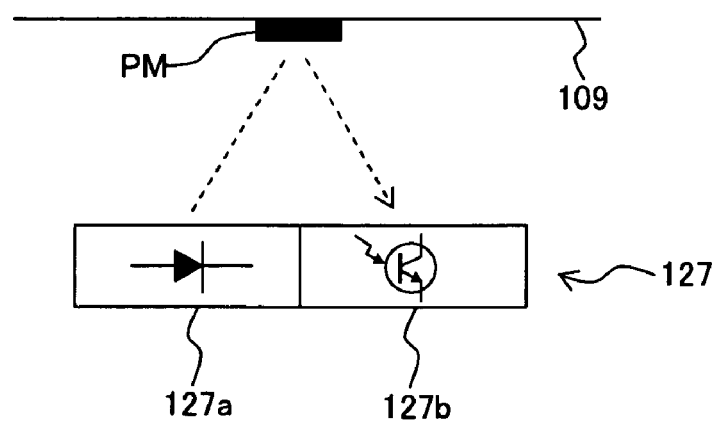

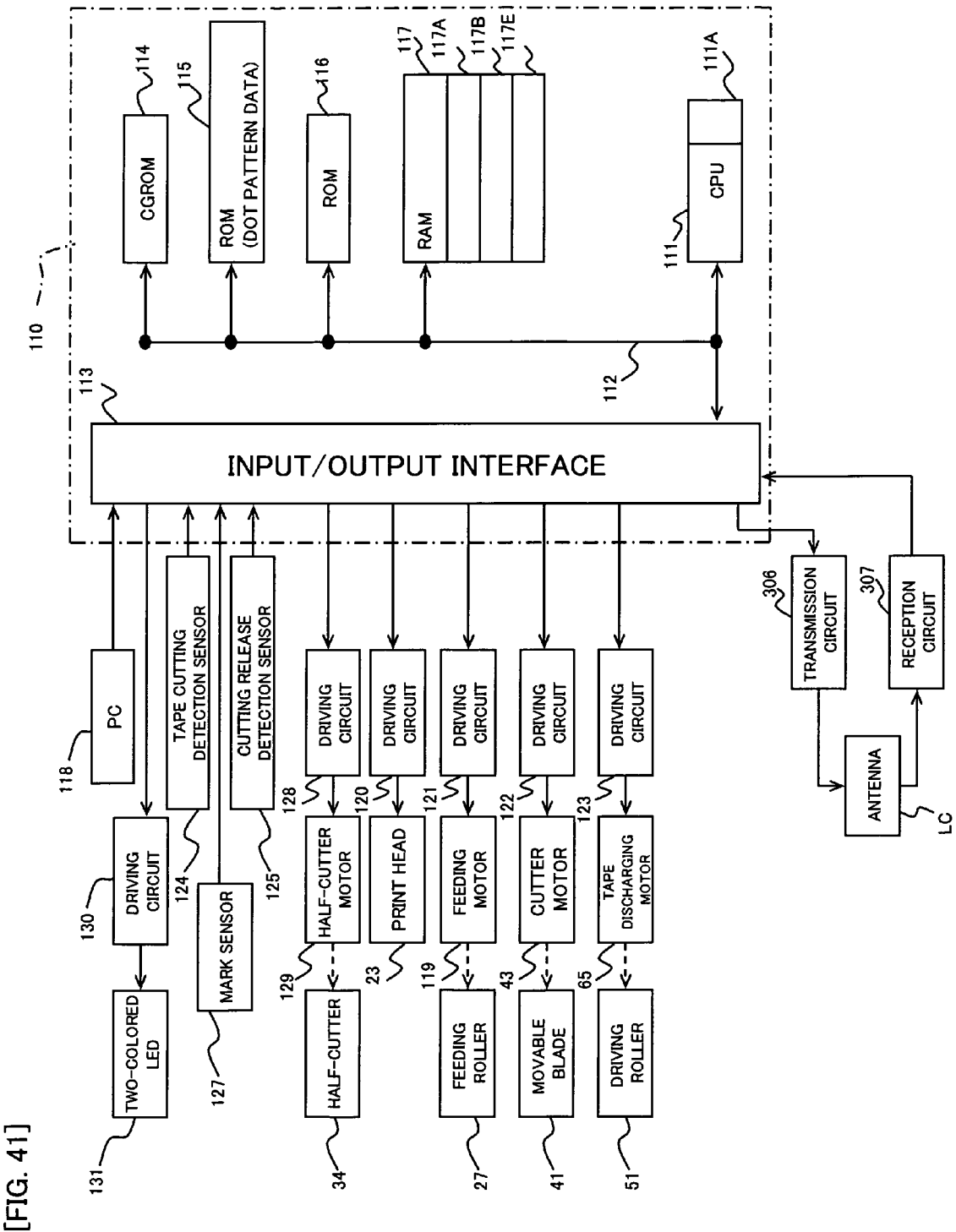
[FIG. 41]

[FIG. 42A]
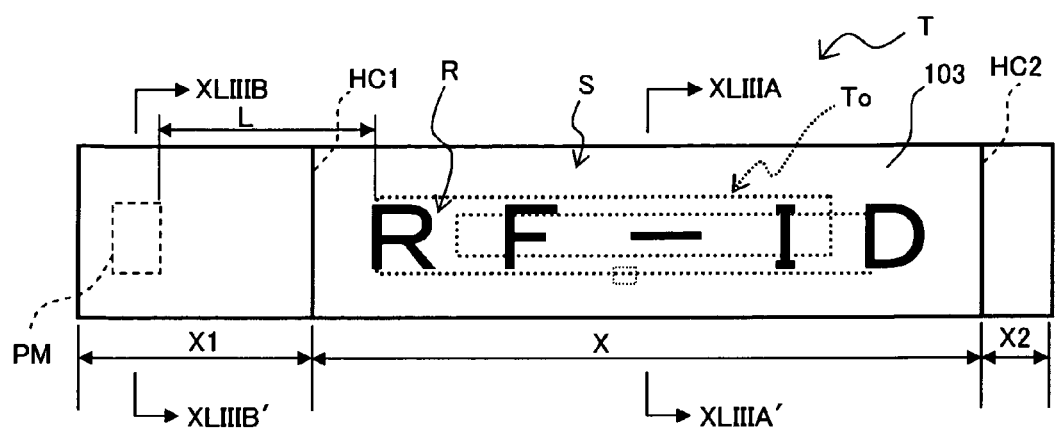
[FIG. 42B]
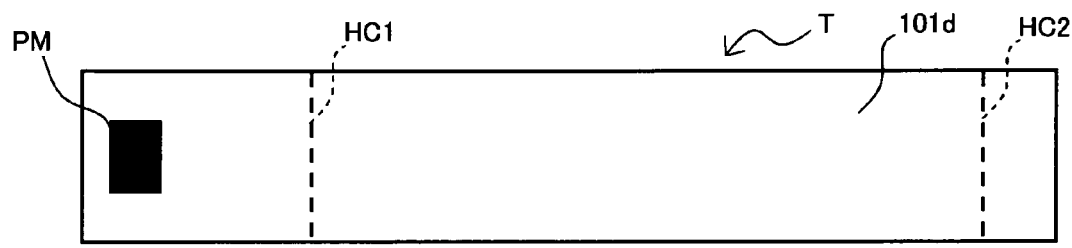

[FIG. 43A]
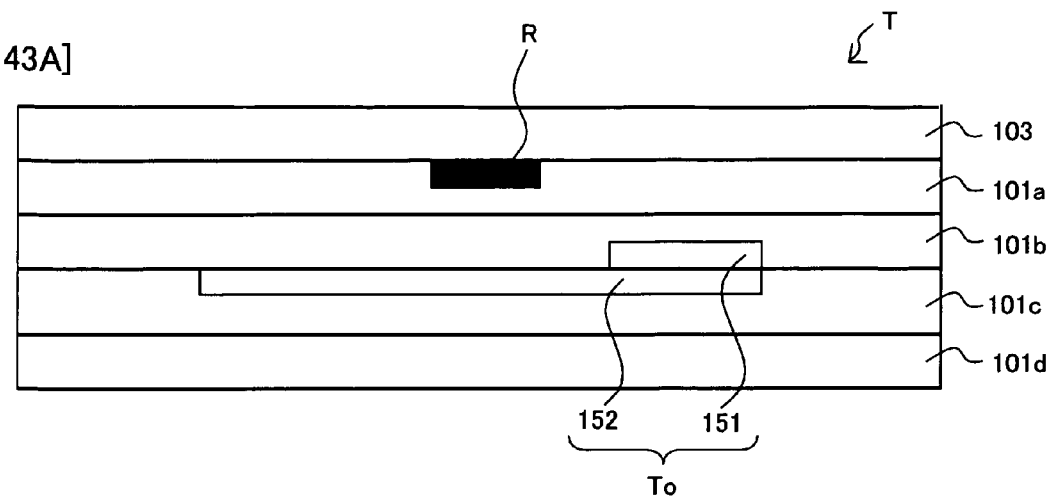
[FIG. 43B]
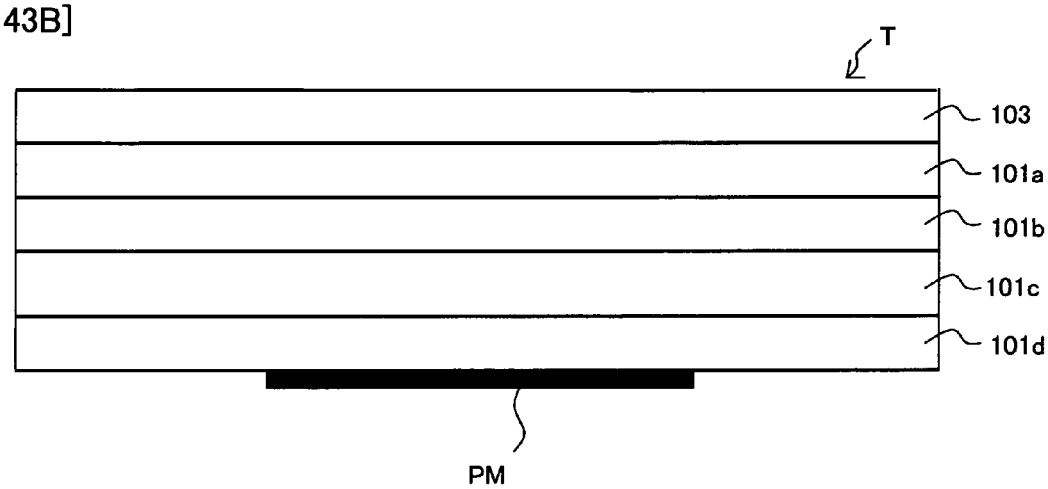
[FIG. 43C]
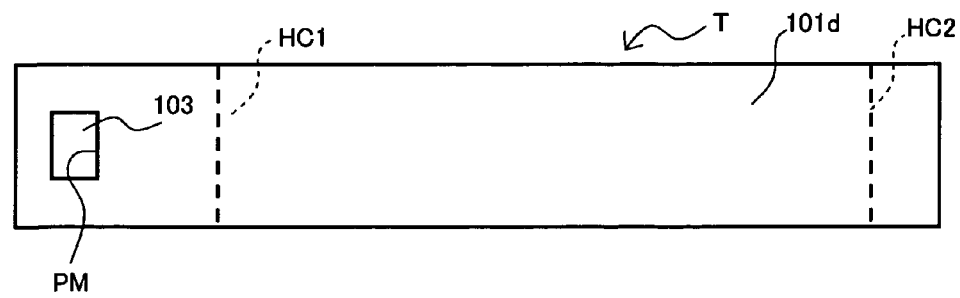

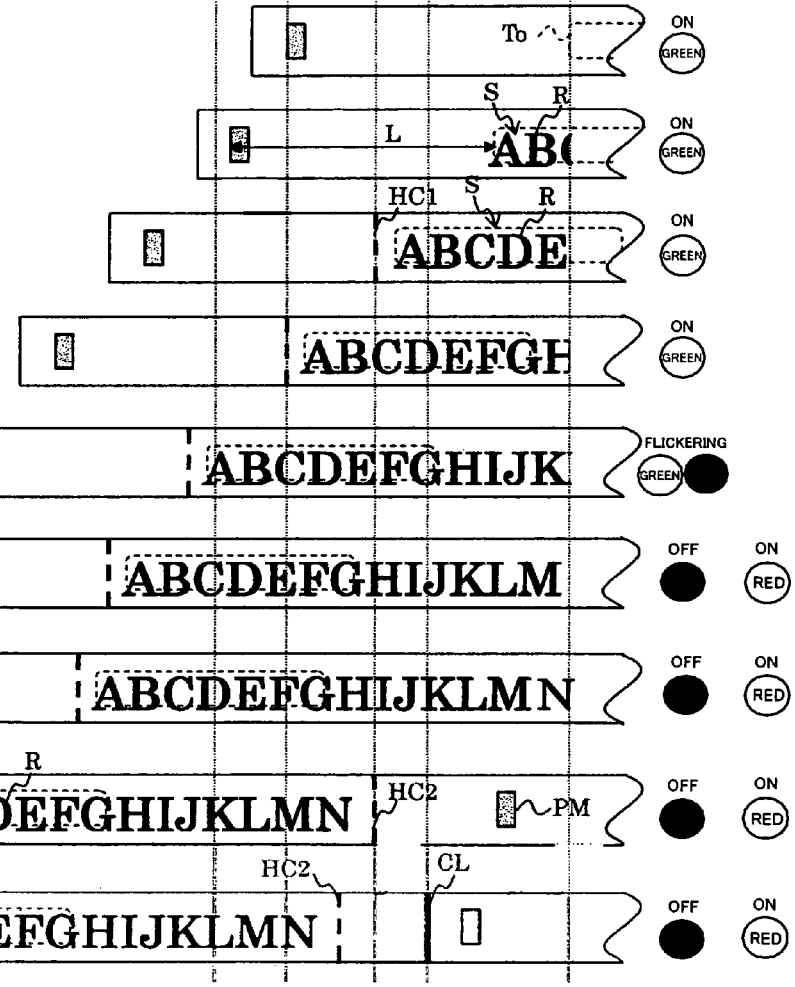

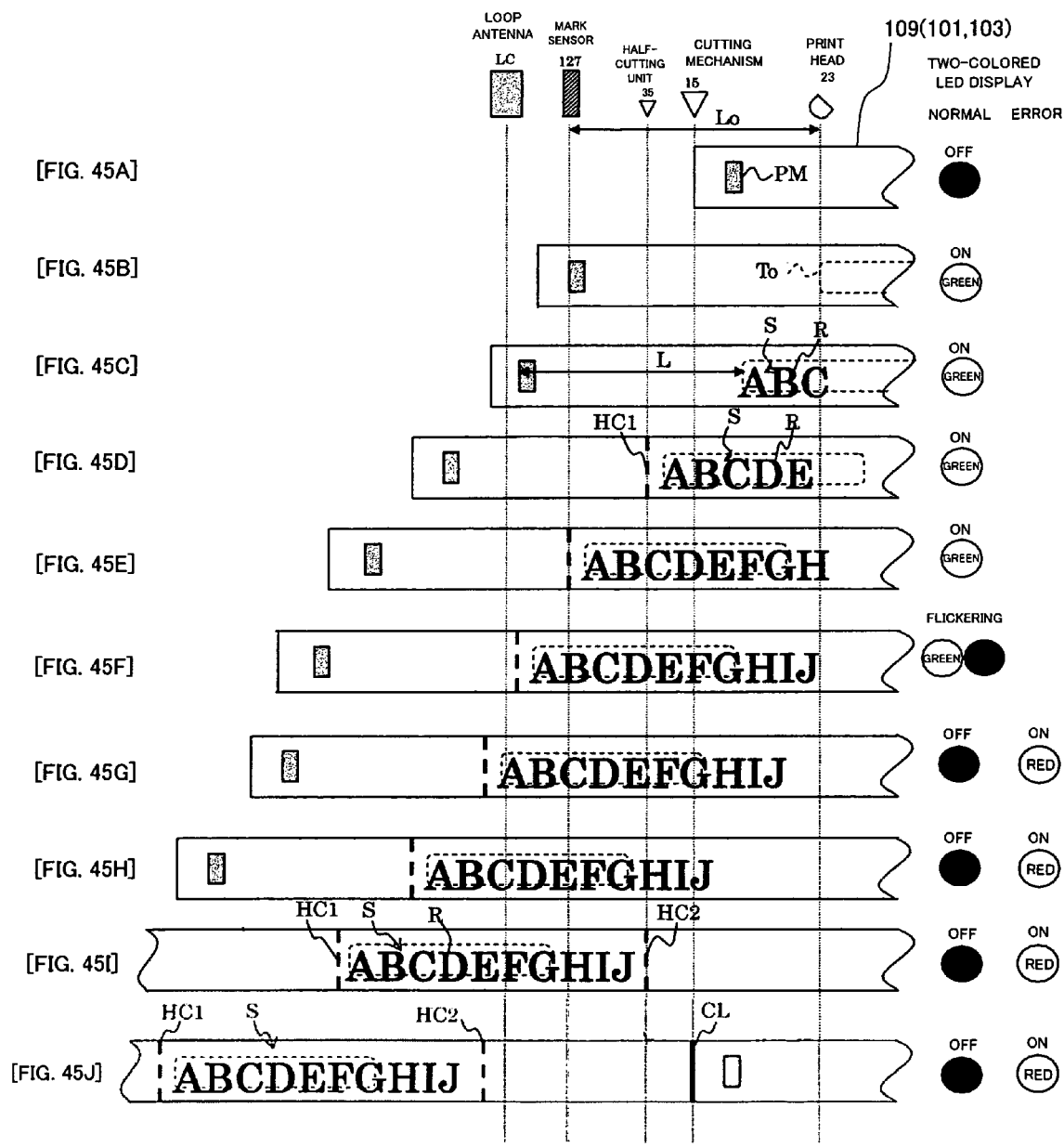

[FIG. 46]
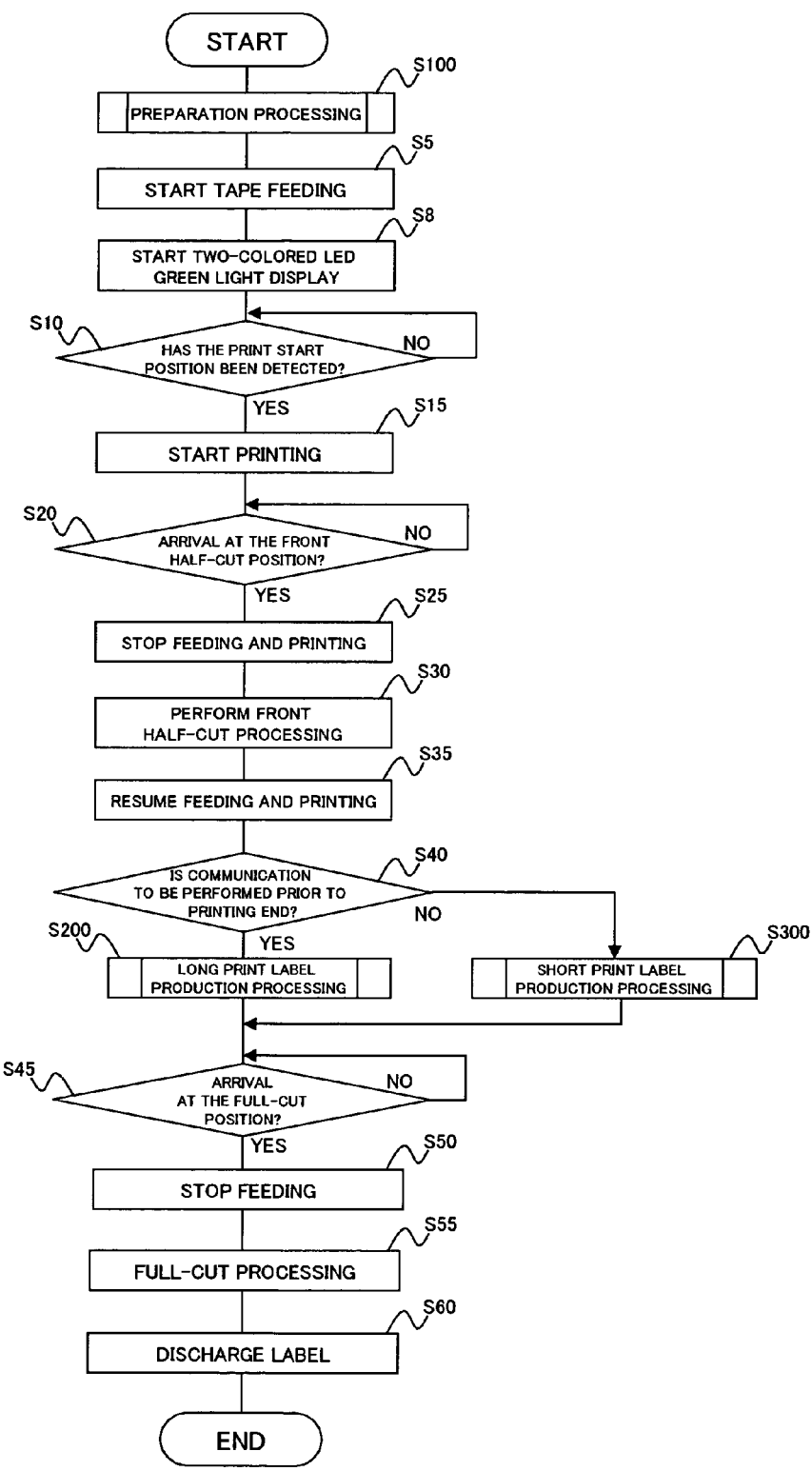

[FIG. 47]
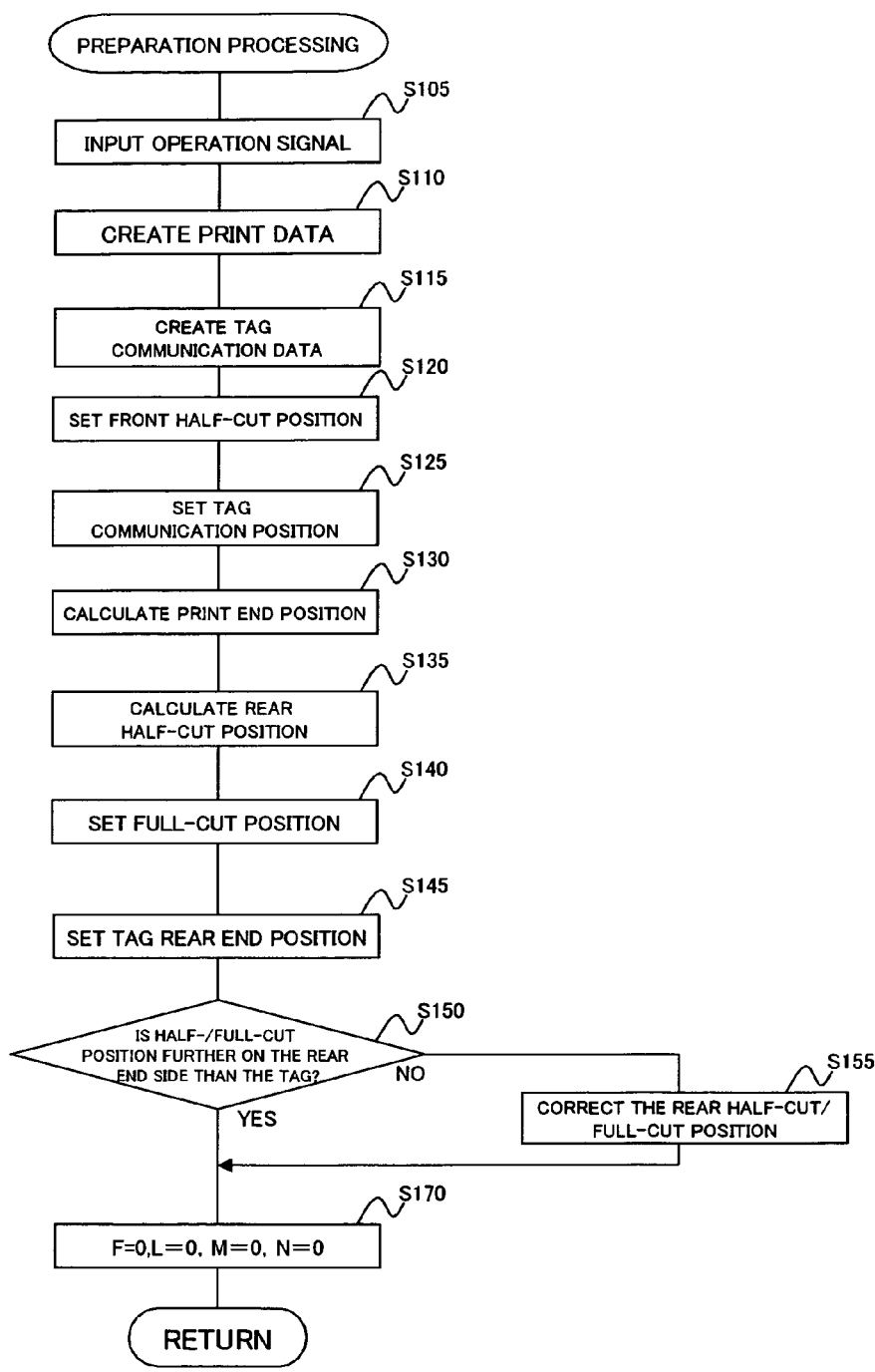

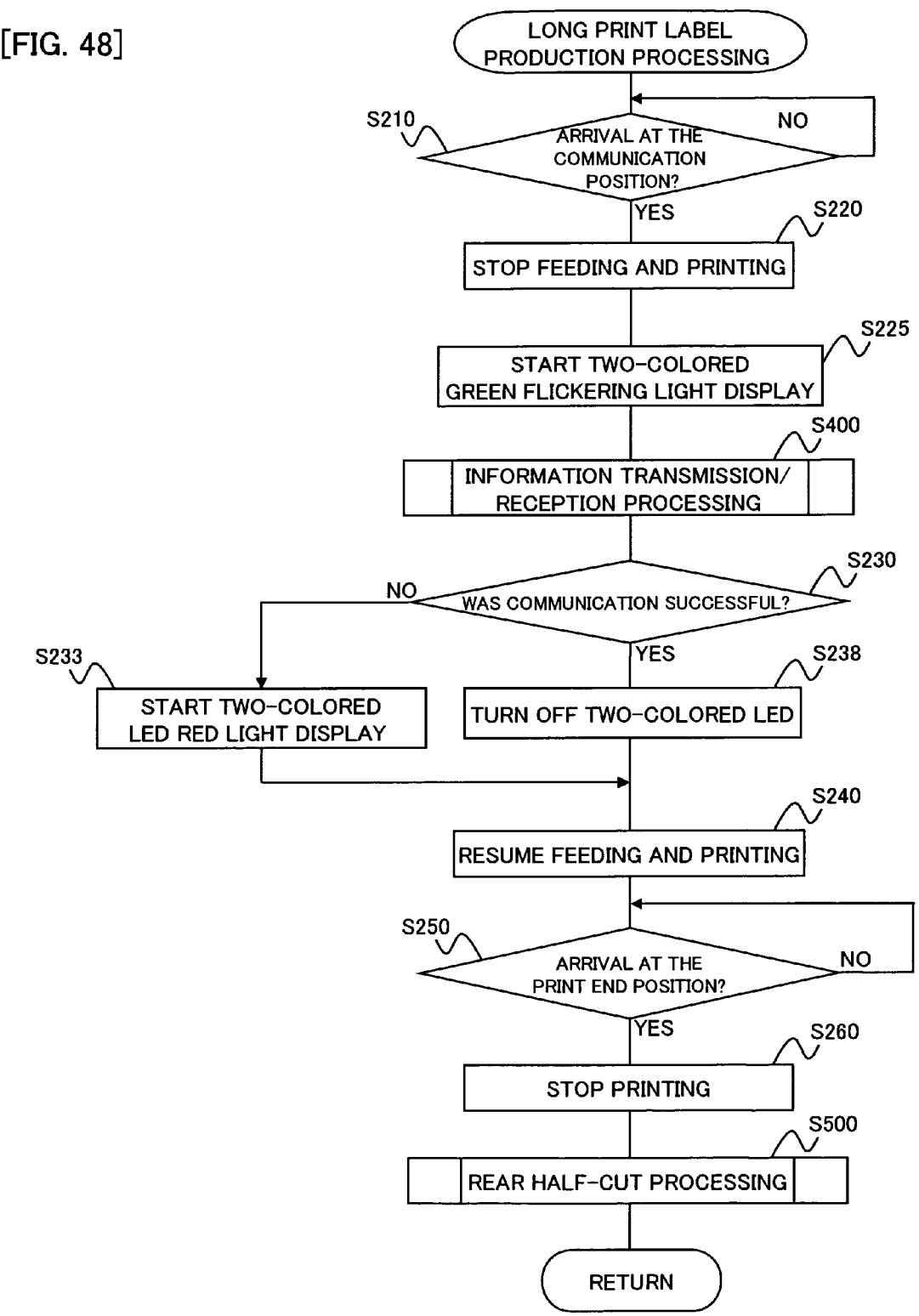
[FIG. 48]

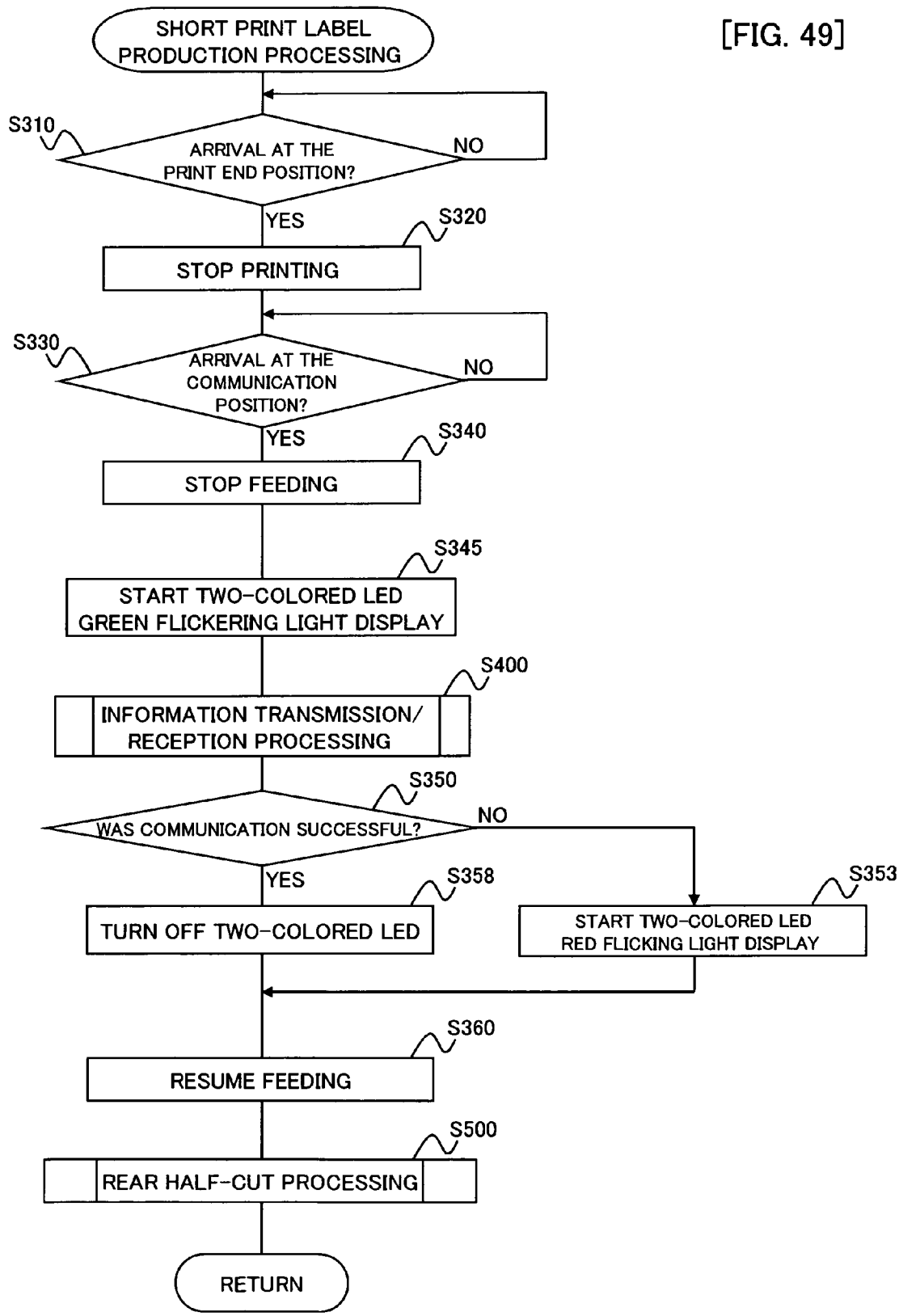
[FIG. 49]

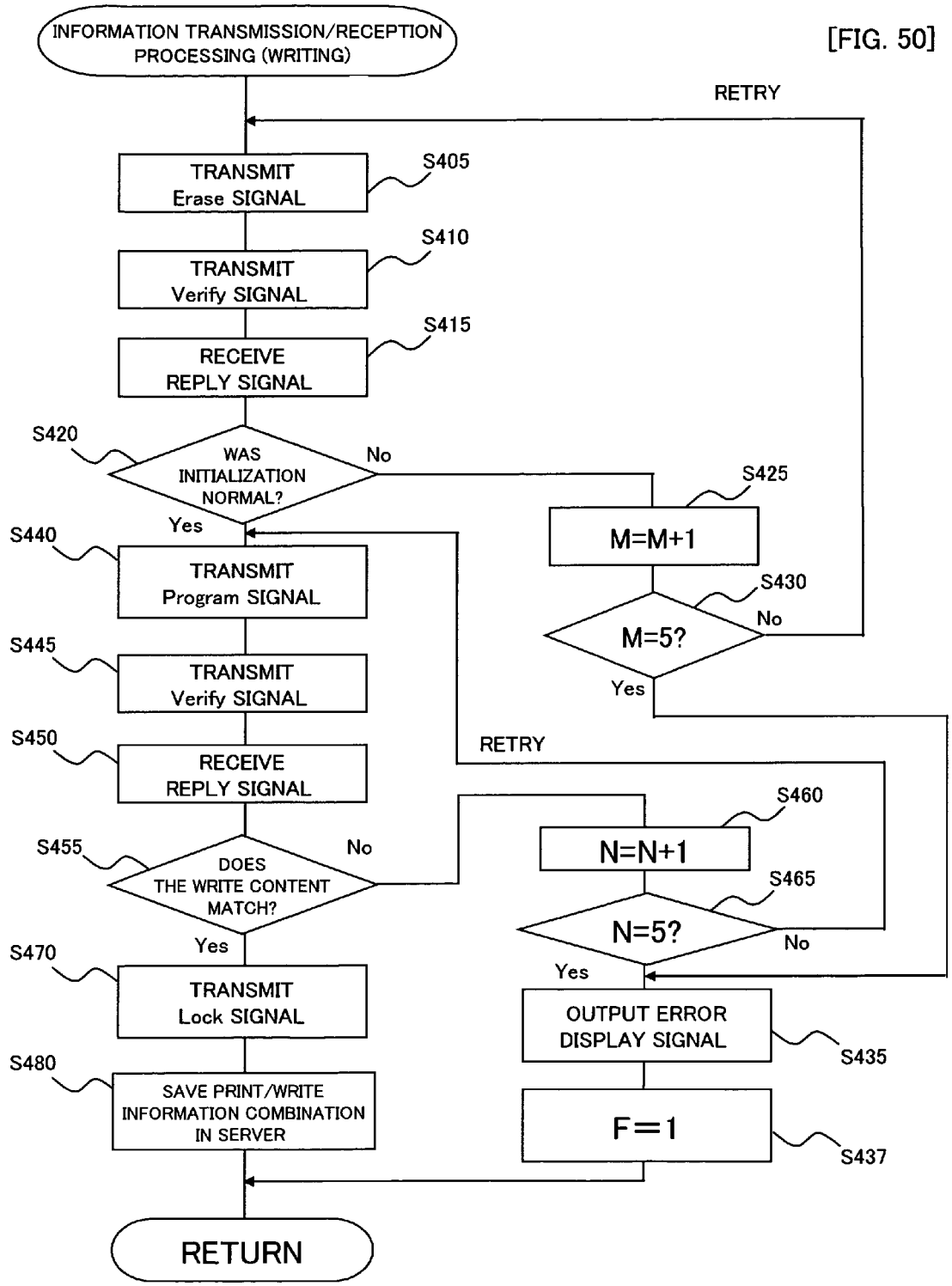
[FIG. 50]

[FIG. 51]
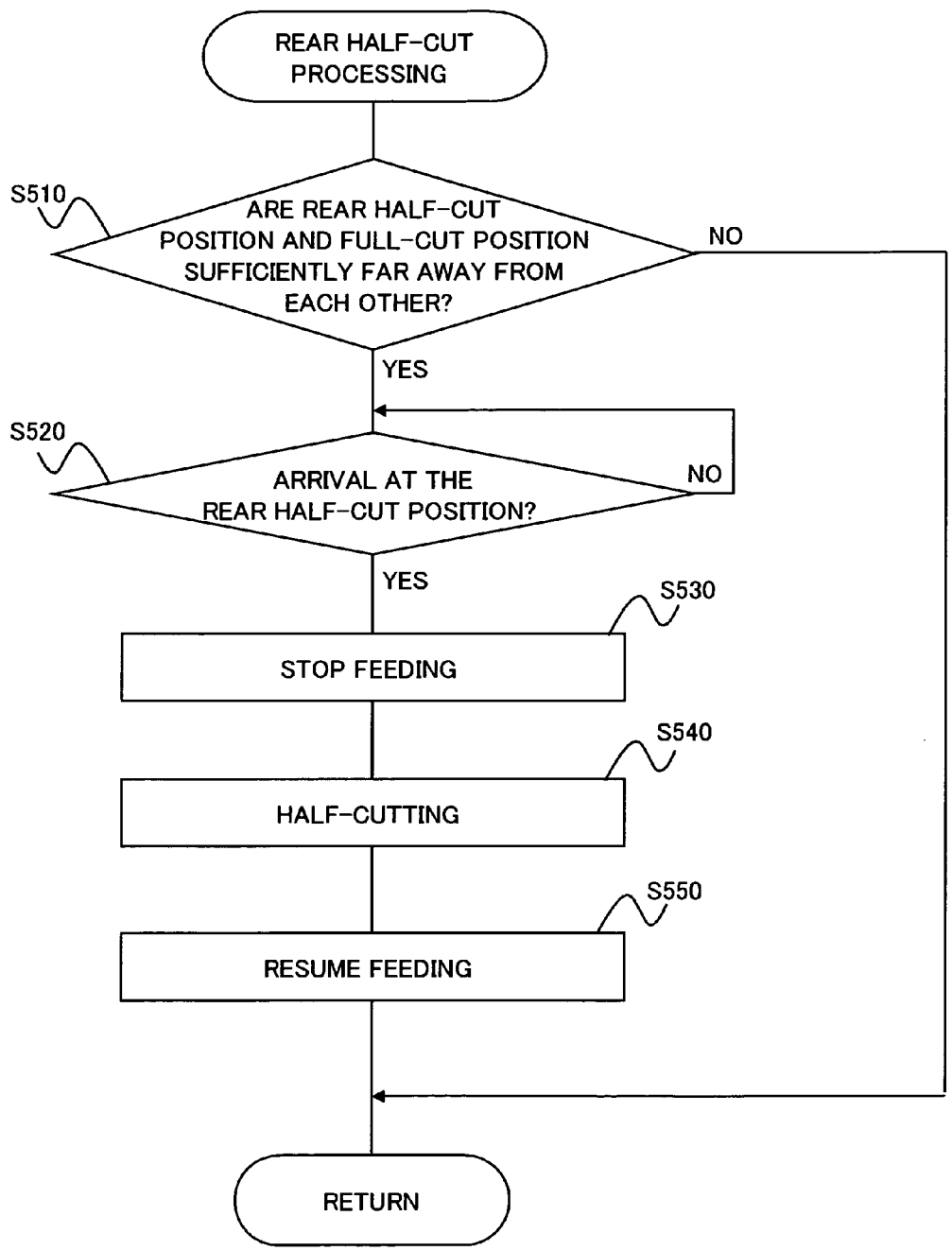

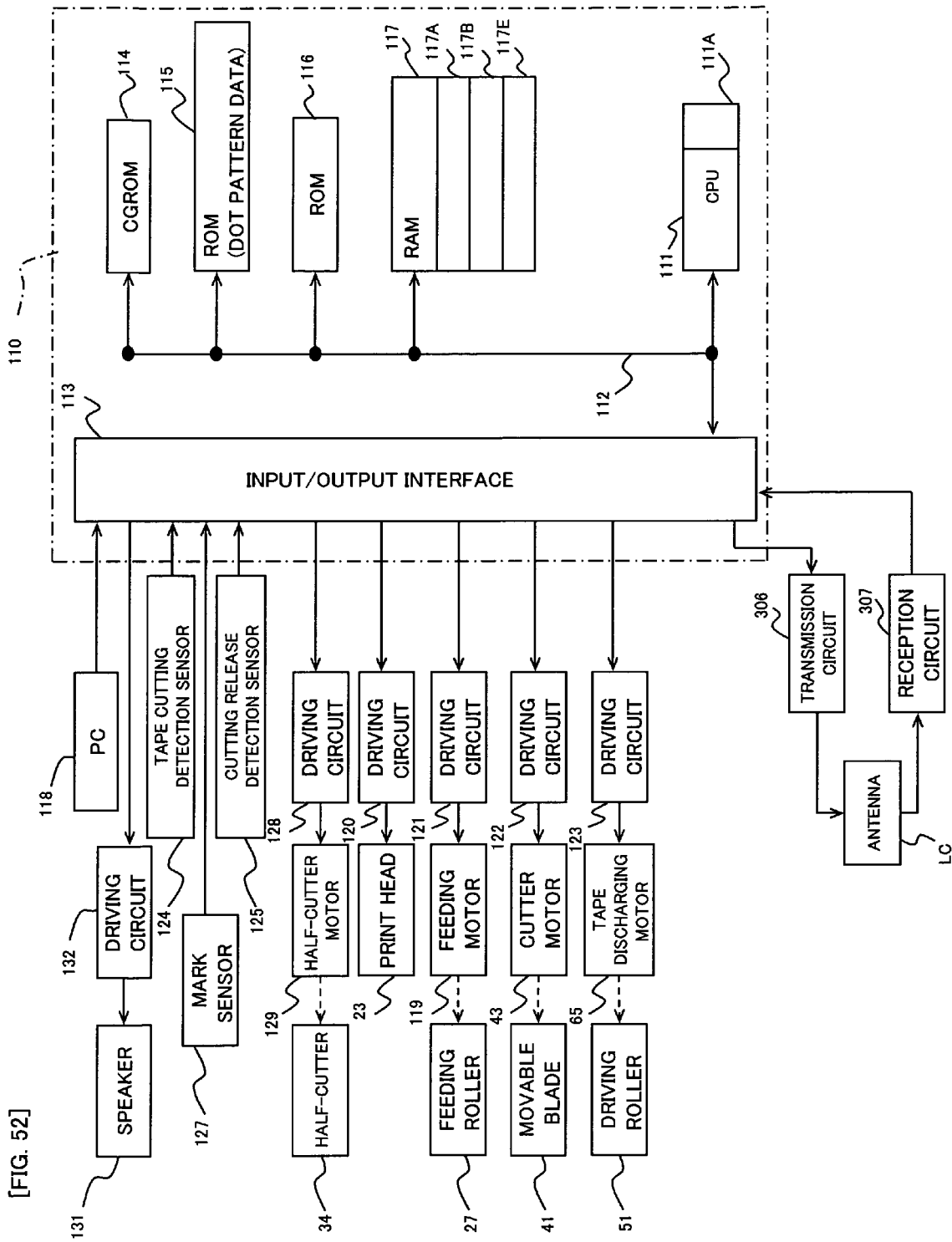
[FIG. 52]

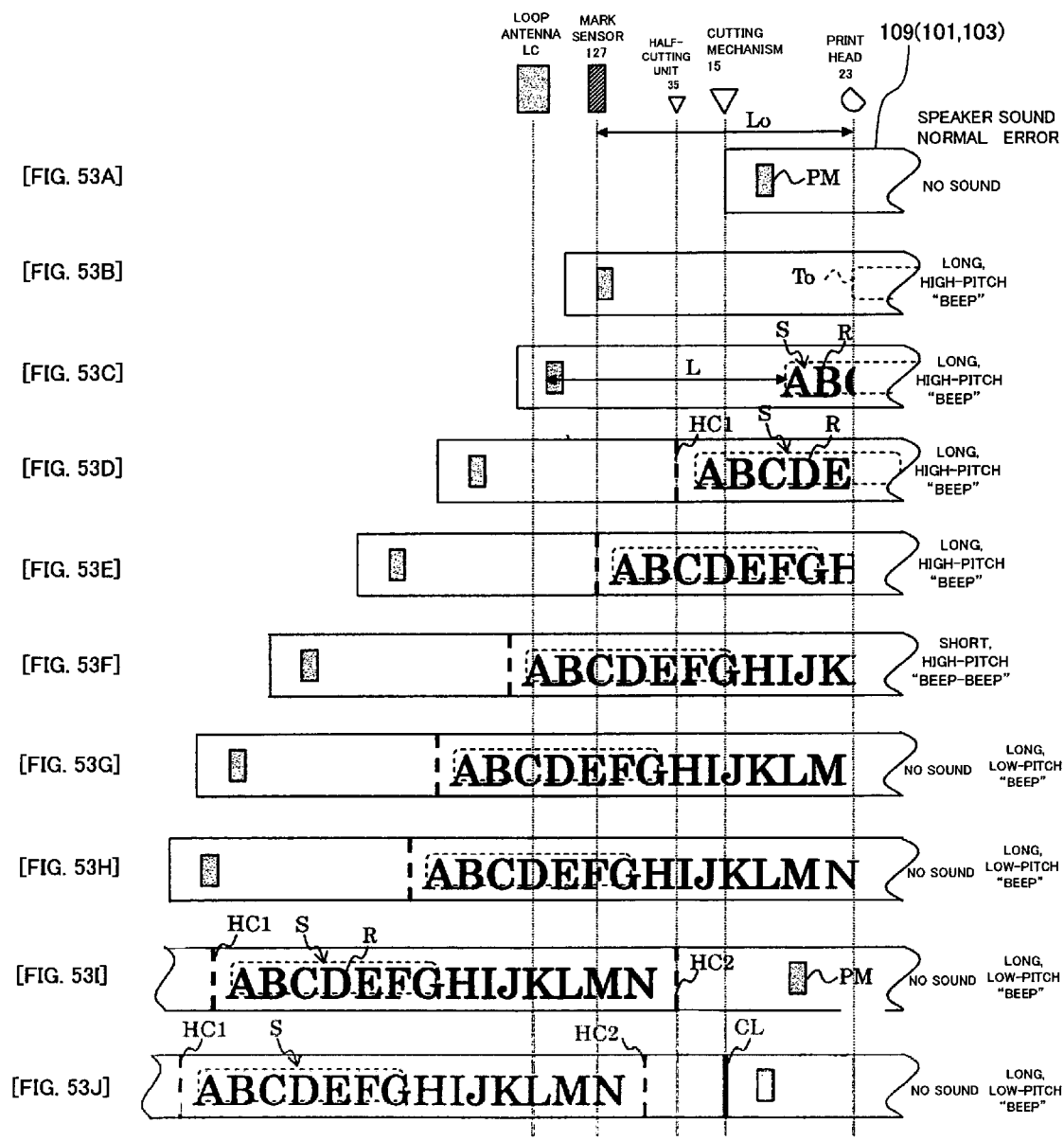

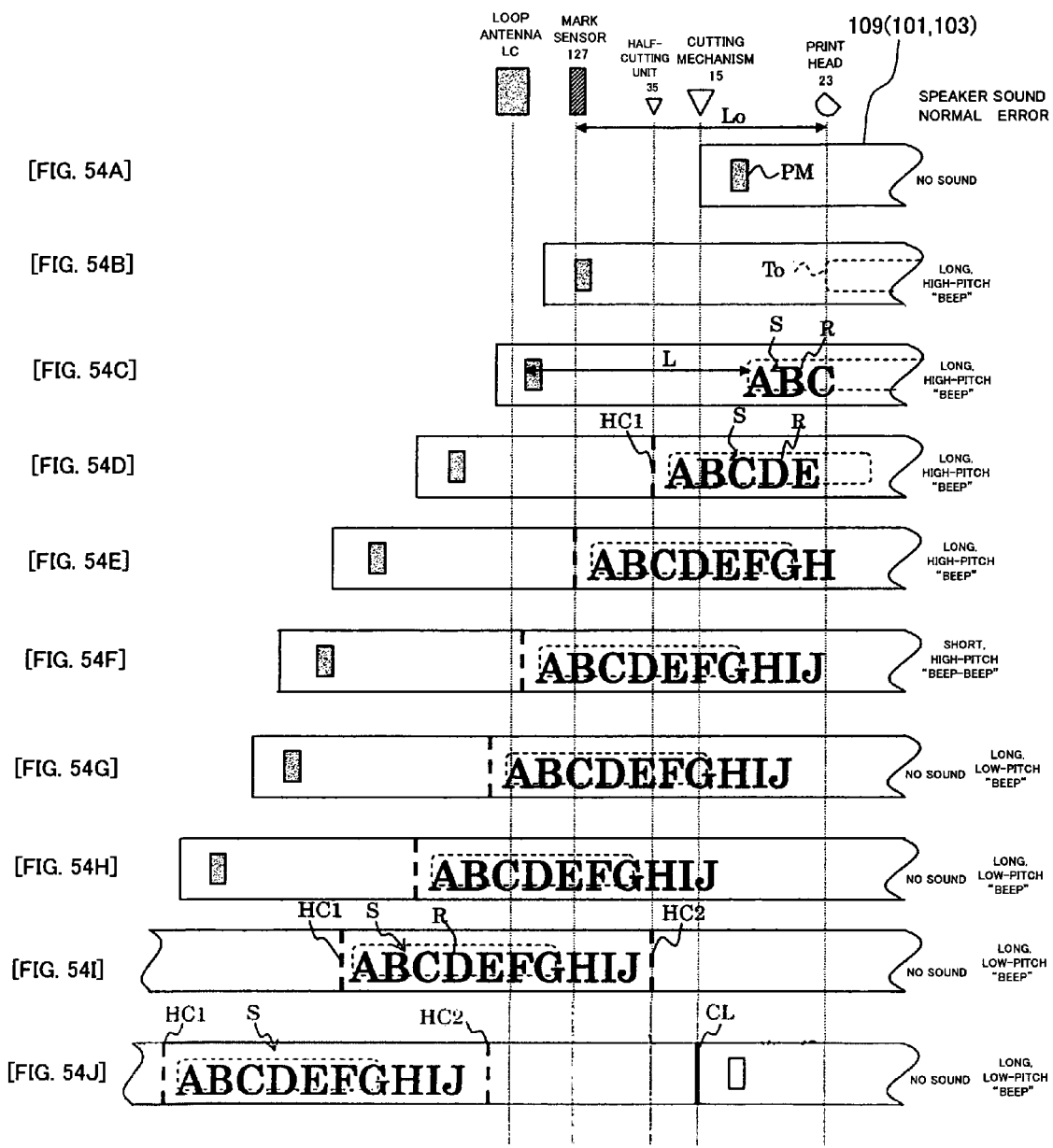

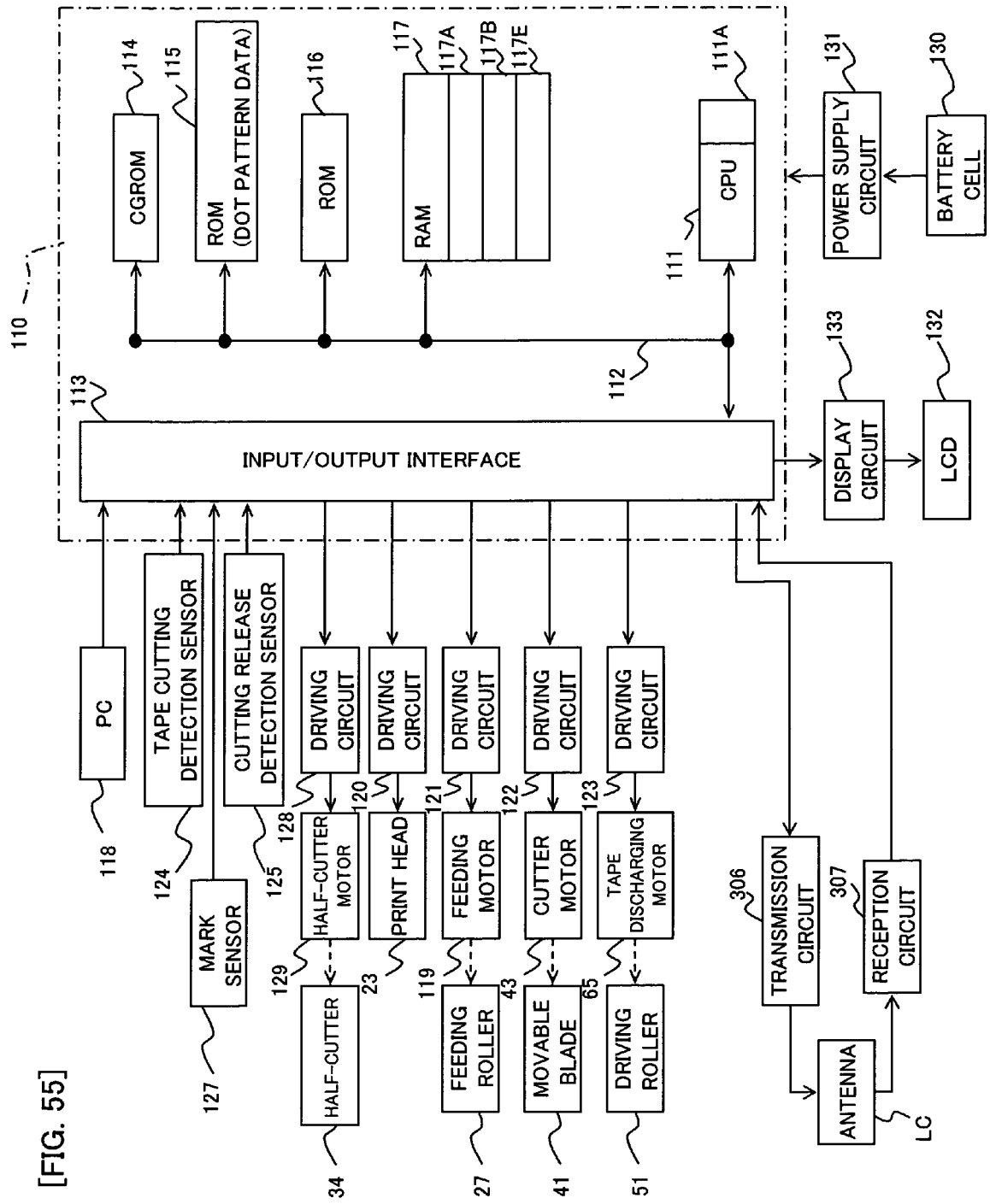

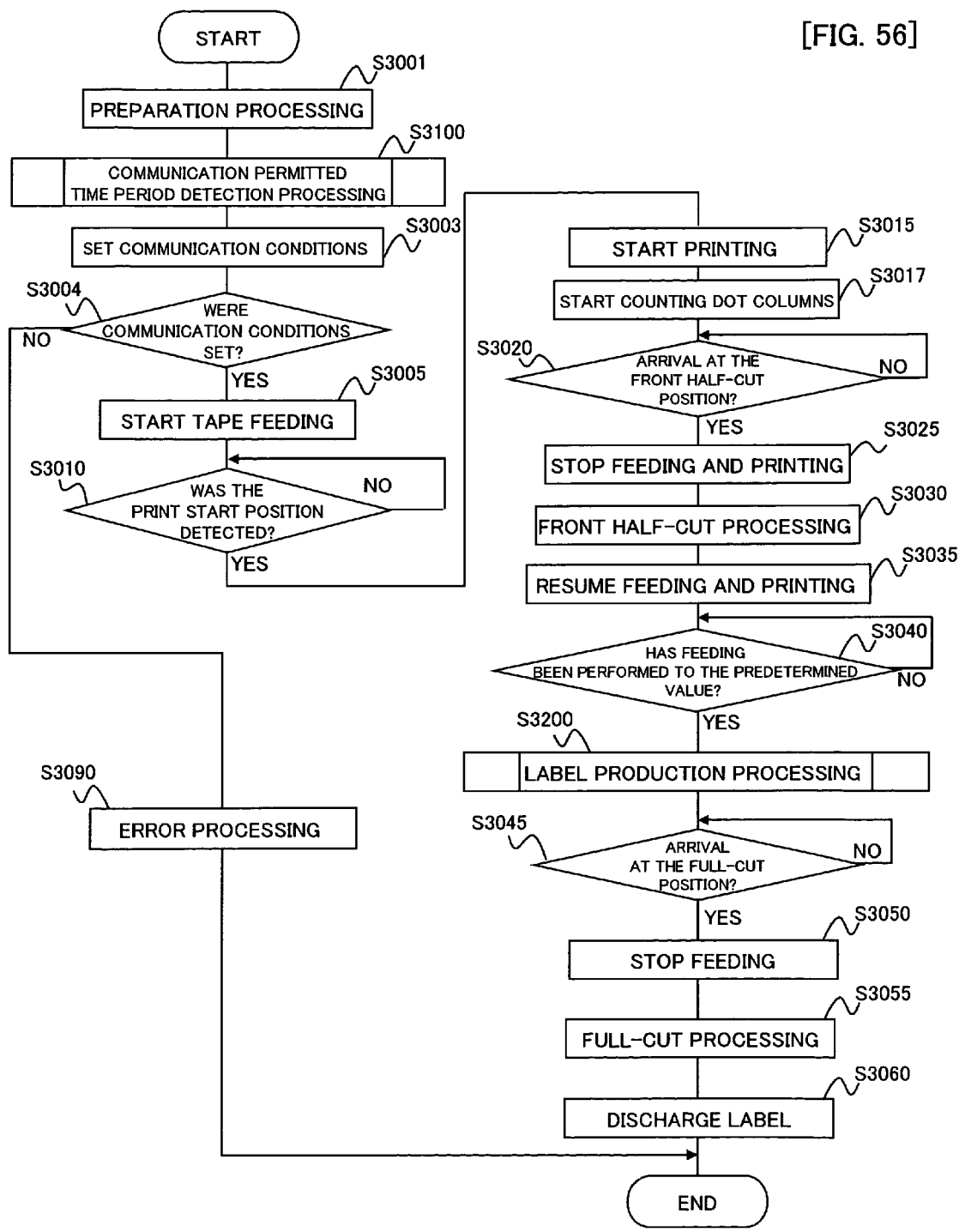
[FIG. 56]

[FIG. 57]
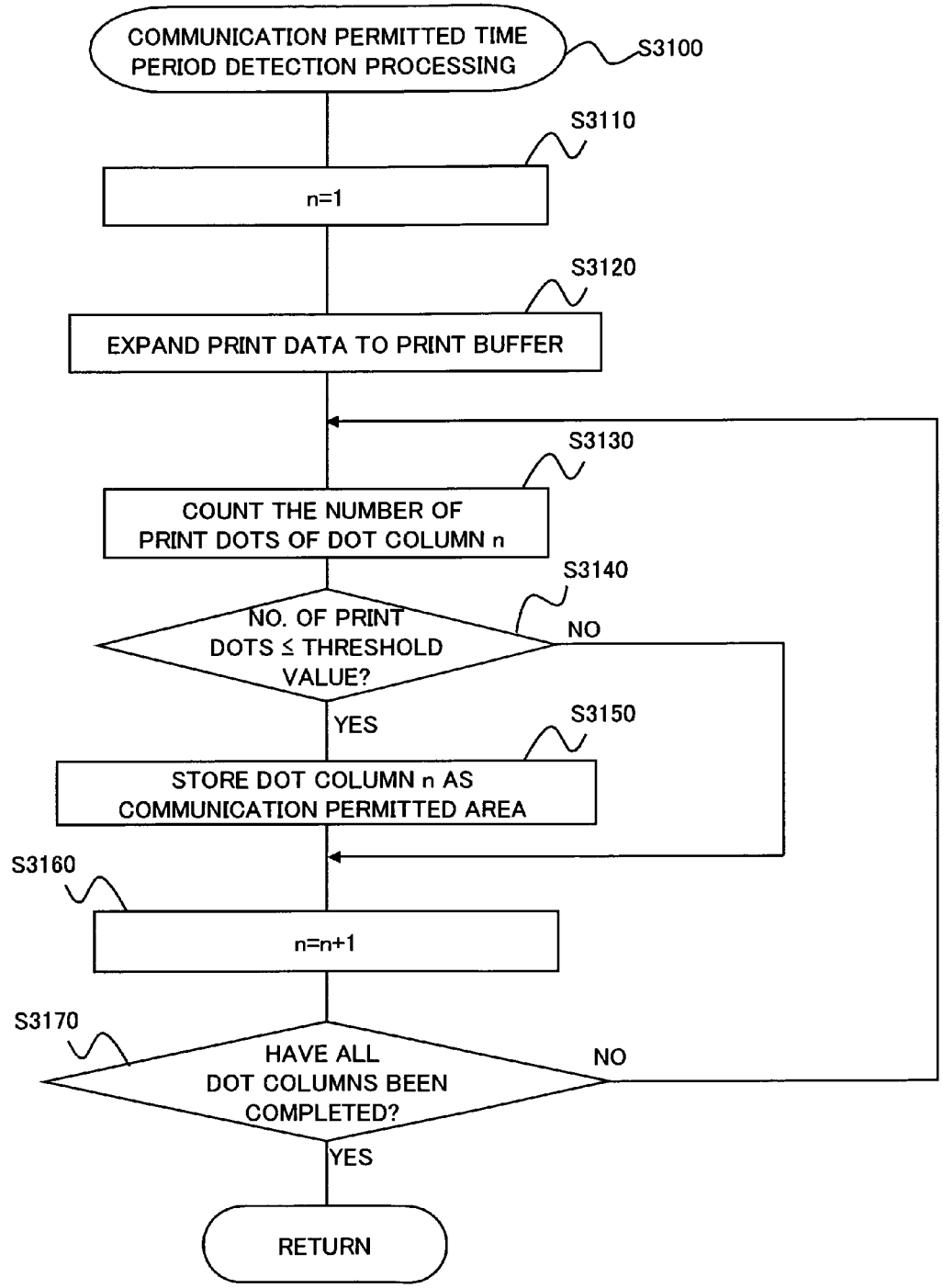

[FIG. 58]
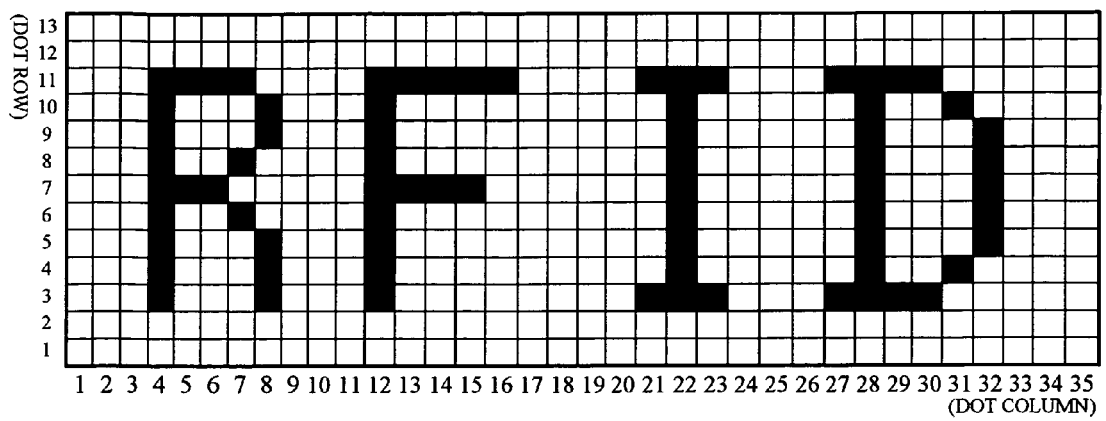
[FIG. 59]
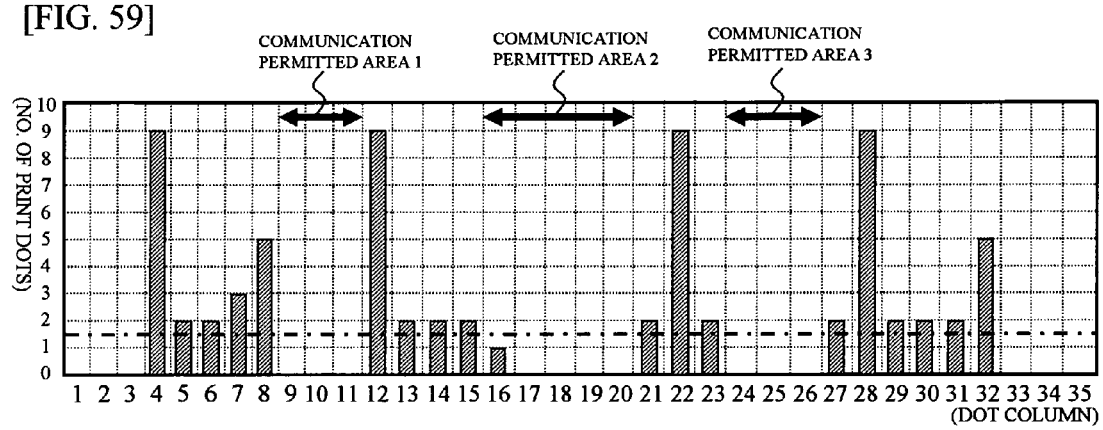
[FIG. 60]
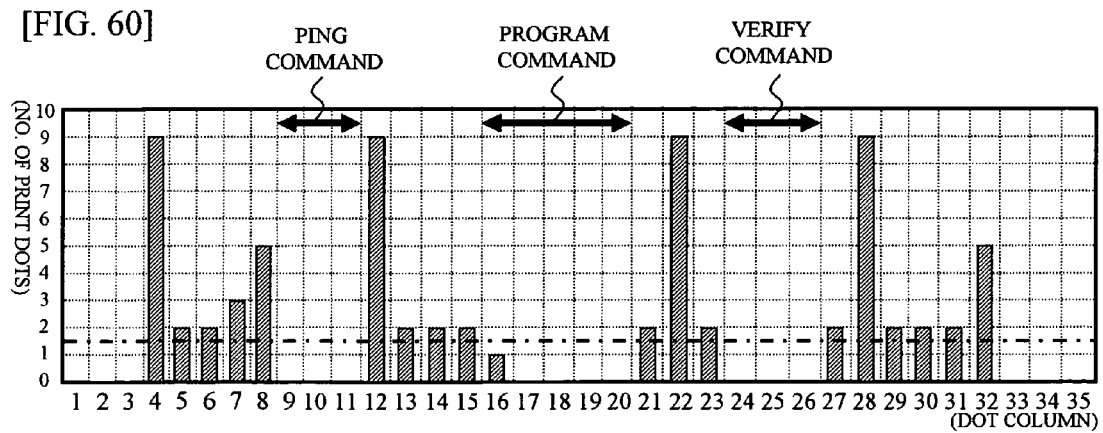

[FIG. 61]
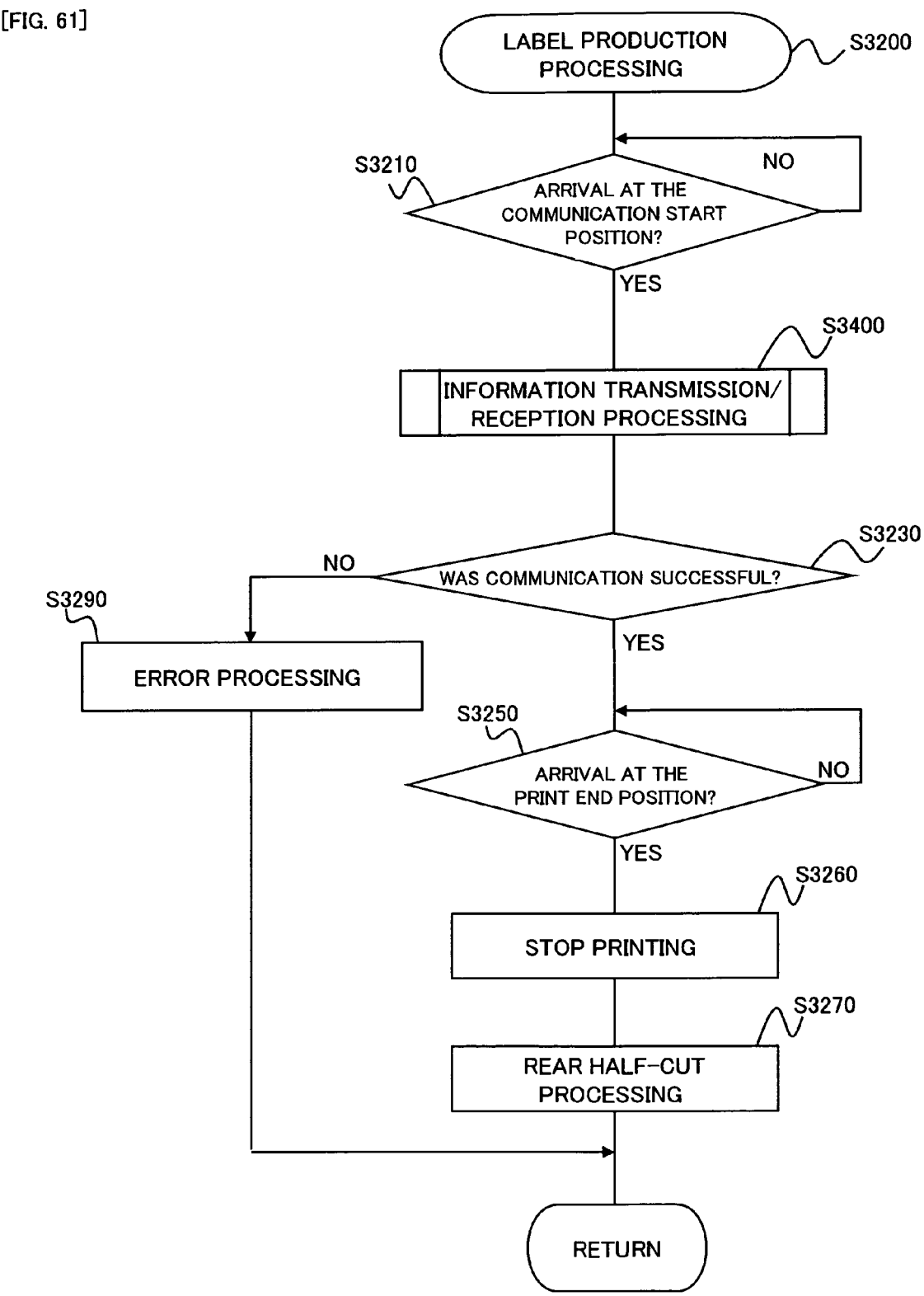

[FIG. 62]
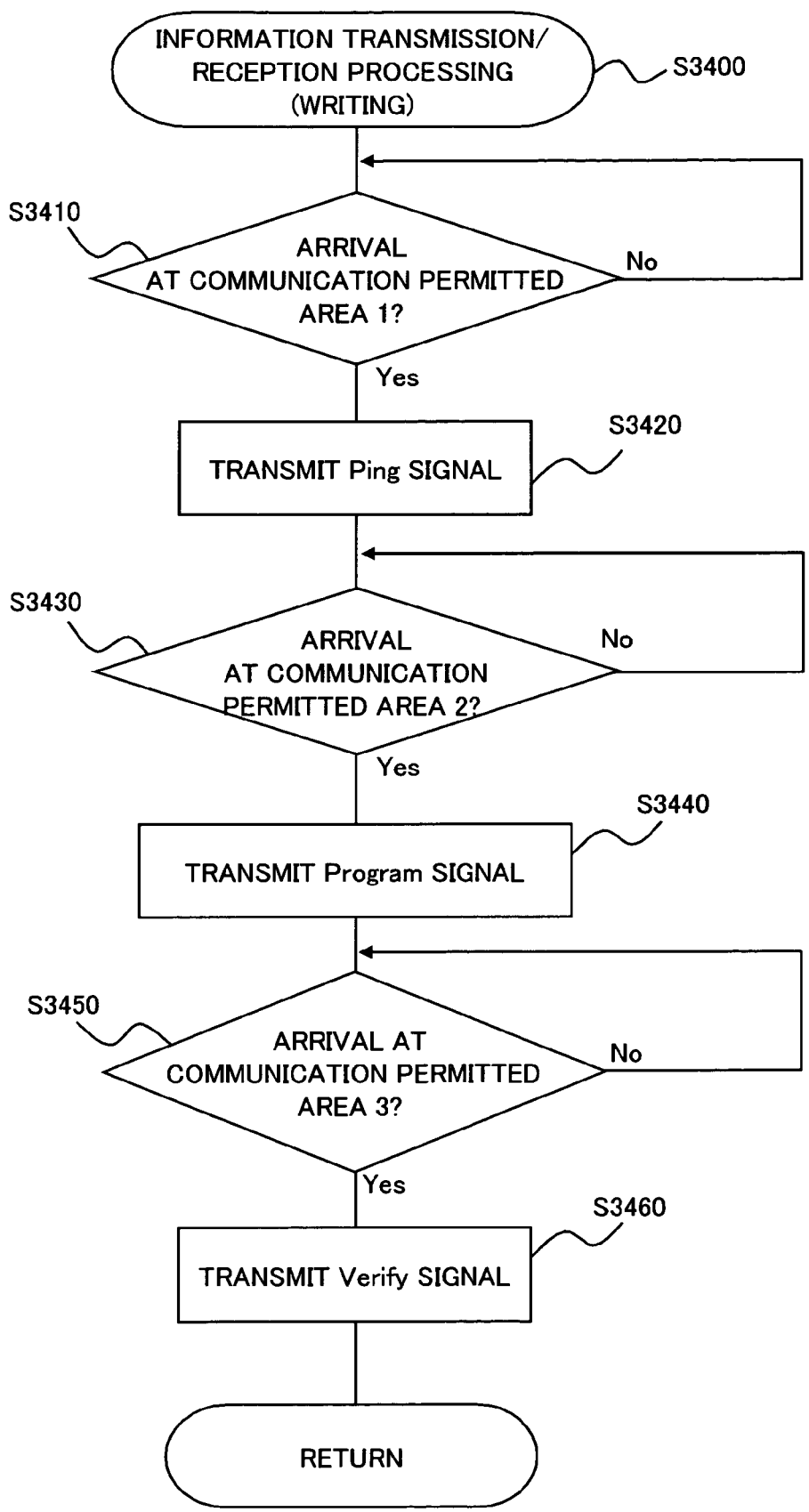

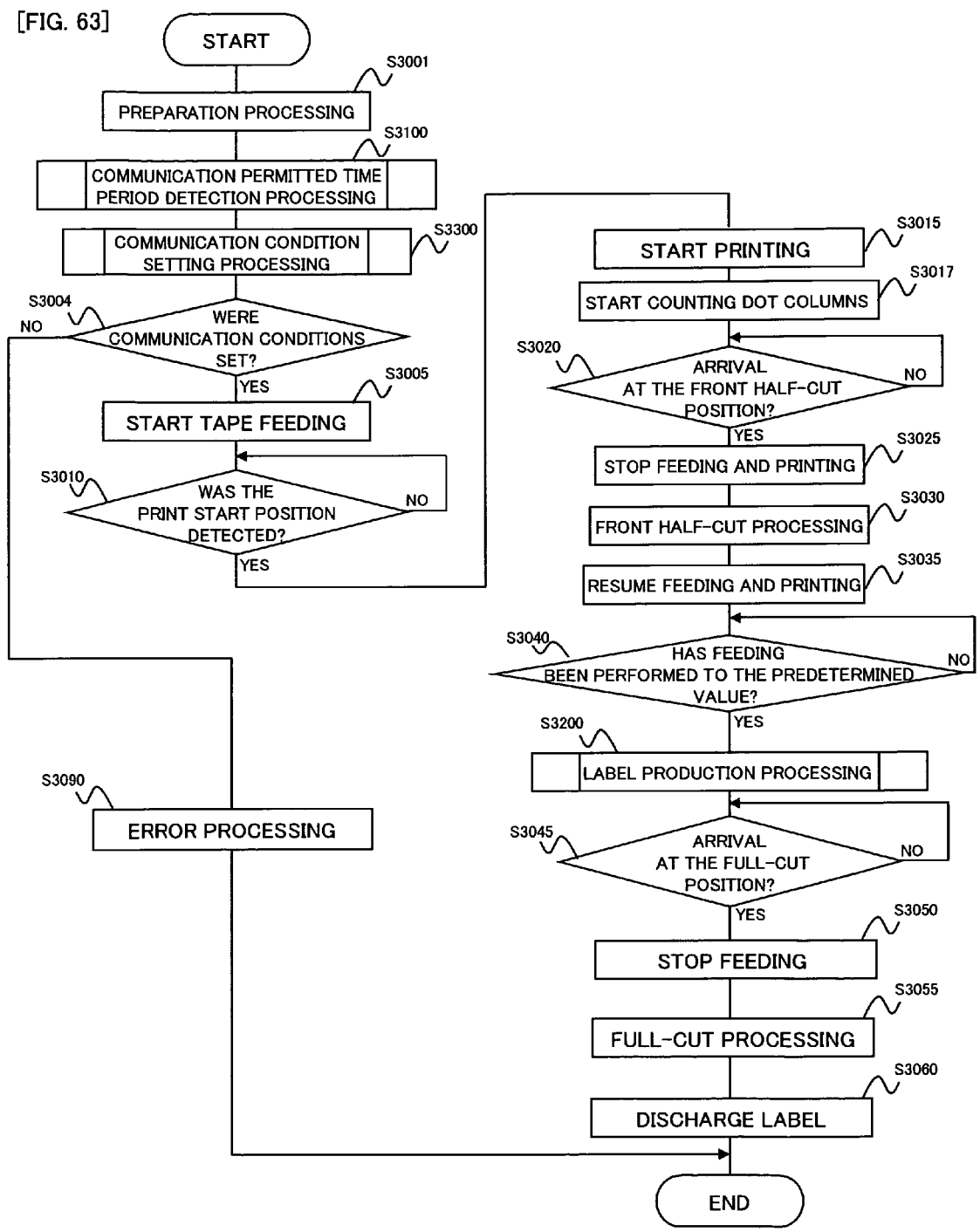
[FIG. 63]

[FIG. 64]
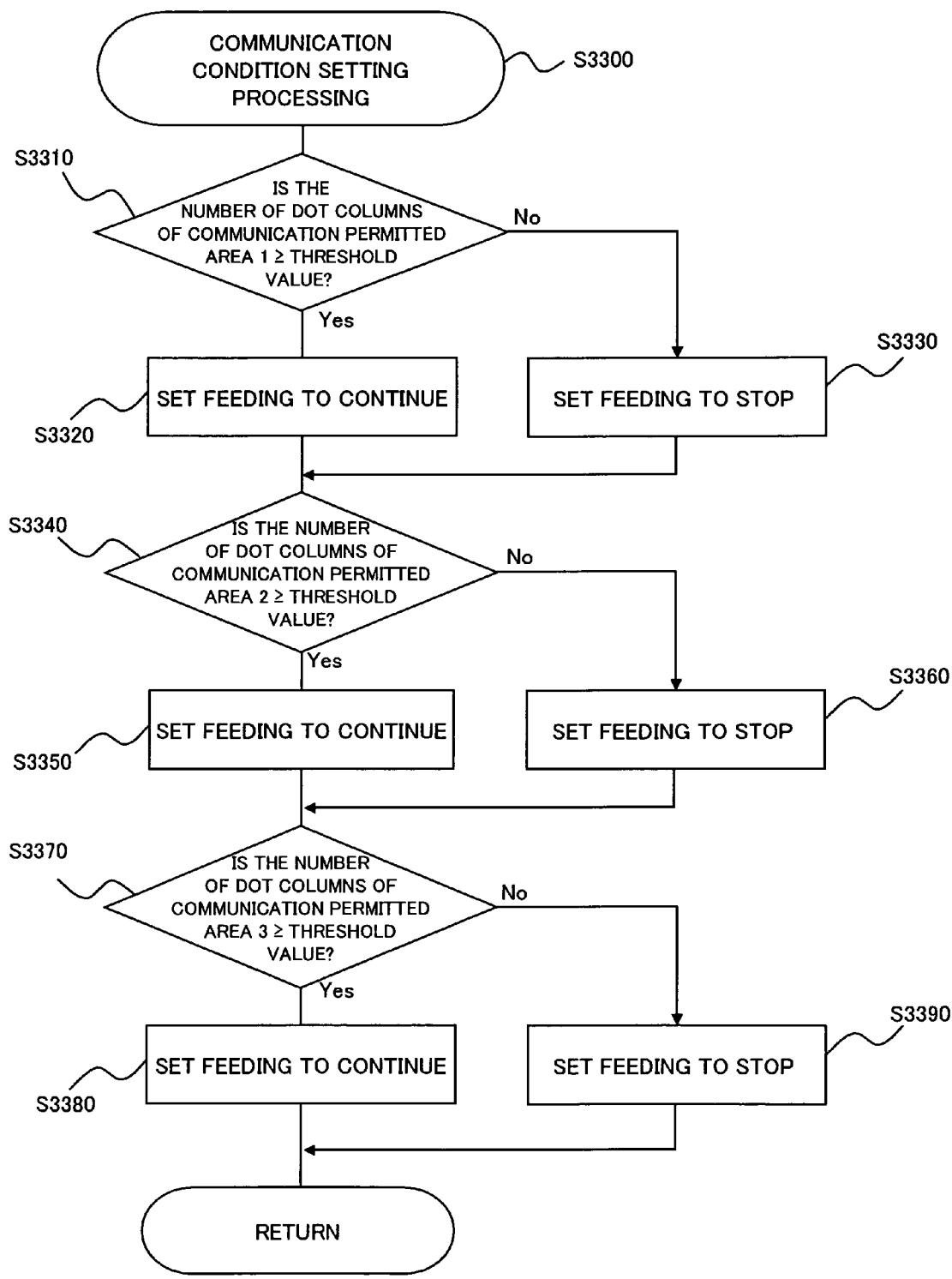

[FIG. 65A]
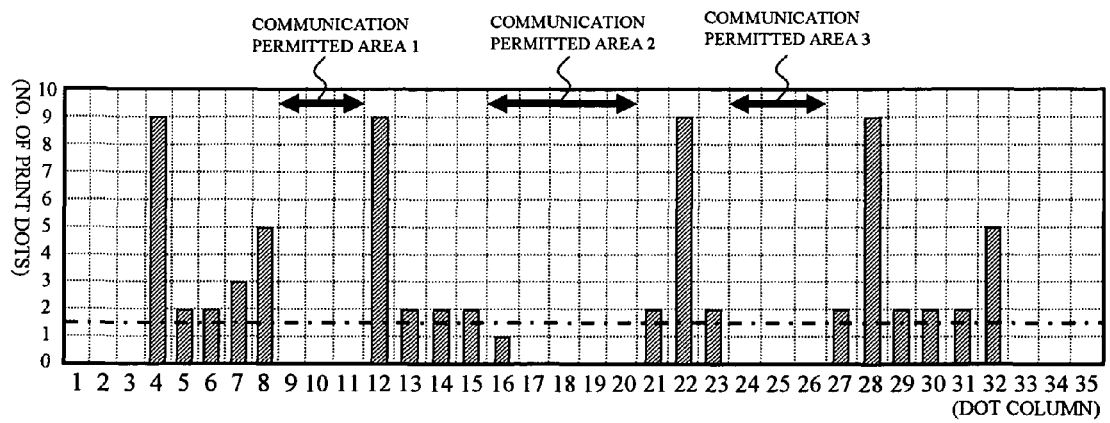
[FIG. 65B]
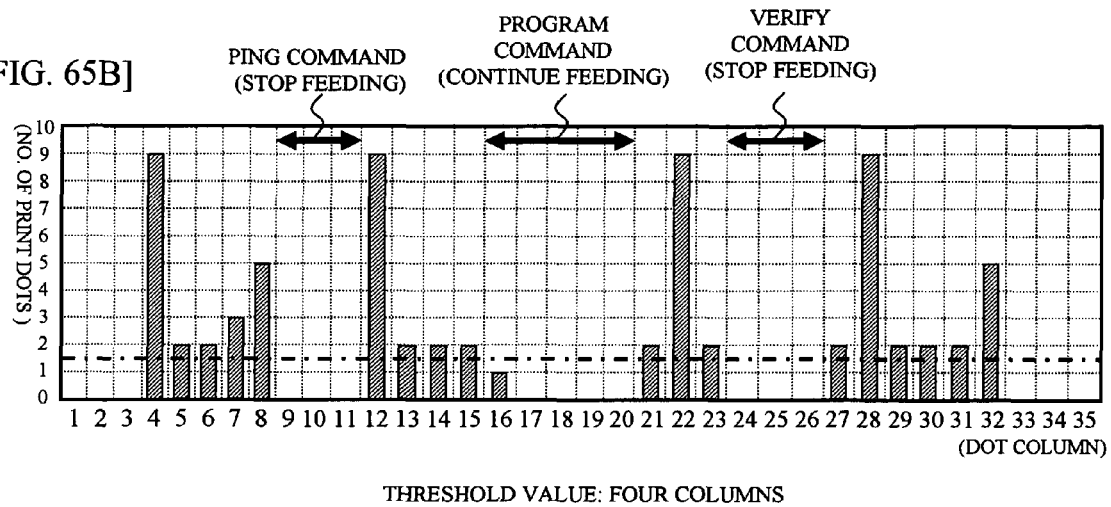
THRESHOLD VALUE: FOUR COLUMNS

[FIG. 66A]
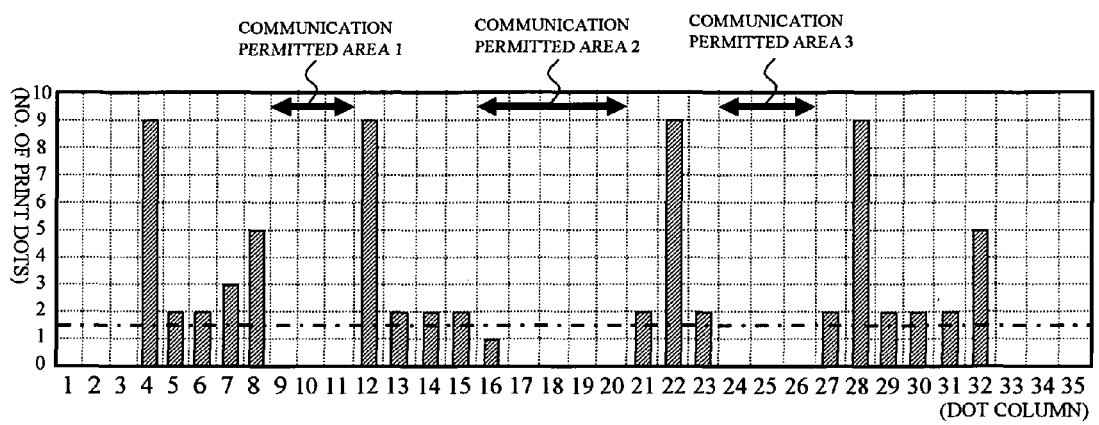
[FIG. 66B]
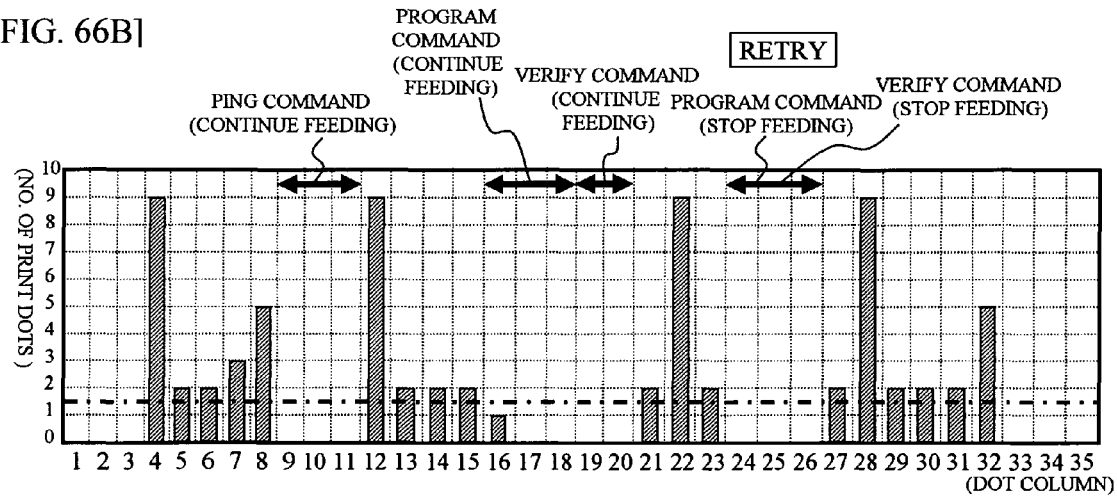

[FIG. 67]
| COMMAND ELEMENT | TIME REQUIRED FOR EXECUTION (CALCULATED AS NO. OF DOT COLUMNS) |
|---|---|
| PING | 2 COLUMNS |
| PROGRAM (BLOCK 1) | 1 COLUMN |
| PROGRAM (BLOCK 2) | 1 COLUMN |
| PROGRAM (BLOCK 3) | 1 COLUMN |
| PROGRAM (BLOCK 4) | 1 COLUMN |
| VERIFY | 2 COLUMNS |
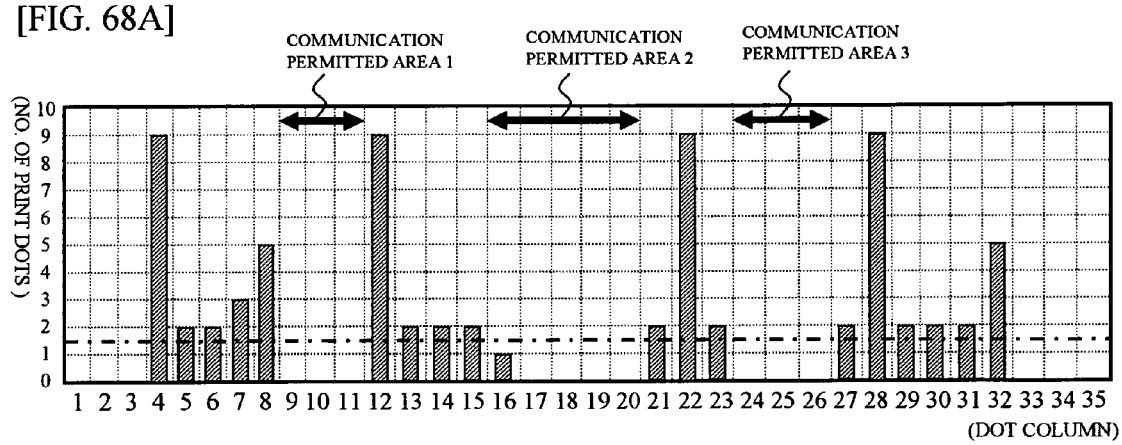
[FIG. 68A]
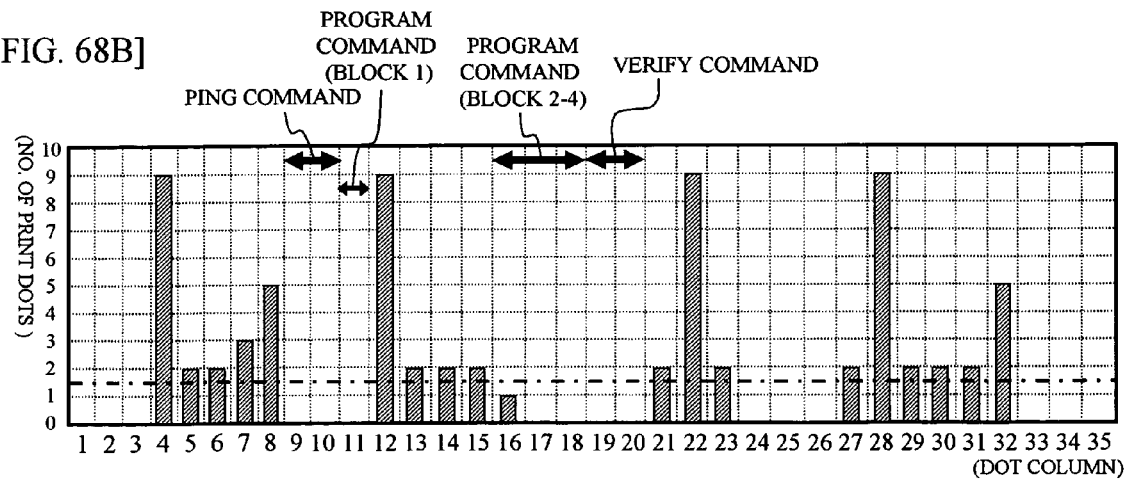
[FIG. 68B]

[FIG. 69A]
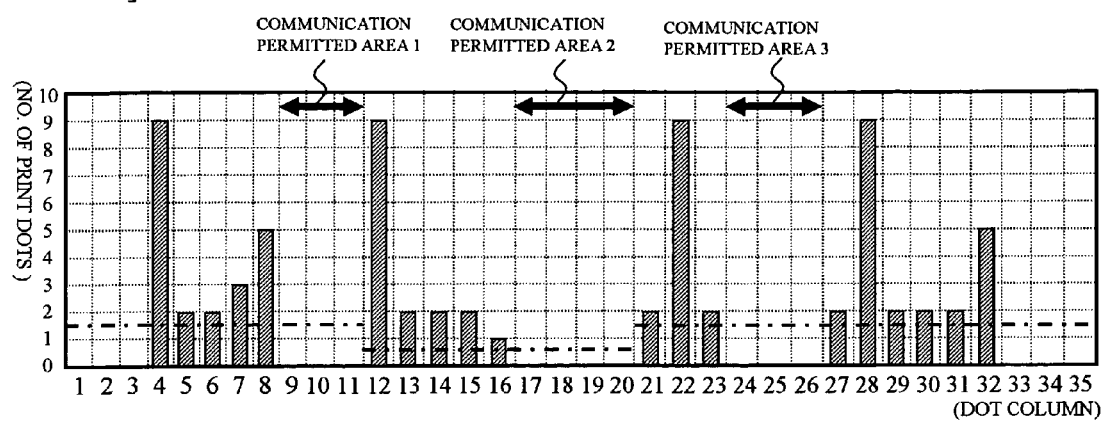
[FIG. 69B]
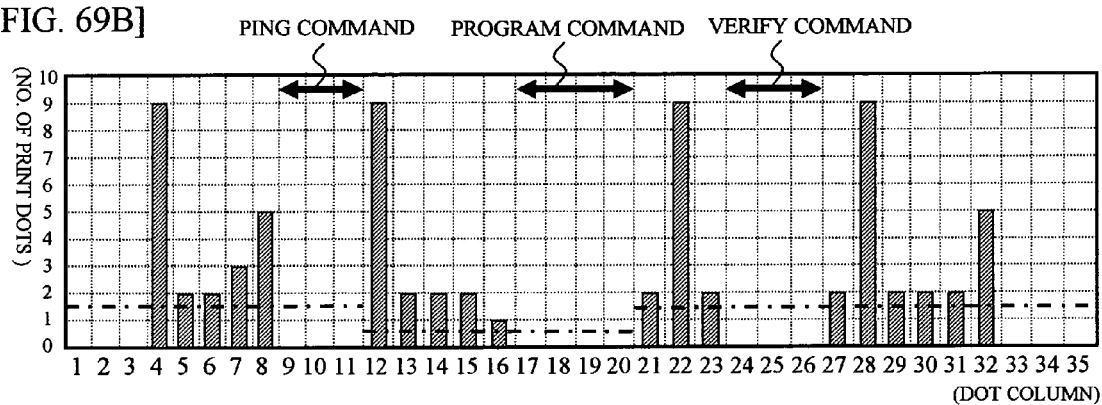

[FIG. 70A]
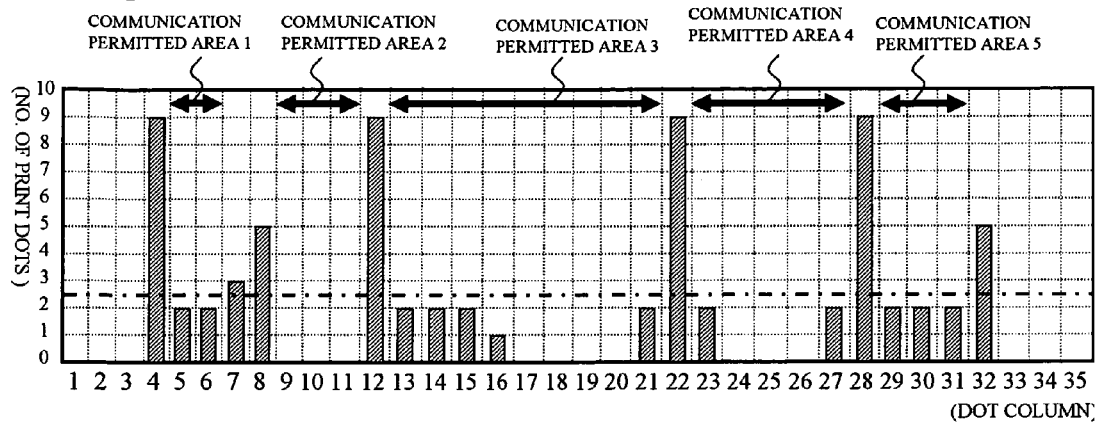
[FIG. 70B]
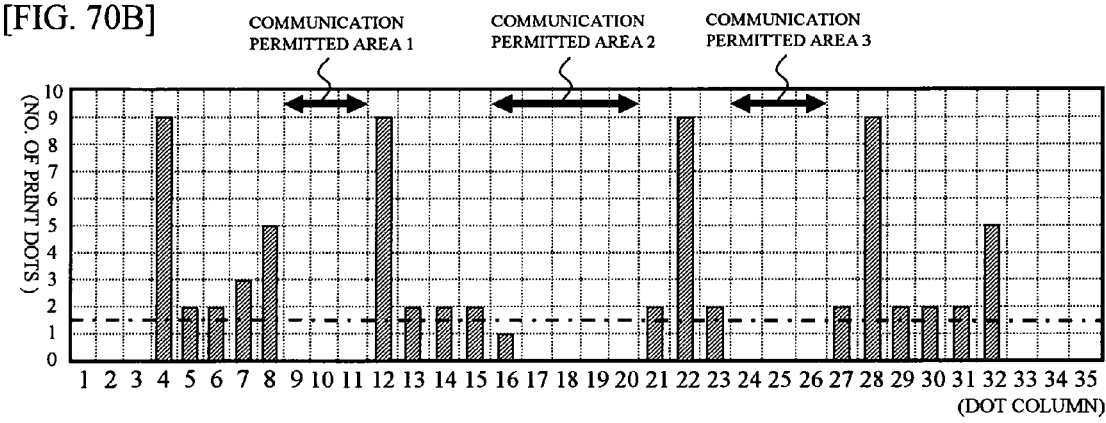
[FIG. 70C]
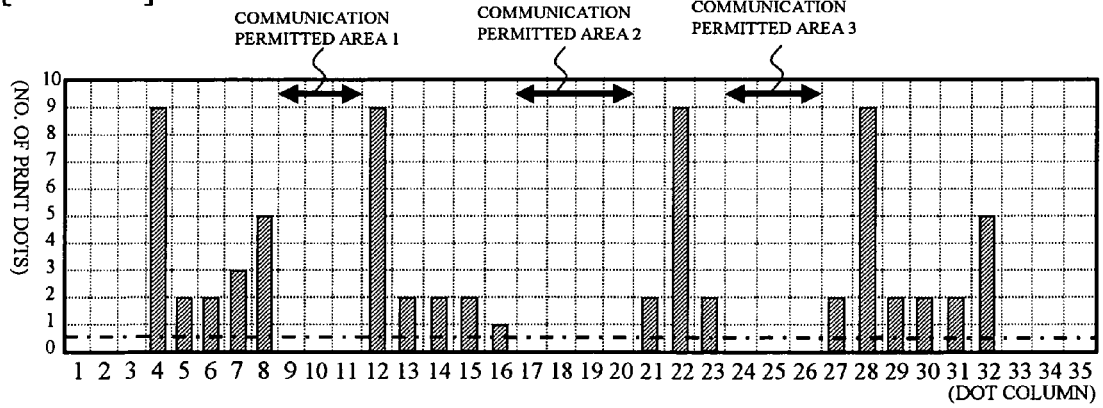

TAG LABEL PRODUCING APPARATUS

CROSS-REFERENCE TO RELATED APPLICATIONS

This is an application PCT/JP2006/325436, filed Dec. 20, 2006, which was not published under PCT article 21(2) in English and claims the benefits of Japanese Patent application No. 2005-366087 filed Dec. 20, 2005, No. 2006-006298 filed Jan. 13, 2006, No. 2006-043799 filed Feb. 21, 2006, and No. 2006-341795 filed Dec. 19, 2006.

TECHNICAL FIELD

The present invention relates to a tag label producing apparatus configured to read and write information to and from an RFID circuit element configured to store information so as to produce an RFID label.

BACKGROUND ART

An RFID (Radio Frequency Identification) system that transmits and receives information in a non-contact manner (coil based electromagnetic coupling type, electromagnetic induction type, or radio wave type, etc.) to and from an RFID circuit element configured to store information is known. For example, an RFID circuit element provided to a label-shaped RFID tag comprises an IC circuit part configured to store predetermined RFID tag information, and an antenna configured to transmit/receive information, connected to the IC circuit part. With such an arrangement, the reader/writer can access (read/write) the RFID tag information in the IC circuit part even if the RFID tag has become dirty or is arranged in a position where it cannot be seen. Such a technique continues to be put into practical use in a wide variety of fields such as commodity management, inspection process, and the like.

An RFID circuit element is generally formed on a label-shaped material as an RFID label, and this tag label is often affixed to a target article for classifying and organizing documents and articles, for example. At such a time, separate from the RFID tag information stored therein, information related to that RFID tag information can be printed on the label, making it possible for the user to conveniently view the related information on the label. For this reason, in the past, a tag label producing apparatus for producing an RFID label from such a perspective has been proposed.

For example, in the tag label producing apparatus described in: Patent Document 1, a tape-shaped tag medium (continuous label paper) wherein an RFID circuit element (antenna and IC chip) is disposed at a substantially equal interval in the longitudinal direction is fed out from a roll unit comprising a roll (rolled paper) around which the tag medium is wound. Subsequently, after predetermined print is printed by a printing means at a predetermined location of the tag medium, RFID tag information is transmitted and received to and from the RFID circuit element provided in the tag medium via an apparatus antenna (RFID communication antenna), thereby producing a tag label with print.

Further, in the tag label producing apparatus described in Patent Document 2, a tag medium comprising an RFID circuit element (RFID tag) is affixed to a mount with a label and, after the tag medium is fed to a predetermined position and the feeding is stopped, information is transmitted from an apparatus antenna (RFID reading/writing apparatus) to the RFID circuit element and predetermined information writing is performed. Then, feeding is immediately resumed and printing is performed by a print head on the front face of the label, thereby continually producing tag labels with print.

At this time, in the above-described tag label producing apparatus, a relatively large amount of power is consumed in the printing means wherein a thermal head, etc., is used, for example. On the other hand, the RFID circuit element normally comprises memory such as RAM or ROM, a control circuit configured to read and write data to and from this memory, a power generating means (internal power supply generation circuit) configured to supply power to the control circuit, and the like (see Patent Document 3, for example). Then, in this RFID circuit element, when information is transmitted or received, power is generated based on a reception signal received from the tag label producing apparatus by the power generating means, the power is supplied so as to start the control circuit, and data reading and writing are performed to and from the memory by the control circuit. As a result, power is also supplied to the RFID circuit element when transmission/reception of information is performed, causing a predetermined amount of power to be consumed on the tag label producing apparatus side during transmission/reception of information.

Patent Document 1: JP, A, 2003-140548
Patent Document 2: JP, A, 2001-96814
Patent Document 3 JP, A, 2000-242754

DISCLOSURE OF THE INVENTION

Problem to be Solved by the Invention

In a case where wireless communication is performed with an RFID circuit element in a tag label producing apparatus, the relative positional relationship between the apparatus antenna and tag antenna is preferably set in a stable manner in a state most favorable for communication. Nevertheless, in the prior art of the above-described Patent Document 1, because the feeding position of the communication position of the tag medium comprising an RFID circuit element is not particularly controlled, in the communication position the RFID circuit element is not necessarily limited to the favorable position for communication. As a result, the possibility exists that the communication efficiency with the apparatus antenna and RFID circuit element antenna may decrease, making it impossible to say that the reliability of the RFID label comprising the RFID circuit element after reading or writing is sufficient.

Further, in the prior art described in Patent Document 2, when an RFID label is produced, the tag medium comprising the RFID circuit element is fed to a predetermined position (near the apparatus antenna), the feeding is then stopped so as to perform communication with the RFID circuit element, the feeding is then further resumed so that printing is performed during feeding, and the formed RFID label is then discharged to outside the apparatus. At this time, in a case where the write processing was not performed well, the operator is notified of the error by a buzzer or LED, but is not particularly notified of any other information at any other time, such as during normal feeding, during wireless communication after feeding has stopped, or when feeding has resumed (excluding cases where the write processing was not performed well). Consequently, the operator cannot confirm that the apparatus is operating normally without malfunction at such times, resulting in great psychological unease. Particularly, in a case where feeding stops for wireless communication after the RFID circuit element has been fed to the communication position, the operator has a difficult time intuitively knowing whether this stopped state is one process of the normal operation for wireless communication or if it is the result of a feeding error, thereby causing problems such as an increase in a sense of uneasiness. Further, regardless if the feeding has stopped for wireless communication, the operator may mistakenly conclude that production of the RFID label is completed and then pull out the end part, causing label production failure.

Further, in general, the tag label producing apparatus, since it is carried to and used in various locations in accordance with its versatile applications, is often further provided with an electrical storage means such as a cell or battery, for example, and used with a limited power supply. As described above with reference to Patent Document 3, the tag label producing apparatus supplies power to the power generating means of the RFID circuit element during transmission/reception of information as well. However, printing by the printing means and transmission/reception of information to and from the RFID circuit element are sometimes substantially performed simultaneously during label production, according to the apparatus configuration. In such a case, the possibility exists that the power required for both printing and transmission/reception of information is insufficient, causing the printing performed by the printing means and the information reading/writing performed with the RFID circuit element to not be normally performed and, in turn, normal RFID label production failure.

As described above, it cannot be said that the tag label producing apparatus according to the above-described prior art sufficiently facilitates label production or improves label production reliability.

It is a first object of the present invention to provide a tag label producing apparatus capable of facilitating label production and improving label production reliability.

A second object of the present invention is to provide a tag label producing apparatus capable of improving the reliability of an RFID label comprising an RFID circuit element after reading or writing by improving the communication efficiency with the apparatus antenna and tag antenna.

A third object of the present invention is to provide a tag label producing apparatus capable of dispelling operator uneasiness and increasing operator trust in relation to apparatus operation, thereby eliminating label production mistakes.

A fourth object of the present invention is to provide a tag label producing apparatus capable of reliably producing an RFID label with print by maintaining normal apparatus operation.

Means for Solving the Problem

To attain the first object, the first invention is a tag label producing apparatus that produces RFID labels using a tag medium including an RFID circuit element having an IC circuit part configured to store information and a tag antenna configured to transmit and receive information, comprising: feeding means for feeding the tag medium; communication means for transmitting and receiving information via a wireless communication to and from the RFID circuit element provided in the tag medium; and communication facilitation processing means for executing predetermined facilitation processing related to a communication during the wireless communication based on the communication means.

The tag medium comprising the RFID circuit element is fed and transmission/reception of information is performed by wireless communication via the communication means, thereby executing information reading and writing to and from the IC circuit part of the RFID circuit element. According to the first invention, predetermined facilitation processing related to communication is executed by the communication facilitation processing means at the time of communication by the communication means. With this arrangement, it is possible to facilitate label production and improve label production reliability.

To attain the first and the second object, the second invention is the tag label producing apparatus according to the first invention, further comprising a housing including a discharging exit, wherein: the communication facilitation processing means is position regulating means for controlling a feeding position of a tape-shaped or sheet-shaped first tag medium near the discharging exit that has the RFID circuit element, and the communication means is an apparatus antenna provided in the housing and configured to transmit and receive information to and from the IC circuit part of the RFID circuit element, near the position regulating means.

The tape-shaped or sheet-shaped first tag medium comprising the RFID circuit element is fed toward the discharging exit, and transmission/reception of information is performed with the apparatus antenna during feeding, thereby executing information reading/writing with the IC circuit part. According to the second invention, the feeding position is controlled near the discharging exit by the position regulating means when the tag medium is fed, thereby substantially fixing the passing position of the tag medium in a stable manner. Then, the apparatus antenna is disposed so that the transmission/reception of information is performed near the position regulating means, thereby improving the communication efficiency with the apparatus antenna and the tag antenna of the RFID circuit element and enhancing the reliability of the RFID label comprising the RFID circuit element after reading and writing.

The third invention is the tag label producing apparatus according to the second invention, wherein the apparatus antenna transmits and receives information to and from the tag antenna, which is a loop antenna comprising a coil of at least one winding.

The apparatus antenna is disposed so that transmission/reception of information is performed near the position regulating means, thereby making it possible to improve the communication efficiency with the apparatus antenna and the loop antenna of the RFID circuit element. Further, because communication can be performed by electromagnetic induction, stable communication can be achieved even if metal, etc., is nearby.

The fourth invention is the tag label producing apparatus according to the second invention, wherein the apparatus antenna transmits and receives information to and from the tag antenna, which is an antenna that includes a dipole shaped section.

The apparatus antenna is disposed so that transmission/reception of information is performed near the position regulating means, thereby making it possible to improve the communication efficiency with the apparatus antenna and the antenna including a dipole shaped section of the RFID circuit element.

The fifth invention is the tag label producing apparatus according to any one of the second to fourth invention, wherein the apparatus antenna is a loop antenna comprising a coil of at least one winding and shielding means.

The apparatus loop antenna is disposed so that transmission/reception of information is performed by magnetic induction near the position regulating means, thereby making it possible to set settings so that the first tag medium always passes through the position where the magnetic flux density produced from the coil of the apparatus loop antenna is largest. As a result, it is possible to improve communication efficiency with the apparatus antenna and the tag antenna of the RFID circuit element.

The sixth invention is the tag label producing apparatus according to any one of the second to fourth invention, wherein the apparatus antenna is a shielded loop antenna comprising a coil with at least one winding.

The loop antenna comprising the shielding means is disposed so that transmission/reception of information is performed by magnetic induction near the position regulating means, thereby making it possible to set settings so that the first tag medium always passes through the position where the magnetic flux density produced from the coil of the loop antenna is largest. As a result, it is possible to improve communication efficiency with the apparatus antenna and the tag antenna of the RFID circuit element.

Further, loop antenna comprising the shielding means is employed, thereby making it possible to decrease the effect of noise components that arrive from outside the apparatus while performing communication at a high efficiency rate by magnetic induction with the RFID circuit element disposed in a nearby location.

The seventh invention is the tag label producing apparatus according to the fifth or sixth invention, wherein the position regulating means regulates the feeding position of the first tag medium at a position that is substantially on the center axis of the coil of the apparatus antenna.

With this arrangement, position control can be performed so that the first tag medium is reliably fed through the position where the magnetic flux density of magnetic induction is largest.

An eighth invention is the tag label producing apparatus according to any one of the fifth to seventh invention, wherein the position regulating means regulates the feeding position so that the distance from the apparatus antenna is one-tenth of the wavelength of a carrier wave used for the communication or less.

With this arrangement, communication can be performed within a range where the ratio of the magnetic field intensity to the electrical field intensity produced from the apparatus antenna increases to two or more times that when the distance from the apparatus antenna is long, thereby achieving the effect of performing communication using a loop antenna.

The ninth invention is the tag label producing apparatus according to any one of the fifth to eighth invention, wherein the position regulating means comprises a discharging roller that regulates the feeding position of the first tag medium while feeding the first tag medium to the discharging exit.

As a result, when the first tag medium is fed, the feeding position can be controlled near the discharging exit while feeding is performed to the discharging exit using a discharging roller, thereby substantially fixing the passing position of the first tag medium in a stable manner and enabling stable communication based on magnetic induction.

The tenth invention is the tag label producing apparatus according to the ninth invention, wherein the discharging roller is disposed on the radial inner side of the coil of the apparatus antenna.

The feeding position is controlled by the discharging roller disposed on the inside of the apparatus antenna so as to substantially fix the passing position of the first tag medium in a stable manner, making it possible to make the first tag medium always pass through the position where the magnetic flux density produced by the coil of the apparatus antenna is largest. Further, setting the discharging roller on the inside of the apparatus antenna makes it possible to not only make the first tag medium pass through a position near the apparatus antenna, but also to utilize the dead space within the apparatus antenna so as to minimize the size of the apparatus.

An eleventh invention is the tag label producing apparatus according to the ninth or tenth invention, wherein a magnetic body (particularly a soft magnetic body) is provided on the side opposite the apparatus antenna, across from the feeding path of the first tag medium.

With a magnetic body of high magnetic permeability such as ferrite, permalloy, and soft iron provided on the side opposite the apparatus antenna, the amount of magnetic flux produced from the coil of the apparatus antenna that crosses the feeding path increases, thereby improving communication efficiency from magnetic induction and enabling a change in the shape of the magnetic flux so that the magnetic flux does not readily spread to outside the apparatus, making it possible to prevent erroneous communication to an RFID circuit element discharged to outside the apparatus from the discharging exit.

The twelfth invention is the tag label producing apparatus according to the eleventh invention, wherein at least a part of either the discharging roller positioned on the side opposite the apparatus antenna or a roller shaft of the discharging roller, is made of a magnetic material as the magnetic body.

With this arrangement, without providing a separate magnetic body as a member on the side opposite the antenna, the roller or roller shaft can be utilized as the magnetic body to adjust the magnetic flux shape so as to concentrate the magnetic flux near the tag antenna, thereby making it possible to improve communication efficiency by magnetic induction and prevent erroneous communication to an RFID circuit element discharged to outside the apparatus from the discharging exit.

The thirteenth invention is the tag label producing apparatus according to the eleventh or twelfth invention, further comprising an arm member configured to rotatably support the discharging roller positioned on the same side as the apparatus antenna, across from the feeding path of the first tag medium, and to move toward the feeding path of the first tag medium, wherein the arm member is constructed using a magnetic material.

With this arrangement, the magnetic flux produced from the coil of the apparatus antenna can be concentrated so as to improve the communication efficiency by magnetic induction with the apparatus antenna and the tag antenna of the RFID circuit element, and adjust the shape of the magnetic flux, thereby preventing erroneous communication to an RFID circuit element outside the apparatus.

The fourteenth invention is the tag label producing apparatus according to any one of the eleventh to thirteenth invention, wherein a length Lg of the magnetic body along a transport direction of the first tag medium is configured shorter than a length L of the tag antenna along a transport direction of the first tag medium.

With this arrangement, the magnetic flux density that passes through the inside of the tag antenna can be increased.

The fifteenth invention is the tag label producing apparatus according to any one of the fifth through fourteenth invention, further comprising shielding means on the side opposite the feeding path of the first tag medium from the apparatus antenna, that shields the magnetic flux produced from the coil of the apparatus antenna.

With this arrangement, the production of magnetic flux can be shielded from the feeding path of the first tag medium to the side opposite the apparatus antenna, thereby making it possible to decrease the possibility of erroneous communication with a tag other than the first tag medium, which is the communication target. Further, the noise that arrives from outside the apparatus can be shielded so as to decrease the effect of that noise.

The sixteenth invention is the tag label producing apparatus according to any one of the fifth through fourteenth invention, further comprising shielding means on the side opposite the apparatus antenna, across from the feeding path of the first tag medium, that shields the magnetic flux produced from the coil of the apparatus antenna.

With this arrangement, the production of magnetic flux can be shielded on the side opposite the apparatus antenna, across from the feeding path of the first tag medium, thereby making it possible to decrease the possibility of erroneous communication with a tag other than the tag medium which is the communication target, such as a tag within the cartridge. Further, the noise that arrives from outside the apparatus can be shielded so as to decrease the effect of that noise.

The seventeenth invention is the tag label producing apparatus according to the fifteenth or sixteenth invention, further comprising cutting means for cutting the first tag medium to be fed with a predetermined length, disposed further upstream in the transport direction of the first tag medium than the position regulating means, and a container holder disposed further upstream in the transport direction of the first tag medium than the cutting means, that enables installation and removal of an RFID tag circuit element container wherein a plurality of the first tag mediums is contained in a continually suppliable manner.

With this arrangement, a first tag medium supplied from an RFID circuit element container installed on a container holder is fed, transmission/reception of information is performed by magnetic induction from an apparatus antenna at a feeding position controlled by position regulating means, and subsequently the rear end side is cut in the transport direction of the first tag medium using the cutting means so as to product an RFID label. Further, use of a configuration wherein the rear end side of the first tag medium is cut by cutting means in this manner makes it possible to position the cutting means between the antenna based communication position and the RFID circuit element container. As a result, the cutting means can be utilized as shielding means configured to shield the magnetic flux, thereby eliminating the need to provide shielding means as a separate member and improving the compactness of the overall apparatus.

An eighteenth invention is the tag label producing apparatus according to the seventeenth invention, wherein the shielding means is disposed so that an end part thereof extends to the side of the container holder from the cutting means.

Because the cutting means is generally made of a metal material, the cutting means independently comprises a function that shields the magnetic flux. At this time, when the shielding means is disposed away from the cutting means, the possibility exists that magnetic flux will leak between the shielding means and the cutting means, resulting in an incomplete shielding function. According to the eighteenth invention, however, the shielding means is disposed so that the end part thereof extends to the container holder side of the cutting means, thereby making it possible to sufficiently exhibit a magnetic flux shielding function that is based on the cooperation of the shielding means and the cutting means. This enables reduction of the effect on the RFIC circuit element disposed further upstream in the transport direction than the cutting means as well as on the RFID circuit element within the RFID circuit element container, thereby reliably preventing erroneous communication.

The nineteenth invention is the tag label producing apparatus according to any one of the fifth to eighteenth invention, wherein the apparatus antenna is fixed near the discharging exit using fixing means created using a magnetic material.

Use of the magnetic material based fixing means for antenna installation makes it possible to concentrate the magnetic field produced from the antenna in section of the fixing means, thereby increasing the magnetic flux density on the inside of the tag antenna when the RFID tag is accessed.

The twentieth invention is the tag label producing apparatus according to the nineteenth invention, wherein the fixing means is disposed on the radial inner side of the apparatus antenna.

Because the fixing means is located on the inside of the apparatus antenna, it is possible to concentrate an even larger amount of magnetic flux using the fixing means and achieve stable communication based on magnetic induction.

The twenty-first invention is the tag label producing apparatus according to the twentieth invention, wherein the center of the fixing means is positioned on the radial inner side of the tag antenna when the center of the tag antenna and the center of the apparatus antenna substantially match.

With this arrangement, the fixing means is located on the radial inner side of the tag antenna, thereby making it possible to concentrate the magnetic flux using the fixing means so as to achieve more stable communication based on magnetic induction when the RFID circuit element is within the communication range.

The twenty-second invention is the tag label producing apparatus according to one of the nineteenth to twenty-first invention, wherein the fixing means is a screw.

Use of a screw that employs a magnetic material such as iron (preferably a soft magnetic material such as soft iron) for loop antenna installation makes it possible to concentrate the magnetic field produced from the loop antenna in a section of the screw, thereby increasing the magnetic flux density on the inside of the tag antenna when the RFID tag is accessed.

To attain the first and the third object, the twenty-third invention is the tag label producing apparatus according to the first invention, wherein the communication means performs a transmission/reception of information via a wireless communication with the RFID circuit element when the RFID circuit element reaches a predetermined position as a result of the feeding of the first tag medium by the feeding means, and the feeding changes to a decelerated or stopped state; and the communication facilitation processing means is first notifying means for notifying an operator that the communication means is performing the transmission/reception of information in the decelerated or stopped state, using a first mode.

According to the twenty-third invention, when the first tag medium is fed by the feeding means and the RFID circuit element provided in the first tag medium arrives at a predetermined position, the feeding of the feeding means is decelerated or stopped and, in that decelerated or stopped state, the communication means accesses the RFID circuit element via wireless communication and performs transmission/reception of information. At this time, the first notifying means notifies the operator of the current status using a predetermined mode (a first mode), thereby making it clear to the operator that the change of the feeding means to a decelerated or stopped state is not the result of a defect or failure of the feeding means, but is rather for transmission/reception of information with the RFID circuit element, and a normal operation process. This makes it possible to dispel operator uneasiness and increase operator trust in the apparatus.

The twenty-fourth invention is the tag label producing apparatus according to the twenty-third invention, further comprising feeding controlling means for controlling the feeding means so as to decelerate a feeding speed or stop the feeding when the RFID circuit element reaches a predetermined position as a result of the feeding.

With the feeding controlling means decelerating or stopping the feeding of the feeding means when the first tag medium is fed by the feeding means and the RFID circuit element arrives at a predetermined position, it is possible to perform transmission/reception of information via wireless communication from the communication means in that decelerated or stopped state.

The twenty-fifth invention is the tag label producing apparatus according to the twenty-fourth invention, wherein the feeding controlling means controls the feeding means so as to decelerate the feeding speed or stop the feeding when a part of the first tag medium comprising the RFID circuit element fed out from the discharging exit, and the first notifying means notifies the operator using the first mode that the transmission/reception of information is in progress with the part of the first tag medium fed out from the discharging exit.

With this arrangement, when the feeding decelerates or stops and transmission/reception is performed with a part of the first tag medium fed out from the discharging exit, the operator can particularly be reliably informed of the status so as to prevent the operator from questioning the current state and pulling out the first tag medium or performing some other careless operation.

The twenty-sixth invention is the tag label producing apparatus according to the twenty-fourth or twenty-fifth invention, wherein the feeding controlling means stops the feeding means with an arrival at the predetermined position.

With this arrangement, the communication means performs communication with the RFID circuit element in a feeding stopped state upon arrival at a predetermined position, thereby making it possible to perform transmission/reception of information with increased stability and reliability.

The twenty-seventh invention is the tag label producing apparatus according to any one of the twenty-third to twenty-sixth invention, further comprising second notifying means for notifying the operator that the RFID circuit element is in the feeding state by the feeding means prior to arrival at the predetermined position, using a second mode.

According to the twenty-seventh invention, when the first tag medium is fed by the feeding means, first the second notifying means notifies the operator of the current status using the second mode. Then, when the RFID tag element provided in the first tag medium arrives at a predetermined position and the communication means performs wireless communication with the feeding means in a decelerated or stopped state, the first notifying means notifies the operator of the current status using the first mode. Thus, the operator is notified of the current status before the feeding means enters the decelerated or stopped state, and then subsequently notified of the current status in the feeding decelerated or stopped state, making it possible to even more clearly indicate to the operator that the system is operating normally.

The twenty-eighth invention is the tag label producing apparatus according to the twenty-seventh invention, wherein the second notifying means practices the notification to the operator using the second mode which is different from the first mode.

With this arrangement, the notification mode is switched before and after feeding decelerates (or stops) when the RFID circuit element arrives at a predetermined position, making it possible to clearly indicate to the operator that the state has transitioned from a feeding state by the feeding means to a communication state by the communication means.

The twenty-ninth invention is the tag label producing apparatus according to the twenty-eighth invention, wherein the first and second notifying means practices the notification to the operator by audio or a visual display.

In a case where audio is employed, the apparatus appeals to the operator's sense of hearing, making it possible to reliably notify the operator of the current status even if the operator moves his/her eyes away from the apparatus. And, in a case where a visual display is employed, the apparatus appeals to the operator's sense of sight, making it possible notify the operator of the current status in a self-explanatory manner.

The thirtieth invention is the tag label producing apparatus according to the twenty-ninth invention, wherein the first notifying means and the second notifying means are constituted as a shared means.

The two modes are achieved by single means, making it possible to simplify the structure, economize space, and reduce cost.

The thirty-first invention is the tag label producing apparatus according to the thirtieth invention, wherein the first and second notifying means are shared single display means for practicing the notification to the operator by a visual display.

The single display means switches the mode of the visual display before and after feeding decelerates (or stops) when the RFID circuit element arrives at a predetermined position, making it possible to clearly indicate to the operator that the state has transitioned from a feeding state by the feeding means to a communication state by the communication means.

The thirty-second invention is the tag label producing apparatus according to the thirty-first invention, wherein the display means practices the notification to the operator using a display mode as the second mode wherein at least the color, brightness, or flickering state differs from that of the first mode.

The single display means switches the color, brightness, or flickering state before and after feeding decelerates (or stops) when the RFID circuit element arrives at a predetermined position, making it possible to clearly indicate to the operator in an easy-to-understand manner that the state has transitioned from a feeding state by the feeding means to a communication state by the communication means.

The thirty-third invention is the tag label producing apparatus according to the thirtieth invention, wherein the first and second notifying means are shared single sound producing means for practicing the notification to the operator by audio.

The single sound producing means switches the mode of the audio before and after feeding decelerates (or stops) when the RFID circuit element arrives at a predetermined position, making it possible to clearly indicate to the operator that the state has transitioned from a feeding state by the feeding means to a communication state by the communication means.

The thirty-fourth invention is the tag label producing apparatus according to the thirty-third invention, wherein the sound producing means practices the notification to the operator using a sound production mode as the second mode wherein at least the frequency, volume, intermittent state, or music differs from that of the first mode.

The single sound producing means switches the frequency, volume, intermittent state, music, etc., before and after feeding decelerates (or stops) when the RFID circuit element arrives at a predetermined position, making it possible to clearly indicate to the operator in an easy-to-understand manner that the state has transitioned from a feeding state by the feeding means to a communication state by the communication means.

The thirty-fifth invention is the tag label producing apparatus according to the twenty-ninth invention, wherein one of the first or second notifying means is means for practicing the notification to the operator by audio, while the other is means for practicing the notification to the operator by a visual display.

The notification mode is switched from audio notification to visual display or from visual display to audio notification before and after feeding decelerates (or stops) when the RFID circuit element arrives at a predetermined position, making it possible to clearly indicate to the operator that the state has transitioned from a feeding state by the feeding means to a communication state by the communication means.

The thirty-sixth invention is the tag label producing apparatus according to any one of the twenty-third to thirty-fifth invention, wherein the first notifying means practices the notification to the operator using different modes in accordance with the type of a command signal transmitted and received by the communication means during the transmission/reception.

With this arrangement, the notification mode changes on a per command signal basis, for example, of the transmission/reception performed by the communication means, making it possible to clearly indicate in detail to the operator the command that is being transmitted (in other words, the communication processing that is being executed.)

The thirty-seventh invention is the tag label producing apparatus according to any one of the twenty-third to thirty-sixth invention, wherein the first notifying means practices the notification to the operator using different modes in accordance with the transmission/reception result of the communication means even after the transmission/reception of information state has ended.

The notification mode changes according to whether transmission/reception of information succeeded or failed, making it possible to clearly indicate to the operator whether or not communication is permitted. Additionally, notification that a retry is in progress is possible.

To attain the first and fourth object, the thirty-eighth invention is the tag label producing apparatus according to the first invention, wherein the feeding means feeds a second tag medium wherein the RFID circuit element is disposed or a print-receiving medium to be bonded to the second tag medium; the tag label producing apparatus further comprises printing means for performing a printing in a predetermined print area of the second tag medium or of the print-receiving medium during the feeding by the feeding means, and wherein, the communication facilitation processing means is predicting means for predicting whether or not a transmission/reception of information will be permitted based on the corresponding operation status of the printing means, before the communication means performs the transmission/reception of information; and the communication means performs the transmission/reception of information with the RFID circuit element in a non-contact manner during the feeding by the feeding means, in accordance with the prediction result of the predicting means.

The feeding means feeds the second tag medium comprising the RFID circuit element or the print-receiving medium, the printing means prints print in the print area of the second tag medium or print-receiving medium during feeding, and the communication means performs information reading/writing via transmission/reception of information with the RFID circuit element, thereby producing a tag label with print. At this time, because the printing means consumes a relatively large amount of power, whether or not the printing means is in a high power consumption state needs to be taken into consideration when the communication means attempts to perform transmission/reception of information (particularly in a case where the power supply is not an external power supply but rather a power supply limited by electrical storage means such as a battery) in order to ensure normal communication.

According to the thirty-eighth invention, the predicting means predicts whether or not transmission/reception of information will be permitted taking into account the operation status of the printing means before the RFID circuit element arrives at the transmission/reception of information position by the feeding means, and the communication means performs transmission/reception of information in accordance with the prediction result. With this arrangement, for example, transmission/reception of information is either not performed or is restricted when the power consumption of the printing means is predicted to be high, and performed for a long period or time or with a high volume of communication data when the power consumption of the printing means is predicted to be low, thereby making it possible to make adjustments so as to not significantly increase the peak of the combined power consumption of both the printing means and the communication means.

As a result, even in a case where the power supply is limited by the electrical storage means such as a battery, for example, normal apparatus operation can be maintained, making it possible to reliably produce RFID labels with print.

The thirty-ninth invention is the tag label producing apparatus according to the thirty-eighth invention, wherein the predicting means includes printing power calculating means for calculating the power consumption required for printing in the predetermined print area using the printing means, and communication condition setting means for setting conditions for the transmission/reception of information in accordance with a calculation result of the printing power calculating means.

With this arrangement, adjustments can be made so that, for example, the communication condition setting means restricts or does not perform transmission/reception of information in a case where the power consumption of the printing means calculated by the printing power calculating means is high, or lengthens the communication time period or increases the volume of communication data in a case where the power consumption of the printing means calculated by the printing power calculating means is low, thereby making it possible to ensure that the peak of the combined power consumption of both the printing means and the communication means does not significantly increase.

The fortieth invention is the tag label producing apparatus according to the thirty-ninth invention, wherein the predicting means further includes communication permitted time detecting means for detecting a transmission/reception permitted timing and a transmission/reception permitted time period for the communication means, based on the power consumption calculated by the printing power calculating means; and the communication condition setting means sets conditions for the transmission/reception of information in accordance with the transmission/reception permitted timing and the transmission/reception permitted time period detected by the communication permitted time detecting means.

In a case where the power consumption of the printing means calculated by the printing power calculating means is relatively low, for example, the transmission/reception permitted timing and the transmission/reception permitted time period that satisfy predetermined conditions are detected by the communication permitted time detecting means as the communication permitted time domain, thereby making it possible to set conditions for actual transmission/reception of information, such as the transmission/reception timing and the transmission/reception time period, from within that domain using the communication condition setting means and make adjustments to ensure that the peak of the combined power consumption of both the printing means and communication means does not significantly increase.

The forty-first invention is the tag label producing apparatus according to the fortieth invention, wherein the communication permitted time detecting means detects the transmission/reception permitted timing and the transmission/reception permitted time period based on which of the power consumption calculated by the printing power calculating means and a predetermined threshold value is large or not.

With this arrangement, a transmission/reception permitted timing and a transmission/reception permitted time period wherein the power consumption of the printing means is lower than the threshold value can be reliably detected as the communication permitted time domain by the communication permitted time detecting means.

The forty-second invention is the tag label producing apparatus according to the fortieth or forty-first invention, wherein the communication condition setting means sets at least a transmission/reception timing and a transmission/reception time period as the conditions for the transmission/reception of information.

The communication condition setting means sets the transmission/reception timing and the transmission/reception time period as conditions for actual transmission/reception of information, thereby making it possible to make adjustments, such as performing transmission/reception within a time domain wherein the power consumption of the printing means is relatively low, so as to not significantly increase the peak of the combined power consumption of both the printing means and the communication means.

The forty-third invention is the tag label producing apparatus according to the forty-second invention, wherein the communication condition setting means further sets at least a feeding speed of the feeding means, the presence of deceleration or stopping of that feeding speed and the decelerated or stopped time period, a transmission/reception retry count, or the presence of a transmission/reception data division and the amount of transmission/reception data after the division, as the condition for the transmission/reception of information.

With this arrangement, in a case where the time domain having low printing means power consumption value is short and the resultant communication period is insufficient, for example, detailed adjustments such as stopping the feeding, decelerating the feeding speed, dividing the transmission/reception data, or decreasing the retry count can be made so as to ensure that the peak of the combined power consumption of both the printing means and the communication means does not significantly increase.

The forty-fourth invention is the tag label producing apparatus according to the forty-third invention, wherein the communication condition setting means sets the presence of a deceleration or a stopping by the feeding means during the transmission/reception of information in accordance with the transmission/reception time period set as the condition of the transmission/reception of information and, in a case where the feeding means is set to decelerate or stop, sets a deceleration time period or a stopped time period.

With this arrangement, for example, detailed adjustments such as stopping or decelerating the feeding can be made in a case where the time domain having low printing means power consumption value is short and the resultant communication time period is insufficient, or lengthening the time period that the feeding is stopped or decelerated in a case where the volume of transmission/reception data is high can be made, thereby making it possible to ensure that the peak of the combined power consumption of both the printing means and the communication means does not significantly increase.

The forty-fifth invention is the tag label producing apparatus according to the forty-second invention, wherein the communication condition setting means sets the transmission/reception retry count during the transmission/reception of information in accordance with the transmission/reception permitted timing and the transmission/reception permitted time period detected by the communication permitted time detecting means.

With this arrangement, in a case where the time domain having low printing means power consumption value is short and the resultant communication time period is insufficient, for example, detailed adjustments such as setting a low transmission/reception count can be further made so as to avoid communication attempts outside the transmission/reception permitted time period, thereby making it possible to ensure that the combined communication power consumption of both the printing means and communication means does not significantly increase.

The forty-sixth invention is the tag label producing apparatus according to any one of the thirty-ninth to forty-fifth invention, wherein the printing power calculating means calculates a distribution of the power consumption in at least a communication permitted range with respect to the printing area prior to a start of the printing by the printing means; and the communication condition setting means sets the conditions for the transmission/reception of information of the communication means in accordance with the power consumption distribution calculated by the printing power calculating means.

With this arrangement, the printing power consumption distribution is calculated for the entire print area by the printing power calculating means prior to the start of printing and, based on the calculation result, the communication condition setting means, for example, lists all time domains in which the power consumption of the printing means is lower than a predetermined value, making it possible to set all transmission/reception time periods in advance so that transmission/reception is performed within those time domains.

The forty-seventh invention is the tag label producing apparatus according to any one of the thirty-ninth to forty-fifth invention, wherein the printing power calculating means calculates the distribution of the power consumption per small area of the print area divided into a predetermined quantity before or after the start of printing by the printing means; and the communication condition setting means sets the conditions for the transmission/reception of information of the communication means in accordance with the power consumption distribution calculated by the printing power calculating means.

With this arrangement, the printing power consumption distribution is calculated by the printing power calculating means per small print area, and the time divisions in which the power consumption of the printing means is relatively low, for example, are listed by the communication condition setting means, making it possible to set transmission/reception time periods so that transmission/reception is performed in those time divisions.

The forty-eighth invention is the tag label producing apparatus according to any one of the thirty-ninth to forty-fifth invention, wherein the printing power calculating means calculates the distribution of the power consumption per predetermined print unit area of the printing area at and after the start of printing by the printing means; and the communication condition setting means sets the conditions for the transmission/reception of information of the communication means in accordance with the power consumption distribution calculated by the printing power calculating means.

With this arrangement, the printing power consumption distribution is calculated by the printing power calculating means per printing unit area, making it possible to set settings on a case by case basis using the communication condition setting means so that transmission/reception is performed in a case where the power consumption of the printing means is lower than a predetermined value, and transmission/reception is not performed in a case where the power consumption is higher than a predetermined value.

The forty-ninth invention is the tag label producing apparatus according to any one of the thirty-ninth to forty-eighth invention, further comprising determining means for determining whether or not a condition for a transmission/reception of information that enable normal production of a tag label can be set.

With this arrangement, in a case where the battery cell (power supply capacity) is low, printing is continuous, or high-quality mode is set and printing cannot be stopped, the determining means judges that communication conditions cannot be set, thereby making it possible, for example, to interrupt tag label production and prompt the user to replace the battery cell or change conditions.

The fiftieth invention is the tag label producing apparatus according to any one of the thirty-eighth to forty-ninth invention, wherein the printing means is a thermal head having a heating element configured to generate a heat when a current is applied.

In a case where the printing means is a thermal head, because power consumption especially increases, the predicting means predicts whether or not transmission/reception of information will be permitted, and the communication means performs transmission/reception of information in accordance with the prediction result, thereby making it possible to effectively adjust the combined communication power consumption of both the printing means and the communication means so as to reliably produce RFID labels with print.

Advantages of the Invention

According to the invention described in claim 1, it is possible to facilitate and improve the reliability of label production.

According to the invention described in claim 2, it is possible to improve the communication efficiency with the apparatus antenna and the tag antenna, shorten the time period required for reading and writing, decrease the power used for communication, and thus improve the reliability of the RFID label comprising an RFID circuit element after reading and writing.

According to the invention described in claim 23, it is possible to clearly indicate to the operator that the decelerated or stopped state of the feeding means is not the result of feeding means defect or failure, but rather a normal operation process, thereby dispelling operator uneasiness and increasing operator trust in the apparatus.

According to the invention described in claim 38, normal apparatus operation is maintained, thereby making it possible to reliably product RFID labels with print.

BRIEF DESCRIPTION OF THE DRAWING

FIG. 1 is a system configuration diagram illustrating an RFID tag manufacturing system comprising the tag label producing apparatus of the first embodiment of the present invention.

FIG. 2 is a perspective view which shows the overall structure of the tag label producing apparatus.

FIG. 3 is a perspective view which shows the structure of the internal module within the tag label producing apparatus.

FIG. 4 is a plan view which shows the structure of the internal module.

FIG. 5 is an enlarged plan view schematically showing the detailed structure of a cartridge.

FIG. 6 is a conceptual view from the direction of arrow D in FIG. 5, illustrating the conceptual configuration of the RFID circuit element To provided in the base tape fed out from the first roll.

FIG. 7 is a diagram illustrating a conceptual configuration of a dipole antenna, and a partially enlarged view thereof.

FIG. 8 is a partially extracted perspective view illustrating the detailed structure of the main part of the label discharging mechanism.

FIG. 9 is an enlarged front view illustrating an example of a specific structure of a loop antenna, a perspective view from the front illustrating the back side structure, and an arrow side view from the Z direction in FIG. 9A.

FIG. 10 is an enlarged front view illustrating a conceptual configuration of a shielded loop antenna, a perspective view from the front illustrating the back side structure thereof, and an arrow side view from the direction Y in FIG. 10A.

FIG. 11 is a perspective view showing the outer appearance of the internal module in a state with the label discharging mechanism removed from the structure shown in FIG. 3.

FIG. 12 is a perspective view showing the outer appearance of the cutting mechanism with the half-cutter removed from the internal module.

FIG. 13 is a perspective view showing the outer appearance of the cutting mechanism with the half-cutter removed from the internal module.

FIG. 14 is a perspective view showing the detailed structure of the movable blade and fixed blade along with the half-cutting module.

FIG. 15 is a partially enlarged cross-sectional view showing the detailed structure of the movable blade and fixed blade along with the half-cutting module.

FIG. 16 is a front view showing the outer appearance of the movable blade.

FIG. 17 is a cross-sectional view taken along a line A-A in FIG. 16.

FIG. 18 is a functional block diagram which shows the control system of the tag label producing apparatus.

FIG. 19 is a circuit diagram simply illustrating the circuit configuration of the connection section of the transmission circuit, the reception circuit, and the apparatus antenna.

FIG. 20 is a functional block diagram which shows the functional configuration of an RFID circuit element.

FIG. 21 is a top view and bottom view illustrating an example of the outer appearance of an RFID label formed after information has been written to (or read from) the RFID circuit element and the tag label tape with print has been cut by the tag label producing apparatus.

FIG. 22 is a cross-sectional view taken along a line XXII-XXII' in FIG. 21.

FIG. 23 is a diagram illustrating an example of a screen displayed on a PC (terminal or general-purpose computer) when the RFID tag information of the IC circuit part of the RFID circuit element is accessed (read from or written to) by the tag label producing apparatus.

FIG. 24 is a diagram conceptually illustrating the positional relationship between the apparatus antenna, driving roller, pressure roller, and tag label tape with print, as well as the state of the magnetic flux produced from the apparatus antenna.

FIG. 25 is a diagram summarizing the relationship (wave impedance behavior) between the electrical field intensity and the magnetic field intensity near the antenna.

FIG. 26 is a diagram conceptually illustrating the positional relationship between the apparatus antenna, driving roller, pressure roller, and tag label tape with print, as well as the state of the magnetic flux produced from the apparatus antenna, in a modification providing a magnetic body.

FIG. 27 is a diagram conceptually illustrating the positional relationship between the apparatus antenna, driving roller, pressure roller, and tag label tape with print, as well as the state of the magnetic flux produced from the apparatus antenna, in a modification comprising the roller shaft as a magnetic body.

FIG. 28 is a diagram conceptually illustrating the positional relationship between the apparatus antenna, driving roller, pressure roller, and tag label tape with print, as well as the state of the magnetic flux produced from the apparatus antenna, in a modification comprising the roller arm as a magnetic body.

FIG. 29 is a diagram conceptually illustrating the positional relationship between the apparatus antenna, driving roller, pressure roller, and tag label tape with print, as well as the state of the magnetic flux produced from the apparatus antenna, in a modification providing a shielding plate on the apparatus antenna side.

FIG. 30 is a diagram conceptually illustrating the positional relationship between the apparatus antenna, driving roller, pressure roller, and tag label tape with print, as well as the state of the magnetic flux produced from the apparatus antenna, in a modification providing a shielding plate on the side opposite the apparatus antenna.

FIG. 31 is a diagram conceptually illustrating the positional relationship between the apparatus antenna, driving roller, pressure roller, and tag label tape with print, as well as the state of the magnetic flux produced from the apparatus antenna, in a modification providing a shielding plate up to a location near the cutter.

FIG. 32 is a diagram conceptually illustrating the positional relationship between the apparatus antenna and tag label tape with print, as well as the state of the magnetic flux produced from the apparatus antenna, in a modification providing a roller on one side only.

FIG. 33 is a diagram conceptually illustrating the positional relationship between the apparatus antenna and tag label tape with print, as well as the state of the magnetic flux produced from the apparatus antenna, in a modification wherein control is performed by guide walls only.

FIG. 34 is a perspective view illustrating the overall structure of the tag label producing apparatus of a modification providing the apparatus antenna outside the apparatus.

FIG. 35 is a plan view illustrating the structure of the inner module of a modification providing the apparatus antenna on the driving roller side of the tape feeding path.

FIG. 36 is a diagram conceptually illustrating the positional relationship between the apparatus antenna and the tag label tape with print, as well as the state of the magnetic flux produced from the apparatus antenna, in a modification wherein a screw comprising a magnetic body is used to install the apparatus antenna.

FIG. 37 is a plan view which shows the structure of the internal module within the tag label producing apparatus according to the second embodiment of the present invention.

FIG. 38 is an enlarged plan view schematically showing the detailed structure of a cartridge.

FIG. 39 is a conceptual view from the direction of arrow D in FIG. 38, illustrating the conceptual configuration of the RFID circuit element To provided in the base tape fed out from the first roll.

FIG. 40 is a partially extracted view illustrated the detailed structure of the main part of the label discharging mechanism, and a diagram illustrating a conceptual configuration of the mark sensor.

FIG. 41 is a functional block diagram which shows the control system of the tag label producing apparatus.

FIG. 42 is a top view and bottom view illustrating an example of the outer appearance of an RFID label formed after information has been written to (or read from) the RFID circuit element and the tag label tape with print has been cut by the tag label producing apparatus.

FIG. 43 is a diagram illustrating the cross-sectional view of the XLIIIA-XLIIIA' cross-section and the XLIIIB-XLIIIB' cross-section in FIG. 42 rotated 90° counterclockwise.

FIG. 44 is an explanatory diagram illustrating the positional relationship between the identifier, RFID circuit element, and print area of the label print of the tag label tape with print continually fed out, and the apparatus antenna, mark sensor, half-cutting module, cutting mechanism, and print head, as well as the light-emitting states of the two-colored LED.

FIG. 45 is an explanatory diagram illustrating the positional relationship between the identifier, RFID circuit element, and print area of the label print of the tag label tape with print continually fed out, and the apparatus antenna, mark sensor, half-cutting module, cutting mechanism, and print head, as well as the light-emitting states of the two-colored LED.

FIG. 46 is a flowchart illustrating a control procedure executed by the control circuit.

FIG. 47 is a flowchart which shows the detailed procedure of step S100.

FIG. 48 is a flowchart which shows the detailed procedure of step S200.

FIG. 49 is a flowchart which shows the detailed procedure of step S300.

FIG. 50 is a flowchart which shows the detailed procedure of step S400.

FIG. 51 is a flowchart which shows the detailed procedure of step S500.

FIG. 52 is a functional block diagram showing the control system of the tag label producing apparatus of a modification wherein the operator is notified of the current status by audio.

FIG. 53 is an explanatory diagram illustrating the positional relationship between the identifier, RFID circuit element, and print area of the label print of the tag label tape with print continually fed out, and the apparatus antenna, mark sensor, half-cutting module, cutting mechanism, and print head, as well as the sound-producing states of the speaker, in a modification wherein the operator is notified of the current status by audio.

FIG. 54 is an explanatory diagram illustrating the positional relationship between the identifier, RFID circuit element, and print area of the label print of the tag label tape with print continually fed out, and the apparatus antenna, mark sensor, half-cutting module, cutting mechanism, and print head, as well as the sound-producing states of the speaker, in a modification wherein the operator is notified of the current status by audio.

FIG. 55 is a functional block diagram illustrating a control system of the tag label producing apparatus according to a third embodiment of the present invention.

FIG. 56 is a flowchart illustrating a control procedure executed by the control circuit.

FIG. 57 is a flowchart which shows the detailed procedure of step S3100.

FIG. 58 is a diagram conceptually illustrating an example of the memory content of the print buffer when print data are expanded into the print buffer in the procedure of step S3120.

FIG. 59 is a diagram for explaining an example of the procedures of step S3130 and step S3140 wherein the number of print dots of all dot columns of the print buffer 117B in which the print data have been expanded is counted, and the counted number of print dots of each dot column is compared with a threshold value so as to identify the dot columns with a number of print dots less than or equal to a threshold value as communication permitted areas.

FIG. 60 is a diagram illustrating an example of the procedure of step S3003 wherein communication conditions are set for the areas regarded as communication permitted areas.

FIG. 61 is a flowchart which shows the detailed procedure of step S3200.

FIG. 62 is a flowchart which shows the detailed procedure of step S3400.

FIG. 63 is a flowchart which shows a control procedure executed by the control circuit in a modification wherein feeding is stopped during a transmission/reception of information.

FIG. 64 is a flowchart which shows the detailed procedure of step S3300.

FIG. 65 is a diagram for explaining an example of the procedure in the communication permitted time period detection processing of step S3100 and the communication condition setting processing of step S3300 wherein the feeding of the tag label tape with print during communication is set to stop or not stop by detecting the communication permitted areas in the print buffer in which print data have been expanded, and comparing the number of dot columns of each communication permitted area with a threshold value.

FIG. 66 is a diagram for explaining an example of the procedure for setting communication conditions in a modification wherein retries are performed.

FIG. 67 is a table summarizing the types of commands (command elements) transmitted to an RFID circuit element from the apparatus antenna, and the time required for executing each command, in a modification wherein divided transmission/reception is performed.

FIG. 68 is a diagram for explaining an example of the procedure for setting communication conditions in a modification wherein divided transmission/reception is performed.

FIG. 69 is a diagram for explaining an example of the procedure for setting communication conditions in a modification wherein the threshold value is changed according to command.

FIG. 70 is a diagram for explaining an example of the procedure for setting communication conditions in a modification wherein the threshold value is changed according to power supply voltage.

BEST MODE FOR CARRYING OUT THE INVENTION

The following describes the embodiments of the present invention with reference to accompanying drawings.

A first embodiment of the present invention will be described with reference to FIGS. 1 to 36. The present embodiment is an embodiment of a case where the present invention is applied to an RFID label manufacturing system.

FIG. 1 is a diagram illustrating the configuration of an RFID tag manufacturing system comprising a tag label producing apparatus of the present embodiment.

In this RFID tag manufacturing system TS shown in FIG. 1, a tag label producing apparatus 1 is connected to a terminal 118a and a general-purpose computer 118b connected to a route server RS and a plurality of information servers IS via a communication line NW in a wired or wireless manner. The terminal 118a and the general-purpose computer 118b will hereinafter be suitably and simply referred to as a "PC 118" collectively.

FIG. 2 is a perspective view showing the overall structure of the tag label producing apparatus 1.

In FIG. 2, the tag label producing apparatus 1 is connected to the PC 118 so as to produce desired RFID labels with print based on operations performed from the PC 118, and comprises an apparatus main body 2 and an opening/closing lid 3 provided on the upper surface of the apparatus main body 2 so as to freely open and close.

The apparatus main body 2 is positioned on the front side (the left front side in FIG. 2), and comprises a side wall 3a (housing) comprising a label discharging exit 11 (discharging exit) configured to discharge to the outside an RFID label T (described later) produced within the apparatus main body 2, and a side lid 12 provided below the label discharging exit 11 of the side wall 3a with a rotationally supported bottom end.

The front lid 12 comprises a pressing part 13, which is designed to release the side lid 12 forward when pressed upward. A power button 14 configured to turn the power supply of the tag label producing apparatus 1 on and off is provided below an open/close button 4 of the side wall 3a. A cutter driving button 16 for driving a cutting mechanism 15 (refer to FIG. 3 described later) disposed within the apparatus housing 2 based on a manual operation performed by the user is provided below the power button 14, and cuts a tag label tape 109 with print (described later) when pressed so as to produce an RFID label T.

A two-colored LED (first notifying means, communication facilitation processing means; second notifying means, display means) 131 configured to indicate the feeding status and RFID communication status of the tag label tape 109 with print is provided on the side wall 3a (near the power button 14 in this example; refer to the second embodiment described later).

The opening/closing lid 3 is rotatably supported by a shaft at the edge of the right rear side in FIG. 2 of the apparatus main body 2, and is always biased in the release direction via a biasing member such as a spring, etc. Then, the opening/closing lid 3 and apparatus main body 2 are unlocked by the pressing of the open/close button 4 disposed adjacent to the opening/closing lid 3 on the upper surface of the apparatus main body 2, and released by the action of the biasing member. Furthermore, in the center side area of the opening/closing lid 3 is provided an inspection window 5 covered by a transparent cover.

FIG. 3 is a perspective diagram showing the structure (with the apparatus antenna LC described later omitted) of an internal module 20 located in the interior of the tag label producing apparatus 1. In FIG. 3, the internal module 20 generally comprises a cartridge holder 6 (container holder) configured to house a cartridge 7 (RFID circuit element container), a printing mechanism 21 comprising a print head (thermal head) 23, the cutting mechanism 15 (cutting means), a half-cutting module 35 (refer to FIG. 4 described later), and a label discharging mechanism 22 configured to discharge a produced RFID label T (refer to FIG. 22 described later) from the label discharging exit 11 (refer to FIG. 2).

FIG. 4 is a plan view illustrating the structure of the internal module 20 shown in FIG. 3, and FIG. 5 is an enlarged plan view schematically illustrating the detailed structure of the cartridge 7.

In these FIGS. 4 and 5, the cartridge holder 6 houses the cartridge 7 so that the orientation of the width direction of the tag label tape 109 with print to be discharged from the label discharging exit 11 is perpendicular. The cartridge 7 comprises a housing 7A, a first roll 102 (actually spiral in shape, but simply shown in a concentric shape in the figure for the sake of convenience), around which a strip base tape 101 is wound, and which is disposed within the housing 7A, a second roll 104 (actually spiral in shape, but simply shown in a concentric shape in the figure for the sake of convenience), around which a transparent cover film 103 is wound, with approximately the same width as that of the base tape 101, a ribbon supply side roll 111 configured to supply an ink ribbon 105 (heat transfer ribbon, which is not required in a case of employing a thermal tape as the print-receiving tape), a ribbon take-up roller 106 configured to rewind the ribbon 105 after the printing, and a feeding roller 27 rotatably supported near a tape discharging part 30 of the cartridge 7.

The feeding roller 27 is configured to affix the base tape 101 and the cover film 103 as a second tag medium to each other by applying pressure and transport the tag label tape 109 with print thus formed as the first tag medium in the direction of the arrow A (i.e. functioning as a pressure roller as well).

The first roll 102 stores, in a manner such that it is wound around a reel member 102a, the base tape 101, which has a structure in which a plurality of RFID circuit elements To are serially formed at a predetermined interval along the longitudinal direction. In this example, the base tape 101 has a four-layer structure (refer to the partially enlarged view in FIG. 5) comprising an adhesive layer 101a formed of a suitable adhesive material, a colored base film 101b formed of PET (polyethylene terephthalate) or the like, an adhesive layer 101c formed of a suitable adhesive material, and a separation sheet (separation material) 101d. The four layers of the base tape 101 are layered in that order from the side rolled to the inside (the right side in FIG. 5) to the side corresponding to the opposite side (the left side in FIG. 5).

A tag antenna (a loop antenna configured in the shape of a loop coil in this example) 152 configured to transmit/receive information is provided on the back face of the base film 101b (on the left side in FIG. 5) in an integrated manner in this example, and an IC circuit part 151 configured to store information is formed so that it is connected to the tag antenna 152, thereby constructing an RFID circuit element To.

The adhesive layer 101a is formed on the front side of the base film 101b (on the right side in FIG. 5) for bonding the cover film 103 thereon at a later time. The separation sheet 101d is also bonded to the back side (on the left side of FIG. 5) of the base film 101b by the adhesive layer 101c for wrapping the RFID circuit element To therein. Note that the separation sheet 101d is peeled off when the RFID label T is affixed as a finished label-shaped product to a predetermined article or the like, thereby adhering the RFID label T to the article or the like by the adhesive layer 101c.

The second roll 104 has the cover film 103 wound around a reel member 104a. The cover film 103 fed out from the second roll 104 is pressed against the ribbon 105 driven by the ribbon supply side roll 111 and the ribbon take-up roller 106, which are disposed inward from the back side of the cover film 103 (i.e., the side of the cover film 103 which is affixed to the base tape 101), by the print head 23, such that the ribbon 105 is brought into close contact with the back side of the cover film 103.

The ribbon take-up roller 106 and the feeding roller 27 are rotationally driven in coordination by a driving power of a feeding motor 119 (refer to FIG. 3 and FIG. 18 described later), which is a pulse motor, for example, provided on the outside of each cartridge 7, that is transmitted to the ribbon take-up roller driving shaft 107 and the tape feeding roller driving shaft 108 (feeding means) via a gear mechanism.

Meanwhile, the print head 23 comprising a great number of heating elements is installed on a head installing part 24 provided on the cartridge holder 6, and is disposed upstream in the transport direction of the cover film 103 from the feeding roller 27.

In front of the cartridge 7 on the cartridge holder 6 (on the lower side in FIG. 4), a roller holder 25 is rotatably pivoted by a support shaft 29, and is designed so as to be switchable to a print position (contact position; refer to FIG. 4) or to a release position (break away position) by a switching mechanism. On this roller holder 25 are rotatably provided a platen roller 26 and a tape pressure roller 28. When the roller holder 25 switches to the print position, the platen roller 26 and the tape pressure roller 28 press against the print head 23 and the feeding roller 27.

In the configuration described above, the base tape 101 fed out from the first roll 102 is supplied to the feeding roller 27. The cover film 103 fed out from the second roll 104, in turn, is pressed against the ink ribbon 105 driven by the ribbon supply side roll 111 and the ribbon take-up roller 106, which are disposed inward from the back side of the cover film 103 (i.e., the side of the cover film 103 which is affixed to the base tape 101), by the print head 23, such that the ink ribbon 105 is brought into close contact with the back side of the cover film 103.

Then, when the cartridge 7 is loaded to the cartridge holder 6, and the roll holder 25 is moved from the release position to the print position, the cover film 103 and the ink ribbon 105 are sandwiched between the print head 23 and the platen roller 26, while the base tape 101 and the cover film 103 are sandwiched between the feeding roller 27 and the pressure roller 28. Subsequently, the ribbon take-up roller 106 and the feeding roller 27 are synchronously rotationally driven along the directions denoted by the arrow B and the arrow C, respectively, by the driving force provided from the feeding motor 119. Furthermore, the tape feeding roller driving shaft 108, the pressure roller 28, and the platen roller 26 are connected to one another by a gear mechanism (not shown). With such an arrangement, upon driving the tape feeding roller driving shaft 108, the feeding roller 27, the pressure roller 28, and the platen roller 26 rotate, thereby feeding out the base tape 101 from the first roll 102 to the feeding roller 27 as described above. On the other hand, the cover film 103 is fed out from the second roll 104, and a plurality of heating elements of the print head 23 are powered by a print-head driving circuit 120 (refer to FIG. 18 described later). As a result, printing is performed, thereby forming the print R (refer to FIG. 21 described later), which corresponds to the RFID circuit element To on the base tape 101 that is to be bonded, on the back side of the cover film 103. Then, the base tape 101 and the printed cover film 103 are affixed to each other by the feeding roller 27 and the pressure roller 28 so as to form a single tape, thereby forming the tag label tape 109 with print, which is then transported to outside the cartridge 7 by the tape discharging part 30. Subsequently, the ribbon take-up roller driving shaft 107 is driven to take up the ink ribbon 105, which has been used to print the print on the cover film 103, onto the ribbon take-up roller 106.

On the upper surface of the housing 7A of the cartridge 7 is provided a tape identification display part 8 configured to display the tape width, tape color, etc., of the base tape 101 built within the cartridge 7, for example. When the cartridge 7 is loaded to the cartridge holder 6 and the opening/closing lid 3 is closed, the inspection window 5 and the tape identification display part 8 are opposite each other, making it possible to visually check the tape identification display part 8 via the transparent cover of the inspection window 5 from outside the apparatus main body 2. With this arrangement, the type of the cartridge 7 loaded to the cartridge holder 6 can be visually inspected with ease via the inspection window 5 from outside the apparatus main body 2.

On the other hand, on the internal module 20 are provided the cutting mechanism 15 and the label discharging mechanism 22 as described above, as well as an apparatus antenna (a loop antenna configured in a loop coil shape in this example) LC configured to perform reading and writing via wireless communication with an RFID circuit element To provided in the base tape 101 (tag label tape with print after bonding; the same hereafter). Then, after the information of the tag label tape 109 with print bonded and produced as described above is read from or written to the RFID circuit element To by the apparatus antenna LC, the tag label tape 109 with print is cut by the cutting mechanism 15 either automatically or by operating the cutter driving button 16 (refer to FIG. 2), thereby forming the RFID label T. This RFID label T is subsequently discharged from the label discharging exit 11 formed by the side wall 3a (refer to FIG. 2), by the label discharging mechanism 22.

The cutting mechanism 15 comprises a fixed blade 40, a movable blade 41 made of a metal material and configured to perform a cutting operation with the fixed blade 40, a cutter helical gear 42 linked to the movable blade 41 (refer to FIG. 3), and a cutter motor 43 (refer to FIG. 3) linked by a gear train to the cutter helical gear 42.

The label discharging mechanism 22 is arranged near the label discharging exit 11 provided on the side wall 3a of the apparatus main body 2, and has a function that serves as a discharging means for forcibly discharging the tag label tape 109 with print cut by the cutting mechanism 15 (in other words, the RFID label T, hereinafter the same) from the label discharging exit 11, as well as a function configured to control the feeding position of the tag label tape 109 with print during near the label discharging exit 11 (specifically, the position of information reading/writing by the apparatus antenna LC). That is, the label discharging mechanism 22 comprises a driving roller (discharging roller) 51 (position regulating means, communication facilitation processing means), a pressure roller (discharging roller) 52 (position regulating means, communication facilitation processing means) opposite the driving roller 51 and across from the tag label tape 109 with print, a pressure operation mechanism part 53 (refer to FIG. 3) configured to apply pressure to the tag label tape 109 with print with the pressure roller 52 and release that pressure, and a discharge driving mechanism part 54 (refer to FIG. 3) that is interlocked with the pressure release operation of the pressure operation mechanism part 53 so that it is rotated so as to discharge the tag label tape 109 with print by the driving roller 51.

At this time, on the inside of the label discharging exit 11 are provided first guide walls 55 and 56 and second guide walls 63 and 64 configured to guide the tag label tape 109 with print to the label discharging exit 11 (refer to FIG. 4). The first guide walls 55 and 56 and the second guide walls 63 and 64 are respectively formed into integrated units and disposed so that they are separated at predetermined intervals at the discharging location of the tag label tape 109 with print cut by the fixed blade 40 and the movable blade 41.

The pressure operation mechanism part 53, as shown in FIG. 3 described above, comprises a roller support holder 57 (arm member), a roller support part 58 (arm member) that is installed on the roller support holder 57 and holds the pressure roller 52 at the front end thereof, a holder support part 59 configured to rotatably support the roller support holder 57, a cam 60 interlocked with the cutting mechanism 15 so as to drive the pressure operation mechanism part 53, and a biasing spring 61.

The roller support part 58 is configured so that the pressure roller 52 is inserted from the vertical direction thereof, and is rotatably supported. Then, the roller support holder 57 rotates in the counterclockwise direction (the direction of arrow 71 in FIG. 3) around a holder support shaft 59 via the cam 60 by the rotation of the cutter helical gear 42, causing the pressure roller 52 to apply pressure to the tag label tape 109 with print. When the cutter helical gear 42 is rotated once again, the holder support shaft 59 rotates in the opposite direction by the biasing spring 61, causing the pressure roller 52 to separate from the tag label tape 109 with print.

The discharge driving mechanism part 54 comprises a tape discharging motor 65 and a gear train 66. After pressure is applied to the tag label tape 109 with print by the driving roller 51 by the pressure roller 52, the tape discharging motor 65 is driven so as to rotate the driving roller 51 in the discharging direction of the tag label tape 109 with print, thereby forcibly discharging the tag label tape 109 with print in the discharging direction.

FIG. 6 is a conceptual view from the direction of arrow D in FIG. 5, illustrating the conceptual configuration of the RFID circuit element To provided in the base tape 101 fed out from the first roll 102. In FIG. 6, the RFID circuit element To has a longitudinal length L (configured in a loop coil shape comprising a coil of at least one winding as described above in this example), and comprises the tag antenna 152 configured to perform transmission/reception of information, and the IC circuit part 151 connected thereto, that stores information. When the antenna is configured as a loop coil antenna in this way, communication can be performed by electromagnetic induction, thereby having the effect of making communication possible even if metal, etc., is nearby.

Note that the tag antenna 152 is not limited to a loop antenna comprising a loop coil as described above; an antenna of another shape and structure may also be used. For example, a dipole antenna wherein the IC circuit part is substantially linearly disposed between the two antenna elements of one side and the other side may be used. FIG. 7A is a diagram illustrating the conceptual configuration of an example based on such a dipole antenna, and corresponds to the FIG. 6. FIG. 7B is a partially enlarged view of FIG. 7A.

In FIG. 7A and FIG. 7B, on the base tape 101 (specifically on the base film 101b described above, for example) are provided two antenna elements 152A and 152B of tag antenna 152 disposed opposite each other along the longitudinal direction thereof, and opposite each of the antenna elements 152A and 152B are formed rectangular connecting end parts (end part electrodes) 152a and 152b that project into a hammer shape in this example.

A protective film 160 covers the IC circuit part 151 and connecting terminals 159A and 159B thereof from above, forming a thin, wide rectangular body, and the IC circuit part 151 is embedded in the center part of the protective film 160 in this example, with its bottom exposed from the protective film 160. Opposing front ends that extend into triangular shapes from the base of each rectangular shape of the connecting terminals 159A and 159B positioned at the bottom part of the protective film 160 are connected to the electrode part on the bottom surface of the IC circuit part 151.

Note that the tag antenna is also not limited to the above-described dipole antenna, and instead an antenna having a shape such as one that includes a dipole shaped section in part (for example, an antenna that combines another antenna with the above described loop antenna, or an antenna that combines a dipole antenna with a loop antenna matching element) may be used as the tag antenna.

FIG. 8 is a partially extracted perspective view illustrating the detailed structure of the main part of the label discharging mechanism 22. In FIG. 8, the vertical middle section of the above-described first guide walls 55 and 56 is cut out, and the driving roller 51 is provided on the one first guide wall 55 so that it approaches the discharging position of the tag label tape 109 with print from the cutout part. The driving roller 51 comprises a roller cutout part 51A formed by a concentric groove on the upper surface. On the other hand, on the other first guide wall 56, the pressure roller 52 approaches the discharging position of the tag label tape 109 with print from the cutout part, and is supported by the roller support part 58 of the pressure operation mechanism part 53.

The apparatus antenna LC, in this example, is configured in a loop coil shape comprising a coil with at least one winding as described above, is disposed near the pressure roller 52 as the pressure roller 52 is positioned at the radial center thereof (radial inner side; specifically on the coil center axis X described later), and accesses (performs information reading/writing with) the RFID circuit element To provided to the tag label tape 109 with print by magnetic induction (including electromagnetic induction, magnetic coupling, or other non-contact method performed via a magnetic field).

FIG. 9A is an enlarged front view illustrating a specific example of the structure of the apparatus antenna LC, i.e., the above-described loop antenna. FIG. 9B is a perspective view from the front surface (front side) illustrating the back surface structure of the apparatus antenna LC, and FIG. 9C is an arrow side view from direction Z in FIG. 9A.

In these FIGS. 9A to 9C, the apparatus antenna LC comprises a substrate 181 and conductive terminals 182 and 183. At the center of the substrate 181 is provided a substantially rectangular opening part (through hole) 180 for the penetration of the pressure roller 52.

Between the conductive terminal 182 and the conductive terminal 183 provided adjacent to each other on the front surface of the substrate 181, a known matching element (or matching circuit, etc.; simplified in the figure for the sake of convenience) M for impedance matching is connected. From the conductive terminal 183, a conductive layer pattern RP1 is extended in the shape of a coil (with two and a half windings in this example) along the outer edge of the opening part 180, and the front end part thereof is connected to the conductive terminal 184 provided between the conductive terminal 183 and the opening part 180, through the substrate 181 on the opposite side (lower side in FIG. 9A).

On the back surface side of the substrate 181, a conductive layer pattern RP2 is extended in the shape of a coil (with ⅓ winding) from the conductive terminal 184 exposed on the back surface side, along the outer periphery of the opening part 180, and the front end part thereof is connected to an electrode 185 provided between the conductive terminal 184 and the opening part 180, on the back surface of the substrate 181 of the opposite side (upper side in FIG. 9B). On the electrode 185 is installed a connector 186 by which power is distributed.

The apparatus antenna LC, however, is not limited to a loop antenna such as described above; an antenna of another shape and structure may also be used. For example, a so-called shielded loop antenna may be used. FIG. 10A is an enlarged front view illustrating a conceptual configuration of an example based on such a shielded loop antenna, FIG. 10B is a perspective view from the front surface (front side) illustrating the back surface structure thereof, and FIG. 10C is an arrow side view as viewed from the direction Y in FIG. 10A. These figures respectively correspond to the above FIG. 9A, FIG. 9B, and FIG. 9C. Note that those sections identical to those in FIGS. 9A to 9C are denoted using the same reference numerals.

In these FIGS. 10A to 10C, with the shielded loop antenna as the apparatus antenna LC, a conductive layer pattern RP' is extended in the shape of a coil (with ½ winding in this example) along the outer edge of the opening part 180 from the conductive terminal 183, and the front end part thereof is connected to the conductive terminal 184 provided between the conductive terminal 183 and the opening part 180, through the substrate 181 on the opposite side (lower side in FIG. 10A).

On the back surface side of the substrate 181, two shielding parts 185'a and 185'b of an electrode 185' are separately extended to the left and right in FIG. 10B, respectively, so as to follow along the outer edge of the opening part 180 (a gap is interposed between the front ends of the these shielding parts 185'a and 185'b). Of the two, the shielding part 185'a is connected to the conductive terminal 184 exposed on the back surface side. Then, on the electrode 185' is installed the connector 186 by which power is distributed.

In a case where a shielded loop antenna (loop antenna comprising shielding means) is used as the apparatus antenna LC in this manner, the functionality of the two shielding parts 185'a and 185'b of the electrode 185' offsets and reduces the occurrence of noise components resulting from the effect of an electrical field, such as that of an introduced electromagnetic wave, while a magnetic field is generated by the current that flows on the loop formed by the conductive layer pattern RP' and the shielding part 185', thereby having the effect of enabling communication at an even higher efficiency rate by magnetic induction.

FIG. 11 is a perspective view showing the outer appearance of the internal module 20 in a state where the label discharging mechanism 22 is removed from the structure shown in FIG. 3.

In FIG. 11, the cutter helical gear 42 is provided with a boss 50 that is formed in a protruding shape and configured to be inserted in a long hole 49 of the movable blade 41. On the downstream side of the fixed blade 40 and the movable blade 41, along the tape discharging direction, between the fixed blade 40 and the movable blade 41, and the first guide walls 55 and 56 (refer to FIG. 4) is installed the half-cutting module 35.

The half-cutting module 35 comprises a receptacle 38 disposed in alignment with the fixed blade 40, a half-cutter 34 disposed on the movable blade 41 side opposite the receptacle 38, a first guide part 36 disposed in alignment with the fixed blade 40, between the fixed blade 40 and the receptacle 38, and a second guide part 37 disposed in alignment with the movable blade 41, opposite the first guide part 36 (refer also to FIG. 14 described later).

The first guide part 36 and the second guide part 37 are configured as a single unit and installed on a side plate 44 (refer to FIG. 4) along with the fixed blade 40 by a guide fixing part 36A provided in a position corresponding to a fixing hole 40A (refer to FIG. 14 described later) of the fixed blade 40.

The receptacle 38 is bent so that the end part opposite the tag label tape 109 with print discharged from the tape discharging part 30 is parallel with the tape, forming a receiving surface 38B. Here, the tag label tape 109 with print, as described above, has a five-layer structure in which the base tape 101 of the four-layer structure comprising the adhesive layer 101a, the base film 101b, the adhesive layer 101c, and the separation sheet 101d is bonded to the cover film 103 (refer also to FIG. 22 described later). Then, the cover film 103, the adhesive layer 101a, the base film 101b, and the adhesive layer 101c of the tag label tape 109 with print disposed between the half-cutter 34 and the receiving surface 38B are cut by pressing the half-cutter 34 against the receiving surface 38B, leaving only the separation sheet 101d uncut. The receiving surface 38B also has the role of guiding the tag label tape 109 with print to the label discharging exit 11, along with the first guide parts 55 and 56.

FIG. 12 and FIG. 13 are perspective views illustrating the outer appearance of the cutting mechanism 15 with the half-cutter 34 removed from the internal module 20.

In these FIGS. 12 and 13, the cutting mechanism 15 is designed so that the movable blade 41 swings from the boss 50 and the long hole 49 with a shaft hole 48 as the fulcrum point when the cutter helical gear 42 rotates by the cutter motor 43 (refer to FIG. 3), thereby cutting the tag label tape 109 with print.

That is, first, when the boss 50 of the cutter helical gear 52 is positioned on the inside (left side in FIG. 12), the movable blade 41 is positioned away from the fixed blade 40 (hereinafter, referred to as the "initial state"; refer to FIG. 12). Then, in this initial state, when the cutter motor 43 is driven, rotating the cutter helical gear 42 counterclockwise (in the direction of arrow 70), the boss 50 moves to the outside and the movable blade 41 rotates counterclockwise (in the direction of arrow 73) around the shaft hole 48, cutting the tag label tape 109 with print with the fixed blade 40 fixed in the internal module 20 (hereinafter, referred to as the "cutting state"; refer to FIG. 13).

After the tag label tape 109 with print is cut so as to form an RFID label in this manner, the movable blade 41 needs to be returned to the initial state in order to cut the next tag label tape 109 with print to be fed. Thus, once again the cutter motor 43 is driven so as to rotate the cutter helical gear 42 counterclockwise (in the direction of arrow 70), thereby once again moving the boss 50 to the inside and rotating the movable blade 41 clockwise (in the direction of arrow 74), separating the movable blade 41 from the fixed blade 40 (refer to FIG. 12). Then, the next tag label tape 109 with print to be printed and fed from the cartridge 7 is in a cuttable state.

At this time, on the cylindrical outer wall of the cutter helical gear 42 is provided a cutter helical gear cam 42A, and when the cutter helical gear 42 is rotated by the cutter motor 43, a microswitch 126 provided adjacent to the cutter helical gear 42 is switched from an OFF state to an ON state by the action of the cutter helical gear cam 42A. With this, the cutting state of the tag label tape 109 with print is detected.

FIG. 14 is a perspective view illustrating the detailed structure of the movable blade 41 and the fixed blade 40 along with the half-cutting module 35, and FIG. 15 is an enlarged cross-sectional view of that section. In these FIGS. 14 and 15, the fixed blade 40 is fixed by a screw, etc., which is the fixing means, through the fixing hole 40A to the side plate 44 (refer to FIG. 4) provided in a standing state on the left side of the cartridge holder 6 within the printing mechanism 15.

The movable blade 41 forms a rough V shape, and comprises a blade part 45 provided on the cutting section, a handle part 46 positioned opposite the blade part 45, and a bent part 47. On the bent part 47 is provided the shaft hole 48, and the movable blade 41 is supported by the side plate 44 at the shaft hole 48 so as to enable rotation with the bent part 47 as the fulcrum point. Further, on the handle part 46 on the side opposite the blade part 45 provided on the cutting section of the movable blade 41 is formed the long hole 49. The blade part 45 is formed by a double-step blade, and the blade surface is constructed by two inclined surfaces, a first inclined surface 45A and a second inclined surface 45B, having different angles of incline and a thickness of the blade part 45 that gradually decreases.

On the other hand, of the first guide part 36 of the above-described half-cutting module 35, an end part 36B opposite the tag label tape 109 with print to be discharged protrudes along the receiving surface 38B formed at the end of the receptacle 38, bending toward the discharging direction of the tag label tape 109 with print. Thus, the end part 36B of the first guide part 36 has a smooth curving surface in the discharging direction of the tag label tape 109 with print at a contact surface 36C of the tag label tape 109 with print discharged from the cartridge 7.

With the end part 36B of the first guide part 36 protruding outward and the contact surface 36C designed as a curved surface, the front end part of the tag label tape 109 with print curled at a constant rate of curvature or higher first comes in contact with the contact surface 36C of the first guide part 36. At this time, when the front end part of the tag label tape 109 with print comes in contact with the downstream side of the discharging direction (downward in FIG. 15) of the tag label tape 109 with print from a boundary point 75 on the contact surface 36C of the first guide part, the front end part of the tag label tape 109 with print moves toward the downstream side along that curved surface and is guided toward the label discharging exit 11 without entering the area between the fixed blade 40 and the first guide part 36 or the receptacle 38.

The first guide part 36 is formed so that a guide width L1 (refer to FIG. 14) that comes in contact with the feeding path of the tag label tape 109 with print is greater than the maximum width (36 mm in the present embodiment) of the loaded tag label tape 109 with print, and an inner surface 36D is formed continuously to the contact surface 36C. The inner surface 36D is formed opposite the first and second inclined surfaces 45A and 45B (details described later) of the movable blade 41, and comes in partial contact with the first and second inclined surfaces 45A and 45B of the movable blade 41 during cutting (refer to FIG. 15). Because the blade part is formed from a double-step blade, the movable blade 41 is designed so that a gap 39 is formed between the contact surface 36C and the inner surface 36D of the end part of the first guide part 36 and the second inclined surface 45B of the movable blade 41 (refer to FIG. 15) when the tag label tape 109 with print is cut by the movable blade 41.

FIG. 16 is a front view of the outer appearance of the movable blade 41, and FIG. 17 is a cross-sectional view of the cross-section A-A in FIG. 16.

In these FIGS. 16 and 17, with regard to the first inclined surface 45A of the present embodiment, the angle formed by the first inclined surface 45A of the blade part 45 and the back surface of the opposite side is 50 degrees.

FIG. 18 is a functional block diagram illustrating a control system of the tag label producing apparatus 1 of the present embodiment. In FIG. 18, a control circuit 110 is disposed on a control board (not shown) of the tag label producing apparatus 1.

On the control circuit 110 are provided the CPU 111 that comprises a timer 111A and is configured to control each device, an input/output interface 113 connected to the CPU 111 via a data bus 112, a CG ROM 114, ROMs 115 and 116, and a RAM 117.

The CG ROM 114 stores dot pattern data for display corresponding with code data for each of the great number of characters.

The ROM (dot pattern data memory) 115 classifies print dot pattern data on a per font (Gothic font, Ming-style font, etc.) basis, and stores the data correspondingly with the code data on a per font basis for the print character sizes of each font, in relation to the respective great number of characters used for printing characters such as letters, symbols, etc. Additionally, the ROM 115 also stores graphic pattern data for printing graphic images including gradation expressions.

The above-described dot pattern data for display and printing stored in the CG ROM 114 and ROM 115 can be read from the PC 118 via the communication line NW, and may be displayed on and printing from the PC 118 that received the data.

The ROM 116 stores the print-head drive control program configured to read the print buffer data in relation to the code data of the characters such as the letters and numbers inputted from the PC 118, and drive the print head 23, the feeding motor 119, and the tape discharging motor 65, the pulse count determining program configured to determine the pulse count corresponding to the formation energy amount of each print dot, the cutting drive control program configured to drive the cutter motor 119 so as to feed the tag label tape 109 with print to the cutting position when printing is completed, and subsequently drive the cutter motor 43 so as to cut the tag label tape 109 with print, the tape discharging program configured to drive the tape discharging motor 65 so as to forcibly discharge the cut tag label tape 109 with print (RFID label T) from the label discharging exit 11, and other various programs required for controlling the tag label producing apparatus 1. The CPU 111 performs various operations based on each such program stored in the ROM 116.

The RAM 117 is provided with a text memory 117A, a print buffer 117B, a parameter storage area 117E, and the like. The text memory 117A stores document data inputted from the PC 118. The print buffer 117B stores a plurality of dot patterns for printing letters and symbols as well as the number of applied pulses, i.e., the amount of energy for forming each dot, as dot pattern data, and the print head 23 performs dot printing according to the dot pattern data stored in the print buffer 117B. The parameter storage area 117E stores the various operation data.

The input/output interface 113 is connected to the PC 118, the print-head driving circuit 120 for driving the print head 23, a feeding motor driving circuit 121 for driving the feeding motor 119, a cutter motor driving circuit 122 for driving the cutter motor 43, a tape discharging motor driving circuit 123 for driving the tape discharging motor 65, a transmission circuit 306 configured to produce carrier waves for accessing (performing reading/writing with) the RFID circuit element To via the apparatus antenna LC and modulate the carrier wave based on a control signal inputted from the control circuit 110, a reception circuit 307 configured to demodulate and output to the control circuit 110 the response signal received via the apparatus antenna LC from the RFID circuit element To, a tape cutting sensor 124, and a cutting release detection sensor 125.

In such a control system with the control circuit 110 at its core, when character data and the like are inputted via the PC 118, the text (document data) is successively stored in the text memory 117A, the print head 23 is driven via the driving circuit 120 and each heating element is selectively exothermically driven according to the print dots of one line so as to print the dot pattern data stored in the print buffer 117B, while the feeding motor 119 synchronously controls the feeding of the tape via the driving circuit 121. The transmission circuit 306 controls the modulation of the carrier wave based on a control signal from the control circuit 110, and the reception circuit 307 processes the demodulated signal based on a control signal from the control circuit 110.

The tape cutting sensor 124 and the cutting release detection sensor 125 comprise the cutter helical gear cam 42A and the microswitch 126 provided on the cylindrical outer wall of the cutter helical gear 42 (refer to FIG. 12 and FIG. 13). Specifically, when the cutter helical gear 42 rotates by the cutter motor 43, the action of the cutter helical gear cam 42A switches the microswitch 126 from an OFF state to an ON state, resulting in the detection of cutting completion of the tag label tape 109 with print by the movable blade 45. The tape cutting sensor 124 is configured based on this process. When the cutter helical gear 42 is further rotated, the action of the cutter helical gear cam 42A switches the microswitch 126 from an ON state to an OFF state, resulting in the detection of the return of the movable blade 45 to the release position. The cutting release detection sensor 125 is configured based on this process.

FIG. 19 is a circuit diagram simply illustrating the circuit configuration of the connection section of the transmission circuit 306, the reception circuit 307, and the apparatus antenna LC. In FIG. 19, the transmission circuit 306 is connected to a transmit-receive splitter 310, and the apparatus antenna LC via the matching circuit M. One end of the apparatus antenna LC is grounded. The reception circuit 307 is also connected to the transmit-receive splitter 310.

The transmit-receive splitter 310 may be a device such as a directional coupler or circulator when high frequency (915 MHz, etc.) is used as the carrier wave, or the matching circuit may be directly connected to the transmission circuit and the reception circuit connected via a resistor having a sufficiently large resistance value compared to the output resistance of the transmission circuit for that connection when a low frequency (13.56 MHz, etc.) is used as the carrier wave.

FIG. 20 is a functional block diagram which shows the functional configuration of the RFID circuit element To. In FIG. 20, the RFID circuit element To comprises the aforementioned tag antenna 152 for transmitting/receiving signals to/from the apparatus antenna LC of the tag label producing apparatus 1 (by magnetic induction in this example) in a non-contact fashion, and the IC circuit part 151 connected to the tag antenna 152.

The IC circuit part 151 comprises a rectification part 153 configured to rectify the carrier waves received via the tag antenna 152, a power source part 154 configured to store the energy of the carrier waves thus rectified by the rectification part 153, which serves as a driving power supply, a clock extraction part 156 configured to extract the clock signals from the carrier waves thus received by the tag antenna 152 and supply the clock signals thus extracted to a control part 155, a memory part 157 configured to store predetermined information signals, a modem part 158 connected to the tag antenna 152, and the control part 155 configured to control the operation of the RFID circuit element To via the rectification part 153, the clock extraction part 156, the modem part 158, etc.

The modem part 158 demodulates the communication signals from the apparatus antenna LC of the tag label producing apparatus 1 received by the tag antenna 152, and modulates the carrier wave received by the tag antenna 152 based on the response signal from the control part 155 and resends that wave as a reflected wave from the tag antenna 152.

The control part 155 executes basic control, such as interpreting a received signal demodulated by the modem part 158, generating a response signal based on the information signal stored in the memory part 157, and returning the response signal from the modem part 158.

The clock extraction part 156 extracts the clock component from the received signal and extracts the clock to the control part 155, supplying the clock corresponding to the frequency of the clock component of the received signal to the control part 155.

FIGS. 21A and 21B are diagrams which show an example of the outer appearance of an RFID label T formed from the cut tag label tape 109 with print after RFID circuit element To information writing (or reading) by the tag label producing apparatus 1 having a configuration such as described above. FIG. 21A is a top view, and FIG. 21B is a bottom view. FIG. 22 is a cross-sectional view taken along a line XXII-XXII' in FIG. 21.

As shown in FIGS. 21A, 21B, and 22, the RFID label T has a five-layer structure in which the print-receiving tape 103 is added to the four-layer structure shown in FIG. 5 as described above. The five-layer structure comprises the print-receiving tape 103, the adhesive layer 101a, the base film 101b, the adhesive layer 101c, and the separation sheet 101d, in that order, from the side of the print-receiving tape 103 (upper side in FIG. 13) to the side corresponding to the opposite side (lower side in FIG. 13). Furthermore, the RFID circuit element To, including the tag antenna 152 provided on the back side of the base film 101b as described above, is provided within the base film 101b and the adhesive layer 101c, and the print R (in this example, the text "RF-ID" which indicates the type of RFID label T) is printed on the back face of the print-receiving tape 103.

FIG. 23 is a diagram illustrating an exemplary screen which may be displayed on the PC 118 (the terminal 118a or the general-purpose computer 118b) when the tag label producing apparatus 1 such as described above accesses RFID tag information (for reading or writing) in the IC circuit part 151 of the RFID circuit element To.

In FIG. 23, the type of RFID label (the access frequency and tape dimensions), the printed letters R printed correspondingly to the RFID circuit element To, an access (writing/reading) ID which is the unique ID (tag ID) of the RFID circuit element To, an article information address stored in the information server IS, a storage destination address of the corresponding information stored in the router server RS, etc., can be displayed on the PC 118. With such an arrangement, based on an operation performed on the PC 118, the tag label producing apparatus 1 begins operation. Specifically, the printed letters R are printed on the cover film 103. Furthermore, information such as the writing ID and the article information is written to the IC circuit part 151 (or, information such as the reading ID and article information stored beforehand in the IC circuit part 151 is read out).

At the time of the above-described writing (or readout), the correspondence between the tag ID of the RFID circuit element To of the RFID label T thus produced and the information read from (or written to) the IC circuit part 151 of the RFID label T is stored in the route server RS, and can be referred to as required.

The most noteworthy characteristic of the present embodiment of the tag label producing apparatus 1 having a basic configuration such as described above is the position of the apparatus antenna LC (specifically, the aforementioned conductive layer pattern RP1, RP2, or RP' comprising a coil; the same hereafter). This point will now be described with reference to FIG. 24.

FIG. 24 is a diagram conceptually illustrating the positional relationship of the apparatus antenna LC (indicated only by the wiring of the conductive layer pattern RP1, RP2, or RP' in the figure), the driving roller 51, the pressure roller 52, and the tag label tape 109 with print, and the state of the magnetic flux produced from the apparatus antenna LC. As shown in FIG. 24, the apparatus antenna LC is disposed so that the roller shafts 51a and 52b of the driving roller 51 and the pressure roller 52 are each substantially positioned on the coil center axis X of the apparatus antenna LC. The position of the apparatus antenna LC in the tape width direction (in the vertical direction of the diagram in FIG. 24) is disposed so that the coil center axis X is located at the center position in the width direction of the tag label tape 109 with print. Then, settings are set so that the tag label tape 109 with print always passes through the position having the greatest density of the magnetic flux M produced by the coil of the apparatus antenna LC.

In the tag label producing apparatus 1 having a configuration such as that described above, the tag label tape 109 with print comprising the RFID circuit element To is fed toward the label discharging exit 11 and, while it is fed, a transmission/reception of information is performed by magnetic induction with the apparatus antenna 1 LC, thereby executing information reading/writing with the IC circuit part 151. In the present embodiment, when the tag label tape 109 with print is fed, the feeding position is controlled near the label discharging exit 11 of the tag label tape 109 with print by the driving roller 51 and the opposing pressure roller 52, thereby substantially fixing the passing position of the tag label tape 109 with print in a stable manner. Then, the apparatus antenna LC can be positioned so as to perform the transmission/reception of information near the driving roller 51 and the opposing pressure roller 52. Particularly, in the present embodiment which employs a loop antenna or shielded loop antenna as the apparatus antenna LC, the feeding position is set so that the tag label tape 109 with print always passes through the position having the greatest magnetic flux density produced by the coil of the apparatus antenna LC. As a result, the communication efficiency with the apparatus antenna LC and the tag antenna 152 of the RFID circuit element To is improved along with the reliability of the RFID label T comprising the RFID circuit element To after reading or writing.

Further, particularly in the present embodiment, the driving roller 51 and the pressure roller 52 control the feeding position of the tag label tape 109 with print at a position substantially on the coil center axis X of the apparatus antenna LC. With this arrangement, the feeding position can be controlled so as to reliably feed the tag label tape 109 with print through the position having the greatest magnetic density.

Further, particularly in the present embodiment, the pressure roller 52 is disposed on the radial inner side of the coil of the apparatus antenna LC. With this arrangement, the feeding position of the tag label tape 109 with print is controlled by the pressure roller 52 disposed on the inside of the apparatus antenna LC so as to substantially fix the passing position of the tag label tape 109 with print in a stable manner, thereby making it possible to make the tag label tape 109 with print always pass through the position where the magnetic density produced by the coil of the apparatus antenna LC is greatest.

Furthermore, particularly, when the feeding position of the tag label tape 109 with print is controlled by the driving roller 51 and the pressure roller 52 as described above, the feeding position is preferably controlled so that the distance from the apparatus antenna LC to the tag antenna 52 is 1/10 or less the wavelength of the carrier waves used for communication. The following describes this in detail.

In a case where a loop antenna is used as the apparatus antenna LC, a magnetic field intensity H and an electrical field intensity E produced nearby are expressed with respect to the distance D from the apparatus antenna LC, given a loop current I, a loop area S, a wavelength $\lambda$, and a free-space impedance (337$\Omega$) Z0, as follows:

$$H=(IS)/(4\pi D^3)$$

$$E=(Z0IS)/(2\lambda D^2)$$

That is, the magnetic field intensity H is inversely proportional to the distance D to the power of three. Additionally, the electrical field intensity E is proportional to frequency and inversely proportional to the square of the distance.

On the other hand, at a position away from the apparatus antenna LC, the magnetic field intensity H and the electrical field intensity E are inversely proportional to the distance D:

$$H=(\pi IS)/(\lambda 2D)$$

$$E=(Z0IS)/(\lambda 2D)$$

For example, in a case where a minute dipole antenna is employed as the apparatus antenna LC, an electrical field and magnetic field expressed given a current I that flows to the wires and a wire length L occur as follows:

$$H=(IL)/(4\pi D^2)$$

$$E=(Z0IL\lambda)/(8\pi 2D^3)$$

As a result, the wave impedance is inversely proportional to frequency and distance:

$$E/H=(Z0\lambda)/(2\pi D)[0212]$$

On the other hand, at a position away from the apparatus antenna LC, the magnetic field intensity H and the electrical field intensity E are expressed as:

$$H=(IL)/(2\lambda D)$$

$$E=(Z0IL)/(2\lambda D)$$

And the wave impedance becomes uniform at:

$$E/H=Z0(377\Omega)$$

FIG. 25 is a diagram summarizing the relationship (wave impedance behavior) with the electrical field intensity (E) and the magnetic field intensity (H) near the antenna, based on the above results. On the horizontal axis is D/$\lambda$. In the figure, a is the characteristic curve in a case where a minute dipole antenna is employed as the apparatus antenna, and b is the characteristic curve in a case where a minute loop antenna is employed as the apparatus antenna (equivalent to the present embodiment). From b in the figure, it is understood that, when a minute loop antenna is employed, E/H decreases to one-half or less the value of a in terms of distance (position away from $\lambda$), and the magnetic field is stronger than the electrical field, within a range of 1/10 or less in terms of wavelength $\lambda$.

While the impedance decreases with a small-sized loop antenna, thereby facilitating the flow of current, the impedance increases with a small-sized dipole antenna, hindering the flow of current.

From the above, in a case where communication is performed with the RFID label T near the apparatus antenna, a loop antenna is preferably used as the apparatus antenna, and the feeding range is preferably limited to a position where D/$\lambda \leq 0.1$, that is, where the magnetic field intensifies. Furthermore, D/$\lambda \leq 0.1$ is satisfied within the range of D$\leq$2.2 m when the carrier wave is 13.56 MHz, and within the range of D$\leq$32 mm when the carrier wave is 915 MHz.

With the driving roller 51 and the pressure roller 52, the feeding position of the tag label tape 109 with print is controlled so that the distance from the apparatus antenna LC to the tag antenna 152 is within the above range, thereby making it possible to communicate within a range where the magnetic field intensity is stronger than the electrical field intensity and thus reliably improve communication efficiency.

Further, particularly in the present embodiment, after the tag label tape 109 with print supplied from the cartridge 7 installed in the cartridge holder 6 is fed and a transmission/reception of information is performed from the apparatus antenna LC at a feeding position controlled by the driving roller 51 and the pressure roller 52, the transport direction rear end side of the tag label tape 109 with print is cut by the cutting mechanism 15 so as to produce an RFID label T. With the rear end side of the tag label tape 109 with print is cut by the cutting mechanism 15 in the manner, the cutting mechanism 15 can be positioned between the communication position of the apparatus antenna LC and the cartridge 7. As a result, the cutting mechanism 15 can be disposed near the tape discharging part of the cartridge 7, and it is able to shield the magnetic flux by use of the cutting mechanism 15 (the half-cutter 34, the fixed blade 40, the movable blade 41, etc.) as shielding means configured to shield the magnetic flux, thereby eliminating the need for installing shielding means as a separate member and making the overall apparatus more compact in size.

Note that various modifications may be made according to the present embodiment without departing from the spirit and scope of the invention, in addition to the above-described embodiment. Description will be made below regarding such modifications.

(1-1) When a Magnetic Body is Installed
(i) When a Magnetic Body is Installed on the Side Opposite the Apparatus Antenna, Across the Feeding Path FIG. 26 is a diagram that conceptually illustrates the positional relationship between the apparatus antenna LC, the driving roller 51, the pressure roller 52, a magnetic body 1200, and the tag label tape 109 with print in the present modification. As shown in FIG. 26, in the present modification, the magnetic body 1200 is provided on the side opposite the apparatus antenna LC, across the feeding path of the tag label tape 109 with print. A length Lg of the magnetic body 1200 in the transport direction is configured to be shorter than a longitudinal dimension L of the tag antenna 152, which is a loop antenna.

According to the present modification, the nature of the magnetic flux to collect within the magnetic body 1200 is utilized so as to thin down the magnetic flux M produced by the coil of the apparatus antenna LC in the direction orthogonal to the surface direction of the tag label tape 109 with print (the vertical direction in the figure), making it possible to form the magnetic flux into a shape that does not spread too far outside the apparatus, thereby preventing erroneous communication with an RFID circuit element To discharged to outside the apparatus from the label discharging exit 11. Further, with the length Lg of the magnetic body 1200 in the tape feeding direction configured shorter than the length L of the tag antenna 152, the present modification makes it possible to increase the magnetic density on the inside of the tag antenna 152.

(ii) When the Roller Shaft Comprises the Magnetic Body

FIG. 27 is a diagram that conceptually illustrates the positional relationship between the apparatus antenna LC, a driving roller 51', the pressure roller 52, and the tag label tape 109 with print in the present modification As shown in FIG. 27, in the present modification, at least one part of a roller shaft 51'a of the driving roller 51' is made of a magnetic material.

According to the present modification, the shape of the magnetic flux M is adjusted and concentrated near the apparatus antenna LC by utilizing the roller shaft 51'a as the magnetic body without installing a magnetic body as a separate member on the side opposite the apparatus antenna LC, thereby making it possible to prevent erroneous communication with an RFID circuit element To discharged to the outside from the label discharging exit 11.

Furthermore, while the roller shaft 51'a of the driving roller 51' is made of a magnetic material in the above, the driving roller 51' itself may also be made of a magnetic material, for example.

(iii) When the Roller Arm Comprises the Magnetic Body

FIG. 28 is a diagram that conceptually illustrates the positional relationship between the apparatus antenna LC, the driving roller 51, the pressure roller 52, and the tag label tape 109 with print in the present modification. As shown in FIG. 28, in the present modification, the pressure roller 52 positioned on the same side as the apparatus antenna LC, across the feeding path of the tag label tape 109 with print, is rotatably supported, and the roller support holder 57 (arm member) and roller support part 58 (arm member) configured to move toward the feeding path of the tag label tape 109 with print are constructed using a magnetic material.

According to the present modification, the magnetic flux M produced by the coil of the apparatus antenna LC is concentrated so as to improve the communication efficiency with the apparatus antenna LC and the tag antenna 152 of the RFID circuit element To, making it possible to adjust the shape of the magnetic flux M and prevent erroneous communication with an RFID circuit element To outside the apparatus.

(1-2) When a Shielding Plate is Installed (i) When a Shielding Plate is Provided on the Apparatus Antenna Side FIG. 29 is a diagram that conceptually illustrates the positional relationship between the apparatus antenna LC, the driving roller 51, the pressure roller 52, and the tag label tape 109 with print in the present modification. As shown in the FIG. 29, in the present modification, a shielding plate 1201 (shielding means) configured to shield the magnetic flux M produced by the coil of the apparatus antenna LC is provided on the side opposite the feeding path of the tag label tape 109 with print (lower side in FIG. 29) from the apparatus antenna LC.

According to the present modification, the production of the magnetic flux M toward the side opposite the apparatus antenna LC (the lower side in FIG. 29) from the feeding path of the tag label tape 109 with print is shielded, making it possible to decrease the possibility of erroneous communication.

(ii) When a Shielding Plate is Provided on the Side Opposite the Apparatus Antenna FIG. 30 is a diagram that conceptually illustrates the positional relationship between the apparatus antenna LC, the driving roller 51, the pressure roller 52, and the tag label tape 109 with print in the present modification. As shown in the FIG. 30, in the present modification, the shielding plate 1202 (shielding means) configured to shield the magnetic flux M produced by the coil of the apparatus antenna LC is provided on the side opposite the apparatus antenna LC (upper side in FIG. 30), across the feeding path of the tag label tape 109 with print.

According to the present modification, the production of the magnetic flux M toward the side opposite the apparatus antenna LC, across the feeding path of the tag label tape 109 with print, is shielded, making it possible to decrease the possibility of erroneous communication with an RFID circuit element To within the cartridge 7.

(iii) When the Shielding Plate is Provided Up to a Location Near the Cutter

FIG. 31 is a diagram that conceptually illustrates the positional relationship between the apparatus antenna LC, the driving roller 51, the pressure roller 52, and the tag label tape 109 with print in the present modification. As shown in the FIG. 31, in the present modification, a shielding plate 1203 (shielding means) configured to shield the magnetic flux M produced by the coil of the apparatus antenna LC is arranged on the side opposite the feeding path of the tag label tape 109 with print (lower side in FIG. 31) from the apparatus antenna LC, so that an end part 1203a thereof is positioned near at least the movable blade 41 of the cutting mechanism 15.

As described above, because the movable blade 41 of the cutting mechanism 15 is made of a metal material, a function for shielding the magnetic flux M is independently provided. At this time, when the shielding plate 1203 is disposed away from the movable blade 41, the magnetic flux M may leak between the shielding plate 1203 and the movable blade 41, resulting in an incomplete shielding function. In the present modification, however, the end part 1203a of the shielding plate 1203 is positioned near at least the movable blade 41, thereby minimizing the gap between the shielding plate 1203 and the movable blade 41, making it possible to sufficiently exhibit the magnetic flux shielding function based on the coordination of the shielding plate 1203 and the movable blade 41. As a result, the effect on the RFID circuit element To positioned further upstream in the transport direction than the movable blade 41 as well as on the RFID circuit element To within the cartridge 7 is decreased, thereby making it possible to reliably prevent erroneous communication.

(1-3) Variations of Position Regulating Means (i) When a Roller is Provided on One Side Only While in the above first embodiment the tag label tape 109 with print is positioned between the driving roller 51 and the pressure roller 52 so as to control the feeding position of the tag label tape 109 with print, the present invention is not limited thereto. That is, as shown in FIG. 32, for example, a guide wall 1204 may be provided so as to connect the first guide wall 55 and the second guide wall 63, with the guide wall 1204 and the pressure roller 52 functioning as a position regulating means (communication facilitation processing means) configured to control the feeding position of the tag label tape 109 with print. In this case as well, similar advantages to those of the first embodiment are provided.

(ii) When Control is Performed by Guide Walls Only

In addition to the above configuration wherein rollers are provided on one side only, as shown in FIG. 33, for example, guide walls 1205 and 1206 may be provided so as to further narrow the feeding path to the information writing/reading position from the apparatus antenna LC, with these guide walls 1205 and 1206 functioning as the position regulating means (communication facilitation processing means) configured to control the feeding position of the tag label tape 109 with print. In this case as well, similar advantages to those of the first embodiment are provided.

(1-4) Variations of the Installation Location of the Apparatus Antenna (i) When the Apparatus Antenna is Provided Outside the Apparatus While the apparatus antenna LC is disposed near the label discharging exit 11 so as to position the roller shafts 51*a* and 52*a* of the driving roller 51 and the pressure roller 52 substantially on the coil center axis X of the apparatus antenna LC in the above first embodiment, the present invention is not limited thereto. That is, as shown in FIG. 34, for example, the apparatus antenna LC may be provided outside the apparatus main body 2 of the tag label producing apparatus 1. FIG. 34 shows an example where a holder 1207 is provided on a side surface 2*a* of the apparatus main body 2 and the apparatus antenna LC is provided within that holder 1207. In this case as well, the apparatus antenna LC is disposed so that the roller shafts 51*a* and 52*a* of the driving roller 51 and the pressure roller 52 are substantially positioned on the coil center axis X of the apparatus antenna LC. In this modification as well, similar advantages to those of the first embodiment are provided.

(ii) When the Apparatus Antenna is Provided on the Driving Roller Side of the Tape Feeding Path While the apparatus antenna LC is disposed near the label discharging antenna 11 on the side of the pressure roller 52 in the above first embodiment, the present invention is not limited thereto. That is, as shown in FIG. 35, for example, the apparatus antenna may be provided on the driving roller 51 side. In this case as well, the apparatus antenna LC is disposed so that the roller shafts 51*a* and 52*a* of the driving roller 51 and the pressure roller 52 are substantially positioned on the coil center axis X of the apparatus antenna LC. In this modification as well, similar advantages to those of the first embodiment are provided. Furthermore, although not specifically shown, with the configuration of the present modification, a suitable shielding means is preferably provided on the side opposite the pressure roller 52 (upper side in FIG. 35) and on the cartridge 7 side (right side in FIG. 35) to prevent erroneous communication.

(1-5) When a Screw is Used to Install the Apparatus Antenna LC

When a screw 1208 (fixing means) made of a magnetic material (a material of high magnetic permeability, such as ferrite, permalloy, or soft iron) is used to install the apparatus antenna LC, the magnetic flux concentrates in the section of the screw 1208 as shown in FIG. 36.

With this arrangement, the communication efficiency with the apparatus antenna LC and the tag antenna 152 of the RFID circuit element To is improved and the shape of the magnetic flux M is adjusted, making it possible to prevent erroneous communication with an RFID circuit element To outside the apparatus. Further, the arrangement also makes it possible to perform stable communication regardless of the length of the tag antenna 152.

While a screw is used as the fixing means in the above, other devices such as a bolt or fastener may also be used.

A second embodiment of the present invention will now be described with reference to FIGS. 37 to 54. The present embodiment notifies the operator of information using LED indicators, etc., thereby dispelling operator uneasiness and increasing operator trust in the operation of the apparatus. Note that components identical to those in the first embodiment are denoted using the same reference numerals, and descriptions thereof will be omitted or simplified as appropriate.

The tag label producing apparatus 1 of the present embodiment, similar to that of the above first embodiment, is provided in the RFID tag manufacturing system shown in the aforementioned FIG. 1, and the overall outer structure is the same as that shown in the aforementioned FIG. 2.

FIG. 37 is a plan view showing the structure of the inner module 20 of the tag label producing apparatus of the present embodiment, and corresponds to FIG. 4 of the above first embodiment. Additionally, FIG. 38 is an enlarged plan view schematically illustrating the detailed structure of the cartridge 7 housed in the cartridge holder 6 (holder for container installation) of the tag label producing apparatus 1 of the present embodiment, and corresponds to FIG. 5 of the above first embodiment.

In FIG. 37 and FIG. 38, the cartridge 7 of the present embodiment, similar to the that of the above first embodiment, comprises the first roll 102 (tag tape roll) around which the base tape 101 (tag tape) is wound, and the second roll 104 around which the cover film 103 (print-receiving medium, print-receiving tape) is wound.

The base tape 101 wrapped around the first roll 102 has a four-layer structure (refer to the partially enlarged view in FIG. 38) similar to that of the above first embodiment, comprising the adhesive layer 101*a* (adhesive material layer for bonding) formed of a suitable adhesive material, the colored base film 101*b* formed of PET (polyethylene terephthalate) or the like, the adhesive layer 101*c* formed of a suitable adhesive material, and the separation sheet 101*d*. The four layers of the base tape 101 are layered in that order from the side rolled to the inside (the right side in FIG. 38) to the side corresponding to the opposite side (the left side in FIG. 38).

At this time, a predetermined identifier (a black identification mark in this example; a hole punched in the base tape 101 by laser processing, etc., or a hole finished using a Thompson mold is also possible) PM (detection target area) for feeding control is provided in advance in a predetermined location (a location further forward than the front end of the antenna 152 on the forward direction side of the transport direction in this example) corresponding to each RFID circuit element To on the front face of the separation sheet 101*d*.

Then, correspondingly, as shown in FIG. 37, a mark sensor 127 (detecting means) capable of detecting the identification mark PM (refer to FIG. 39, etc., described later) provided on the separation sheet 101*d* is provided further down the transport direction upstream side than the driving roller 51 of the tag label producing apparatus 1 (in other words, between the half-cutter 34 described later and the apparatus antenna LC).

FIG. 39 is a conceptual view from the direction of arrow D in FIG. 38, illustrating the conceptual configuration of the RFID circuit element To provided in the base tape 101 fed out from the first roll 102. In FIG. 39, the RFID circuit element To, as described above, comprises the tag antenna 152 constructed in a loop coil shape and configured to perform a transmission/reception of information, and an IC circuit part 151 connected thereto and configured to store information. On the front face of the separation sheet 101*d*, the identification mark PM is respectively provided at a predetermined position corresponding to each RFID circuit element To.

FIG. 40A is a partially extracted perspective view illustrating the detailed structure of the main parts of the label discharging mechanism 22, and FIG. 40B is a diagram illustrating the conceptual configuration of the mark sensor 127. In FIG. 40A, the vertical middle sections of the above-described first guide walls 55 and 56 are cut out, and the driving roller 51 is provided on the one first guide wall 55 so that it approaches the discharging position of the tag label tape 109 with print from the cutout part. The driving roller 51 comprises a roller cutout part 51A formed by a concentric groove on the upper surface. On the other hand, on the other first guide wall 56, the pressure roller 52 approaches the discharging position of the tag label tape 109 with print from the cutout part, and is supported by the roller support part 58 of the pressure operation mechanism part 53.

The apparatus antenna LC is disposed in this example near the pressure roller 52 as the pressure roller 52 is positioned at the radial center thereof, and accesses (performs reading/writing with) the RFID circuit element To provided in the tag label tape 109 with print by magnetic induction (including electromagnetic induction, magnetic coupling, and other non-contact method performed via an electromagnetic field).

Further down the transport direction upstream side than the driving roller 51 (in other words, between the half-cutter 34 described later and the apparatus antenna LC) is provided the mark sensor 127 capable of detecting the identification mark PM provided on the separation sheet 101*d* of the base tape 101. This mark sensor 127, as shown in FIG. 40B, is a known reflection-type photoelectric sensor comprising an optical projector 127*a* comprising a light-emitting diode, and an optical receiver 127*b* comprising a phototransistor, for example. The control output from the optical receiver 127*b* is inverted in accordance with whether or not the identification mark PM exists between the optical projector 127*a* and the optical receiver 127*b*. The front surface of the first guide wall 56 opposite the mark sensor 127 is of a color that does not reflect the light of the optical projector, and is tilted so that the optical receiver does not receive reflected light. Note that the mark sensor 127 is not limited to the above-described reflection type, but may be a transmission-type photoelectric sensor when the identifier comprises a machined hole, for example.

FIG. 41 is a functional block diagram illustrating the control system of the tag label producing apparatus 1 of the second embodiment, and corresponds to FIG. 18 of the above first embodiment. In FIG. 41, similar to the above first embodiment, the CPU 111, the input/output interface 113, the CG ROM 114, the ROMs 115 and 116, the RAM 117, etc., are provided on the control circuit (feeding control means) provided in the tag label producing apparatus 1 of the present embodiment.

The input/output interface 113 is respectively connected to the PC 118, the print-head driving circuit 120, the feeding motor driving circuit 121, as well as a half-cutter motor driving circuit 128 for driving a half-cutter motor 129, an LED driving circuit 130 for illuminating the two-colored LED 131, and the mark sensor 127 in this second embodiment.

In such a control system in which the control circuit 110 serves as the core, when character data, etc., are inputted via the PC 118, similar to the above first embodiment, the print head 23 is driven via the driving circuit 120 so as to perform printing while, at the same time, the feeding motor 119 controls the feeding of the tape via the driving circuit 121. The transmission circuit 306 controls the modulation of the carrier wave based on a control signal from the control circuit 110, and the reception circuit 307 processes the demodulated signal based on a control signal from the control circuit 110. The two-colored LED 131, based on a control signal from the LED driving circuit 130, switches the two emitted colors, green and red, based on predetermined timing during tape feeding control, notifying the operator of the current status based on the on, flickering, or off light display (details described later).

FIGS. 42A and 42B are diagrams which show an example of the outer appearance of an RFID label T formed from the cut tag label tape 109 with print after RFID circuit element To information writing (or reading) by the tag label producing apparatus 1 having a configuration such as described above. FIG. 42A is a top view, and FIG. 42B is a bottom view. These figures correspond to FIG. 21A and FIG. 21B of the above first embodiment, respectively. FIG. 43A is a diagram in which the cross-sectional view of the cross-section XLIIIA-XLIIIA' in FIG. 42 is rotated 90° C. counterclockwise (corresponding to FIG. 22 of the above first embodiment), and FIG. 43B is a diagram in which the cross-sectional view of the cross-section XLIIIB-XLIIIB' in FIG. 42 is rotated 90° C. counterclockwise.

In these FIGS. 42A, 42B, 43A, and 43B, the RFID label T has a five-layer structure in which the cover film 103 is added to the four-layer structure illustrated in FIG. 38 as described above. The five layers are comprised of the cover film 103, the adhesive layer 101*a*, the base film 101*b*, the adhesive layer 101*c*, and the separation sheet 101*d*, which are layered from the cover film 103 (upper side in FIG. 43) to the opposite side (lower side in FIG. 43). Furthermore, the RFID circuit element To, including the tag antenna 152 provided on the back side of the base film 101*b* as described above, is provided within the base film 101*b* and the adhesive layer 101*c*, and the label print R (in the example, the text "RF-ID" which indicates the type of RFID label T) corresponding to the stored information, etc., of the RFID circuit element To is printed on the back face of the cover film 103.

On the cover film 103, the adhesive layer 101*a*, the base film 101*b*, and the adhesive layer 101*c* are formed half-cut lines HC (half-cut areas; two lines in this example: a front half-cut line HC1 and a rear half-cut line HC2; details described later) substantially along the tape width direction by the half-cutter 34 as previously described. The area of the cover film 103 between these half-cut lines HC1 and HC2 is the print area S wherein the label print R is printed.

The dimension X1 in the tape longitudinal direction of the front margin area (the distance from the tape front end to the half-cut line HC1) is set (fixed, in this example) to a predetermined value in advance (note that the rear half-cut line HC2 is not provided in some cases, as described later). The dimension X in the tape longitudinal direction of the print area S (the distance from the half-cut line HC1 to the half-cut line HC2), and the dimension X2 in the tape longitudinal direction of the rear margin area (the distance from the half-cut line HC2 to the tape rear end) is variably set according to the content and form (for example, the number of characters, font, etc.) of the label print R. Further, the aforementioned identifier PM remains on the separation sheet 101*d*, and the distance from the tape feeding direction front end of the identifier PM to the tape feeding direction front end of the RFID circuit element To offset thereby is a predetermined value L. Note that, as previously described, in place of a black mark such as that shown in FIG. 43A and FIG. 43B provided as the identifier PM, a hole that substantially passes through the base tape 101 may be formed as the identifier PM by laser material processing, etc., as shown in FIG. 43C. In this case, when the mark sensor 127 comprises a known reflection-type photoelectric sensor comprising an optical projector and optical receiver and the identifier PM comprising the above hole arrives at a position between the optical projector and optical receiver, the light from the optical projector passes through the hole of the identifier PM and the transparent cover film 103 without being reflected or received by the optical receiver, thereby inverting the control output from the optical receiver.

In the tag label producing apparatus 1 of such a basic configuration, the two-colored LED 131 emits light with a predetermined color when feeding is stopped in order to access the tag label tape 109 with print from the apparatus antenna LC via wireless communication during feeding, thereby indicating to the operator that feeding has stopped for a normal transmission/reception of information. The behavior of the control process corresponding to that feeding position will now be described with reference to FIG. 44 and FIG. 45. In this second embodiment, the position of the rear half-cut line HC2 on the tape rear end side is variably controlled according to whether the label print R is long or short. Thus, a case where the print R is long, and a case where the print R is short will be described separately.

(A) When the Print Length is Relatively Long

FIG. 44A to FIG. 44J each constitute an explanatory diagram illustrating the positional relationship between the identifier PM, the RFID circuit element To, and the print area S of the label print R of the tag label tape 109 with print continually fed out, and the apparatus antenna LC, the mark sensor 127, the half-cutting module 35, the cutting mechanism 15, and the print head 23, and the light emission status of the two-colored LED 131. As shown in the figures, in the second embodiment, the distance L from the tape feeding direction front end position of the identifier PM to the tape feeding direction front end of the RFID circuit element To of the base tape 101 is preset so that it is equivalent to the tape feeding direction distance Lo between the mark sensor 127 and the print head 23.

First, FIG. 44A shows the status immediately before the feed-out of the tag label tape 109 with print begins from the cartridge 7. In the state shown in the figure, the identifier PM is not detected by the mark sensor 127, and the two-colored LED 131 is still in an off state.

From this state, the feed-out of the tag label tape 109 with print begins and the two-colored LED 131 turns on, emitting the color green (and stays on until FIG. 44F). As the feeding of the tag label tape 109 with print (in other words, the feeding of the base tape 101 and the cover film 103; hereinafter the same) proceeds, the area near the tape feeding direction front end of the RFID circuit element To reaches the position of the print head 23 (FIG. 44B). Here, as described above, because L=Lo, when the front end of the identifier PM reaches the position of the mark sensor 127 due to the movement of the tag label tape 109 with print, the position corresponding to the RFID circuit element To of the cover film 103 (the position where bonding is performed with the RFID circuit element To position of the base tape 101) reaches the position of the print head 23. In response, the identifier PM is detected by the mark sensor 127, and the printing of the label print R begins on the cover film 103 (FIG. 44C). In this example, as shown in FIG. 44I to FIG. 44J described later, the example given is of a case where relatively long text (the letters "ABCDEFGHIJKLMN") is printed.

When the feeding of the tag label tape 109 with print proceeds further from the state of FIG. 44C, the preset position of the front half-cut line HC1 (the position of distance X1 from the tape front end, as previously described; refer to FIG. 42) reaches the position of the half-cutting module 35 (FIG. 44D). In this state, because the identifier PM has already been detected by the mark sensor 127, the detection of arrival at this position is performed by detecting that the tag label tape 109 with print has proceeded a predetermined distance from the state of FIG. 44B (the identifier PM detection start state). The feeding of the tag label tape 109 with print is then stopped according to this detection, and the front half-cut line HC1 is formed by the half-cutting module 35 (FIG. 44D).

Subsequently, the feeding of the tag label tape 109 with print resumes and, when the feeding of the tag label tape 109 with print further proceeds from the state of FIG. 44D, the RFID circuit element To arrives at the position of the apparatus antenna LC (FIG. 44F). At this time, because relatively long text ("ABCDEFGHIJKLMN") is to be printed as the label print R in this example as previously described, all printing in the print area S is not yet completed at this point in time. As a result, the feeding and printing of the tag label tape 109 with print is paused (interrupted) so as to perform wireless communication with the RFID circuit element To from the apparatus antenna LC in a feeding stopped state. Here, while wireless communication is performed (about 1 second, for example), the two-colored LED 131 that had been continually on up until this point flickers using the same green color. Note that, in certain cases, in this state, the front end part of the tag label tape 109 with print is exposed to the outside of the apparatus 1 from the discharging exit 11. Then, after the wireless communication explained in detail later is successfully completed, the two-colored LED 131 turns off, the feeding and printing are resumed (FIG. 44G), and finally all of the ("ABCDEFGHIJKLMN") printing is completed (FIG. 44H).

When the feeding of the tag label tape 109 with print further proceeds from the state of FIG. 44H, the preset position of the rear half-cut line HC2 (the position of distance X2 from the tape rear end, as previously described; refer to FIG. 42) reaches the position of the half-cutting module 35. Detection of arrival at this position, similar to the position detection of the front half-cut line HC1, is performed by detecting that the tag label tape 109 with print has proceeded a predetermined distance from the state of FIG. 44B. The feeding of the tag label tape 109 with print is then stopped according to this detection, and the rear half-cut line HC2 is formed by the half-cutting module 35 (FIG. 44I).

When the feeding of the tag label tape 109 with print further proceeds from the state of FIG. 44I, the position of the cutting line CL corresponding to the tape longitudinal dimension X of the print area S of each RFID label T variably set according to the length of the label print R reaches the position of the cutting mechanism 15 (note that from FIG. 44G to this stage, the two-colored LED 131 remains off). Detection of arrival at this position, similar to the above, is also performed by detecting that the tag label tape 109 with print has proceeded a predetermined distance from the state of FIG. 44B. The feeding of the tag label tape 109 with print is then stopped according to this detection, cutting is performed on the cutting line CL by the cutting mechanism 15 (FIG. 44J), and the front end side of the tag label tape with print is cut off so as to form the RFID label T.

While the above process has been described for a case where the wireless communication is normally performed, in a case where wireless communication fails, the two-colored LED 131 notifies the operator of a communication error by continually displaying red from the time feeding and printing subsequently resume (FIG. 44G) to printing completion (FIG. 44J).

(B) When the Print Length is Relatively Short

FIG. 45A to FIG. 45J, similar to FIG. 44A to FIG. 44J, each constitute an explanatory diagram illustrating the positional relationship between the identifier PM, the RFID circuit element To, and the print area S of the label print R of the tag label tape 109 with print continually fed out, and the apparatus antenna LC, the mark sensor 127, the half-cutting module 35, the cutting mechanism 15, and the print head 23, as well as the light emission status of the two-colored LED 131. In this example, as shown in FIG. 45F to FIG. 45J described later, the example given is of a case where relatively short text (the letters "ABCDEFGHIJ") is printed.

FIG. 45A to FIG. 45E are similar to the above-described FIG. 44A to FIG. 44E. That is, the two-colored LED 131 is off until immediately before the feed-out of the tag label tape 109 with print begins from the cartridge 7 (FIG. 45A), and then turns on, emitting green, when feed-out begins. When the feeding proceeds and the front end of the identifier PM reaches the position of the mark sensor 127 (FIG. 45B), the printing of the label print R on the cover film 103 begins (FIG. 45C). The feeding then further proceeds and the position of the front half-cut line HC1 reaches the position of the half-cutting module 35. The front half-cutting line HC1 is then formed by the half-cutting module 35 (FIG. 45D), the feeding of the tag label tape 109 with print is resumed, and the feeding of the tag label tape 109 with print further proceeds (FIG. 45E).

Subsequently, because the character count of the label print R is relatively short in this example, the printing of the label print R ("ABCDEFGHIJ") is completed (FIG. 45F) before the RFID tag element To reaches the position of the apparatus antenna LC (refer to FIG. 45G described later).

Subsequently, feeding proceeds and the RFID circuit element To reaches the position of the apparatus antenna LC (FIG. 45G). However, unlike the above case (A), all printing in the print area S is already completed at this time. As a result, the feeding of the tag label tape 109 with print is stopped (interrupted), and the two-colored LED 131 which had been continually on up to this point is switched to a flickering display of the same green color. (Note that, similar to the above, in this state, in certain cases the front end part of the tag label tape 109 with print is exposed to the outside of the apparatus 1 from the discharging exit 11, for example). In this feeding stopped state, wireless communication is performed with the RFID circuit element To from the apparatus antenna LC and, once wireless communication is successfully completed as described in detail later, the two-colored LED 131 turns off and feeding is resumed (FIG. 45H).

The subsequent FIG. 45I to FIG. 45J are similar to the above-described FIG. 44I to FIG. 44J. That is, when the feeding of the tag label tape 109 with print further proceeds from the state of FIG. 45H and the position of the half-cut line HC2 reaches the position of the half-cutting module 35, the feeding of the tag label tape 109 with print is stopped and the rear half-cut line HC2 is formed by the half-cutting module 35 (FIG. 45I). When the feeding further proceeds and the position of the cutting line CL reaches the position of the cutting mechanism 15, the feeding is stopped, cutting is performed at the cutting line CL by the cutting mechanism 15 (FIG. 45J), and the front end side of the tag label tape 109 with print is cut off so as to form the RFID label T.

Furthermore, in a case where wireless communication fails, similar to FIG. 44G to FIG. 44J, the two-colored LED 131 is continually on, emitting red, from the time feeding and printing subsequently resume (FIG. 45H) until printing is completed (FIG. 45J) so as to notify the operator of the communication error.

As described above, in the second embodiment, the light display of the two-colored LED is controlled in coordination with the feeding roller 27, etc., as described above, so that the two-colored LED 131 is on, emitting green, (second mode) from the start of the feed-out of the tag label tape 109 with print until the RFID circuit element To reaches the position of the apparatus antenna LC, so as to indicate normal feeding; flickers, emitting green, (first mode) when feeding is stopped and wireless communication is performed with the RFID circuit element To by the apparatus antenna LC so as to indicate a wireless communication state (transmission/reception of information state); and turns off after wireless communication ends normally or changes to red after wireless communication fails so as to indicate that a communication error occurred, FIG. 46 is a flowchart showing a control procedure executed by the control circuit 110 for performing such control.

In FIG. 46, the flow begins when a predetermined RFID label producing operation is performed from the tag label producing apparatus 1 via the PC 118. First, in step S100, an operation signal from the PC 118 is inputted (via the communication line NW and the input/output interface 113) and, based on this operation signal, preparation processing configured to set print data and RFID circuit element To communication data is executed (for details, refer to FIG. 47 described later).

Subsequently, the flow proceeds to step S5, where a control signal is outputted to the feeding motor driving circuit 121 via the input/output interface 113, and the feeding roller 27 and the ribbon take-up roller 106 are rotationally driven by the driving force of the feeding motor 121. Furthermore, a control signal is outputted to the tape discharging motor 65 via the tape discharging motor driving circuit 123, and the driving roller 51 is rotationally driven. With this arrangement, the base tape 101 is fed out from the first roll 102 and supplied to the feeding roller 27, the cover film 103 is fed out from the second roll 104, and the base tape 101 and the cover film 103 are affixed to each other by the feeding roller 27 and the sub-roller 109 so as to form a single tape, thereby forming the tag label tape 109 with print, which is then further transported to the outside of the tag label producing apparatus 1 from the outward direction of the cartridge 7.

Subsequently, the flow proceeds to step S8, where a control signal is outputted to the LED driving circuit 130 via the input/output interface 113, and the green light display of the two-colored LED 131 is started so as to indicate that the feeding roller 27 is feeding the tag label tape 109 with print normally.

Next, in step S10, the decision is made as to whether or not the identifier PM of the tag label tape 109 with print has been detected (in other words, whether or not the tag label tape 109 with print has reached the print start position), based on the detection signal of the mark detection sensor 127 inputted via the input/output interface 113. Until the identifier PM is detected, the decision is made that the condition is not satisfied and this step is repeated. Once the identifier PM is detected, the decision is made that the condition is satisfied, and the flow proceeds to the next step S15.

In step S15, a control signal is outputted to the print-head driving circuit 120 via the input/output interface 113 so as to supply power to the print head 23 and start the printing of the label print R such as letters, symbols, barcodes, or the like (refer to FIG. 44B and FIG. 44C), corresponding to the print data generated in step S100 in the above-described print area S of the cover film 103 (the area to be substantially bonded to the back face of the RFID circuit element To disposed at an equal interval at a predetermined pitch in the base tape 101).

Subsequently, in step S20, the decision is made as to whether or not the tag label tape 109 with print has been fed to the above-described front half-cut position (in other words, whether or not the tag label tape 109 with print has reached the position where the half-cutter 34 of the half-cutting module 35 is in front of the front half-cut line HC1 set in step S100). This decision may be made by detecting, for example, the transported distance after the identifier PM of the base tape 101 has been detected in the step S10, using a predetermined known method (by counting, for example, the number of pulses outputted by the feeding motor driving circuit 121 configured to drive the feeding motor 119, which is a pulse motor). Until the front half-cut position is reached, the decision is made that the condition is not satisfied and this step is repeated. Once the position has been reached, the decision is made that the condition is satisfied, and the flow proceeds to the next step S25.

In step S25, a control signal is outputted to the feeding motor driving circuit 121 and the tape discharging motor driving circuit 123 via the input/output interface 113 so as to stop the driving of the feeding motor 119 and the tape discharging motor 65, thereby stopping the rotation of the feeding roller 27, the ribbon take-up roller 106, and the driving roller 51. With this arrangement, in the process wherein the tag label tape 109 with print fed out from the cartridge 7 is moved in the discharging direction, the feeding of the base tape 101 from the first roll 102, the feeding of the cover film 103 from the second roll 104, and the transport of the tag label tape 109 with print are stopped with the half-cutter 34 of the half-cutting module 35 in front of the front half-cut line HC1 set in step S100. At this time, a control signal is also outputted to the print-head driving circuit 120 via the input/output interface 113 so as to stop the power supply to the print head 23, thereby stopping (interrupting) the printing of the above-described label print R.

Next, in step S30, a control signal is outputted to the half-cutter motor driving circuit 128 via the input/output interface 113 so as to drive the half-cutter motor 129 and rotate the half-cutter 34, thereby cutting the cover film 103, the adhesive layer 101a, the base film 101b, and the adhesive layer 101c of the tag label tape 109 with print and perform the front half-cut processing which forms the front half-cut line HC1 (refer to FIG. 44D).

Then, the flow proceeds to step S35 and, similar to the step S5, the feeding roller 27, the ribbon take-up roller 106, and the driving roller 51 are rotationally driven so as to resume the transport of the tag label tape 109 with print, and, similar to step S15, power is supplied to the print head 23 so as to resume the printing of the label print R.

Subsequently, in step S40, the decision is made as to whether the tag label tape 109 with print will arrive at the communication position (the position where the RFID circuit element To is in front of the apparatus antenna LC) before the printing of all label print R to the print area S is completed (the state of the aforementioned FIG. 44F) or whether the printing of all label print R to the print area S will be completed before the tag label tape 109 with print will arrive at the communication position (the position where the RFID circuit element To is in front of the apparatus antenna LC; the state of the aforementioned FIG. 45G), according to the print end position that is variably set according to print content (the number of print characters, font, etc.) in step S100 and the tag rear end position (refer to step S145 described later) set according to the various information of the cartridge 7 included in the operation signal inputted from the operator in step S100.

For example, if the length of the label print R that is to be printed is relatively long and the positional relationship is similar to the state shown in FIG. 44F, the condition of the step S40 is satisfied and the flow proceeds to step S200, where long print label production processing is performed. That is, once the tag label tape 109 with print has been transported to the communication position of the RFID circuit element To (to the position where the RFID circuit element To is in front of the apparatus antenna LC), feeding and printing are stopped and a transmission/reception of information is performed. Subsequently, feeding and printing are resumed, printing is completed, feeding is further executed, and feeding is stopped at the rear half-cut position so as to form the rear half-cut line HC2 (refer to FIG. 48 described later).

On the other hand, if the length of the label print R that is to be printed is relatively short and the positional relationship is similar to the state shown in FIG. 45G, the condition of the step S40 is not satisfied and the flow proceeds to step S300, where short print label production processing is performed. That is, the feeding and printing continues as is and, once printing is completed, feeding continues until the tag label tape 109 with print reaches the communication position of the RFID circuit element To (the position where the RFID circuit element To is in front of the apparatus antenna LC), where feeding is stopped and a transmission/reception of information is performed. Subsequently, feeding is resumed once again and then stopped at the rear half-cut position so as to form the rear half-cut line HC2 (refer to FIG. 49 described later).

Once step S200 or step S300 is completed as described above, the flow proceeds to step S45. (At this point, in step S200 or step S300, the feeding of the tag label tape 109 with print resumes and the two-colored LED 131 switches to off or a red light display.) In step S45, the decision is made as to whether or not the tag label tape 109 with print has been fed to the above-described full-cut position (in other words, whether or not the tag label tape 109 with print has reached the position where the movable blade 41 of the cutting mechanism 15 is in front of the cutting line CL set in step S100). This decision may also be made by detecting, for example, the transported distance after the identifier PM of the base tape 101 has been detected in the step S120, using a predetermined known method (by counting, for example, the number of pulses outputted by the feeding motor driving circuit 121 configured to drive the feeding motor 119, which is a pulse motor) as described above. Until the full-cut position is reached, the decision is made that the condition is not satisfied and this step is repeated. Once the position has been reached, the decision is made that the condition is satisfied, and the flow proceeds to the next step S50.

In step S50, similar to the step S25, the rotation of the feeding roller 27, the ribbon take-up roller 106, and the driving roller 51 is stopped, thereby stopping the transport of the tag label tape 109 with print. With this arrangement, the feed-out of the base tape 101 from the first roll 102, the feed-out of the cover film 103 from the second roll 104, and the transport of the tag label tape 109 with print are stopped with the movable blade 41 of the cutting mechanism 15 in front of the cutting line CL set in step S100.

Subsequently, in step S55, a control signal is outputted to the cutter motor driving circuit 122 so as to drive the cutter motor 43 and rotate the movable blade 41 of the cutting mechanism 15, thereby performing the full-cut processing wherein the cover film 103, the adhesive layer 101a, the base film 101b, the adhesive layer 101c, and the separation sheet 101d of the tag label tape 109 with print are all cut (separated) to form the cutting line CL (refer to FIG. 44K). Thus, a label-shaped RFID label T, which includes the RFID circuit element To which the RFID tag information has been written, and on which predetermined printing has been performed correspondingly thereto, is formed by cutting the RFID label T from the tag label tape 109 with print by the separation action executed by the cutting mechanism 15.

Subsequently, the flow proceeds to step S60 where a control signal is outputted to the tape discharging motor driving circuit 123 via the input/output interface 31 so as to drive the tape discharging motor 65 again, thereby rotating the driving roller 51. As a result, the driving roller 51 begins transport once again. Accordingly, the RFID label T thus formed in the shape of a label in the step S55 is transported toward the label discharging exit 11 and discharged to outside the tag label producing apparatus 1 from the label discharging exit 11, and the flow ends.

Furthermore, the cutting processing of the step S55 and the label discharging processing of the step S60 may be performed in coordination as described below, for example.

For example, first, during the cutting operation performed by the cutting mechanism 15, the cutter motor 43 is driven via the input/output interface 113 and the cutter motor driving circuit 122 so as to rotate the cutter helical gear 42 counterclockwise (in the direction of the arrow 70 in FIG. 3) and, in turn, rotate the roller support holder 57 counterclockwise (the direction of the arrow 71 in FIG. 3) around the holder support part 59 by the boss 50 and the cam 60. Then, immediately before the tag label tape 109 with print is cut by the fixed blade 40 and the movable blade 41, the tag label tape 109 with print is pressed by the driving roller 51 and the pressure roller 52 so as to hold the tag label tape 109 with print until the tape is cut.

Subsequently, the decision is made by the control circuit 110 as to whether or not the cutting of the tag label tape 109 with print has been completed, based on the detection signal of the tape cutting detection sensor 124. When the decision is made that the detection signal of the microswitch 126 has been switched from an OFF state to an ON state and the cutting has been completed, rotation of the cutter motor 43 via the input/output interface 113 and the cutter motor driving circuit 122 is paused. On the other hand, when the cutting has not been complete, the driving of the cutter motor 43 continues until the microswitch 126 switches from an OFF state to an ON state.

When cutting has been completed and the cutter motor 43 stops, the tape discharging motor 65 rotates via the input/output interface 113 and the tape discharging motor driving circuit 123 so as to rotate the driving roller 51 via the gear train 66, thereby discharging the held tape (RFID label T). Then, the decision is made by the control circuit 110 as to whether or not the RFID label T has been discharged based on whether or not a predetermined amount of time (0.5-1.0 sec, for example) has passed since the start of tape feed-out. If so, the rotation of the tape discharging motor 64 is stopped via the input/output interface 113 and the tape discharging motor driving circuit 123. If not, the rotation continues until the RFID label T has been discharged.

After the rotation of the tape discharging motor 65 has stopped, the cutter motor 43 is once again rotated via the input/output interface 113 and the cutter motor driving circuit 122. As a result, the cutter helical gear 42 is also once again rotated so as to rotate and return the movable blade 41 to a released position (refer to FIG. 12), and the roller support holder 57 is rotated in a direction that causes the biasing sprint 61 to move the pressure roller 52 away (in the direction opposite the arrow 71 of FIG. 3) and is held for a certain interval by the stopper 72. Subsequently, the control circuit 110 detects whether or not the cutting release operation has been completed based on a detection signal from the cutting release detection sensor 125. In a case where the microswitch 126 has not switched from the ON state to the OFF state and the cutting release operation has not been completed, rotation of the cutter motor 43 continues until the cutting release operation is completed. Then, in a case where the microswitch 126 has switched from the ON state to the OFF state and the cutting release operation has been completed, the rotation of the cutter motor 43 is stopped and the full-cut processing and the label discharging processing ends.

Further, even after the above flow ends, the red light display (communication error display when wireless communication fails) of the two-colored LED may continue as is and then turn off when the operator performs a suitable predetermined operation in response to the communication error.

FIG. 47 is a flowchart which shows the detailed procedure of the step S100. In the flow shown in FIG. 47, first, in step S105, the operation signal entered from the PC 118 is inputted (identified) via the input/output interface 113. This operation signal includes print information such as the characters, design, pattern, and font (character style, size, thickness, etc.) of the label print R specified by the operator, or the code data of the letters, numbers, and other characters, as well as the write information (at least the RFID tag information including the tag ID as identification information) in a case where information is to be written to the RFID circuit element To. Further, the operation signal also includes information related to the type of the cartridge 7 loaded to the cartridge holder 6 (in other words, tag attribute information such as the disposed interval of the RFID circuit element within the base tape 101, and the tape width of the base tape 101).

The part to be detected (an identifier having a concavo-convex shape, for example) for cartridge information that is separately provided on the cartridge 7 is detected by a suitable detecting means (a means configured to perform a mechanical detection such as a mechanical switch, a sensor configured to perform optical detection, a sensor configured to perform magnetic detection, etc.), and the type of the cartridge 7 is automatically detected and found based on this detection signal.

Subsequently, the flow proceeds to step S110, where print data corresponding to the print information is created based on the operation signal inputted in the step S105.

Then, in the step S115, communication data corresponding to the write information is created based on the operation signal inputted in the step S105. While this procedure is executed in a case where information is written to the RFID circuit element To so as to produce an RFID label T as described above, the procedure may be omitted in a case where information is stored in advance in the RFID circuit element To and read so as to produce an RFID label T.

Subsequently, the flow proceeds to step S120, where the position of the above-described front half-cut line HC1 is set. This setting sets the position on the tape of the front half-cut line HC1 corresponding to the cartridge information, based on the operation signal inputted in the step S105. That is, the disposed interval of the RFID circuit element within the base tape 101 (in other words, the distance between two cutting lines CL; the length of one RFID label T) is uniquely determined as described above according to the type of the cartridge 7, and the position of the front half-cut line HC1 (unlike the position of the rear half-cut line HC2) is determined in advance (stored in a suitable location of the control circuit 110 in table format, etc.) as a certain position from the front end of the tag label tape 109 with print, regardless of the content of the label print R, according to the length of the RFID label T. In this procedure, based on such a premise, the position of the front half-cut line HC1 is set (fixed) to a predetermined position for each cartridge 7.

Then, in step S125, the communication position on the tape based on the above-described RFID circuit element To is set. This setting as well, similar to the step S120, sets (fixes) based on the operation signal inputted in the step S105 the disposed position of the tag label tape 109 with print of the RFID circuit element To a predetermined position for each cartridge 7 based on premise that the type (size) and disposed position of the RFID circuit element To are predetermined according to the type of the cartridge 7, the latter as a certain position from the front end of the tag label tape 109 with print.

Subsequently, the flow proceeds to step S130, where the position on the tape where the printing of the label print R is to end is calculated based on the print data created in the step S110. That is, the print end position changes according to the content of the label print R, ending (relatively) close to the label rear end side when the print length is long, and ending (relatively) close to the label front end side when the print length is short.

Then, in the step S135, the position of the above-described rear half-cut line HC2 is set. This setting sets the position on the tape of the rear half-cut line HC2 corresponding to the cartridge information, based on the operation signal inputted in the step S105 and the print end position calculated in the step S130. That is, based on the operation signal inputted in the step S105, the position of the rear half-cut line HC2 on the tape is calculated by adding (interposing) the distance determined with respect to the print end position calculated in the step S130, based on the premise that the distance from the print end position to the rear half-cut line HC2 is constantly predetermined by the type of the cartridge 7.

Subsequently, the flow proceeds to step S140, where the position (full-cut position) of the cutting line CL of the tag label tape 109 with print is set. This setting as well, similar to the step S120, sets (fixes) based on the operation signal inputted in the step S105 the cutting position of the tag label tape 109 with print to a predetermined position for each cartridge 7, based on the premise that the label size is constantly predetermined according to the type of the cartridge 7.

Then, in step S145, the rear end position of the tape of the above-described RFID circuit element To is set. This setting as well, similar to the above, sets (fixes) based on the operation signal inputted in the step S105 the rear end position of the tag label tape 109 with print of the RFID circuit element To a predetermined position for each cartridge 7 based on the premise that the type (size) and the disposed position of the RFID circuit element To are predetermined according to the type of the cartridge 7.

Then, the flow proceeds to step S150, where the decision is made as to whether or not the position of the rear half-cut line HC2 set in step S135 and the position of the cutting line CL set in step S140 are further on the label rear end side than the rear end position of the RFID circuit element To of step S145. When the position of the rear half-cut line HC2 and the position of the cutting line CL are set on the label rear end side, the decision is made that the condition is satisfied and the flow proceeds to step S170.

In a case where the position of the rear half-cut line HC2 or the cutting line CL is set further on the label front end side than the rear end position of the RFID circuit element To, the decision is made that the condition is not satisfied, and the flow proceeds to S155. In step S155, because the possibility exists that a part of the RFID circuit element To may be cut if left as is, position correcting (resetting) is performed so that both the position of the rear half-cut line HC2 and the position of the cutting line CL are further on the label rear end side than the rear end position of the RFID circuit element To, and the flow proceeds to step S170.

In step S170, when communication is performed from the apparatus antenna LC to the RFID circuit element To as later described, variables L, M, and N configured to count the number of times communication is reattempted (retried; the number of access attempts) in a case where there is no response from the RFID circuit element To, and a flag F used to indicate whether or not communication was successful are initialized to zero (0), and the routine ends.

FIG. 48 is a flowchart which shows the detailed procedure of the step S200. In the flow shown in FIG. 48, first, in step S210, the decision is made as to whether or not the tag label tape 109 with print has been transported to the aforementioned position of communication with the apparatus antenna LC (in other words, whether or not the tag label tape 109 with print has arrived at the position where the apparatus antenna LC is substantially in front of the RFID circuit element To, which is set in the step S125). The decision at this time as well, similar to the step S20 of the FIG. 46, may be made by detecting, for example, the transported distance after the identifier PM of the base tape 101 has been detected in the step S10, using a predetermined known method. Until the communication position is reached, the decision is made that the condition is not satisfied and this step is repeated. Once the position has been reached, the decision is made that the condition is satisfied, and the flow proceeds to the next step S220.

In step S220, similar to the step S25, the rotation of the feeding roller 27, the ribbon take-up roller 106, and the driving roller 51 is stopped, thereby stopping the transport of the tag label tape 109 with print, with the apparatus antenna LC substantially in front of the RFID circuit element To. Also, the power supply to the print head 23 is stopped so as to stop (interrupt) the printing of the label print R (refer to FIG. 44F).

Subsequently, the flow proceeds to step S225, where a control signal is outputted to the LED driving circuit 130 via the input/output interface 113, and the green light display of the two-colored LED 131 configured to indicate a normal feeding state that has been displayed up until this time is switched to a flickering display of the same green color, which indicates that transport has stopped for a transmission/reception of information processing.

Next, the flow proceeds to step S400 where a transmission/reception of information is performed via wireless communication between the antenna LC and the RFID circuit element To so as to perform a transmission/reception of information processing (for details, refer to FIG. 50 described later) which writes the information created in the step S115 of FIG. 47 to the IC circuit part 151 of the RFID circuit element To (or which reads information stored in advance in the IC circuit part 151).

Subsequently, the flow proceeds to step S230 where the decision is made as to whether or not the transmission/reception of information of the step S400 succeeded. Specifically, in step S400, because the flag F should equal 1 when communication fails (refer to step S437 of FIG. 50 described later), the decision is made as to whether or not F=0.

When F=1, the decision is made that the condition is not satisfied, communication with the RFID circuit element To is deemed to have failed, and the flow proceeds to step S233, where a control signal is outputted to the LED driving circuit 130 via the input/output interface 113 so as to trigger the two-colored LED 131 to start the red light display, indicating that a communication error has occurred. The flow then proceeds to step S240.

On the other hand, when F=0, the decision is made that the condition is satisfied, communication with the RFID circuit element To is deemed to have succeeded, and the flow proceeds to step S238, where a control signal is outputted to the LED driving circuit 130 via the input/output interface 113 so as to turn off the two-colored LED 131, indicating that a transmission/reception of information was normally performed. The flow then proceeds to step S240.

In step S240, similar to step S35 of FIG. 46, the feeding roller 27, the ribbon take-up roller 106, and the driving roller 51 are rotationally driven so as to resume the transport of the tag label tape 109 with print, and power is supplied to the print head 23 so as to resume the printing of the label print R.

At this time, in a case where the communication attempt count (retry count) of the step S400 is high, causing the communication stopped time period of the print head 23 of step S220 and thereafter to lengthen a certain degree, the possibility exists that the temperature of the print head 23 is low. In response, the amount of power (amount of energy per unit time) supplied to the print head 23 may be increased more than usual when the printing is resumed in the step S240.

Next, the flow proceeds to step S250 where the decision is made as to whether or not the tag label tape 109 with print has been transported to the above-described print end position (calculated in step S130 of FIG. 47). The decision at this time as well, similar to the above, may be made by detecting, for example, the transported distance after the identifier PM of the base tape 101 has been detected in the step S10, using a predetermined known method. Until the print end position is reached, the decision is made that the condition is not satisfied and this step is repeated. Once the position has been reached, the decision is made that the condition is satisfied, and the flow proceeds to the next step S260.

In step S260, similar to step S25 of FIG. 46, the power supply to the print head 23 is stopped, thereby stopping the printing of the label print R. As a result, the printing of the label print R in the print area S is completed (refer to FIG. 44H).

Subsequently, the flow proceeds to step S500, where rear half-cut processing configured to form the rear half-cut line HC2 by the half-cutter 34 of the half-cutting module 35 is performed after the tag label tape 109 with print has been transported to a predetermined rear half-cut position (for details, refer to FIG. 51 described later), and the routine ends.

FIG. 49 is a flowchart which shows the detailed procedure of the step S300. In the flow shown in FIG. 49, first, in step S310, similar to step S250 of FIG. 28, the decision is made as to whether or not the tag label tape 109 with print has been transported to the print end position (calculated in step S130 of FIG. 47). The decision at this time may also be made using the same method as that in step S250. Until the print end position is reached, the decision is made that the condition is not satisfied and this step is repeated. Once the position has been reached, the decision is made that the condition is satisfied, and the flow proceeds to the next step S320.

In step S320, similar to step S260 of FIG. 48, the power supply to the print head 23 is stopped, thereby stopping the printing of the label print R. As a result, the printing of the label print R in the print area S is completed (refer to FIG. 45F).

Subsequently, the flow proceeds to step S330 where, similar to step S210 of FIG. 28, the decision is made as to whether or not the tag label tape 109 with print has been transported to the above-described position of communication with the apparatus antenna LC. The decision at this time may also be made using the same method as that in step S210. Until the communication position is reached, the decision is made that the condition is not satisfied and this step is repeated. Once the position has been reached, the decision is made that the condition is satisfied, and the flow proceeds to the next step S340.

In step S340, similar to the step S220, the rotation of the feeding roller 27, the ribbon take-up roller 106, and the driving roller 51 is stopped, thereby stopping the transport of the tag label tape 109 with print, with the apparatus antenna LC substantially in front of the RFID circuit element To (refer to FIG. 45G).

Subsequently, the flow proceeds to step S345, where a control signal is outputted to the LED driving circuit 130 via the input/output interface 113, and the green light display of the two-colored LED 131 configured to indicate a normal feeding state is switched to a flickering display of the same green color, which indicates that transport has stopped for a transmission/reception of information processing.

The subsequent step S400 is identical to that shown in FIG. 48, where a transmission/reception of information processing configured to perform a transmission/reception of information by wireless communication between the antenna LC and the RFID circuit element To is performed (for details, refer to FIG. 50 described later).

Next, the flow proceeds to step S350 where, similar to step S230 of FIG. 48, the decision is made as to whether or not the transmission/reception of information of step S400 was successful according to whether or not F=0.

When F=1, the decision is made that the condition is not satisfied, communication with the RFID circuit element To is deemed to have failed, and the flow proceeds to step S353, where a control signal is outputted to the LED driving circuit 130 via the input/output interface 113 so as to trigger the two-colored LED 131 to start the red light display, indicating that a communication error has occurred. The flow then proceeds to step S360.

On the other hand, when F=0, the decision is made that the condition is satisfied, communication with the RFID circuit element To is deemed to have succeeded, and the flow proceeds to step S358, where a control signal is outputted to the LED driving circuit 130 via the input/output interface 113 so as to turn off the two-colored LED 131, indicating that the transmission/reception of information was normally performed. The flow then proceeds to step S360.

In step S360, similar to step S240 of FIG. 48, the feeding roller 27, the ribbon take-up roller 106, and the driving roller 51 are rotationally driven, thereby resuming the transport of the tag label tape 109 with print (refer to FIG. 45H).

The next step S500 is the same as that of FIG. 48, and a description thereof will be omitted.

FIG. 50 is a flowchart which shows the detailed procedure of step S400 described in FIG. 48 and FIG. 49. In this example, information writing will be described as an example of the above-described information writing and information reading.

First, in step S405 of the flow shown in FIG. 50, a control signal is outputted to the transmission circuit 306 (refer to FIG. 41, etc.) via the input/output interface 113 so as to transmit a carrier wave subjected to predetermined modulation to the RFID circuit element To of the write target via the apparatus antenna LC as an "Erase" signal configured to initialize the information stored in the memory part 157 of the RFID circuit element To. As a result, the memory part 157 of the RFID circuit element To is initialized.

Next, in step S410, a control signal is outputted to the transmission circuit 306 via the input/output interface 113 so as to transmit a carrier wave subjected to predetermined modulation to the RFID circuit element To of the information write target via the apparatus antenna as a "Verify" signal configured to check the content of the memory part 157, and prompt a response.

Subsequently, in step S415, a reply signal transmitted from the RFID circuit element To of the write target in response to the "Verify" signal is received via the apparatus antenna LC, and incorporated via the reception circuit 307 (refer to FIG. 41, etc.) and the input/output interface 113.

Next, in step S420, the information stored in the memory part 157 of the RFID circuit elements To is checked based upon the received reply signal, and the decision is made as to whether or not the memory part 157 has been normally initialized.

In a case where the decision is made that the condition is not satisfied, the flow proceeds to step S425 where M is incremented by one and then, in step S430, the decision is made as to whether or not M is equal to five. In a case where M is less than or equal to four, the decision is made that the condition is not satisfied and the flow returns to step S405 and the same procedure is repeated. In a case where M equals five, the flow proceeds to step S435 where an error display signal is outputted to the PC 118 via the input/output interface 113 and the communication line NW so as to display the corresponding writing failure (error). Further, in step S437, the aforementioned flag F is set to 1, and the routine ends. With such an arrangement, a maximum of five retries are performed even if initialization fails.

When the decision is made in step S420 that the condition is satisfied, the flow proceeds to step S440 where a control signal is outputted to the transmission circuit 306 so as to transmit a carrier wave subjected to predetermined modulation to the RFID circuit element To of the information write target via the apparatus antenna LC as a "Program" signal configure to write desired data to the memory part 157, and write the information.

Next, in step S445, a control signal is outputted to the transmission circuit 306 so as to transmit a carrier wave subjected to predetermined modulation as a "Verify" signal to the RFID circuit element To of the information write target via the apparatus antenna LC, and prompt a response. Subsequently, in step S450, a reply signal transmitted from the RFID circuit element To of the write target in response to the "Verify" signal is received via the apparatus antenna LC, and incorporated via the reception circuit 307 and the input/output interface 113.

Next, in step S455, the information stored within the memory part 157 of the RFID circuit element To is checked based on the received reply signal, and the decision is made as to whether or not the transmitted predetermined information has been normally stored in the memory part 157, using a known error detecting code (CRC code: Cyclic Redundancy Check, etc).

In a case where the decision is made that the condition is not satisfied, the flow proceeds to step S460 where N is incremented by one and then, in step S465, the decision is made as to whether or not N is equal to five. In a case where N is less than or equal to 4, the decision is made that the condition is not satisfied and the flow returns to step S440 where the same procedure is repeated. In a case where N is equal to five, the flow returns to step S435 where the corresponding writing failure (error) is similarly displayed on the PC 118. Subsequently, in step S437, the flag F is set to one, and the routine ends. With such an arrangement, a maximum of five retries are performed even if information writing fails.

When the decision is made in step S455 that the condition is satisfied, the flow proceeds to step S470 where a control signal is outputted to the transmission circuit 306 so as to transmit a carrier wave subjected to predetermined modulation as a "Lock" command to the RFID circuit element To of the information write target via the apparatus antenna LC, and prohibit the writing of new information to the RFID circuit element To. As a result, the writing of RFID tag information to the RFID circuit element To, to which writing is to be performed, is completed.

Next, the flow proceeds to step S480 where the combination of information written to the RFID circuit element To in the step S440 and the corresponding print information of the label print R to be printed in the print area S by the print head 23 is outputted via the input/output interface 113 and the communication line NW and stored in the information server IS and router server RS. Furthermore, this stored data are stored and maintained within the database of each server IS and RS, for example, for use as reference by the PC 118 as needed. With the above, the routine ends.

FIG. 51 is a flowchart which shows the detailed procedure of step S500 described in FIG. 48 and FIG. 49.

First, in step S510 of the flow shown in FIG. 51, the decision is made as to whether or not the position of the rear half-cut line HC2 set in the step S135 and the position of the cutting line CL set in the step S140 are at a predetermined distance or more away from each other. When the position of the rear half-cut line HC2 and the position of the cutting line CL are too close, the decision is made that the condition is not satisfied, provision of the rear half-cut line HC2 separate from the cutting line CL is deemed inappropriate, and the routine ends. On the other hand, if the position of the rear half-cut line HC2 and the position of the cutting line CL are sufficiently far away from each other, the decision is made that the condition is satisfied and the flow proceeds to step S520.

The step S510 is designed to prevent apparatus malfunction from occurring as a result of the full-cut position and half-cut position being too close to each other, causing the label to peel away during full-cutting or peeled tape to get caught in the cutter, etc.

In step S520, similar to step S20, the decision is made as to whether or not the tag label tape 109 with print has been fed to the above-described rear half-cut position (in other words, whether or not the tag label tape 109 with print has reached the position where the half-cutter 34 of the half-cutting module 35 is in front of the rear half-cut line HC2 calculated in step S135). Similar to the above, this decision may also be made by detecting the transported distance after the identifier PM of the base tape 101 has been detected in the step S10, using a predetermined known method (by counting, for example, the number of pulses outputted by the feeding motor driving circuit 121 configured to drive the feeding motor 119, which is a pulse motor). Until the rear half-cut position is reached, the decision is made that the condition is not satisfied and this step is repeated. Once the position has been reached, the decision is made that the condition is satisfied, and the flow proceeds to the next step S530.

In step S530, similar to the previously described step S50, etc., a control signal is outputted to the feeding motor driving circuit 121 and the tape discharging motor driving circuit 123 via the input/output interface 113 so as to stop the driving of the feeding motor 119 and the tape discharging motor 65, thereby stopping the rotation of the feeding roller 27, the ribbon take-up roller 106, and the driving roller 51. With this arrangement, the feed-out of the base tape 101 from the first roll 102, the feed-out of the cover film 103 from the second roll 104, and the transport of tag label tape 109 with print are stopped with the half-cutter 34 of the half-cutting module 35 in front of the rear half-cut position HC2 calculated in step S135.

Next, the flow proceeds to step S540 where, similar to the step S30, a control signal is outputted to the half-cutter motor driving circuit 128 so as to rotate the half-cutter 34, thereby cutting the cover film 103, the adhesive layer 101*a*, the base film 101*b*, and the adhesive layer 101*c* of the tag label tape 109 with print and perform the rear half-cut processing which forms the rear half-cut line HC2 (refer to FIG. 44I and FIG. 45I).

Then, the flow proceeds to step S550 where, similar to the step S35, the feeding roller 27, the ribbon take-up roller 106, and the driving roller 51 are rotationally driven, thereby resuming the transport of the tag label tape 109 with print, and the routine ends.

In the tag label producing apparatus 1 of the second embodiment configured as described above, when the tag label tape 109 with print is fed by the feeding roller 27 and the RFID circuit element To arrives at the position of the apparatus antenna LC, the feeding of the tape roller 27 is stopped, the RFID circuit element To is accessed by wireless communication from the apparatus antenna in that stopped state, and a transmission/reception of information is performed. At this time, the two-colored LED 131 notifies the operator of the current status by a flickering green light display, clearly indicating to the operator that the stopped state of the feeding roller 27 is a normal operation process for performing a transmission/reception of information with the RFID circuit element To and not the result of a defect or failure of the feeding roller 27. This makes it possible to dispel operator uneasiness and increase operator faith in the apparatus.

Note that access of the RFID circuit element To via wireless communication may also be performed by the apparatus antenna LC without completely stopping the feeding of the tag label tape with print, with the feeding speed of the RFID circuit element To sufficiently decelerated near the apparatus antenna LC. In such a case, in step S210 of FIG. 48, the decision is made as to whether or not the tag label tape 109 with print has reached a position slightly before the position where the RFID circuit element To is in front of the apparatus antenna LC, and, in the next step S220, the feeding speed of the tag label tape 109 with print may simply be decelerated to a level that permits wireless communication and then, in the next step 240, accelerated to the normal speed.

Further, the feeding is stopped and communication is performed with the RFID circuit element To when the RFID circuit element To reaches the position in front of the apparatus antenna LC, thereby making it possible to perform a transmission/reception of information in a more stable and highly reliably manner.

Further, particularly in the second embodiment, the two-colored LED 131 displays a flickering green light when a part (the front end part) of the tag label tape 109 with print comprising the RFID circuit element To is fed out from the discharging exit 11 and exposed outside the apparatus 1, thereby making it possible to prevent the operator from questioning why the feeding has stopped with a part of the tag label tape 109 with print exposed from the discharging exit 11 and pulling out the tape 109 or performing some other careless operation.

Further, particularly in the second embodiment, when the tag label tape 109 with print is fed by the feeding roller 27, the operator is first notified of the current status by the green light display of the two-colored LED 131. Next, when the RFID circuit element To provided to the tag label tape 109 with print reaches the position of the apparatus antenna LC and the apparatus antenna LC performs wireless communication with the feeding roller 27 in a stopped state, the operator is notified of the current status by the flickering green light display of the two-colored LED 131. Thus, notification of the current status to the operator is performed before the feeding roller 27 enters the stopped state, and then in the feeding stopped state as well, making it possible to even more clearly convey to the operator that the system is operating normally.

Further, particularly, in the second embodiment, the mode of the light display of the two-colored LED 131 switches (from an on display to a flickering display) around the time that feeding stops when the RFID circuit element To reaches the position of the apparatus antenna LC, thereby making it possible to clearly indicate to the operator that the state has transitioned from a feeding state by the feeding roller 27 to a communication state by the apparatus antenna LC.

Further, particularly in the second embodiment, the two-colored LED 131 notifies the operator of the current status by visual light displays so as to appeal to the operator's sense of sight, thereby making it possible to clearly notify the operator of current conditions in a self-explanatory manner.

Further, particularly in the second embodiment, the green light display (the display with the light continually on) indicating that the tag label tape 109 with print is being fed, and the flickering green light display (the display with the light intermittently on) indicating that the feeding has stopped are both achieved by a single, common two-colored LED 131, thereby making it possible to clearly indicate to the operator that the state has transitioned from a feeding state to a communication state, and to simplify the structure, save space, and reduce costs. Naturally, each of the respective light displays may be achieved using separately provided LEDs as well.

Furthermore, while the flickering green light display is used only when the apparatus antenna LC is performing wireless communication in the second embodiment, the flickering green light display may also be used when, for example, the tape is in a stopped state in order to perform the half-cut processing in FIG. 44D and FIG. 45D. In such a case, the user can recognize that the system is operating normally during half-cutting as well, making it possible to prevent the operator from jumping to the conclusion that production is completed and pulling out the RFID label during production.

Further, particularly in the second embodiment, after the transmission/reception of information is completed, the two-colored LED 131 notifies the operator of the current status using a flickering green light display (indicating the transmission/reception of information state) or a contrasting red light display in accordance with the transmission/reception result (communicability) of the apparatus antenna LC, thereby making it possible to clearly indicate to the operator whether or not communication was permitted, i.e., whether the transmission/reception of information succeeded or failed. Note that the two-colored LED 131 may also display a red light display during the period retries are performed in the step S440 to step S465 loop in the flowchart of FIG. 50. This makes it possible to clearly indicate to the operator that communication is being reattempted.

Furthermore, while the notification mode (green light display) indicating that the tag label tape 109 with print is being fed, and the notification mode (flickering green light display) indicating that feeding has stopped for the transmission/reception of information are distinguished by different light patterns of the same color in the above second embodiment, the present invention is not limited thereto and the two modes may be distinguished by the brightness of the light or by different light colors with the LED that displays the light comprising a multi-colored LED capable of emitting three or more colors. In the case of this type of configuration as well, it is possible to clearly indicate to the operator in an easy-to-understand manner that the state has transitioned from a feeding state by the feeding roller 27 to a communication state by the apparatus antenna LC. Naturally, even in a mode where the two-colored LED 131 displays lights in accordance with the transmission/reception of information result (communicability) of the apparatus antenna LC, distinguishment may be made by a combination of differences in brightness and light pattern, rather than by the light color or the on/off state. While in the second embodiment the two-colored LED displays a green light before wireless communication, displays a flickering green light during wireless communication, and turns off after successful wireless communication, the present invention is not limited thereto, and green flickering lights with a long cycle, short cycle, and a long cycle may be used, respectively.

Further, while in the above second embodiment the two-colored LED 131 uniformly flickers green while the feeding of the tag label tape 109 with print is in a stopped state for the transmission/reception of information, the present invention is not limited thereto and the two-colored LED 131 may notify the operator of the current status using different colors and light modes, for example, based on the type of command signal (command) transmitted/received in the transmission/reception of information state. In such a case, for example, the multi-colored LED may flicker blue once during "Erase" signal transmission in step S405 of FIG. 50, flicker light blue once during "Verify" signal transmission in step S410 and step S445, flicker white once during reception of the reply signal in step S415 and step S450, flicker purple once during transmission of the "Program" signal in step S440, and flicker yellow once during transmission of the "Lock" command in step S470. With this arrangement, the notification mode changes per command signal of the transmission/reception of information performed by the apparatus antenna LC, for example, making it possible to clearly indicate in detail to the operator the command that is being transmitted (in other words, the communication processing that is being executed) at that time.

While the above has been described in connection with an illustrative scenario in which information writing based on the flowchart of FIG. 50 is used rather than information reading, in the case of information reading, the operator is notified of the current status by a combination of light colors different from that above, thereby making it possible for the operator to clearly distinguish between information writing and information reading.

Note that various modifications may be made according to the second embodiment without departing from the spirit and scope of the invention, in addition to the above-described embodiment. Description will be made below regarding such modifications.

(2-1) When Notifying the Operator of the Current Status by Audio

While in the second embodiment the notification indicating that the tag label tape 109 with print is being fed, the notification indicating that feeding is in a stopped state, and the notification in accordance with the transmission/reception of information result (communicability) of the apparatus antenna LC are respectively made by LED light displays so as to appeal to the operator's sense of sight, the present invention is not limited thereto. That is, a sound producing apparatus, such as a speaker, for example, may be used so as to appeal to the operator's sense of hearing.

FIG. 52 is a functional block diagram illustrating a control system of the tag label producing apparatus of the present embodiment, and corresponds to the above-described FIG. 41. Note that the parts identical to those in FIG. 41 are denoted by the same reference numerals, and descriptions thereof will be omitted.

In FIG. 52, a speaker driving circuit 132 and a speaker (first notification means, communication facilitation processing means; second notification means, sound producing means) 133 are provided in place of the LED driving circuit 130 and the two-colored LED 131 provided in FIG. 41. All other components are the same as those of FIG. 41. The behavior of the control corresponding to the feeding position of the tag label tape 109 with print will now be described with reference to FIG. 53 and FIG. 54.

(A) When the Print Length is Relatively Long

FIG. 53A to FIG. 53J each constitute an explanatory diagram of the tag label producing apparatus of the present modification, illustrating the positional relationship between the identifier PM, the RFID circuit element To, and the print area S of the label print R of the tag label tape 109 with print continually fed out, and the apparatus antenna LC, the mark sensor 127, the half-cutting module 35, the cutting mechanism 15, and the print head 23, as well as the sound producing state of the speaker 133, and correspond to the above-described FIG. 44. Note that the parts identical to those in FIG. 44 are denoted by the same reference numerals, and descriptions thereof will be omitted.

First, in FIG. 53A, immediately before the tag label tape 109 with print is fed out from the cartridge 7, the apparatus is in a silent state with no sound produced from the speaker 133. From this state, the speaker 133 starts to produce, for example, a long, high-frequency (high-pitch) notification sound (specifically, a high beep sound) as the feed-out of the tag label tape 109 with print begins, and then subsequently continues to produce this long, high-pitch sound until the feeding and printing of the tag label tape 109 with print are paused (interrupted) and wireless communication is performed with the RFID circuit element To by the apparatus antenna LC in FIG. 53F. Then, for example, the speaker 133 produces a short, high-frequency notification sound (specifically, a high beep-beep sound) during the period wireless communication is performed (for about 1 second, for example) in FIG. 53F. Then, after the wireless communication ends (starting from FIG. 53G and including cutting completion of the tag label tape 109 with print of FIG. 53J and thereafter), the speaker 133 stops produces sound, resulting in a state of silence.

In a case where wireless communication fails, the speaker 133, for example, produces a long, low-frequency notification sound (specifically, a low beep sound) after feeding and printing are subsequently resumed (FIG. 53G) until printing ends (FIG. 53J), thereby notifying the operator of the communication error.

In this case as well, similar to the flickering of the LED, while a short, high-pitch sound is produced only when the apparatus antenna LC performs wireless communication in the present modification, a short, high-pitch sound may also be produced when the tape is in a stopped state in order to perform the half-cutting in FIG. 53D, for example. With this arrangement, the user can recognize that the apparatus is operating normally during half-cutting as well. The same also applies in the case of the relatively short print length described below.

(B) When the Print Length is Relatively Short

FIG. 54A to FIG. 54J, similar to FIG. 53A to FIG. 53J, each constitute an explanatory diagram illustrating the positional relationship between the identifier PM, the RFID circuit element To, and the print area S of the label print R of the tag label tape 109 with print continually fed out, and the apparatus antenna LC, the mark sensor 127, the half-cutting module 35, the cutting mechanism 15, and the print head 23, as well as the sound producing state of the speaker 133, and correspond to the above-described FIG. 45. Note that the components identical to those in FIG. 45 are denoted by the same reference numerals, and descriptions thereof will be omitted.

First, in FIG. 54A, immediately before the feed-out of the tag label tape 109 with print begins, the apparatus is in a silent state with no sound produced from the speaker 133. From this state, the speaker 133 begins producing a long, high-pitch notification sound as the feed-out of the tag label tape 109 with print begins, and then subsequently continues to produce the long, high-pitch sound until the feeding and printing are paused and wireless communication is performed in FIG. 54G Then, the speaker 133 produces a short, high-pitch notification sound, for example, while the wireless communication is performed (for less than one second to a few seconds) in FIG. 54G Then, after the wireless communication ends, the speaker 133 stops producing sound, resulting in a state of silence.

Furthermore, when wireless communication fails, the speaker 133 produces a long, low-pitch notification sound from the time feeding and printing are subsequently resumed (FIG. 54H) to the time printing is completed (FIG. 54J), thereby notifying the operator of the communication error.

When the above-described control behavior is performed, in place of the light display of the two-colored LED 131 performed in step S8 in the flowchart shown in FIG. 46 described above, a control signal is outputted to the speaker driving circuit 132 via the input/output interface 113 so that the speaker 133 starts producing a long, high-pitch notification sound. Similarly, the speaker 133 starts producing a short, high-pitch notification sound in step S225 of FIG. 48, and either stops producing sound in step S238 or starts producing a long, low-pitch notification sound in step S233. Similarly, the speaker 133 starts producing a short, high-pitch notification sound in step S353 of FIG. 49, and either stops producing sound in step S358 or starts produces a long, low-pitch notification sound in step 353. All other control procedures executed by the control circuit 110 are the same as those of the above embodiment 2, and descriptions thereof will be omitted.

According to the present modification as well, it is made clear to the operator that the decelerated or stopped state of the feeding roller 27 is a normal operation process and not the result of a defect or failure of the feeding roller 27, thereby achieving the same effect as the above second embodiment, that is, dispelling operator uneasiness and increasing operator trust in the apparatus.

Furthermore, particularly in the present modification, the speaker 133 produces audio so as to notify the operator of current conditions by appealing to the operator's sense of hearing, thereby making it possible to reliably notify the operator of the current status even when the operator has moved his or her eyes away from the apparatus.

Further, particularly in the present modification, the long, high-pitch sound indicating that the tag label tape 109 with print is being fed, and the short, high-pitch sound indicating that feeding has stopped are realized through the shared, single speaker 133, thereby making it possible to simplify structure, save space, and reduce costs. Naturally, each of the respective sounds may be achieved using separately provided speakers as well.

Furthermore, while the notification mode (long, high-pitch sound) indicating that the tag label tape 109 with print is being fed, and the notification mode (short, high-pitch sound) indicating that feeding has stopped for a transmission/reception of information are distinguished in the present modification by a difference in the length of the sound (intermittency) of the same frequency, the present invention is not limited thereto, and distinguishment may be achieved by sound volume or by different music played using a configuration that enables the playing of music. With this arrangement as well, it is possible to clearly indicate to the operator in an easy-to-understand manner that the state has transitioned from a feeding state by the feeding roller 27 to a communication state by the apparatus antenna LC. Naturally, even in a mode where the speaker 133 produces sound in accordance with the transmission/reception of information result (communicability) of the apparatus antenna LC, distinguishment may be made by a combination of differences in volume and the sound length, rather than in frequency and the presence/non-presence of sound.

Further, the two-colored LED 131 of the above second embodiment and the speaker 133 of the present modification may be combined, making it possible to distinguish a notification of the second mode indicating that the feeding from the start of feed-out of the tag label tape 109 with print to the arrival of the RFID circuit element To at the position of the apparatus antenna LC is being performed normally, a notification of the first mode indicating that the feeding has stopped and the state has changed to a wireless communication state with the RFID circuit element To by the apparatus antenna LC, and a notification indicating that a communication error has occurred when wireless communication fails, by combining the respective light displays of the two-colored LED 131 and the sounds of the speaker 133.

For example, the notification of the first mode or the notification of the second mode may be achieved by the audio from the speaker 133 while the notification of the other mode is achieved by a visual display from the two-colored LED 131, thereby making it possible to clearly indicate to the operator that the state has transitioned from the feeding state by the feeding roller 27 to the communication state by the apparatus antenna LC. Further, the PC 118 may comprise a display part such as a CRT or LCD panel and a sound producing part such as a speaker, buzzer, or chime so that each notification mode is distinguishable by a combination of the respective output modes via the input/output interface 113.

(2-2) Other

While in the above transmission/reception of information is performed by magnetic induction (including electromagnetic induction, magnetic coupling, and other non-contact methods performed via an electromagnetic field) using the apparatus antenna LC and a loop antenna as the antenna 152 of the RFID circuit element To, a transmission/reception of information may also be performed using a dipole antenna, patch antenna, etc., as the two antennas of the communication means.

In the following, a third embodiment of the present invention will be described with reference to FIGS. 55 to 70. The present embodiment reliably achieves normal apparatus operation by maintaining the required power for both a printing and transmission/reception of information. Note that components identical to those in the first and second embodiments are denoted using the same reference numerals, and descriptions thereof will be omitted as appropriate.

The tag label producing apparatus 1 of the present embodiment, similar to that of the above first and second embodiments, is provided in the RFID tag manufacturing system shown in the aforementioned FIG. 1, and the overall outer structure is the same as that shown in the aforementioned FIG. 2. In the present embodiment, although not particularly shown, a housing part provided in a predetermined location (back surface side, for example) of the apparatus main body 2, that houses in a removable manner a known battery cell 130 (or a battery or other electrical storage means) that serves as a power source of the tag label producing apparatus 1.

FIG. 55 is a functional block diagram illustrating a control system of the tag label producing apparatus 1 of the third embodiment, and corresponds to FIG. 18 of the above first embodiment, and to FIG. 41 of the second embodiment. In FIG. 55, similar to the above first and second embodiments, the CPU 111, the input/output interface 113, the CG ROM 114, the ROMs 115 and 116, the RAM 117, etc., are provided on the control circuit 110 provided in the tag label producing apparatus 1 of the present embodiment.

The CG ROM 114 stores dot pattern data in correspondence with code data as described above, but in the third embodiment also functions as a display CG (character generator) for executing display on the LCD 132, which is a display unit for displaying battery cell 130 replacement information, for example.

The input/output interface 113 is connected to the PC 118, the print-head driving circuit 120, the feeding motor driving circuit 121, the half-cutter motor driving circuit 128, and the like, as well as the display circuit 133 configured to control the display of the LCD 132, and the power supply circuit 131 configured to supply power from the battery cell 130. The power supply circuit 131, based on the status of the power button 14, receives power from the battery cell 130 when the power supply is ON, and then supplies power that has been adjusted to a predetermined voltage to each circuit (the control circuit 110, etc.).

In such a control system having the control circuit 110 at its core, when character data and the like are inputted via the PC 118, similar to the above first and second embodiments, the text (document data) is successively stored in the text memory 117A, the print head 23 is driven via the driving circuit 120, and each heating element is selectively exothermically driven according to the print dots of one line so as to print the dot pattern data stored in the print buffer 117B, while the feeding motor 119 controls the feeding of the tape via the driving circuit 121 in synchronization. The transmission circuit 306 controls the modulation of the carrier wave based on a control signal from the control circuit 110, and the reception circuit 307 processes the demodulated signal based on a control signal from the control circuit 110. The same holds true for the previously described cutting control as well.

The information writing (or reading) of the RFID circuit element To and the cutting of the tag label tape 109 with print by the tag label producing apparatus 1 of such a configuration is then completed so as to form the RFID label T. The outer appearance is the same as that described in the above embodiment 2 with reference to FIG. 42A, FIG. 42B, and FIGS. 43A to 43C, and a description thereof will be omitted.

In the tag label producing apparatus 1 of such a basic configuration, after information reading or writing is performed with the RFID circuit element To by the apparatus antenna LC for the tag label tape 109 with print bonded and manufactured, the tag label tape 109 with print is cut by the cutting mechanism 15 so as to form the RFID label T. Here, the third embodiment has the special feature that the information reading/writing is performed when the power consumption of the print head 23 is predicted to be smaller than a predetermined value, thereby making adjustments so as to not significantly increase the peak of the combined power consumption of both printing and communication. Furthermore, as described in detail later, in the third embodiment, the power consumption of the print head 23 is detected by counting the number of print dots based on the correlation of the number of dots of the dot pattern data stored in the print buffer 117B that is being transmitted to the print head 23 and the power consumption of the print head 23.

FIG. 56 is a flowchart showing a control procedure executed by the control circuit 110 for performing such control.

In FIG. 56, the flow begins when a predetermined RFID label producing operation is performed from the tag label producing apparatus 1 via the PC 118. First, in step S3001, an operation signal from the PC 118 is inputted (via the communication line NW and the input/output interface 113) and, based on this operation signal, preparation processing configured to set print data, communication data with the RFID circuit element To, the front/rear half-cut position, the full-cut position, etc., is executed.

Next, in step S3100, communication permitted time period detection processing configured to detect the communication permitted time period (the transmission/reception permitted timing and the transmission/reception permitted time period) when the power consumption of the print head 23 will be less than a predetermined value, thereby permitting a transmission/reception of information (for details, refer to FIG. 57 described later).

In the next step S3003, the communication conditions (transmission/reception timing, command type, etc.) corresponding to the communication permitted time period detected by the communication permitted time period detection processing are set.

In the next step S3004, the decision is made as to whether or not communication conditions were set in the step S3003. For example, in a case where the battery cell 130 is depleted and the power supply is low, or in a case where printing is continuous and a communication permitted time period cannot be detected in the step S3100 (or in a case where only communication permitted time periods shorter than the communication time period of transmission/reception with the RFID circuit element To, i.e., the communication time period unit, are detected), the decision is made that the condition is not satisfied due to the difficulty in setting the communication conditions, and the flow proceeds to step S3090. Then, error processing configured to notify the operator that RFID label production has been canceled and to prompt the operator to replace the battery cell 130 or change production conditions, for example, is performed (by, for example, a suitable display on the PC 118), and the flow ends. On the other hand, in a case where communication conditions were set, the decision is made that the condition is satisfied and the flow proceeds to the next step S3005.

In the step S3005, a control signal is outputted to the feeding motor driving circuit 121 via the input/output interface 113, and the feeding roller 27 and the ribbon take-up roller 106 are rotationally driven by the driving force of the feeding motor 121. Furthermore, a control signal is outputted to the tape discharging motor 65 via the tape discharging motor driving circuit 123, and the driving roller 51 is rotationally driven. With this arrangement, the base tape 101 is fed out from the first roll 102 and supplied to the feeding roller 27, the cover film 103 is fed out from the second roll 104, and the base tape 101 and the cover film 103 are affixed to each other by the feeding roller 27 and the sub-roller 109 so as to form a single tape, thereby forming the tag label tape 109 with print, which is then further transported to outside the tag label producing apparatus 1 from the outward direction of the cartridge 7.

Next, in step S3010, the decision is made as to whether or not the identifier PM of the base tape 101 has been detected (in other words, whether or not the cover film 103 has reached the print start position of the print head 23), based on the detection signal of the mark detection sensor 127 inputted via the input/output interface 113. Until the identification mark PM is detected, the decision is made that the condition is not satisfied and this step is repeated. Once the identifier PM is detected, the decision is made that the condition is satisfied, and the flow proceeds to the next step S3015.

In step S3015, a control signal is outputted to the print-head driving circuit 120 via the input/output interface 113 so as to supply power to the print head 23 and start the printing of the label print R such as letters, symbols, barcodes, or the like, corresponding to the print data generated in step S3001 in the above-described print area S of the cover film 103 (the area to be substantially bonded to the back face of the RFID circuit element To disposed at an equal interval at a predetermined pitch in the base tape 101).

In the next step S3017, the counting of the transmission dot columns within the dot pattern data stored in the print buffer 117B that are being transmitted to the print head 23 (refer to FIG. 58 described later) is started. The counting of these dot columns is performed by, for example, storing in advance the correspondence between the dot column and the number of pulses outputted to the feeding motor driving circuit 121 configured to drive the feeding motor 119, which is a pulse motor, and counting the number of pulses.

Subsequently, in step S3020, the decision is made as to whether or not the tag label tape 109 with print has been fed to the front half-cut position set in the previous step S3001 (in other words, whether or not the tag label tape 109 with print has reached the position where the half-cutter 34 of the half-cutting module 35 is in front of the front half-cut line HC1 set in step S3001). This decision may be made by detecting, for example, the transported distance after the identification mark PM of the base tape 101 has been detected in the step S3010, using a predetermined known method (by counting, for example, the number of pulses outputted by the feeding motor driving circuit 121 configured to drive the feeding motor 119, which is a pulse motor). Until the front half-cut position is reached, the decision is made that the condition is not satisfied and this step is repeated. Once the position has been reached, the decision is made that the condition is satisfied, and the flow proceeds to the next step S3025.

In step S3025, a control signal is outputted to the feeding motor driving circuit 121 and the tape discharging motor driving circuit 123 via the input/output interface 113 so as to stop the driving of the feeding motor 119 and the tape discharging motor 65, thereby stopping the rotation of the feeding roller 27, the ribbon take-up roller 106, and the driving roller 51. With this arrangement, in the process wherein the tag label tape 109 with print fed out from the cartridge 7 is moved in the discharging direction, the feed-out of the base tape 101 from the first roll 102, the feed-out of the cover film 103 from the second roll 104, and the transport of the tag label tape 109 with print are stopped with the half-cutter 34 of the half-cutting module 35 in front of the front half-cut line HC1 set in step S3001. At this time, a control signal is also outputted to the print-head driving circuit 120 via the input/output interface 113 so as to stop the power supply to the print head 23, thereby stopping (interrupting) the printing of the above-described label print R.

Next, in step S3030, a control signal is outputted to the half-cutter motor driving circuit 128 via the input/output interface 113 so as to drive the half-cutter motor 129 and rotate the half-cutter 34, thereby cutting the cover film 103, the adhesive layer 101a, the base film 101b, and the adhesive layer 101c of the tag label tape 109 with print and perform the front half-cutting which forms the front half-cut line HC1.

Then, the flow proceeds to step S3035 and, similar to the step S3005, the feeding roller 27, the ribbon take-up roller 106, and the driving roller 51 are rotationally driven so as to resume the transport of the tag label tape 109 with print, and, similar to step S3015, power is supplied to the print head 23 so as to resume the printing of the label print R.

Subsequently, in step S3040, the decision is made as to whether or not the tag label tape 109 with print to be fed has been transported a predetermined value (for example, a transport distance long enough for a corresponding RFID circuit element To, to which the printed cover film 103 has been bonded, to reach the apparatus antenna LC). The transport distance decision at this time, similar to the step S3020, may also be made by counting the number of pulses outputted to the feeding motor driving circuit 121 configured to drive the feeding motor 119, which is a pulse motor.

In the next step S3200, label production processing is performed. That is, once the tag label tape 109 with print has been transported to the communication start position of the RFID circuit element To (to the position where the RFID circuit element To is near the apparatus antenna LC), a transmission/reception of information is performed based on the communication conditions set in the step S3003. Subsequently, printing is completed, the tag label tape 109 with print is further fed, and then feeding is stopped at the rear half-cut position so as to form the rear half-cut line HC2 (refer to FIG. 61 described later).

After step S3200 is completed as described above, the flow proceeds to step S3045. In step S3045, the decision is made as to whether or not the tag label tape 109 with print has been fed to the above-described full-cut position (in other words, whether or not the tag label tape 109 with print has reached the position where the movable blade 41 of the cutting mechanism 15 is in front of the cutting line CL set in step S3001). This decision may also be made by detecting, for example, the transported distance after the identification mark PM of the base tape 101 has been detected in the step S3010, using a predetermined known method (by counting, for example, the number of pulses outputted by the feeding motor driving circuit 121 configured to drive the feeding motor 119, which is a pulse motor) as described above. Until the full-cut position is reached, the decision is made that the condition is not satisfied and this step is repeated. Once the position has been reached, the decision is made that the condition is satisfied, and the flow proceeds to the next step S3050.

In step S3050, similar to the step S3025, the rotation of the feeding roller 27, the ribbon take-up roller 106, and the driving roller 51 is stopped, thereby stopping the transport of the tag label tape 109 with print. With this arrangement, the feed-out of the base tape 3001 from the first roll 102, the feed-out of the cover film 103 from the second roll 104, and the transport of the tag label tape 109 with print are stopped with the movable blade 41 of the cutting mechanism 15 in front of the cutting line CL set in step S3001.

Subsequently, in step S3055, a control signal is outputted to the cutter motor driving circuit 122 so as to drive the cutter motor 43 and rotate the movable blade 41 of the cutting mechanism 15, thereby performing the full-cut processing wherein the cover film 103, the adhesive layer 101a, the base film 101b, the adhesive layer 101c, and the separation sheet 101d of the tag label tape 109 with print are all cut (separated) to form the cutting line CL. Thus, a label-shaped RFID label T, which includes the RFID circuit element To to which the RFID tag information has been written, and on which predetermined printing has been performed correspondingly thereto, is formed by cutting the RFID label T from the tag label tape 109 with print by the separation action executed by the cutting mechanism 15.

Subsequently, the flow proceeds to step S3060 where a control signal is outputted to the tape discharging motor driving circuit 123 via the input/output interface 31 so as to drive the tape discharging motor 65 again, thereby rotating the driving roller 51. As a result, the driving roller 51 begins transport once again. Accordingly, the RFID label T thus formed in the shape of a label in the step S3055 is transported toward the label discharging exit 11 and discharged to outside the tag label producing apparatus 1 from the label discharging exit 11, and the flow ends.

FIG. 57 is a flowchart which shows the detailed procedure of the step S3100.

First, in step S3110, a variable n configured to count the dot columns (refer to FIG. 58 described later) of the dot pattern data stored in the print buffer 117B is initialized to one.

In the next step S3120, the data inputted in the step S3001 is expanded to the print buffer 117B and stored as dot pattern data (refer to FIG. 58 described later).

In the next step S3130, the number of print dots in the nth dot column is counted (refer to FIG. 59 described later). Note that the number of print dots is the number of dots actually printed in each dot column of the dot pattern data in the print buffer 117B by the supply of power to the heating elements of the print head 23.

In the next step S3140, the decision is made as to whether or not the number of print dots of the dot column n counted in the step S3130 is less than or equal to a threshold value. This threshold value reflects the number of print dots for which the prediction has been made that the combined power consumption for both printing and communication at the time of a transmission/reception of information can be covered by the power source (the battery cell 130) of the tag label producing apparatus 1 (refer to FIG. 59 described later). In a case where the number of print dots is less than or equal to the threshold value, the decision is made that the condition is satisfied and the flow proceeds to the next step S3150.

In step S3150, when the number of print dots is less than or equal to the threshold value in the step S3140, the decision is made that the dot column is a communication permitted area, and the number of dot columns n is temporarily stored in a suitable memory (in the RAM 117, for example). Then, the flow proceeds to the next step S3160. When the number of print dots is greater than the threshold value in the step S3140, the decision is made that the condition is not satisfied and the flow proceeds directly to the next step S3160.

In the step S3160, the variable n configured to count the dot columns of the dot pattern data stored in the print buffer 117B is incremented by one, and the flow proceeds to the next step S3170.

In step S3170, the decision is made as to whether or not the processing of the step S3130 to the step S3150 (the decision as to whether or not the number of print dots is less than or equal to the threshold value and, if so, the temporary storage of that information) has been completed for all dot columns of the dot pattern data stored in the print buffer 117B. In a case where the processing has not been completed for all dot columns, the decision is made that the condition is not satisfied and the flow proceeds to the previous step S3130. On the other hand, in a case where the processing has been completed for all dot columns, the decision is made that the condition is satisfied, and the routine ends.

Based on the above procedure, the number of dot columns having a number of print dots in the data of the print buffer 117B that is less than or equal to a threshold value is identified, and the communicable communication permitted areas are detected.

FIG. 58 is a diagram conceptually illustrating an example of dot pattern data stored in the print buffer 117B when the print data (in this example, the characters "RFID" which indicate the type of RFID label T) are expanded to the print buffer 117B in the procedure of the step S3120. Here, the figure shows the state where the print data have been expanded into a 13-dot (row)×35-dot (column) buffer.

FIG. 59 is a diagram for explaining an example of the procedure of the step S3130 and step S3140 wherein the number of print dots is counted for all dot columns (1 to 35) of the print buffer 117B in which print data have been expanded, and the counted number of print dots in each dot column is compared with a threshold value (here, 1.5; indicated by the dashed-line in the figure) so as to identify the dot columns having a number less than or equal to the threshold value and detect communication permitted areas. As shown in this figure, for example, the character "R" is expanded into the dot columns 4 to 8, and the number of print dots in the fourth column and in the seventh column within the character "R" is 9 and 3, respectively. Then, here the threshold value is set to 1.5, and the dot columns having a number of print dots of 1.5 or less, that is columns 9 to 11, 16 to 20, and 24 to 26, are identified, resulting in the detection of these areas as communication permitted areas. Here, the areas of the dot columns 9 to 11, 16 to 20, and 24 to 26 are respectively detected as communication permitted area 1, communication permitted area 2, and communication permitted area 3.

FIG. 60 is a diagram illustrating an example of the procedure of step S3003 wherein communication conditions are set for the detected communication permitted areas. As shown in this figure, settings are set so that a "Ping" signal for checking whether or not an RFID circuit element To exists within the communication range is transmitted in the communication permitted area 1, a "Program" signal configured to write desired data to the memory part 157 is transmitted in the communication permitted area 2, and a "Verify" signal configured to check the content of the memory part 157 is transmitted in the communication permitted area 3. Here, the time required for executing the "Ping" command and the "Verify" command is equivalent to three dot columns, and the time required for transmitting the "Program" signal is equivalent to five dot columns. (The time required for command execution is converted to the number of dot columns transmitted to the print head 23 from the print buffer 117B within that time.)

FIG. 61 is a flowchart which shows the detailed procedure of the step S3200. In the flow shown in FIG. 61, first, in step S3210, the decision is made as to whether or not the tag label tape 109 with print has been fed to the above-described communication start position of the apparatus antenna LC. The decision at this time as well, similar to the step S3020 of FIG. 56 described above, may be made by detecting, for example, the transported distance after the identification mark PM of the base tape 101 has been detected in the step S3010, using a predetermined known method. Until the communication start position is reached, the decision is made that the condition is not satisfied and this step is repeated. Once the position has been reached, the decision is made that the condition is satisfied, and the flow proceeds to the next step S3400.

In step S3400, the transmission/reception of information is performed via wireless communication between the antenna LC and the RFID circuit element To based on the communication conditions correspondingly set for the communication permitted areas so as to perform the transmission/reception of information processing (for details, refer to FIG. 62 described later) which writes the information created in the step S3001 of FIG. 56 to the IC circuit part 151 of the RFID circuit element To (or which reads information stored in advance in the IC circuit part 151).

Subsequently, the flow proceeds to the step S3230 where the decision is made as to whether or not the transmission/reception of information in the step S3400 succeeded. Specifically, in step S3400, the "Verify" signal is transmitted to the RFID circuit element To and, based on the response signal received from the RFID circuit element To, the decision is made as to whether or not the predetermined written information has been stored in the IC circuit part 151.

When communication fails, the decision is made that the condition was not satisfied and the flow proceeds to step S3290 where error processing for notifying the operator on the label that communication has failed [for example, printing a print R' of a different form corresponding to the communication error (the characters "NG" for example)] is performed, and the routine ends.

On the other hand, when communication succeeds, the decision is made that the condition is satisfied, communication is deemed successful, and the flow proceeds to step S3250.

In step S3250, the decision is made as to whether or not the tag label tape 109 with print has been transported to the above-described print end position (calculated in step S3001 of FIG. 56). The decision at this time as well, similar to the above, may be made by detecting, for example, the transported distance after the identification mark PM of the base tape 101 has been detected in the step S3010, using a predetermined known method. Until the print end position is reached, the decision is made that the condition is not satisfied and this step is repeated. Once the position has been reached, the decision is made that the condition is satisfied, and the flow proceeds to the next step S3260.

In step S3260, similar to step S3025 of FIG. 56, the power supply to the print head 23 is stopped, thereby stopping the printing of the label print R. As a result, the printing of the label print R in the print area S is completed.

Subsequently, the flow proceeds to step S3270 where rear half-cut processing for forming the rear half-cut line HC2 by the half-cutter 34 of the half-cutting module 35 after transport to the predetermined rear half-cut position is performed. With the above, the routine ends.

FIG. 62 is a flowchart which shows the detailed procedure of the step S3400. In this example, information writing will be described as an example of the above-described information writing and information reading.

First, in step S3410 of the flow shown in FIG. 62, the decision is made as to whether or not the transmission dot column to be transmitted from the print buffer 117B to the print head 23 has reached the communication permitted area 1, specifically, whether or not the number of dot columns for which counting was started in the previous step S3017 has reached nine. This procedure is repeated until the decision is made that the condition is satisfied, and then the flow proceeds to the next step S3420.

In step S3420, a control signal is outputted to the transmission circuit 306 via the input/output interface 113, and a carrier wave subjected to predetermined modulation is transmitted to the RFID circuit element To which information is to be written via the apparatus antenna LC as a "Ping" signal configured to check whether or not an RFID circuit element To within the communication range exists, prompting a response. Then, a response signal transmitted from the RFID circuit element To in response to the "Ping" signal is received via the apparatus antenna LC, and incorporated via the reception circuit 307 and the input/output interface 113.

In the next step S3430, the decision is made as to whether or not the transmission dot column to be transmitted from the print buffer 117B to the print head 23 has reached the communication permitted area 2, specifically, whether or not the number of dot columns for which counting was started in the previous step S3017 has reached 16. This procedure is repeated until the decision is made that the condition is satisfied, and then the flow proceeds to the next step S3440.

In step S3440, a control signal is outputted to the transmission circuit 306, a carrier wave subjected to predetermined modulation is transmitted to the RFID circuit element To which information is to be written via the apparatus antenna LC as a "Program" signal configured to write desired data to the memory part 157 of the RFID circuit element To which is the write target (the RFID circuit element To that transmitted the response signal), and the information is written.

In the next step S3450, the decision is made as to whether or not the transmission dot column to be transmitted from the print buffer 117B to the print head 23 has reached the communication permitted area 3, specifically, whether or not the number of dot columns for which counting was started in the previous step S3017 has reached 24. This procedure is repeated until the decision is made that the condition is satisfied, and then the flow proceeds to the next step S3460.

In step S3460, a control signal is outputted to the transmission circuit 306 via the input/output interface 113 so as to transmit a carrier wave subjected to predetermined modulation to the RFID circuit element To which information is to be written via the apparatus antenna LC as a "Verify" signal configured to check the content of the memory part 157, and prompt a response. Then, a response signal transmitted from the RFID circuit element To which data is to be written in response to the "Verify" signal is received via the apparatus antenna LC, and incorporated via the reception circuit 307 and the input/output interface 113. Then, the routine ends.

In the above, step S3100 and step S3003 in FIG. 56 that are executed by the control circuit 110 comprise a predicting means for predicting whether or not a transmission/reception of information will be permitted based on the corresponding operation status of the printing means, as well as a communication facilitation means, as described in the various claims. Of these, step S3003 also comprises a communication condition setting means for setting conditions for the transmission/reception of information in accordance with a calculation result of the printing power calculating means, step S3130 in FIG. 57 comprises a printing power calculating means for calculating the power consumption required for printing in the predetermined print area using the printing means, and step S3140 comprises a communication permitted time detecting means for detecting a transmission/reception permitted timing and a transmission/reception permitted time period for the communication means.

Further, step S3004 in FIG. 56 comprises a determining means for determining whether or not a condition for a transmission/reception of information that enable normal production of a tag label can be set.

In the tag label producing apparatus 1 of this third embodiment configured as described above, the opening/closing lid 3 is first set to an open state, the cartridge 7 is then loaded to the cartridge holder 6, the opening/closing lid 3 is set to a closed state, and then label production is performed. That is, a predetermined label print R is printed by the print head 23 in the print area S of the cover film 103, the tag label tape 109 with print of a layered structure that includes the three layers of the cover film 103, the adhesive layer 101c, and the separation sheet 101d, which covers the other two, is transported, a transmission/reception of information is performed in a non-contact manner from the apparatus antenna LC to the RFID circuit element To provided in the tag label tape 109 with print being fed, information reading/writing is executed, and the tag label tape 109 with print is then cut at a predetermined length by the cutting mechanism 15 so as to produce the RFID label T.

At this time, because the print head 23, which is a thermal head, consumes a relatively large amount of power, when a transmission/reception of information is performed from the apparatus antenna LC and, as in the third embodiment, there is no external power, resulting in a limited power supply from an electrical storage means such as the battery cell 130, whether or not the print head 23 is operating in a high power consumption state needs to be taken into consideration to ensure normal communication.

In the third embodiment, before the RFID circuit element To provided in the label tape 109 with print reaches the position of a transmission/reception of information with the apparatus antenna LC by the driving roller 51, the prediction is made as to whether or not a transmission/reception of information will be permitted in view of the operation status of the print head 23. Information transmission/reception is then performed based on that prediction result via the apparatus antenna LC. With this arrangement, the transmission/reception of information is not performed when the power consumption of the print head 23 is predicted to be high, and the transmission/reception of information is permitted when the power consumption of the print head 23 is predicted to be low, thereby making it possible to make adjustments so that the combined power consumption of both printing and communication does not significantly increase.

As a result, even in a case where the power supply is limited by the electrical storage means such as the battery cell 130, for example, normal apparatus operation can be maintained, making it possible to reliably produce an RFID label with print.

Further, particularly in the third embodiment, when the number of print dots within each dot column of the dot pattern data stored in the print buffer 117B is compared with a threshold value and the number is found to be less than or equal to that threshold value, control is performed so as to predict that the combined power consumption of both printing and communication at that time can be sufficiently covered by the power source (the above-described battery cell 130) of the tag label producing apparatus 1, and thus perform the transmission/reception of information. With the communication permitted areas detected based on a comparison with a threshold value in this manner, when the power supply capacity of the tag label producing apparatus 1 is changed (when, for example, the electrical storage means of the battery cell 130, etc., is switched to external power), the communication permitted areas corresponding to the state of apparatus usage at that time can be detected by suitably changing the threshold value. As a result, normal apparatus operation can be reliably maintained.

Further, particularly in the third embodiment, for example, in a case where the battery cell 130 is depleted and the power supplied to the tag label producing apparatus 1 is low, or in a case where printing is continuous and communication permitted areas cannot be detected (or in a case where only communication permitted areas shorter than the RFID circuit element To communication time period required for RFID label production have been detected), RFID label production is cancelled and a suitable display is performed on the PC 118, etc., due to the difficulties in setting communication conditions, prompting the user to replace the battery cell 130 or change the conditions for RFID label production. With this arrangement, the production of RFID labels under conditions where the combined power consumption of both printing and communication cannot be covered by the apparatus power source and the resultant failure are prevented, thereby making it possible to reliably produce RFID labels T with print.

Further, particularly in the third embodiment, a thermal head comprising heating elements that receive power and generate heat is used as the print head 23. In such a case where a thermal head is used as the print head, resulting in increased power consumption particularly during printing, the effect of the third embodiment, i.e., maintaining normal operation and reliably producing RFID labels T with print, is underscored.

Note that various modifications may be made according to the third embodiment without departing from the spirit and scope of the invention, in addition to the above-described embodiment. Description will be made below regarding such modifications.

(3-1) When Feeding is Stopped During a Transmission/Reception of Information

While in the above third embodiment the transmission/reception of information is performed with the RFID circuit element To while the tag label tape 109 with print is fed, the present invention is not limited thereto and may be designed so that, as necessary, feeding is stopped in order to perform the transmission/reception of information.

FIG. 63 is a flowchart illustrating a control procedure executed by a control circuit of this modification, and corresponds to the aforementioned FIG. 56.

In FIG. 63, the point that differs from the above-describe FIG. 56 is that step S3003 is replaced with the communication condition setting processing (for details, refer to FIG. 64 described later) of step S3300. That is, after the communication permitted time period detection processing is performed in step S3100, in the next step S3300, communication condition setting processing (communication condition setting means, predicting means, communication facilitation processing means) configured to set communication conditions (transmission/reception timing, command type, whether or not feeding is to be stopped, etc.) corresponding to the communication permitted time period detected in the communication permitted time period detection processing is performed. Subsequently, in the next step S3004, the decision is made as to whether or not communication conditions were set in the step S3300. All other procedures are the same as those of the above-described FIG. 56, and descriptions thereof will be omitted.

FIG. 64 is a flowchart which shows the detailed procedure of the step S3300. The communication condition setting processing performed corresponds to a case where the stored content of the print buffer 117B is of the state of the above-described FIG. 58.

First, in step S3310, the decision is made as to whether or not the number of dot columns of the communication permitted area 1 is greater than or equal to a predetermined threshold value. The predetermined threshold value here is set so as to ensure that, during the period the data of that number of dot columns are transmitted from the print buffer 117B to the print head 23, the "Ping" signal can be transmitted to the RFID circuit element To and a corresponding response signal can be received from the RFID circuit element To. When the number of dot columns of the communication permitted area 1 is greater than or equal to the predetermined threshold value, the decision is made that the condition is satisfied and the flow proceeds to the next step S3320.

In step S3320, communication conditions are set so that the feeding of the tag label tape 109 with print continues in the communication permitted area 1 (specifically, the feeding of the tag label tape 109 with print during the period the print data of the dot columns included in the communication permitted area 1 are outputted from the print buffer 117B to the print head 23 and printed).

On the other hand, when the number of dot columns of the communication permitted area 1 is less than the predetermined threshold value in the step S3310, the decision is made that the condition is not satisfied and the flow proceeds to step S3330 where communication conditions are set so as to stop the feeding of the tag label tape 109 with print in the communication permitted area 1.

In the next step S3340, the decision is made as to whether or not the number of dot columns of the communication permitted area 2 is greater than or equal to a predetermined threshold value. The predetermined threshold value here is set so as to ensure that the "Program" signal can be transmitted to the RFID circuit element To during the period the print information of that number of dot columns is outputted from the print buffer 117B to the print head 23. When the number of dot columns of the communication permitted area 2 is greater than or equal to the predetermined threshold value, the decision is made that the condition is satisfied and the flow proceeds to the next step S3350.

In step S3350, the communication conditions are set so that the feeding of the tag label tape 109 with print continues in the communication permitted area 2.

On the other hand, when the number of dot columns of the communication permitted area 2 is less than the predetermined threshold value in the step S3340, the decision is made that the condition is not satisfied and the flow proceeds to step S3360 where communication conditions are set so as to stop the feeding of the tag label tape 109 with print in the communication permitted area 2.

In the next step S3370, the decision is made as to whether or not the number of dot columns of the communication permitted area 3 is greater than or equal to a predetermined threshold value. The predetermined threshold value here is set so as to ensure that, during the period the print information of that number of dot columns is outputted from the print buffer 117B to the print head 23, the "Verify" signal can be transmitted to the RFID circuit element To and a corresponding response signal can be received from the RFID circuit element To. When the number of dot columns of the communication permitted area 3 is greater than or equal to the predetermined threshold value, the decision is made that the condition is satisfied and the flow proceeds to the next step S3380.

In step S3380, the communication conditions are set so that the feeding of the tag label tape 109 with print continues in the communication permitted area 3.

On the other hand, when the number of dot columns of the communication permitted area 3 is less than the predetermined threshold value in the step S3370, the decision is made that the condition is not satisfied and the flow proceeds to step S3390 where communication conditions are set so as to stop the feeding of the tag label tape 109 with print in the communication permitted area 3.

FIG. 65 is diagram for explaining an example of the procedure of the communication permitted time period detection processing of the step S3100 and the communication condition setting processing of step S3300 wherein the feeding of the tag label tape 109 with print during communication is set to stop or not stop by detecting the communication permitted areas in the print buffer 117B in which print data have been expanded, and comparing the number of dot columns of each communication permitted area with a threshold value.

First, in FIG. 65A, as previously described, the number of print dots of all dot columns (1 to 35) of the print buffer 117B in which the print data have been expanded is counted, and the communication permitted areas 1, 2, and 3 are detected by comparing the number of print dots counted for each dot column with a threshold value (here, 1.5; indicated by the dashed-line in the figure). Then, in FIG. 65B, communication settings are set by comparing the number of dot columns of each of these communication permitted areas 1, 2, and 3 with a threshold value (here, the time required to execute each of the "Ping," "Program," and "Verify" commands is set to four dot columns; that is, the threshold value is 4), and continuing the tape feeding in those areas having a number of dot columns greater than or equal to the threshold value, and stopping the tape feeding in those areas having a number of dot columns smaller than the threshold value. As shown in this figure, communication settings are set so that the tape feeding is stopped in the communication permitted areas 1 and 3 since the number of dot columns in these communication permitted areas 1 and 3 is three and thus less than the threshold value, and the tape feeding continues in the communication permitted area 2 since the number of dot columns of this communication permitted area 2 is five and thus greater than or equal to the threshold value. As a result, communication settings are set so that tape feeding is stopped and a "Ping" signal is transmitted in the communication permitted area 1, tape feeding is continued while a "Program" signal is transmitted in the communication permitted area 2, and tape feeding is stopped and a "Verify" signal is transmitted in the communication permitted area 3.

According to the above-described modification, the transmission/reception of information is performed in a communication permitted area where the power consumption of the print head 23 is predicted to be low, while the feeding of the tag label tape 109 with print is stopped and the transmission/reception of information is subsequently performed in a case where the communication permitted area is minimal and the communication time period is insufficient, thereby making it possible to make fine adjustments so that the peak of the combined power consumption of both printing and communication does not increase significantly and ensure reliable RFID label T production. Further, because the feeding of the tag label tape 109 with print is stopped in a communication permitted area, the tape feeding can be stopped in an area (time period) where printing is not performed (where the print volume is low), thereby making it possible to minimize the effect tape feeding stoppage has on printing.

While control is performed in the above so as to continue or stop the tape feeding in accordance with the size of the communication permitted area, control may be performed so as to change the tape feeding speed in accordance with the size of the communication permitted area. In such a case, when the communication permitted area is minimal and the communication time period is insufficient, the feeding of the tag label tape 109 with print is decelerated for the transmission/reception of information, thereby making it possible to more finely make adjustments so that the peak of the combined power consumption of both printing and communication does not increase. Further, the time period in which the tape feeding is stopped can be controlled, making it possible to reduce the RFID label production time in comparison with the above modification.

When multiple communication permitted areas are detected, feeding may always be stopped (or decelerated) in the last communication permitted area (for example, communication permitted area 3 in the case of FIG. 65). With this arrangement, even in a case where the transmission/reception of information is not completed in the previous communication permitted area, the transmission/reception of information can be completed in the last communication permitted area, thereby making it possible to reliably produce an RFID label T.

(3-2) When a Transmission/Reception of Information is Reattempted (Retried)

While in the above third embodiment, information writing to the RFID circuit element To (transmission of the "Program" signal) is performed only once, the present invention is not limited thereto, and retries may be performed in a case where information writing fails.

In the present modification, in the communication condition setting procedure of the step S3003, the retry count when information writing fails is set according to the communication permitted areas detected in the communication permitted time period detection processing. Furthermore, in a case where the detected communication permitted area is minimal and a retry cannot be performed even once, tape feeding may be stopped as described in the above modification (3-1) to attempt writing once again.

FIG. 66 is a diagram for explaining one example of the communication condition setting procedure of the present modification. FIG. 66A is a diagram for explaining the procedure configured to detect the communication permitted areas in the communication permitted time period detection processing of the step S3100. The figure is similar to FIG. 59, etc., and a description thereof will be omitted. As shown in FIG. 66B, here the "Ping" signal is transmitted in the communication permitted area 1, and the "Program" signal and "Verify" signal are transmitted in the communication permitted area 2. The time required for executing the "Ping" command is three dot columns, and the time required for executing the "Program" command and "Verify" command is five dot columns. Then, in a case where information writing fails in the communication permitted area 2, an attempt is made to perform (retry) information writing once again in the communication permitted area 3. At this time, the number of dot columns of the communication permitted area 3 is three, resulting in difficulties in performing retries while the tape is being fed. Here, in the communication permitted area 3, the tape feeding is stopped, and the "Program" signal and "Verify" signal are transmitted until writing succeeds, with the set retry count as the upper limit. Furthermore, in a case where information writing succeeds in the communication permitted area 2, signal transmission is not performed in the communication permitted area 3. Additionally, although not shown, in a case where the communication permitted area 3 is a relatively large area, the retry count is set in accordance with that size and retries are performed while the tape feeding continues.

According to the present modification described above, a retry count is set in accordance with the communication permitted areas so as to avoid retries outside the transmission/reception permitted time period, making it possible to make fine adjustments to ensure that the peak of the combined power consumption of both printing and communication does not increase and to reliably produce the RFID label T.

(3-3) When Divided Transmission/Reception is Performed

While in the above embodiment 3 information transmission to the RFID circuit element To is performed once, the present invention is not limited thereto and may be designed so that the information is divided and the transmitted.

In the present modification, in the communication condition setting procedure of the step S3003, a number of divisions for dividing the "Program" signal into multiple command elements prior to transmission is set in accordance with the communication permitted areas detected in the communication permitted time period detection processing.

FIG. 67 is a table summarizing the types of commands (command elements) transmitted from the apparatus antenna LC to the RFID circuit element To, and the time required for executing each command (here, converted to the number of dot columns outputted from the print buffer 117B to the print head 23 within that time). As shown in the figure, in the present modification, the information to be transmitted is divided into four blocks, and the "Program" signal is divided into four command elements and transmitted accordingly. The time required for executing the "Ping" command and "Verify" command is two dot columns, respectively, and the time required for executing the "Program" command is four dot columns (the time required for transmitting each command element is set to one dot column each).

FIG. 68 is a diagram for explaining one example of the communication condition setting procedure of the present modification. FIG. 68A is a diagram for explaining the procedure configured to detect the communication permitted areas in the communication permitted time period detection processing of the step S3100. The figure is the same as FIG. 59, etc., and a description thereof will be omitted. Then, as shown in FIG. 68B, the "Ping" signal and the command element 1 of the "Program" signal are transmitted in the communication permitted area 1, and the command elements 2 to 4 of the "Program" signal and the "Verify" signal are transmitted in the communication permitted area 2. In the subsequent communication permitted area 3, a transmission/reception of information is not performed.

According to the present modification described above, the "Program" signal is divided into multiple command elements and then transmitted in accordance with the communication permitted areas, thereby making it possible to make fine adjustments so that the peak of the combined power consumption of both printing and communication does not increase.

(3-4) When Communicability is Determined Per Dot Column

While in the above embodiment 3 the communication permitted areas of the entire area of the print data expanded into the print buffer 117B are detected before printing is started, the present invention is not limited thereto, and the decision as to whether or not communication is permitted may be made per dot column when data are to be transmitted from the print buffer 117B to the print head 23, with a transmission/reception of information performed in accordance with the decision result.

Further, rather than making the decision as to whether or not communication is permitted per dot column as described above, the dot pattern data of the print buffer 117B may be divided into a predetermined number areas so that communication permitted areas are detected on a per small area basis (for example, one character at a time, etc.).

(3-5) When the Threshold Value is Changed According to Command

While in the above third embodiment, the threshold value is uniformly set to a certain value and, when the number of print dots of each dot column is less than or equal to that threshold value, the decision is made that the dot column is a communication permitted area, the present invention is not limited thereto. That is, because the power consumption required by the IC circuit 151 of the RFID circuit element To differs according to the type of signal (command) transmitted, the threshold value may be varied according to the type of command.

FIG. 69 is a diagram for explaining one example of the communication condition setting procedure of the present modification. As shown in FIG. 69, the threshold value is 1.5 until the first communication permitted area (communication permitted area 1) is detected, 0.5 until the following second communication permitted area (communication permitted area 2) is detected, and 1.5 until the following third communication permitted area (communication permitted area 3) is detected. With this arrangement, communication conditions are set so that the communication permitted areas 1, 2, and 3 are detected as shown in FIG. 69A, and the "Ping" signal is transmitted in the communication permitted area 1, the "Program" signal is transmitted in the communication permitted area 2, and the "Verify" signal is transmitted in the communication permitted area 3.

According to the present modification described above, because in general the power consumption during information writing (during transmission of the "Program" signal) is greater than that during information reading (during transmission of the "Ping" and "Verify" signals), a threshold value is appropriately set according to command type, making it possible to make finer adjustments so that the peak of the combined power consumption of both printing and communication does not increase.

(3-6) When the Threshold Value is Changed According to Power Supply Voltage

While in the above third embodiment the communication permitted areas are set according to the (predicted) power consumption distribution of the print head 23 during printing, the present invention is not limited thereto, and control may be performed by adding the power supply voltage of the tag label producing apparatus 1 (that is, the voltage of the battery cell 130, or other electrical storage means such as a battery) to the conditions so that the communication permitted areas are set according to the (predicted) power consumption distribution of the print head 23 and the power supply voltage.

FIG. 70 is a diagram for explaining one example of the communication condition setting procedure in the present modification, and FIG. 70A illustrates a case where a high-capacity battery cell (such as a new battery cell, etc.) is used as the battery cell 130, FIG. 70B illustrates a case where a moderate-capacity battery cell (such as a used battery cell, etc.) is used as the battery cell 130, and FIG. 70C illustrates a case where a low-capacity battery cell (such as deteriorated battery cell, etc.) is used as the battery cell 130. In FIG. 70A, the threshold value is set high (here to 2.5) since the power supply capacity is high, and communication permitted areas are set using relatively large areas as shown in the figure. On the other hand, in FIG. 70B, the threshold value is set to a moderate level (here to 1.5) since the power supply capacity is moderate, and communication permitted areas are set using moderate level areas as shown in the figure. On the other hand, in FIG. 70C, the threshold value is set to a low level (here to 0.5) since the power supply capacity is low, and communication permitted areas are set using relatively small areas as shown in the figure.

According to the present modification described above, a threshold value is set in accordance with the power supply voltage of the tag label producing apparatus 1 so that the communication permitted areas can be appropriately set according to the (predicted) power consumption distribution of the print head 23 and the power supply capacity. This makes it possible to make finer adjustments so that the peak of the combined power consumption of both printing and communication does not increase.

(3-7) Other

While in the above the power consumption of the print head 23 is predicted by counting the number of print dots, and the communication permitted areas are set in accordance with power consumption distribution, in a case where the power consumption of the print head 23 exceeds the predicted power consumption or writing fails as a result of a larger decrease in power supply voltage than predicted during printing, for example, control may be changed from normal control (the control of the third embodiment) to control in accordance with current conditions by, for example, changing the threshold value according to command or power supply voltage as in the above modifications (3-5) and (3-6). Furthermore, in a case where conditions are still not resolved even though control has been changed in this manner, control may be performed so that printing is stopped and writing is subsequently performed.

Further, while in the above the number of print dots to be outputted to the print head 23 from the print buffer 117B where print data have been expanded is counted so as to predict the power consumption of the print head 23, the present invention is not limited thereto, and the power consumption of the print head 23 may be directly detected using such as a power meter, and the communication permitted areas may be detected according to that detection result.

Further, while in the above transmission/reception of information is performed by magnetic induction (including electromagnetic induction, magnetic coupling, and other non-contact methods performed via an electromagnetic field) using the apparatus antenna LC and a loop antenna as the antenna 152 of the RFID circuit element To, the present invention is not limited thereto and, as explained in the above first embodiment, a dipole antenna, patch antenna, etc., may also be used as the communication means, for example, to perform a transmission/reception of information.

(4) Other Modifications Common to all Embodiments

While the above has been described in connection with illustrative scenarios in which RFID tag information writing/reading and printing are performed with the tag label tape 109 with print in a moving state, the present invention is not limited thereto, and the tag label tape 109 with print may be stopped at a predetermined position (and further held by predetermined feeding guides for reading/writing) so as to perform printing and reading/writing.

Further, while in the above the half-cutting module 35 is provided as half-cutting means separately from the cutting mechanism 15 provided as cutting means, the present invention is not limited thereto. That is, for example, the system may be designed so that half-cutting is performed by controlling the rotation angle of the fixed blade 41 of the cutting mechanism 15 so that it is relatively small during full-cutting. In this case as well, the same effect is achieved.

Further, while the above has been described in connection with an illustrative scenario in which the tag label tape 109 with print that had been printed and accessed (performed reading/writing with) the RFID circuit element To is cut by the cutting mechanism 15 so as to form the RFID label T, the present invention is not limited thereto. That is, in a case where a label mount (a so-called die cut label) separated in advance to a predetermined size corresponding to the label is continuously disposed on the tape fed out from the roll, the present invention may also be applied to a case where the label is not cut by the cutting mechanism 15 but rather the label mount (a label mount containing the accessed RFID circuit element To on which corresponding printing has been performed) only is peeled from the tape after the tape has been discharged from the label discharging exit 11 so as to form the RFID label T.

Furthermore, the present invention is also not limited to a case where the RFID tag information is read from or written to the IC circuit part 151 of the RFID circuit element To, and print for identifying the RFID circuit element To is printed by the print head 23. This printing does not always need to be performed, and the present invention may be applied to a case where RFID tag information is only read or written. Further, while the above has been described using mainly as an example a case where RFID tag information is sent to the RFID circuit element To and written to the IC circuit part 151 so as to form an RFID label T, the present invention is not limited thereto. That is, the present invention can also be applied to a case where an RFID label T is produced by reading RFID tag information from a read-only RFID circuit element To in which predetermined RFID tag information is stored in advance in a non-erasable manner, and printing print corresponding to the RFID tag information thus read. In this case as well, the same effect as that above is achieved.

Further, while in the above a method in which print is printed on the cover film 103 separate from the base tape 101 comprising the RFID circuit element To and subsequently the cover film 103 and the base tape 101 are adhered to each other is employed, the present invention is not limited thereto and may be applied to a method in which, for example, print is printed in the print area of the cover film layer contained in thermal tape as the tag tape (a method where adherence is not performed). In such a case, the configuration of the receptacle 38 and the half-cutter 34 in the half-cutting module 35 differs from the above. That is, the receptacle is disposed on the half-cutter 34 side, and the half-cutter is disposed on the receptacle 38 side.

Furthermore, while the above has been described in connection with an illustrative scenario where the base tape 101 is wound around a reel member 102a so as to form a first roll 102, and the roll is disposed within the cartridge 7, and hence the base tape 101 is fed out from the cartridge 7, the present invention is not limited thereto. For example, an arrangement can be made as follows. Namely, a long-length or rectangular tape or sheet (including tape cut to a suitable length after being supplied from a roll) in which at least one RFID circuit element To is disposed is stacked (laid flat and layered into a tray shape, for example) in a predetermined housing part so as to form a cartridge. The cartridge is then mounted to the cartridge holder provided to the tag label producing apparatus 1. Then, the tape or sheet is supplied or fed from the housing part, and printing or writing is performed so as to produce RFID labels.

Furthermore, a configuration wherein the above-described roll is directly removably loaded to the tag label producing apparatus 1 side, or a configuration wherein a long, flat paper-shaped or strip-shaped tape or sheet is moved one piece at a time from outside the tag label producing apparatus 1 by a predetermined feeder mechanism and supplied to within the tag label producing apparatus 1 are also possible. Additionally, the structure of the roll is not limited to a type that is removable from the tag label producing apparatus 1 main body, such as the cartridge 7, but rather the first roll 102 may be provided as a so-called installation type or an integrated type that is not removable from the apparatus main body side. In this case as well, the same effect is achieved.

Note that the "Scroll ID" signal, "Erase" signal, "Verify" signal, "Program" signal, "Lock" signal, etc., used in the above are compliant to specifications enacted by EPC global. EPC global is a nonprofit corporation co-established by EAN (European Article Number) International, which is an international distribution code organization, and the Uniform Code Council (UCC), which is an American distribution code organization. Note that any signals compliant with other standards can be employed as long as the signals provide the same functions.

Other than those previously described, approaches according to each of the above embodiment and modifications may be utilized in combination as appropriate.

Note that various modifications which are not described in particular can be made according to the present invention without departing from the spirit and scope of the invention.

EXPLANATION OF REFERENCE NUMERALS

1 Tag label producing apparatus (RFID tag information communication apparatus)
3a Side wall (housing)
6 Cartridge holder (container holder)
7 Cartridge (RFID circuit element container)
11 Label discharging exit (discharging exit)
15 Cutting mechanism (cutting means)
23 Print head (thermal head, printing means)
51 Driving roller (discharging roller, position regulating means, communication facilitation processing means)
51'a Roller shaft
52 Pressure roller (discharging roller, position regulating means, communication facilitation processing means)
57 Roller support holder (arm member)
58 Roller support part (arm member)
101 Base tape
103 Cover film (print-receiving medium)
108 Feeding roller driving shaft (feeding means)
109 Tag label tape with print
127 Mark sensor (detecting means)
131 Two-colored LED (first notifying means, communication facilitation processing means; second notifying means, display means)
133 Speaker (first notifying means, communication facilitation processing means; second notifying means, sound producing means)
151 IC circuit part
152 Tag antenna
1200 Magnetic body
1201 Shielding plate (shielding means)
1202 Shielding plate (shielding means)
1203 Shielding plate (shielding means)
1204 Guide wall (position regulating means, communication facilitation processing means)
1205 Guide wall (position regulating means, communication facilitation processing means)
1206 Guide wall (position regulating means, communication facilitation processing means)
1208 Screw (fixing means)
LC Apparatus antenna
PM Identification mark (identifier)
RP1 Conductive layer pattern (coil)
RP2 Conductive layer pattern (coil)
RP' Conductive layer pattern (coil)
S Print area
To RFID circuit element
T RFID label

The invention claimed is:

1. A tag label producing apparatus comprising:
a feeding device that feeds a tag medium including an RFID circuit element having an IC circuit part configured to store information and a tag antenna configured to transmit and receive information;
a communication device that transmits and receives information via a wireless communication to and from said RFID circuit element provided in said tag medium; and
a communication facilitation processing portion that executes predetermined facilitation processing related to a communication during said wireless communication based on said communication device, wherein
said tag medium comprises a tape-shaped or sheet-shaped second tag medium,
said feeding device feeds either said second tag medium, wherein said RFID circuit element is disposed, or a print-receiving medium, which is to be bonded to the second tag medium, and
said tag label producing apparatus further comprises a printing device that performs a printing in a predetermined print area of said second tag medium or of said print receiving medium during the feeding by said feeding device, and wherein, said communication facilitation processing portion is a predicting portion that predicts whether or not a transmission/reception of information will be permitted based on the corresponding operation status of said printing device, before said communication device performs said transmission/reception of information, and said communication device performs said transmission/reception of information with said RFID circuit element in a non-contact manner during the feeding by said feeding device, in accordance with the prediction result of said predicting portion, and said predicting portion includes a printing power calculating portion that calculates the power consumption required for printing said predetermined print area using said printing device, and a communication condition setting portion that sets conditions for said transmission/reception of information in accordance with a calculation result of said printing power calculating portion.

2. The tag label producing apparatus according to claim 1, wherein:

said predicting portion further includes communication permitted time detecting portion that detects a transmission/reception permitted timing and a transmission/reception permitted time period for said communication device, based on the power consumption calculated by said printing power calculating portion; and said communication condition setting portion sets conditions for said transmission/reception of information in accordance with said transmission/reception permitted timing and said transmission/reception permitted time period detected by said communication permitted time detecting portion.

3. The tag label producing apparatus according to claim 2, wherein:

said communication permitted time detecting portion detects said transmission/reception permitted timing and said transmission/reception permitted time period based on whether the power consumption calculated by said printing power calculating portion is lower than a predetermined threshold value.

4. The tag label producing apparatus according to claim 2, wherein:

said conditions for the transmission/reception of information includes a transmission/reception timing and a transmission/reception time period, and said communication condition setting portion sets at least said transmission/reception timing and said transmission/reception time period.

5. The tag label producing apparatus according to claim 4, wherein:

said conditions for the transmission/reception of information further includes a feeding speed of said feeding device, the presence of deceleration or stopping of the feeding speed and the decelerated or stopped time period, a transmission/reception retry count, or the presence of a transmission/reception data division and the amount of transmission/reception data the division, and said communication condition setting portion further sets at least said feeding speed, the presence of said deceleration or said stopping and the decelerated or stopped time period, said transmission/reception retry count, or the presence of said transmission/reception data division and the amount of transmission/reception data after the division.

6. The tag label producing apparatus according to claim 5, wherein:

said communication condition setting portion sets the presence of a deceleration or a stopping by said feeding device during the transmission/reception of information in accordance with said transmission/reception time period set and, in a case where said feeding device is set to decelerate or stop, sets a deceleration time period or a stopped time period.

7. The tag label producing apparatus according to claim 5, wherein:

said communication condition setting portion sets said transmission/reception retry count during the transmission/reception of information in accordance with said transmission/reception permitted timing and said transmission/reception permitted time period detected by said communication permitted time detecting portion.

8. The tag label producing apparatus according to claim 1, wherein:

said printing power calculating portion calculates a distribution of said power consumption in at least a communication permitted range with respect to said printing area prior to a start of the printing by said printing device; and said communication condition setting portion sets the conditions for the transmission/reception of information of said communication device in accordance with the power consumption distribution calculated by said printing power calculating portion.

9. The tag label producing apparatus according to claim 1, wherein:

said printing power calculating portion calculates the distribution of said power consumption per small area of said print area divided into a predetermined quantity before or after the start of printing by said printing device; and said communication condition setting portion sets the conditions for the transmission/reception of information of said communication device in accordance with the power consumption distribution calculated by said printing power calculating portion.

10. The tag label producing apparatus according to claim 1, further comprising a determining device that determines whether or not a condition for a transmission/reception of information that enables normal production of a tag label can be set.

11. The tag label producing apparatus according to claim 1, wherein:

said printing device is a thermal head having a heating element configured to generate a heat when a current is applied.

* * * * *